United States Patent [19]
Livingston et al.

[11] Patent Number: 4,714,993
[45] Date of Patent: Dec. 22, 1987

[54] APPARATUS AND METHOD FOR EFFECTING DYNAMIC ADDRESS TRANSLATION IN A MICROPROCESSOR IMPLEMENTED DATA PROCESSING SYSTEM

[75] Inventors: David L. Livingston, Binghamton; Daniel J. Sucher, Vestal; Bruce M. Walk, Endicott, all of N.Y.

[73] Assignee: International Business Machines Corporation, Armonk, N.Y.

[21] Appl. No.: 912,165

[22] Filed: Sep. 26, 1986

Related U.S. Application Data

[63] Continuation of Ser. No. 542,933, Oct. 18, 1983, abandoned.

[51] Int. Cl.[4] .............................................. G06F 12/10
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 4,037,215 | 7/1977 | Birney et al. | 364/200 |
| 4,145,738 | 3/1979 | Inoue et al. | 364/200 |
| 4,276,609 | 6/1981 | Patel | 364/900 |
| 4,373,179 | 2/1983 | Katsumata | 364/200 |
| 4,374,410 | 2/1983 | Sakai et al. | 364/200 |
| 4,374,417 | 2/1983 | Bradley et al. | 364/200 |

*Primary Examiner*—Gary V. Harkcom
*Assistant Examiner*—David L. Clark
*Attorney, Agent, or Firm*—Curtis G. Rose; J. H. Bouchard; J. Jancin, Jr.

[57] ABSTRACT

The performance of a multi-microprocessor implemented data processing system that emulates a mainframe system is enhanced and optimized in view of space and power constraints for purposes of address translation by providing RAM-based storage means of predetermined depth and width to function as a page address table. The storage means depth is set to at least provide bit space to represent the total number of fixed size pages possible in a given virtual memory space. The width of the storage means is set to at least provide bit space to represent the largest page number that might be encountered in the available real memory and to accommodate a predetermined number of bits that flag information pertinent to translation and system performance. Circuit means, including microcode, is provided for initializing and updating the contents of the storage means as required. Further, when the translation capability is off, a real out-of-bounds flag bit in the storage means can be used to dynamically insure that a real out-of-bounds condition is not produced. The storage means is coupled to the microprocessor address bus from when it receives the page portion of a virtual address for which a real address is desired.

9 Claims, 4 Drawing Figures

APPARATUS AND METHOD FOR EFFECTING DYNAMIC ADDRESS TRANSLATION IN A MICROPROCESSOR IMPLEMENTED DATA PROCESSING SYSTEM

This is a continuation of application Ser. No. 542,933, filed Oct. 18, 1983, now abandoned.

BACKGROUND OF THE INVENTION

1. Field of the Invention

This invention is concerned with apparatus for and a method of effecting address translation in a multi-microprocessor implemented data processing system that emulates a mainframe system. More particularly, this invention is directed to optimizing dynamic address translation in such a system through the replacement of the translation look-aside buffer with a random access memory array.

2. Description of the Prior Art

The emulation of "mainframe" data processing systems through the use of microprocessors has become a reality. A typical mainframe data processing system would be any one of the System/370 (S/370) models available from International Business Machines Corporation. The Personal Computer XT/370, a "desktop" System/370, also available from International Business Machines Corporation, is one example of such a microprocessor implemented mainframe. This particular desktop system is a hardware/software package that allows one to run System/370 application programs in a single user environment, to run as a terminal attached to a mainframe host or to run in a stand-alone mode as a personal computer, as required by the particular application. There are, of course, similar systems available from other manufacturers, all of which systems incorporate many of the same functions as the Personal Computer XT/370 although the manner and means of implementation does differ, in varying degrees, from system to system.

Due to revolutionary advances in chip densities and packaging, which have been accompanied by significant reductions in costs, many main frame features can now be implemented directly in a desktop system, while other features require some hardware and/or software assistance in order to make them available. The introduction and use of more powerful microprocessors such as, for example, the 8086 and 8088 from Intel Corporation and the 68000 from Motorola Corporation, add further to the list of functions it would be possible to implement in a desktop mainframe. This new breed of microprocessors is fully capable of running a large, enriched instruction set, such as that of System/370, although several of these microprocessors, working in concert with the aid of additional hardware and/or software support, would be required to effect instruction execution in an acceptable time period. It will also be appreciated that presently available microprocessors, while remarkable for the functions they do offer, are not capable of providing all mainframe capability without system compromise.

Thus, as in all data processing system designs, various trade-offs are made in order to optimize the price and performance of these microprocessor implemented desktop mainframes. One particular trade-off problem is posed by the need or desire to utilize certain mainframe functions and features that would be particularly difficult to provide in a microprocessor implemented desktop mainframe. Another type of trade-off problem is posed by the requirement that all architectural constraints of the emulated mainframe be adhered to so that user programs can be run without conflict. One specific implementation problem of concern, due in part to such trade-offs being made, is that of effecting address translation, from a virtual to a real address, without adversely impacting space and power constraints in a microprocessor implemented mainframe data processing system. In the System/370 world, for example, dynamic address translation (DAT) is implemented with performance as a paramount consideration, with space and power constraints being given secondary weight. In a microprocessor implemented system such design priorities are often reversed and sometimes dramatically so.

Dynamic address translation, by way of background explanation, is a capability which enables the user of a data processing system to have access to a greater working memory size than that which is actually available in terms of physically realized memory. The extra memory size is obtained through the use of a fast mass storage device, such as a hard disk. The memory space perceived to be available by the user is referred to as the virtual memory space. If the data processing system is a multi-user facility or if the size of the application program warrants the use of DAT, part of the user's program will reside in real memory and the rest will reside on the hard disk.

For address translation purposes, the real and virtual memory spaces are partitioned into blocks of equal size called pages. All addresses are divided into two parts; a high order portion that identifies the page number and a low order portion that identifies the address of an element within the page. Given a virtual address, translation to the real address is accomplished by means of a "page table". The page number portion of a virtual address is used to locate the memory residence of a desired page by reference to the page table. If the page table reveals that the desired page is presently in real memory, the virtual page number gets translated to the real page number. The element address within the page remains unchanged. If the desired page is not in real memory, a "page fault" is indicated that causes the desired page to be fetched from the hard disk and loaded into real memory. The page table is then updated to reflect the changes made to real memory.

When a new page is to be loaded into real memory, the position it will occupy is decided by an algorithm that determines which old page can first be removed to make room in real memory for the desired page, with the least impact on system performance. This page selection algorithm is based, in part, on a flag called the reference bit, one of which is associated with each page table entry. The previous contents on the page location being loaded are either written to the hard disk, if the page had been changed since it was first loaded, or simply overwritten, if no page changes have been made. This fact is also determined by software and is indicated by a flag called a change bit, one of which is associated with each page table entry. The reference and change bits are kept in real memory, in a System/370 environment, separate from the page table and pages with which they are associated.

In System/370 architecture, the page table is located in real memory. As a result, due to the relatively slow access times of the real memory chips or modules, translations directly accessing it are extremely slow from a performance standpoint. Therefore, a small subset of the page table is kept in a fast piece of hardware called a translation look-aside buffer (TLB). Address translations are referenced to both the TLB and the page table. If the desired page resides in the TLB, then translation is performed via the TLB and access to the page table is terminated. Otherwise, translation is performed through the page table and the contents of the TLB must be updated. When updating the TLB, reference bits provide a means for determining which address is the least recently used. This address is replaced with the new address obtained via the page table translation. To clear the TLB, a "purge" instruction is given. Performance suffers anytime a translation is performed via the page table because of a "miss" in the TLB.

The above techniques were designed for use in mainframe systems where, as noted above, space and power considerations are secondary to performance. In small, microprocessor-based systems, performance is still important, but space and power considerations becomes significant limiting factors. The address translation problem for the system designer now becomes one of balancing the trade-offs among performance, space and power restrictions while still providing efficient DAT in a single user, microprocessor-based environment.

As was previously mentioned, performing DAT using a page table in a real memory, without a TLB, would result in excessive and relatively slow memory accesses and, thus, degrade system performance. While performance enhancement is made possible in such a situation via implementation of a TLB, this alternative and its associated circuitry utilizes a large amount of high speed logic which requires, in turn, a relatively large quantity as noted, of board space and power. In addition, there is a considerable amount of microcode needed to manage and control operation of the TLB which, if provided, further taxes the limited resources of a microprocessor implemented mainframe. Thus, while it would be possible to enhance address translation to benefit that aspect of system performance, the space, power and coding penalties associated with a TLB-aided solution to translation performance improvement are too great to accept.

OBJECTS AND SUMMARY OF THE INVENTION

Accordingly, it is a principal object of the present invention to provide means for and a method of address translation that will permit a multi-microprocessor implemented mainframe data processing system to satisfactorily utilize virtual memory space without need of a translation look-aside buffer.

It is also a principal object of the present invention to provide such means and methodology in such a system wherein address translation is implemented in a manner that does not unduly sacrifice translation speed while conserving space and power.

It is a further object of the present invention to provide means and a method for enabling address translation in a microprocessor implemented mainframe data processing system that includes parity, page content change and page usage indicia.

It is another object of the present invention to provide means and a method for enabling address translation in a microprocessor implemented mainframe data processing system that includes out-of-bounds detection.

It is another object of the present invention to provide means and a method for enabling address translation in a microprocessor implemented mainframe data processing system that includes out-of-bounds detection which permits real memory space to be configured, as desired, in a programmable segmented or continuous manner.

These and other objects of the present invention are achieved in a multi-microprocessor implemented mainframe emulated data processing system by selectable apparatus for effecting address translation which employs storage means of appropriate and predetermined dimensions for the translation task. The storage means is coupled to the microprocessor address bus from whence it receives the page portion of a virtual address for which a real address is desired. The storage means depth is set to at least provide bit space to represent the total number of fixed size pages possible in a given virtual memory space. The width of the storage means is set to at least provide bit space to represent the largest page number that might be encountered in the available real memory and to accommodate a predetermined number of bits that flag information pertinent to translation and system performance. Circuit means, including microcode, is provided for initializing and updating the contents of the storage means as required. Further, when the translation capability is off, a real out-of-bounds flag bit in the storage means can be used to dynamically insure that a real out-of-bounds condition is not produced.

BRIEF DESCRIPTION OF THE DRAWINGS

The invention will be described further, by way of a preferred example thereof, with reference to the accompanying drawings wherein like reference numerals have been used in the several views to depict like elements, in which.

DESCRIPTION OF THE PREFERRED EMBODIMENT

The present invention is to be explained in the context of a mainframe desktop system that has been implemented with at least two microprocessors. More particularly, this resultant system has been adapted to emulate a System/370 mainframe. For those requiring further information on the instruction set of this mainframe and details of System/370 functions, reference should be made to the IBM System/370 Principles Of Operation (Manual No. GA22-7000), which is available from the IBM Corporation and which is, to the extent necessary, incorporated herein by reference. In addition, those requiring further information on the details of the desktop mainframe referred to herein should refer to Technical Reference Manual For The IBM Personal Computer XT/370 Manual No. 6936732).

It will be understood by those having skill in this art that mainframe implementation can be achieved by use of only a single microprocessor. Alternatively, a plurality of microprocessors, equal to or different than the number used herein, could be employed to emulate a mainframe system. Further divergence in system configuration is possible as a result of variations in instruction set partitioning schemes and the manner in which the subsets are then emulated. Examples of this multiple microprocessor implementation approach are more completely described in commonly assigned U.S. patent application Ser. No. 371,634, filed in the names of Agnew et al on Apr. 26, 1982. In Agnew et al, a System/370 instruction set is partitioned in accordance with several criteria and the subsets thereof are each implemented on one or more of a plurality of microprocessors, but not all necessarily in the same manner.

Figure 1:
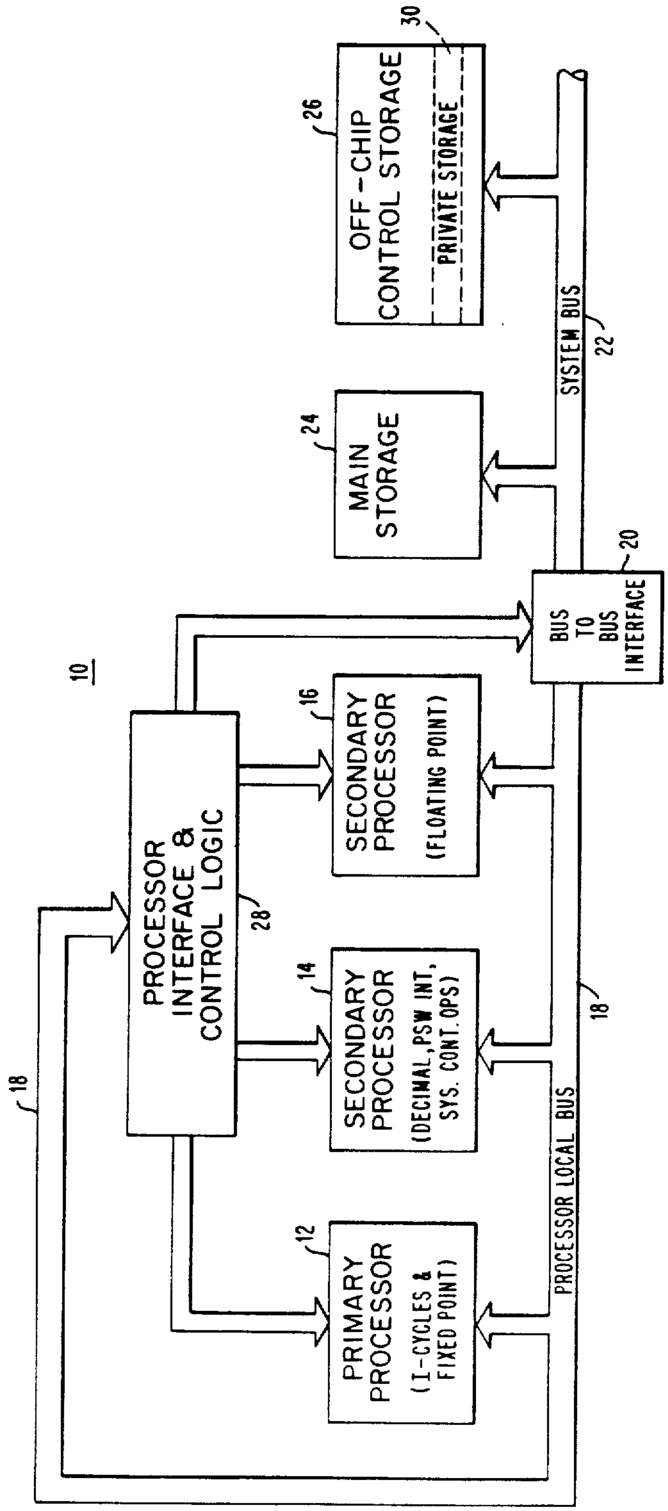
FIG. 1 schematically illustrates a simplified block diagram of a multi-microprocessor implemented mainframe data processing system which includes control and main memory storage.

An illustrative desktop mainframe data processing system 10 is shown in FIG. 1. As depicted in the simplified system block diagram thereof, a primary processing unit 12, and its associated secondary microprocessors 14 and 16 are connected to a local processor bus 18. Local bus 18 is connected, in turn, by bus-to-bus adapter 20 to the system bus 22. Main storage 24 and the secondary control storage 26 are both connected to the system bus 22. The primary processor 12 and secondary processors 14 and 16 are also responsively connected to processor control logic means 28 which incorporates processor control and interface logic and some private storage therefor. Certain aspects of the control logic means 28 shall be discussed hereinafter in greater detail.

In the particular embodiment described herein, primary processor 12 is assigned the responsibility for performing all instruction fetches and operand address calculations for all of the processors used in the system. It also performs execution of all fixed point instructions, contains and maintains the general purpose registers, instruction length codes, condition codes and instruction addresses, recognizes system interrupts and provides indications to the system that a main storage instruction fetch or operand access is required. In addition, primary processor 12 is also able to provide an indication to the system that a change in processor control is needed.

Secondary processor 14 performs execution of all system control instructions and maintains all of the control registers. When necessary, it performs the service processor function and provides indications to the system of main storage operand access and private storage microcode access. In addition, secondary microprocessor 14 is adapted to provide the system with an indication that a change in processor control is needed.

Secondary microprocessor 16 performs execution of all floating point instructions, containing and maintaining all of the floating point registers. It also provides the system with an indication of main storage operand access and of a need to alter microprocessor control. Alternatively, these floating point functions can be provided by a peripheral unit rather than by a microprocessor.

The mainframe instruction set is thus allocated for execution among the several processors. Primary processor 12 is provided with limited on-chip control store that can be utilized to store mainframe instruction responsive microcode and/or microprocessor interface and control microcode. It will be recognized, given the fixed quantity of on-chip control store available, that the instruction responsive microcode and the interface microcode reside in control store at the cost of the other. A greater amount of one type of microcode in on-chip control store residence means that a lesser amount of the other type can be accommodated therein. If a more functional microprocessor interface is desired, with an attendant cost in supporting microcode, there will be less room in control store for instruction responsive microcode. From a performance standpoint, it is best to keep the interface simple and leave as much control store as possible for instruction code. In this embodiment, for example, it has been decided to place microcode for the most frequently used mainframe instructions in the control store of microprocessor 12 and to use a relatively simple intermicroprocessor interface that requires minimal microcode.

A main storage module 24 is attached to system bus 22 and used as needed by the processors 12, 14 and 16. It is assumed that the processor local bus 18 and the microprocessors 12, 14 and 16 all include 24 bits of addressing to accommodate the addressing structure of the mainframe to be implemented. It may be necessary to slightly modify currently available microprocessors to achieve this addressing capability. The secondary processor 14 uses off-chip control storage module 26, as may be necessary, for its own microcode and scratchpad functions. While secondary processor 16 has no need to use off-chip control store 26 in this embodiment, it could access that module, as might be necessary, to satisfy its microcode and scratchpad needs. Processors 12, 14 and 16 and processor control logic means 28 are interconnected together by and pass information to each other on the processor local bus 18. The microcode required by secondary microprocessor 14 is shown in source form in Appendix A hereof. It includes the code for interfacing the processors and for controlling certain aspects of dynamic address translation, such as initialization and updating, as shall be hereinafter explained.

Because all of the available address bits or lines in a microprocessor implemented mainframe will be needed to define and emulate the mainframe's virtual storage, it would not be effective to divide all possible storage defined by the available address bits between virtual main storage and control storage. Since all of the available address lines are needed to define virtual storage, prior to determination of the real address involved, there is no direct manner of using those same address lines to also identify unique control storage addresses. An additional line is required and implemented to distinguish main storage from control storage accesses.

Although shown as two separate modules, and they are from a logical standpoint, main storage and control storage are a physically contiguous block of random access memory (RAM), with an exception to be discussed below. The dividing line between storage modules, as described herein, is the dividing line between real main storage and control storage. In this illustrative embodiment, the main storage module 24 runs from address 00000 to address 77FFF (hexidecimal—hereinafter hex). The control storage module 26 runs from address 78000 to address 7FFFF (hex). The addresses used herein have been selected to simplify and facilitate this description. Those having skill in this art will recognize that the address limits for each memory module are a design choice and that the manipulation of more than than one address bit, to steer between main and control storage, may be necessary.

Private store 30, referred to previously, is logically a portion of off-chip control storage 26, but is physically located in the processor control logic means 28 and mapped into a reserved segment of control store 26.

The reserved segment of control store 26 is typically about 256 bytes long, although it can be greater. The processor control logic means 28 is connected to bus-to-bus interface 20 via bus feeder 18a. Also physically located in the processor control logic means 28 are a pair of override latches, see commonly assigned U.S. patent application Ser. No. 527,053 filed in the name of Buonomo et al for additional details, that serve to steer memory accesses from processors 12 and 14 to either the main memory storage module 24 or to the off-chip control storage module 26.

The invention described herein enables an optimal and efficient realization of dynamic address translation in a single user, microprocessor-based System/370. By taking advantage of advances in random access memory (RAM) technology, the traditional high speed, hardware implemented TLB-slow real memory page table combination can be replaced by a page table implemented in fast static RAMs. Given a fixed page size, the overall RAM depth is set equal to or greater than the total number of pages of that size which will fit in the virtual memory space. The RAM width is set, in part, to accommodate the number of bits needed to represent the highest page number possible in the available real memory space. In addition, the RAM width is chosen to include, for each page entry therein, a page fault bit that is used to signify whether the desired virtual page is in real memory, reference and change bits to assist in the transfer of pages from disk to memory and vice versa, a real out-of-bounds bit that signifies if an address is outside the defined real memory space, and a parity bit for checking proper operation of all functions associated with the RAM.

Figure 2:
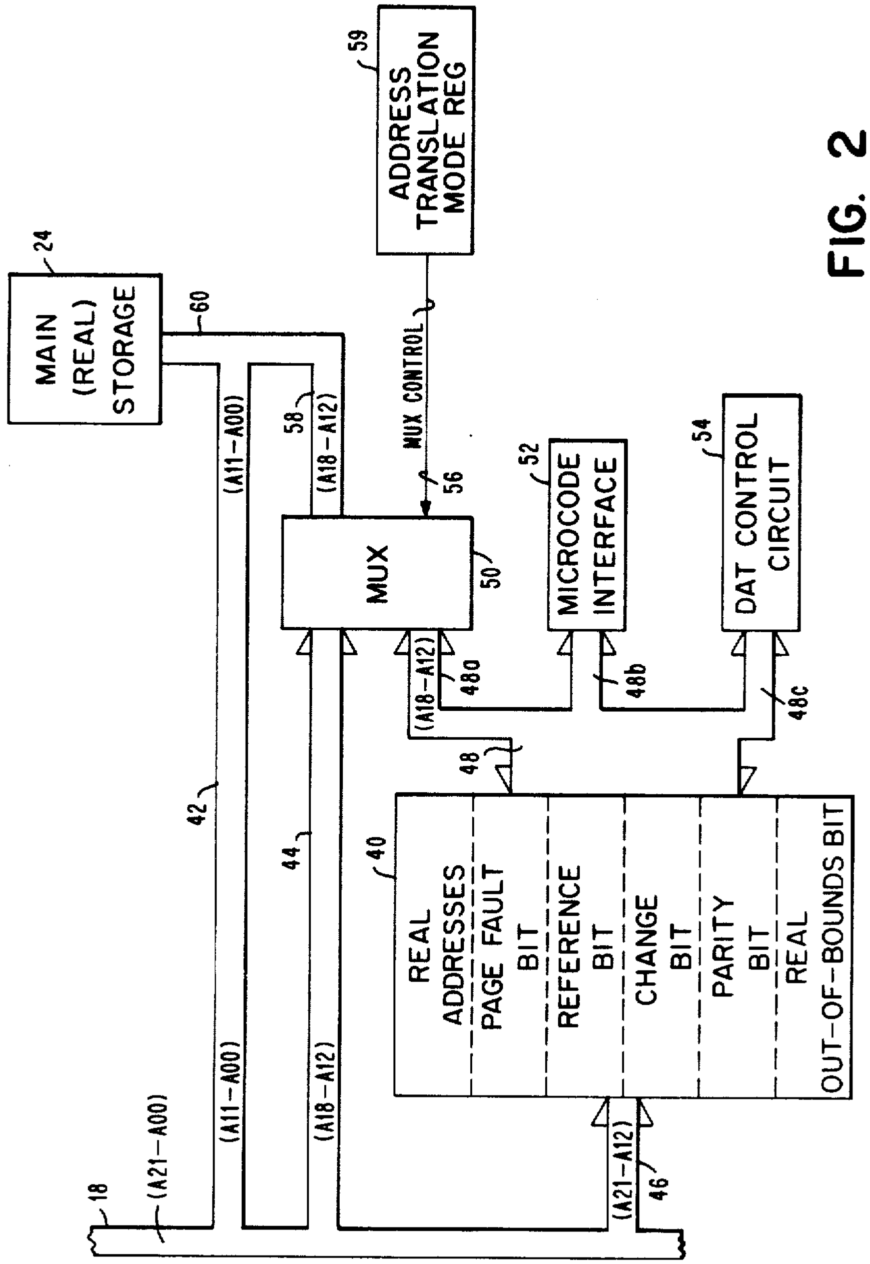
FIG. 2 schematically depicts, in accordance with the present invention, a block diagram of address translation apparatus for the FIG. 1 processing system.

A generalized view of a mainframe desktop system which incorporates dynamic address translation in accordance with the subject invention is shown in FIG. 2. The RAM organization of the above-mentioned functions will henceforth be referred to as the page address table or PAT 40. Input bus information for use by the PAT 40 or for system use when PAT 40 is not operational is derived from the microprocessor bus 18. In total, three address sub-buses are derived utilizing specific bits of the microprocessor address bus 18, as follows. The twelve low order address bits A11–A00, which define the element address within a page, are extracted from microprocessor address bus 18 and placed on element bus 42. The next seven bits A18–A12, which are sufficient to define all real memory page numbers, are similarly extracted from microprocessor address bus 18 and placed on real address bus 44. The ten high order bits A21–A12, which define all possible virtual memory page addresses, are also removed from microprocessor address bus 18 and placed on PAT input bus 46. The Pat 40 output bus 48 is actually a composite bus that includes three sub-busses 48a, 48b and 48c. PAT output sub-bus 48a carries the real or translated address, bits A18–A12, to data multiplexer 50. PAT output sub-bus 48b bi-directionally transfers information between microcode interface 52 and PAT 40 as shall hereinafter be explained. PAT output bus 48c performs a similar function in transferring information between DAT control circuit 54 and PAT 40. The nature and use of the information transferred by these PAT output buses shall also be explained hereinafter.

There are three modes of operation for PAT 40. Mode A is "DAT on", in which address translation and any functions associated therewith are automatically controlled by hardware and the microcode provided for that purpose. In this first or "DAT on" mode, the input PAT address bus 46, which consists of the 10 high order address bits A21–A12 from microprocessor address bus 18, define the virtual page number being sought. All data bus functions are automatically controlled by hardware in the "DAT on" mode. The second mode, "DAT off", basically bypasses the PAT with the exception of use of the real out-of-bounds bit. Translation is not needed in this operating mode. The third mode, "PAT modification" allows access to the PAT by the processor microcode for initializing and updating purposes. In this mode, the address space of PAT 40 becomes a subspace of memory accessible only to the microcode. This prevents any direct interaction between software and PAT 40. Initialization and updating of PAT 40 by the microcode is aided by a microcode interface circuit 52, see FIG. 3, composed of the tri-state buffer 70, transceivers 72, 74 and 76, as well as the necessary address, data and control signal information therefor.

Mode selection is accomplished by processor microcode manipulation of a mode selection control register 59. When the contents of mode selection register 59 are set to a predetermined value, it causes the data multiplexer control line 56 to be set. This results in the address information on bus 48a being passed through data multiplexer 50 to its output bus 58. If the "PAT off" or "PAT manipulation" modes are required, the mode register is loaded with an appropriate value that resets data multiplexer control line 56. This switches the data on bus 44 to the multiplexer output bus 58 since address translation is not required for these modes of operation.

The translation and page fault mechanism are required for DAT use. When a translation is attempted, the virtual page number is input to PAT 40. If no page fault is detected by the microcode, the translation bus 48a, excluding the page fault bit, represents the real page number. This address portion is concatenated with the element address on bus 42 to form the entire real address placed on the real address bus 60. If a page fault is detected, the translation content of the PAT has no meaning. The microcode then responsively initiates a page fault exception which begins the paging process and ultimately updates PAT 40.

Reference and change bits are supplied to assist the secondary processor 14 microcode in determining where a new page will be placed in real memory and whether or not the old page it replaces need be written to the hard disk. Every time a virtual page is accessed, its corresponding reference bit is correspondingly set. It can only be reset or de-asserted by the microcode. The change bit is asserted or set whenever a write operation is performed during a virtual page access. It also can only be reset by the microcode.

Real out-of-bounds detection is normally implemented in random logic as an address threshold. Any address above the threshold causes the processor in control to be notified of the addressing error. This function is implemented, in accordance with the present invention, by using PAT 40 when in the "DAT off" mode. The real address is obtained directly from processor address bus 18 by multiplexing certain of the address bits around PAT 40, as previously explained. The input PAT 46 bus of the microprocessor address bus remains connected as the PAT input address bus. Since this bus contains part of the real address being accessed, a threshold may be defined in PAT 40 by asserting all locations of the real out-of-bounds bit above the threshold address. That information is placed into PAT 40 by the microcode and the microcode interface logic, see FIG. 3, for subsequent real address verification. This task is primarily handled by the tri-state buffer. In addition, programmable, multiple thresholds may be implemented, allowing the real memory space to be segmented in any desired configuration. When DAT is on, the real out-of-bounds bit has no meaning. In this case, microcode operation during PAT modification must prevent the user from establishing an address translation which would produce a real out-of-bounds condition. Use of the real out-of-bounds bit when translation is off is under microcode control.

Figure 3A:
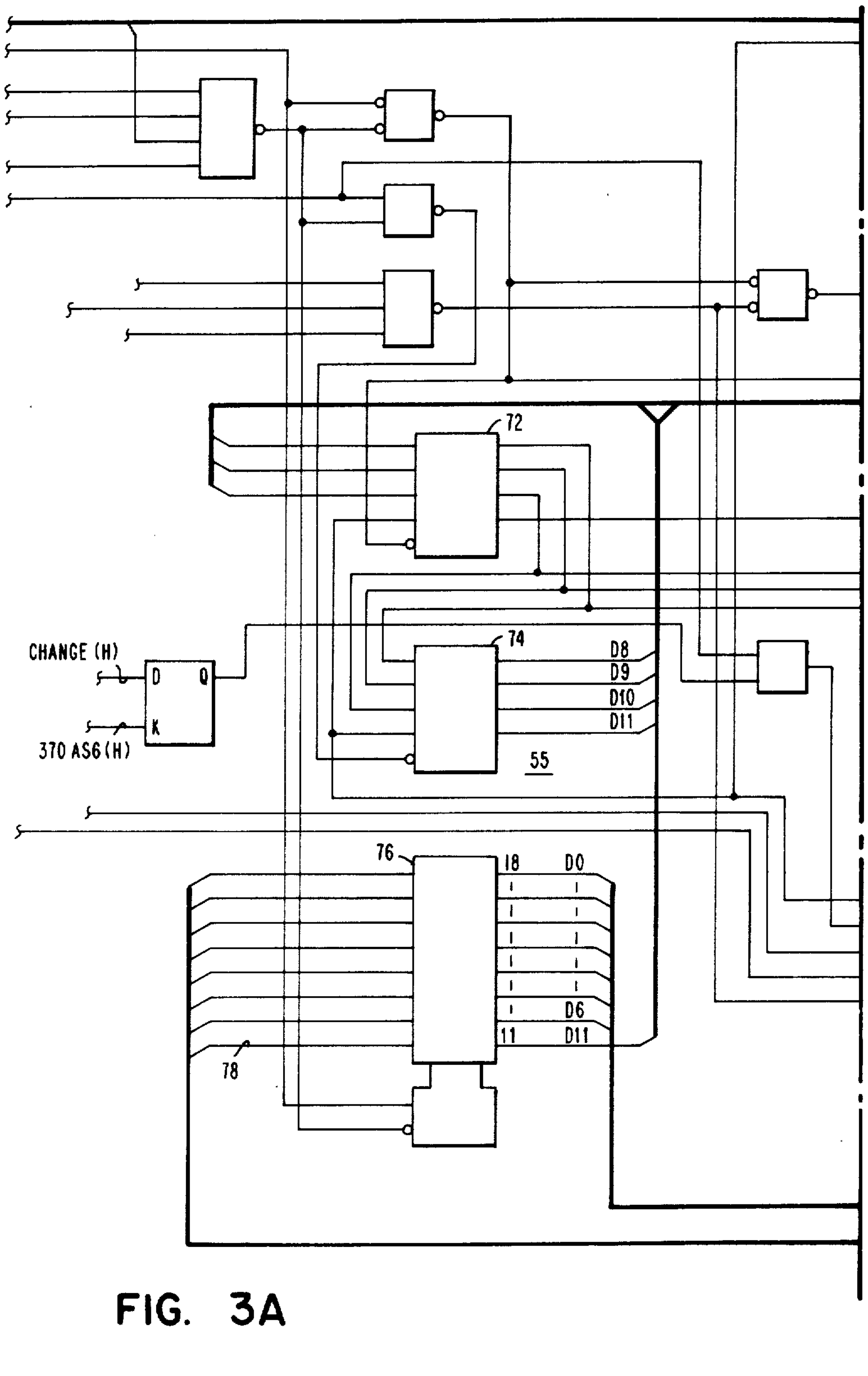
FIGS. 3A and 3B schematically show, in greater detail, the address translation apparatus for the FIG. 2 processing system.
Figure 3B:
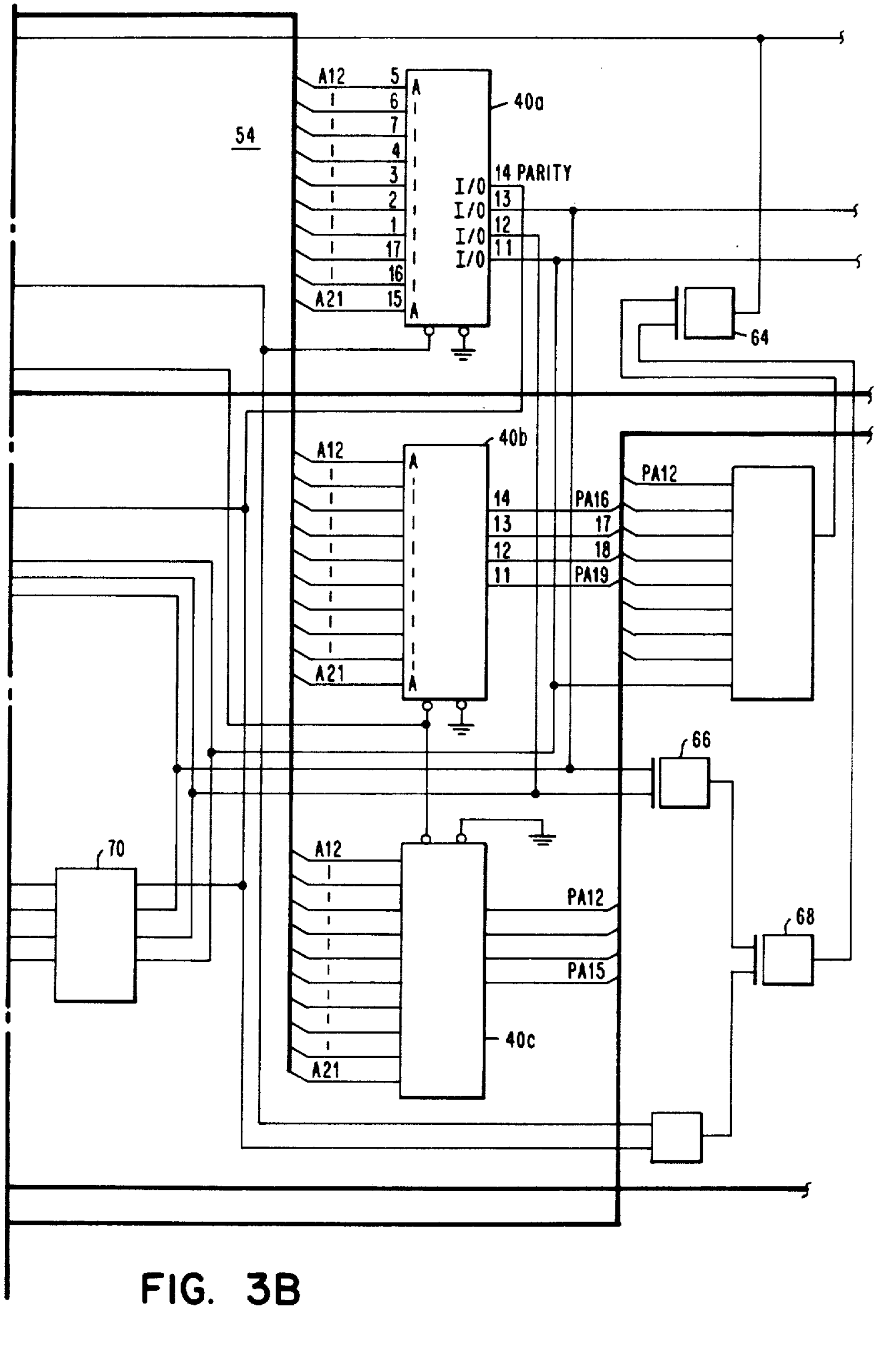

Parity is automatically checked and generated across the entire width of the PAT for every access when DAT is on or any microcode access. If a parity error is detected, the microcode sends a machine check to notify the user of the error. As shown in FIG. 3, parity is checked for DAT RAMs 40*a*, 40*b* and 40*c* by the combination of buffer 62 and Exclusive OR gates 64, 66 and 68.

As an example of PAT 40 use, it will be assumed that a 4 megabyte (MB) virtual memory space having fixed 4 kilobyte (KB) size pages is to be implemented in accordance with the arrangement shown in FIG. 2. The lower twelve address lines, bus 42, of the microprocessor address bus 18 determine the location of an element within a 4KB page. Ten upper address lines from the microprocessor address bus 18 are needed to identify and access 1,024 virtual pages, which is the maximum number of 4KB pages that fit in the defined virtual memory space. In this example, the real memory space is limited to 512KB. This requires that the width of translation bus 48*a* of PAT 40 be seven bits. These seven address lines will carry the translated real page number and are concatenated with the lower twelve address lines to form the real address on bus 60.

Although the present invention has been described in the context of a preferred embodiment thereof, it will be readily apparent to those skilled in the appertaining art, that modifications and variations can be made therein without departing from its spirit and scope. Accordingly, it is not intended that the present invention be limited to the specifics of the foregoing description of the preferred embodiment. Instead, the present invention should be considered as being limited solely by the appended claims, which alone are intended to define its scope.

APPENDIX A

```
       00000000   LISTFL    EQU  0
                  *              WASHINGTON PRIVATE STORAGE MAP
                  ***********************************************************************
                  *                                                                     *
                  *        THE FOLLOWING CODE DEFINES MAJOR AREAS OF WASHINGTON         *
                  *        PRIVATE STORAGE. ALL FURTHFR DFFTNTTION OF FRIVATE           *
                  *        STORAGE WILL BE BASED ON THE LABELS DEFINED BELOW.           *
                  *        THERE SHOULD BE NO OTHER DIRECT REFERENCES TO PRIVATE        *
                  *        STORAGE ADDRESSES.                                           *
                  *                                                                     *
                  ***********************************************************************
                  *
                  *
                  *----------------------------------------------------------------------
       00000000             ORG     $0000          M68000 TRAP/INTERRUPT VECTORS AREA
000000 0100       VECTORS   DS.B    $100           DEFINED IN 'ECODE'
       00000024   TRACEV    EQU     VECTORS+$24    E-ENGINE TRACE VECTOR
       00000080   TRAP0     EQU     VECTORS+$80    E-ENGINE TRAP0 VECTOR
       00000100   END_01    EQU     *
                  *----------------------------------------------------------------------
       00000100             ORG     $0100          370 REGISTER INTERCHANGE AREA
000100 00A4       REG_AREA  DS.B    $A4            DEFINED IN 'EQUATES'
       000001A4   END_02    EQU     *
                  *----------------------------------------------------------------------
       00000200             ORG     $0200          370 EMULATION MICROCODE AREA
000200 2E00       ECODE     DS.B    $2E00          DEFINED IN 'ECODE'
       00003000   END_03    EQU     *
                  *----------------------------------------------------------------------
       00003000             ORG     $3000          370 DECIMAL/FLOATING POINT OPS MICROCODE
003000 0C00       DEC_FLP   DS.B    $C00           DEFINED IN 'DECFLP'
       00003000   FPRDISP   EQU     DEC_FLP        ENTRY FOR FPR REGISTER FETCH SUB-ROUTINE
       00003058   FPRALTER  EQU     DEC_FLP+$58    ENTRY FOR FPR REGISTER ALTER SUB-ROUTINE
       00003C00   END_04    EQU     *
                  *----------------------------------------------------------------------
       00003C00             ORG     $3C00          370 OP CODE BRANCH TABLES
003C00 0300       OPTABLES  DS.B    $300           DEFINED IN 'ECODE'
       00003C00   OPTABLE   EQU     OPTABLES+$0    370 OP CODE TABLE
       00003E00   BETABLE   EQU     OPTABLES+$200  370 OP CUS ERROR TABLE
                  *                                OVERLAYED BY ENTRIES IN OTHER CODE
       00003F00   END_05    EQU     *
                  *----------------------------------------------------------------------
       00004000             ORG     $4000          SIO EMULATION CODE FOR VESTAL/SYNERGY
004000 0400       SIO_EMUL  DS.B    $400           DEFINED IN 'PCIO'/'PCACIA'
       00004400   END_06    EQU     *
                  *----------------------------------------------------------------------
       00004800             ORG     $4800          DEC/FLPT OVERFLOW FOR DEBUG/OLD CORNROW
004800 0900       DBUG_DEC  DS.B    $900           DEFINED IN 'DBUGDFP'
       00005100   END_06A   EQU     *
                  *----------------------------------------------------------------------
```

```
       00005F00                  ORG      $5F00          MEMORY-MAPPED HARDWARE REGISTERS
005F00 0100             MEM_MAPD DS.B     $100           DEFINED IN 'EQUATES'
       00006000         END_07   EQU      *
                        *-----------------------------------------------------------------
       00006000                  ORG      $6000          A/E ENGINE COMMUNICATIONS AREA
006000 0020             AE_COMM  DS.B     $20            DEFINED IN 'EQUATES'
       00006020         END_08   EQU      *
                        *-----------------------------------------------------------------
       00006020                  ORG      $6020          PC/PU COMMUNICATIONS AREA
006020 0020             PC_COMM1 DS.B     $20            DEFINED IN 'EQUATES'
       00006040         END_09   EQU      *
                        *-----------------------------------------------------------------
       00006040                  ORG      $6040          A ENGINE FIXED AREAS
006040 0008             A_ENG    DS.B     $8             DEFINED IN 'EQUATES'
       00006048         END_10   EQU      *
                        *-----------------------------------------------------------------
       00006048                  ORG      $6048          PC/PU COMMUNICATIONS AREA
006048 0058             PC_COMM2 DS.B     $58            DEFINED IN 'EQUATES'
       000060A0         END_11   EQU      *
                        *-----------------------------------------------------------------
       000060C0                  ORG      $60C0          E ENGINE WORK AREAS
0060C0 0140             E_WORK   DS.B     $140           DEFINED IN 'EQUATES'
       00006200         END_12   EQU      *
                        *-----------------------------------------------------------------
       00006200                  ORG      $6200          BUS ERROR CONTROL BLOCK
006200 000A             BUS_ERRC DS.B     $A             DEFINED IN 'EQUATES'
       0000620A         END_13   EQU      *
                        *-----------------------------------------------------------------
       00006240                  ORG      $6240          DECIMAL WORK AREA
006240 0080             DEC_WORK DS.B     $80            DEFINED IN 'DECCODE'
       000062C0         END_14   EQU      *
                        *-----------------------------------------------------------------
       000062C0                  ORG      $62C0          EXTENDED FLOATING POINT WORK AREA
0062C0 0028             XFP_WORK DS.B     $28            DEFINED IN 'FCODE'
       000062E8         END_15   EQU      *
                        *-----------------------------------------------------------------
       00006300                  ORG      $6300          SIO/TIO DEVICE CONTROL BLOCK
006300 0100             CHAN_DCB DS.B     $100           DEFINED IN 'DEBUG'
       00006400         END_16   EQU      *
                        *-----------------------------------------------------------------
       00006600                  ORG      $6600
006600 0100                      DS.B     $100           M68000 STACK
       00006700         STACKST  EQU      *              START OF STACK
       00006700         END_17   EQU      *
                        *-----------------------------------------------------------------
       00006800                  ORG      $6800          M68000 REGISTER SAVE AREA
006800 0040             M68_SAVE DS.B     $40            DEFINED IN 'ECODE'
       00006840         END_18   EQU      *
                        *-----------------------------------------------------------------
       00007000                  ORG      $7000
       00007000         ALT_DISP EQU      *              DEBUG ALTER/DISPLAY ENTRY
       00007000         DEBUG_CD EQU      *              SIO/TIO EMULATION FOR DEBUG CARD
       00007000         DIAGNOST EQU      *              POSSIBLE DIAGNOSTIC CODE
007000 1000                      DS.B     $1000          DEFINED IN 'DEBUG'
       00008000         END_19   EQU      *
                        *-----------------------------------------------------------------

                        *****************************************************************
                        *                                                               *
                        *       THE REMAINDER OF THE EQUATES ARE PRINTED ONLY IF THE FILE *
                        *       BEING ASSEMBLED IS THE 'EQUATES' FILE.                  *
                        *                                                               *
                        *****************************************************************
                                 IFNE  LISTFL
                                 LIST
                                 ENDC
                                 IFEQ  LISTFL
       00000000                  ORG      VECTORS
000000 00006700                  DC.L     STACKST        INITIAL STACK POINTER FOR HW RESET
000004 000025AA                  DC.L     HW_RESET       INITIAL PROGRAM COUNTER FOR HW RESET
000008 000014CA                  DC.L     BUSERROR       E-ENGINE 370 STORAGE ACCESS ERROR
00000C 00001B62                  DC.L     CS_000C        E-ENGINE ADDRESSING ERROR
000010 00001B6A                  DC.L     CS_0010        E-ENGINE ILLEGAL INSTRUCTION ERROR
000014 00001B72                  DC.L     CS_0014        E-ENGINE DIVIDE BY ZERO ERROR
000018 00001B7A                  DC.L     CS_0018        E-ENGINE CHK INSTRUCTION TRAP ERROR
00001C 00001B82                  DC.L     CS_001C        E-ENGINE TRAPV INSTRUCTION TRAP ERROR
```

```
000020 00001B8A          DC.L    CS_0020         E-ENGINE PRIVILEGE VIOLATION ERROR
000024 00001B92          DC.L    CS_0024         E-ENGINE TRACE ACTIVE
                 *
                 *       CS_0024 MAY BE OVERLAYED BY DEBUG CARD A/D OR SUPERTRACE CODE
                 *
000028 00001B9A          DC.L    CS_0028         E-ENGINE UNIMPLEMENTED INSTRUCTION
00002C 0000277C          DC.L    SUPERTR         E-ENGINE SUPER TRACE
000030 00001BAA          DC.L    CS_0030         30
000034 00001BAA          DC.L    CS_0030
000038 00001BAA          DC.L    CS_0030
00003C 00001BAA          DC.L    CS_0030
000040 00001BAA          DC.L    CS_0030         40
000044 00001BAA          DC.L    CS_0030
000048 00001BAA          DC.L    CS_0030
00004C 00001BAA          DC.L    CS_0030
000050 00001BAA          DC.L    CS_0030         50
000054 00001BAA          DC.L    CS_0030
000058 00001BAA          DC.L    CS_0030
00005C 00001BAA          DC.L    CS_0030
000060 00001BAA          DC.L    CS_0030         60
000064 00001BAA          DC.L    CS_0030
000068 00001BAA          DC.L    CS_0030
00006C 00001BAA          DC.L    CS_0030
000070 00001BAA          DC.L    CS_0030         70
000074 00001BAA          DC.L    CS_0030
000078 00001BAA          DC.L    CS_0030
00007C 00001BAA          DC.L    CS_0030
000080 00001BAA          DC.L    CS_0030         80    TRAP0
                 *
                 *       THE ABOVE TRAP0 VECTOR MAY BE OVERLAYED BY DEBUG CARD A/D CODE
                 *
000084 00001BAA          DC.L    CS_0030
000088 00001BAA          DC.L    CS_0030
00008C 00001BAA          DC.L    CS_0030
000090 00001BAA          DC.L    CS_0030         90
000094 00001BAA          DC.L    CS_0030
000098 00001BAA          DC.L    CS_0030
00009C 00001BAA          DC.L    CS_0030
0000A0 00001BAA          DC.L    CS_0030         A0
0000A4 00001BAA          DC.L    CS_0030
0000A8 00001BAA          DC.L    CS_0030
0000AC 00001BAA          DC.L    CS_0030
0000B0 00001BAA          DC.L    CS_0030         B0
0000B4 00001BAA          DC.L    CS_0030
0000B8 00001BAA          DC.L    CS_0030
0000BC 00001BAA          DC.L    CS_0030
0000C0 00001BAA          DC.L    CS_0030         C0
0000C4 00001BAA          DC.L    CS_0030
0000C8 00001BAA          DC.L    CS_0030
0000CC 00001BAA          DC.L    CS_0030
0000D0 00001BAA          DC.L    CS_0030         D0
0000D4 00001BAA          DC.L    CS_0030
0000D8 00001BAA          DC.L    CS_0030
0000DC 00001BAA          DC.L    CS_0030
0000E0 00001BAA          DC.L    CS_0030         E0
0000E4 00001BAA          DC.L    CS_0030
0000E8 00001BAA          DC.L    CS_0030
0000EC 00001BAA          DC.L    CS_0030
0000F0 00001BAA          DC.L    CS_0030         F0
0000F4 00001BAA          DC.L    CS_0030
0000F8 00001BAA          DC.L    CS_0030
0000FC 4EF81B5A          JMP     CS_5010         INVALID BRANCH ERROR
                 *
                 *
                 * * * * * * * * * * * * * * * * * * * * * * * * * * * * * * * * * * *
                 *                                                                   *
                 *       THE ABOVE INSTRUCTION WILL BE REACHED IF THERE IS A BRANCH   *
                 *       TO A FW ADDRESS BOUNDARY ( 00, 04, 08, ETC ) IN THE RANGE    *
                 *       FROM 0000 TO 00FC. A BRANCH TO A HW ADDRESS BOUNDARY         *
                 *       ( 02, 06, ETC ) WILL PROBABLY REACH THIS INSTRUCTION ALSO,   *
                 *       BUT THIS IS DEPENDENT UPON HOW THE ADDRESSES IN THE VECTOR   *
                 *       TABLE DECODE INTO VALID INSTRUCTIONS.                        *
                 *                                                                   *
                 * * * * * * * * * * * * * * * * * * * * * * * * * * * * * * * * * * *
```

```
00000200           ORG     ECODE
        ******************************************************************
        *                                                                *
        *        EXIT POINT TO THE A-ENGINE                              *
        *                                                                *
        *        THE FOLLOWING LABELS ARE USED AS EXIT POINTS TO SWITCH  *
        *        CONTROL FROM THE E-ENGINE TO THE A-ENGINE. REGISTER D2  *
        *        CONTAINS A RETURN CODE WHICH IS WRITTEN TO THE OBATCH REG *
        *        TO SWITCH ENGINES AND TO INDICATE TO THE A-ENGINE THE   *
        *        CONDITIONS WHICH WERE ENCOUNTERED DURING THE PREVIOUS   *
        *        E-ENGINE OPERATION. THE FOLLOWING RETURN CODES MAY BE SET. *
        *                                                                *
        *        000X - GOOD COMPLETION, SET 370 COND CODE TO 'X'        *
        *        4500 - BUS ERROR DURING CLCL OR MVCL INSTRUCTION        *
        *        4949 - FIXED POINT DIVIDE EXCPT, CVB INSTRUCTION        *
        *        4A43 - DECIMAL OVERFLOW EXCPT, SET 370 COND CODE TO '3' *
        *        4C0X - EXPONENT OVERFLOW EXCPT, SET 370 COND CODE TO 'X' *
        *        5D0X - EXPONENT UNDERFLOW EXCPT, SET 370 COND CODE TO 'X' *
        *        5E00 - SIGNIFICANCE EXCPT, SET 370 COND CODE TO '0'     *
        *        9696 - SPECIFICATION EXCPT DURING A DECIMAL INSTRUCTION *
        *        A7A7 - BUS ERROR DURING A DECIMAL OR FLT PT INSTRUCTION *
        *        C0C0 - A PSW SWAP OCCURRED, CLEAR TPENDING IF ON        *
        *        C600 - SPECIFICATION EXCPT                              *
        *        C7C7 - DATA EXCPT                                       *
        *        C900 - FIXED POINT DIVIDE EXCPT                         *
        *        CBCB - DECIMAL DIVIDE EXCPT                             *
        *        CC00 - EXPONENT OVERFLOW EXCPT                          *
        *        CD00 - EXPONENT UNDERFLOW EXCPT                         *
        *        CE00 - SIGNIFICANCE EXCPT                               *
        *                                                                *
        ******************************************************************
        *
000200 7400         RETURN   MOVEQ   #0,D2            SET 0000 RETURN CODE
000202 31C25FF0     RETURNEX MOVE.W  D2,ENGINE_A      SWITCH TO A-ENGINE CONTROL
        ******************************************************************
        *                                                                *
        *        RETURN POINT FROM THE A-ENGINE                          *
        *                                                                *
        *        THE A-ENGINE RETURNS CONTROL TO THE E-ENGINE TO HANDLE  *
        *        VARIOUS FUNCTIONS WHICH ARE NOT IMPLEMENTED IN THE A-ENGINE. *
        *        THESE INCLUDE SOME 370 INSTRUCTIONS AND VARIOUS CONTROL, *
        *        ERROR AND EXCEPTION CONDITIONS. THE INSTRUCTION OR EXCEPTION *
        *        CODE IS IN THE OBATCH REGISTER AND IS USED TO ACCESS THE *
        *        APPROPRIATE ROUTINE VIA AN OPERATION TABLE. SOME OF THE *
        *        CODES ARE A WRAP OF THE RETURN CODE WHICH HAD BEEN SENT TO *
        *        THE A-ENGINE. THE FOLLOWING EXCEPTION CODES MAY BE PRESENT. *
        *                                                                *
        *        4500 - BUS ERROR DURING CLCL OR MVCL INSTRUCTION        *
        *        4949 - FIXED POINT DIVIDE EXCPT, CVB INSTRUCTION        *
        *        4A43 - DECIMAL OVERFLOW EXCPT                           *
        *        4C0X - EXPONENT OVERFLOW EXCPT                          *
        *        5D0X - EXPONENT UNDERFLOW EXCPT                         *
        *        5E00 - SIGNIFICANCE EXCPT                               *
        *        9696 - SPECIFICATION EXCPT DURING A DECIMAL INSTRUCTION *
        *        A000 - 370 ACCESS EXCPT, IFETCH 1ST HW OR ODD PC        *
        *        A100 - 370 ACCESS EXCPT, IFETCH 2ND OR 3RD HW           *
        *        A200 - 370 ACCESS EXCPT, OPERAND OR PRIVATE STORE       *
        *        A300 - PSR TRACE - INST STEP, PER OR EXECUTE            *
        *        A400 - INTERRUPT ACCEPTED                               *
        *        A500 - ERRONEOUS A-ENGINE 'RESET' RETURN                *
        *        A600 - A-ENGINE MICROCODE BRANCH ERROR                  *
        *        A7A7 - BUS ERROR DURING A DECIMAL OR FLT PT INSTRUCTION *
        *        C0C0 - A PSW SWAP OCCURRED                              *
        *        C100 - OPERATION EXCPT                                  *
        *        C600 - SPECIFICATION EXCPT                              *
        *        C7C7 - DATA EXCPT                                       *
        *        C800 - FIXED POINT OVERFLOW EXCPT                       *
        *        C900 - FIXED POINT DIVIDE EXCPT                         *
        *        CBCB - DECIMAL DIVIDE EXCPT                             *
        *        CC00 - EXPONENT OVERFLOW EXCPT                          *
        *        CD00 - EXPONENT UNDERFLOW EXCPT                         *
        *        CE00 - SIGNIFICANCE EXCPT                               *
        *                                                                *
        ******************************************************************
        *
000206 7600                  MOVEQ   0,D3
000208 3E385FF0              MOVE.W  OBATCH,D7        GET OP CODE FROM QUATCH
00020C 16385FF0              MOVE.B  OBATCH,D3
```

```
000210 30385FB0              MOVE.W  BER_REG,D0          CHECK IF A-ENGINE BUS ERROR
000214 6B08                  BMI.S   A_BERR              BRANCH IF ONE IS PENDING
000216 E34B                  LSL.W   1,D3                MULTIPLY BY 2 FOR DISPLACEMENT
000218 32753000              MOVE.W  0(A5,D3),A1         GO TO PROPER ROUTINE
00021C 4ED1                  JMP     (A1)
                   * * * * * * * * * * * * * * * * * * * * * * * * * * * * * * * * * * *
                   *                                                                   *
                   *         PRIORITY OF HANDLING A-ENGINE BUS ERRORS:                 *
                   *                 (1) PAT PARITY                                    *
                   *                 (2) ODD PC                                        *
                   *                 (3) REAL ADDRESS OUT OF BOUNDS                    *
                   *                 (4) VIRTUAL ADDRESS OUT OF BOUNDS                 *
                   *                 (5) PAGE FAULT                                    *
                   *                 (6) OFF BOUNDARY                                  *
                   *                                                                   *
                   * * * * * * * * * * * * * * * * * * * * * * * * * * * * * * * * * * *
                   *
00021E 0800000D    A_BERR    BTST    OFFB_BIT,D0         IS THIS AN OFF-BOUNDARY ERROR?
000222 664A                  BNE.S   A_BAGIT             IF NOT, MUST BE REAL MACHINE CHECK
                   *
000224 343CA1FF              MOVE.W  #$A1FF,D2           TEST FOR ANY OTHER BUS ERRORS
000228 8440                  OR.W    D0,D2
00022A 4642                  NOT.W   D2                  ALSO CLEARS D2 FOR WRITE RETURN
00022C 6640                  BNE.S   A_BAGIT             BR IF SOME OTHER BUS ERROR
                   *
00022E 31FCC3FF601A          MOVE.W  #OB_ERR,INSTSAVE    SAVE 'OFF BOUNDARY' CODE
000234 22385FCE              MOVE.L  ADDR_REG,D1         RESTORE THE FAILING 370 ADDRESS
000238 028100FFFFFF          ANDI.L  #$00FFFFFF,D1       CLEAR BITS 31-24
00023E 08C1001F              BSET    #31,D1
000242 2241                  MOVEA.L D1,A1
000244 08000008              BTST    RD_WRT,D0           CHECK IF IT WAS A READ CYCLE
000248 661E                  BNE.S   OB_WRT              BRANCH FOR WRITE
                   *
                   *         FETCH OFF-BOUNDARY DATA TO BE LOADED INTO THE OBATCH FOR RE-RUN
                   *
00024A 1419                  MOVE.B  (A1)+,D2            FETCH HIGH BYTE
00024C E14A                  LSL.W   8,D2                MOVE IT
00024E 1411                  MOVE.B  (A1),D2             FETCH LOW BYTE
                   *
000250 72EF        RET_OB    MOVEQ   #$EF,D1             SET OFF-BOUNDARY BIT = 0 = ON
                   *                                         A-ENGINE WILL RERUN THE BUS CYCLE
000252 C2386106    RET_BAG   AND.B   SAVE_CNTL,D1
000256 4A3860E8              TST.B   EXECFLAG            ARE WE IN EXECUTE?
00025A 6704                  BEQ.S   RET_OB1             NO, OK
00025C 00010001              ORI.B   #INSTOV,D1          MAKE SURE NOT TO RESET INST OVERRIDE
000260 11C15FE1    RET_OB1   MOVE.B  D1,SYS_CNTL
000264 4EF80202              JMP     RETURNEX            D2 HAS DATA IF IT WAS A READ
                   *
                   *         GET OFF-BOUNDARY DATA FROM OBATCH TO STORE IN 370 STORAGE
                   *
000268 12C3        OB_WRT    MOVE.B  D3,(A1)+            MOVE 1ST BYTE TO STORAGE
00026A 1287                  MOVE.B  D7,(A1)             MOVE 2ND BYTE TO STORAGE
00026C 60E2                  BRA.S   RET_OB
                   *
00026E 31FCC2FF601A A_BAGIT  MOVE.W  #B_ERR,INSTSAVE     SAVE 'BUS ERROR' OCCURRENCE
000274 4EB81486              JSR     BUS_ERR             ANALYZE ERROR, AND FILL OUT BECB
000278 72DF        A_BAGIT1  MOVEQ   #$DF,D1             SET BAGIT BIT = 0 = ON
00027A 60D6                  BRA.S   RET_BAG                 FORCE BUS ERROR TO A-ENGINE
                   * * * * * * * * * * * * * * * * * * * * * * * * * * * * * * * * * * *
                   *                                                                   *
                   *         E-ENGINE REGISTER CONTENTS AT ENTRY TO E-CYCLE ROUTINES    *
                   *         D0 - BUS ERROR REGISTER                                   *
                   *                                                                   *
                   *         D3 - INSTRUCTION BYTE SHIFT LEFT 1 BIT (X'00000???')      *
                   *                                                                   *
                   *         D7 - INSTRUCTION HALFWORD FROM OBATCH                     *
                   *                                                                   *
                   *       * A0 - ADDRESS OF PSR (X'6000')                             *
                   *                                                                   *
                   *       * A5 - ADDRESS OF OP TABLE (X'3C00')                        *
                   *                                                                   *
                   *         A7 - STACK POINTER                                        *
                   *                                                                   *
                   *                                                                   *
                   *         * THESE REGISTERS MAY NOT BE CHANGED AT ANY TIME!         *
                   *                                                                   *
                   * * * * * * * * * * * * * * * * * * * * * * * * * * * * * * * * * * *
```

```
           * * * * * * * * * * * * * * * * * * * * * * * * * * * * * * * * * * *
           *                                                                   *
           *    B2 INSTRUCTION DECODE                                          *
           *                                                                   *
           * * * * * * * * * * * * * * * * * * * * * * * * * * * * * * * * * * *
           *
)027C 4243          B2OPS    CLR.W    D3
)027E 1607                   MOVE.B   D7,D3            GET SECOND BYTE OF INSTRUCTION
)0280 0C03001E               CMPI.B   #$1E,D3          TEST IF GREATER THAN X'1E'
           *                                             (HIGHEST VALID INSTRUCTION)
)0284 620020D6               BHI      OPEXCP1
)0288 E34B                   LSL.W    1,D3             MULTIPLY BY 2 FOR DISPLACEMENT
)028A 45F80294               LEA      B2OPTAB,A2       GET ADDRESS OF OP DECODE TABLE
)028E 32723000               MOVEA.W  0(A2,D3),A1
)0292 4ED1                   JMP      (A1)             GO TO ROUTINE
           *
      00000294      B2OPTAB  EQU      *
00294 235C                   DC       OPEXCP1          INVALID IN E-ENGINE     CONCS   B200 E
00296 235C                   DC       OPEXCP1          INVALID IN E-ENGINE     DISCS   B201 E
00298 1266                   DC       STIDP            STORE CPUID             STIDP   B202 E
0029A 235C                   DC       OPEXCP1          INVALID IN E-ENGINE     STIDC   B203 E
0029C 0ED2                   DC       SCK              SET CLOCK               SCK     B204 E
0029E 10D8                   DC       STCK             STORE CLOCK             STCK    B205 E
002A0 0EF6                   DC       SCKC             SET CLOCK COMPARATOR    SCKC    B206 E
002A2 1112                   DC       STCKC            STORE CLOCK COMPARATOR  STCKC   B207 E
002A4 0FC2                   DC       SPT              SET CPU TIMER           SPT     B208 E
002A6 12E8                   DC       STPT             STORE CPU TIMER         STPT    B209 E
002A8 0F5C                   DC       SPKA             SET PSW KEY FROM ADDR   SPKA    B20A E
002AA 0986                   DC       IPK              INSERT PSW KEY          IPK     B20B E
002AC 235C                   DC       OPEXCP1          INVALID IN E-ENGINE     PBINT   B20C E
002AE 0E50                   DC       PTLB             PURGE TLB               PTLB    B20D E
           *                 INVALID IF MANOPS ADDRESS STOP NOT SET UP         EXL     B20E E
002B0 1D66                   DC       ADSTOP           MANOPS ADDRESS STOP             B20E E
           *                 INVALID IF PER ADDRESS STOP NOT SET UP            ACCW    B20F E
002B2 216C                   DC       PER_ADST         PER ADDRESS STOP                B20F E
002B4 235C                   DC       OPEXCP1          INVALID IN E-ENGINE     SPX     B210 E
002B6 235C                   DC       OPEXCP1          INVALID IN E-ENGINE     STPX    B211 E
002B8 235C                   DC       OPEXCP1          INVALID IN E-ENGINE     STAP    B212 E
002BA 0E6C                   DC       RRB              RESET REFERENCE BIT     RRB     B213 E
002BC 235C                   DC       OPEXCP1          INVALID IN E-ENGINE             B214 E
002BE 235C                   DC       OPEXCP1          INVALID IN E-ENGINE             B215 E
002C0 235C                   DC       OPEXCP1          INVALID IN E-ENGINE             B216 E
002C2 235C                   DC       OPEXCP1          INVALID IN E-ENGINE             B217 E
002C4 235C                   DC       OPEXCP1          INVALID IN E-ENGINE     PC      B218 E
002C6 235C                   DC       OPEXCP1          INVALID IN E-ENGINE     SAC     B219 E
002C8 235C                   DC       OPEXCP1          INVALID IN E-ENGINE             B21A E
002CA 235C                   DC       OPEXCP1          INVALID IN E-ENGINE             B21B E
002CC 235C                   DC       OPEXCP1          INVALID IN E-ENGINE             B21C E
002CE 0B38                   DC       MAD              MAKE ADDRESSABLE        MAD     B21D E
002D0 0BAA                   DC       MUN              MAKE UNADDRESSABLE      MUN     B21E E
           *
           *                                           INVALID IN E-ENGINE     B21F - B2FF E
           *
           * * * * * * * * * * * * * * * * * * * * * * * * * * * * * * * * * * *
           *                                                                   *
           *    CS  (BA)  COMPARE AND SWAP INSTRUCTION                         *
           *                                                                   *
           * * * * * * * * * * * * * * * * * * * * * * * * * * * * * * * * * * *
           *
      000002D2      CS       EQU      *
0002D2 31C7601A              MOVE.W   D7,INSTSAVE      SAVE INSTRUCTION HALFWORD
0002D6 7203                  MOVEQ    #3,D1
0002D8 C2386019              AND.B    OP2_EA+3,D1      IS OPERAND 2 ON FULLWORD BOUNDARY?
0002DC 660020E0              BNE      SPECEX           NO, SPECIFICATION EXCEPTION
0002E0 28786016              MOVEA.L  OP2_EA,A4
0002E4 D9FC80000000          ADDA.L   #MS_ACC,A4
           *
0002EA 2614                  MOVE.L   (A4),D3          GET OPERAND 2 FROM MAIN STORAGE
0002EC 021000CF              ANDI.B   #CC_RST,(A0)     SET CONDITION CODE TO ZERO
           *
0002F0 B6B86006              CMP.L    R1,D3            COMPARE REGISTER WITH OPERAND 2
0002F4 670C                  BEQ.S    CS1              BRANCH IF EQUAL
           *
0002F6 21C36006              MOVE.L   D3,R1            MOVE OPERAND 2 TO REGISTER
0002FA 00100010              ORI.B    #CC1,(A0)        SET CONDITION CODE 1
0002FE 4EF80200              JMP      RETURN
           *
```

```
                      *
000302 28B8600A       CS1      MOVE.L  R3,(A4)           MOVE REGISTER 3 TO STORAGE, CC=0
000306 4EF80200                JMP     RETURN
                      *
                      * * * * * * * * * * * * * * * * * * * * * * * * * * * * * * * * * * * *
                      *                                                                       *
                      *   CDS  (BB)  COMPARE DOUBLE AND SWAP INSTRUCTION                      *
                      *                                                                       *
                      *                                                                       *
                      * * * * * * * * * * * * * * * * * * * * * * * * * * * * * * * * * * * *
                      *
       0000030A       CDS      EQU     *
00030A 3207                    MOVE.W  D7,D1
00030C 31C7601A                MOVE.W  D7,INSTSAVE       SAVE INSTRUCTION HALFWORD
000310 2438600A                MOVE.L  RR3_EVEN,D2       SAVE CONTENTS
000314 2638600E                MOVE.L  RR1_EVEN,D3
000318 28386006                MOVE.L  RR1_ODD,D4        GET CONTENTS OF DOUBLEWORD REGISTER
00031C 21C36006                MOVE.L  D3,RR2E_RET       SAVE REGISTERS IN CASE OF ABORT
000320 21C4600A                MOVE.L  D4,RR2O_RET
000324 02010011                ANDI.B  #$11,D1           TEST IF ODD REGISTERS
000328 66002094                BNE     SPECEX            SPECIFICATION EXCEPTION IF ODD
00032C 7207                    MOVEQ   #7,D1
00032E C2386019                AND.B   OP2_EA+3,D1       IS OPERAND 2 ON DOUBLEWORD BOUNDARY?
000332 6600208A                BNE     SPECEX            NO, SPECIFICATION EXCEPTION
000336 28786016                MOVEA.L OP2_EA,A4
00033A D9FC80000000            ADDA.L  #MS_ACC,A4
                      *
000340 2A1C                    MOVE.L  (A4)+,D5          GET FIRST HALF FROM MAIN STORAGE
000342 2C14                    MOVE.L  (A4),D6           GET SECOND HALF FROM MAIN STORAGE
                      *
000344 021000CF                ANDI.B  #CC_RST,(A0)      SET CONDITION CODE TO ZERO
000348 BA83                    CMP.L   D3,D5             COMPARE REGISTER WITH OPERAND 2
00034A 6710                    BEQ.S   CDS1              BRANCH IF EQUAL
                      *
00034C 21C56006       CDS3     MOVE.L  D5,RR2E_RET       MOVE OPERAND 2 TO REGISTER
000350 21C6600A                MOVE.L  D6,RR2O_RET       MOVE OPERAND 2 TO REGISTER
                      *
000354 00100010                ORI.B   #CC1,(A0)         SET CONDITION CODE 1  (NOT EQUAL)
000358 4EF80200                JMP     RETURN
                      *
                      *
00035C BC84           CDS1     CMP.L   D4,D6             COMPARE SECOND WORD
00035E 66EC                    BNE.S   CDS3              IF NOT EQUAL, LOAD OPER2, SET CC1
                      *
000360 28886012                MOVE.L  RR3_ODD,(A4)      MOVE SECOND REGISTER TO STORAGE
000364 2902                    MOVE.L  D2,-(A4)          MOVE REGISTER TO STORAGE, FIX ADDR
000366 4EF80200                JMP     RETURN
                      * * * * * * * * * * * * * * * * * * * * * * * * * * * * * * * * * * * *
                      *                                                                       *
                      *   CLM  (BD)  COMPARE LOGICAL CHARACTERS UNDER MASK INSTRUCTION        *
                      *                                                                       *
                      *                                                                       *
                      * * * * * * * * * * * * * * * * * * * * * * * * * * * * * * * * * * * *
                      *
       0000036A       CLM      EQU     *
00036A 31C7601A                MOVE.W  D7,INSTSAVE       SAVE INSTRUCTION
00036E 0247000F                ANDI.W  #$000F,D7         GET MASK ONLY
000372 E34F                    LSL.W   1,D7              MAKE IT A BR TABLE DISPLACEMENT
                      *
000374 45F86012                LEA     R1X,A2            GET OPERAND 1 ADDRESS
000378 28786016                MOVEA.L OP2_EA,A4         GET OPERAND 2 MS ADDRESS
00037C D9FC80000000            ADDA.L  #MS_ACC,A4
                      *
000382 4EFB7002                JMP     CLMTABLE(D7)      GO TO APPROPRIATE MASK ROUTINE
                      *
       00000386                RORG    *
       00000386       CLMTABLE EQU     *                 BRANCH TABLE BASE ADDRESS
       00000386                ORG     *
000386 603E                    BRA.S   CLM00             CLM MASK 0
000388 6042                    BRA.S   CLM01             CLM MASK 1
00038A 6054                    BRA.S   CLM02             CLM MASK 2
00038C 6042                    BRA.S   CLM03             CLM MASK 3
00038E 6064                    BRA.S   CLM04             CLM MASK 4
000390 6042                    BRA.S   CLM05             CLM MASK 5
000392 6054                    BRA.S   CLM06             CLM MASK 6
000394 6042                    BRA.S   CLM07             CLM MASK 7
000396 6018                    BRA.S   CLM08             CLM MASK 8
```

```
000398 6042                      BRA.S   CLM09             CLM MASK 9
00039A 6054                      BRA.S   CLM0A             CLM MASK A
00039C 6046                      BRA.S   CLM0B             CLM MASK B
00039E 600C                      BRA.S   CLM0C             CLM MASK C
0003A0 604A                      BRA.S   CLM0D             CLM MASK D
0003A2 6004                      BRA.S   CLM0E             CLM MASK E
                       *
0003A4 B50C            CLMS0F    CMPM.B  (A4)+,(A2)+       COMPARE 4 BYTES ENTRY, CLM MASK F
0003A6 660C                      BNE.S   CLMCCNE
0003A8 B50C            CLM0E     CMPM.B  (A4)+,(A2)+       COMPARE 3 BYTES ENTRY
0003AA 6608                      BNE.S   CLMCCNE
0003AC B50C            CLM0C     CMPM.B  (A4)+,(A2)+       COMPARE 2 BYTES ENTRY
0003AE 6604                      BNE.S   CLMCCNE
0003B0 B50C            CLM08     CMPM.B  (A4)+,(A2)+       COMPARE 1 BYTE ENTRY
                       *
0003B2 6714            CLMCC     BEQ.S   CLM00X            GO TO SET COND CODE 0
0003B4 6304            CLMCCNE   BLS.S   CLMCC1
0003B6 7E20                      MOVEQ   #CC2,D7           SET CONDITION CODE 2
0003B8 6002                      BRA.S   CLMRTN
                       *
0003BA 7E10            CLMCC1    MOVEQ   #CC1,D7           SET CONDITION CODE 1
0003BC 021000CF        CLMRTN    ANDI.B  #CC_RST,(A0)      CLEAR PSR COND CODE
0003C0 8F10                      OR.B    D7,(A0)           SET NEW PSR COND CODE
0003C2 4EF80200                  JMP     RETURN
                       *
                       *
0003C6 B014            CLM00     CMP.B   (A4),D0           PRETEST EVEN THOUGH MASK IS ZERO
0003C8 7E00            CLM00X    MOVEQ   #CC0,D7           SET CONDITION CODE 0
0003CA 60F0                      BRA.S   CLMRTN
                       *
                       *
0003CC 564A            CLM01     ADDQ.W  #3,A2
0003CE 60E0                      BRA.S   CLM08             GO TO COMPARE 1 BYTE
                       *
                       *
0003D0 544A            CLM03     ADDQ.W  #2,A2
0003D2 6008                      BRA.S   CLM0C             GO TO COMPARE 2 BYTES
                       *
                       *
0003D4 524A            CLM05     ADDQ.W  #1,A2
0003D6 6018                      BRA.S   CLM0A             GO TO COMPARE 2 BYTES
                       *
                       *
0003D8 524A            CLM07     ADDQ.W  #1,A2
0003DA 60CC                      BRA.S   CLM0E             GO TO COMPARE 3 BYTES
                       *
                       *
0003DC B50C            CLM09     CMPM.B  (A4)+,(A2)+       COMPARE 2 BYTES
0003DE 66D4                      BNE.S   CLMCCNE
0003E0 544A            CLM02     ADDQ.W  #2,A2
0003E2 60CC                      BRA.S   CLM08             GO TO COMPARE 1 BYTE
                       *
                       *
0003E4 B50C            CLM0B     CMPM.B  (A4)+,(A2)+       COMPARE 3 BYTES
0003E6 66CC                      BNE.S   CLMCCNE
0003E8 524A            CLM06     ADDQ.W  #1,A2
0003EA 60C0                      BRA.S   CLM0C             GO TO COMPARE 2 BYTES
                       *
                       *
0003EC B50C            CLM0D     CMPM.B  (A4)+,(A2)+       COMPARE 3 BYTES
0003EE 66C4                      BNE.S   CLMCCNE
0003F0 B50C            CLM0A     CMPM.B  (A4)+,(A2)+       COMPARE 2 BYTES
0003F2 66C0                      BNE.S   CLMCCNE
0003F4 524A            CLM04     ADDQ.W  #1,A2
0003F6 60B8                      BRA.S   CLM08             GO TO COMPARE 1 BYTE
                       ***************************************************
                       *                                                 *
                       *   CLCL  (0F)  COMPARE LOGICAL LONG              *
                       *                                                 *
                       *                                                 *
                       *                         LABEL      CONTENTS     *
                       *                         -----      --------     *
                       *                                                 *
                       *      INPUT:  AT COMM+8  RR1_ODD    (R1+1) - OP1 LENGTH    *
                       *                     +C  RR2_EVEN   (R2)   - OP2 ADDRESS   *
                       *                    +10  RR1_EVEN   (R1)   - OP1 ADDRESS   *
                       *                    +14  RR2_ODD    (R2+1) - PAD, OP2 LENGTH *
                       *
```

```
                    *                                                     *
                    *                                                     *
                    *         OUTPUT: AT COMM+8   RR2E_RET   (R2)         *
                    *                       +C    RR2O_RET   (R2+1)       *
                    *                      +10    RR1E_RET   (R1)         *
                    *                      +14    RR1O_RET   (R1+1)       *
                    *                                                     *
                    *                ALSO CONDITION CODE SET IN PSR       *
                    *                                                     *
                    * * * * * * * * * * * * * * * * * * * * * * * * * * * *
                    *
        000003F8    CLCL     EQU     *
0003F8 31C7601A              MOVE.W  D7,INSTSAVE        SAVE INSTRUCTION
0003FC 22386006              MOVE.L  RR1_ODD,D1         SHUFFLE REGISTERS TO RETURN ADDRESSES
000400 21F8600A6006          MOVE.L  RR2_EVEN,RR2E_RET
000406 21F86012600A          MOVE.L  RR2_ODD,RR2O_RET
00040C 21C16012              MOVE.L  D1,RR1O_RET
                    *
000410 11F8600A60E0          MOVE.B  RR2O_RET,RR2O_SAV   SAVE OP2 PAD BYTE
000416 11F8601260DE          MOVE.B  RR1O_RET,RR1O_SAV   SAVE OP1 LENGTH REG HI-BYTE
                    *
00041C 7400                  MOVEQ   #0,D2
00041E 11C2600E              MOVE.B  D2,RR1E_RET        CLEAR OP1 ADDRESS HI-BYTE
000422 11C26006              MOVE.B  D2,RR2E_RET        CLEAR OP2 ADDRESS HI-BYTE
000426 11C26012              MOVE.B  D2,RR1O_RET        CLEAR HI-BYTE OF OP1 LENGTH REGISTER
00042A 11C2600A              MOVE.B  D2,RR2O_RET        CLEAR HI-BYTE OF OP2 LENGTH REGISTER
                    *
00042E 2A386012              MOVE.L  RR1O_RET,D5        GET OP1 COUNT
000432 2C38600A              MOVE.L  RR2O_RET,D6        GET OP2 COUNT
000436 287C80000000          MOVEA.L #MS_ACC,A4         GET MAIN STORAGE ADDRESSES
00043C 2C4C                  MOVEA.L A4,A6
00043E D9F8600E              ADDA.L  RR1E_RET,A4        OP1 MS ADDRESS
000442 DDF86006              ADDA.L  RR2E_RET,A6        OP2 MS ADDRESS
                    *
000446 BC85                  CMP.L   D5,D6              COMPARE OPERAND COUNTS
000448 5BF860E6              SMI     CLCL_SW            SET FLAG, 'FF' OP1 >, '00' OP2 >
00044C 6A04                  BPL.S   CLCL_1             BR IF OP2 COUNT > OP1 COUNT
00044E CB46                  EXG     D5,D6              EXCHANGE REGISTERS, OP2 CNT TO D5
000450 C94E                  EXG     A4,A6              EXCHANGE REGISTERS, OP2 TO A4
                    *
                    *        LARGER OPERAND COUNT/ADDRESS IN D6/A6
                    *        USE D5 FOR COUNT TO COMPARE OP1/OP2 FIELDS
                    *
000452 2805         CLCL_1   MOVE.L  D5,D4              GET COMPARE WORKING COUNT
000454 670000EC              BEQ     CLCLPAD1           IF ZERO, GO TO DO PAD COMPARE
                    *
000458 7401                  MOVEQ   #1,D2              TEST OP1/OP2 ADDRESS BOUNDARIES
00045A 300C                  MOVE.W  A4,D0
00045C C042                  AND.W   D2,D0
00045E 320E                  MOVE.W  A6,D1
000460 C242                  AND.W   D2,D1
000462 B141                  EOR.W   D0,D1              IF BOUNDARIES ARE UNEQUAL,
000464 666E                  BNE.S   CLCBYTE              COMPARE BYTES
000466 4A40                  TST.W   D0                 IF BOTH ON EVEN BOUNDARY, GO
000468 670C                  BEQ.S   CLCFULL              GO COMPARE FULLWORDS
                    *
00046A 7602                  MOVEQ   #$2,D3             SET UP FOR 1-BYTE COMPARE, D2 IS 1
                    *                                     NECESSARY FOR BUS ERROR HANDLING
00046C B90E                  CMPM.B  (A6)+,(A4)+        COMPARE BYTE TO ALIGN ON HW BNDRY
00046E 664E                  BNE.S   CLCBNEQ            BR IF NON-COMPARE
000470 5384                  SUBQ.L  #1,D4              ADJUST WORKING COUNT
000472 670000BA              BEQ     CLCLPAD            BR IF ZERO, GO TO CHECK PADDING
                    *
000476 263C00000080 CLCFULL  MOVE.L  #$80,D3            OPERATION BYTE COUNT IS X'80'
00047C B883         CLCMPF1  CMP.L   D3,D4              TEST REMAINING WORKING COUNT
00047E 6D18                  BLT.S   CLCMPF3            BR IF LESS THAN X'80' BYTES LEFT
000480 741F                  MOVEQ   #$1F,D2            LOOP COUNT FOR 4-BYTE COMPARE
000482 B98E         CLCMPF2  CMPM.L  (A6)+,(A4)+        COMPARE 4 BYTES
000484 56CAFFFC              DBNE    D2,CLCMPF2
000488 6624                  BNE.S   CLCFNEQ            BR IF NON-COMPARE
00048A 9883                  SUB.L   D3,D4              ADJUST WORKING COUNT
                    *
                    *        LEAVE TO HANDLE AN INTERRUPT?
                    *
00048C 72F8                  MOVEQ   #$F8,D1            INTERRUPT REGISTER MASK
00048E 82385F90              OR.B    CC_INT_REG,D1      WAIT FOR ANY KIND OF INTERRUPT
000492 4601                  NOT.B   D1                 COMPLEMENT BITS
```

```
000494 67E6                 BEQ.S   CLCMPF1           BR IF NO, COMPARE MORE FULLWORDS
000496 605C                 BRA.S   CLCLINTR          GO TO CLEAN UP FOR INTERRUPT
                  *
                  *         X'00' TO X'7F' BYTES LEFT FOR FULLWORD COMPARE
                  *
000498 2404       CLCMPF3   MOVE.L  D4,D2             GET FULLWORD COMPARE COUNT
00049A 024200FC             ANDI.W  #$FC,D2
00049E 677E                 BEQ.S   CLCMPB4           IF NONE, JUST COMPARE BYTES
0004A0 2602                 MOVE.L  D2,D3             MAKE THE OPERATION BYTE COUNT
0004A2 E44A                 LSR.W   2,D2              MAKE FW LOOP COUNT
0004A4 5342                 SUBQ.W  #1,D2
0004A6 B98E       CLCMPF4   CMPM.L  (A6)+,(A4)+       COMPARE REMAINING FULLWORDS
0004A8 56CAFFFC             DBNE    D2,CLCMPF4
0004AC 676E                 BEQ.S   CLCMPB3           BR IF COMPARE, TEST FOR ANY MORE
                  *
                  *         FW NON-COMPARE
                  *
0004AE 598C       CLCFNEQ   SUBQ.L  #4,A4             RESTORE ADDRESSES
0004B0 598E                 SUBQ.L  #4,A6
0004B2 5242                 ADDQ.W  #1,D2             RESTORE NON-COMPARE BYTE COUNT
0004B4 E54A                 LSL.W   #2,D2
0004B6 5342                 SUBQ.W  #1,D2
0004B8 B90E       CLCFNEQ1  CMPM.B  (A6)+,(A4)+       COMPARE 1 BYTE
0004BA 56CAFFFC             DBNE    D2,CLCFNEQ1       CONTINUE TIL BYTE IS FOUND
                  *
                  *         BYTE NON-COMPARE
                  *
0004BE 55C7       CLCBNEQ   SCS     D7                SET FLAG, 'FF' SOURCE>DEST, '00' D>S
0004C0 5242                 ADDQ.W  #1,D2             ADJUST NON-COMPARE COUNT
0004C2 9642                 SUB.W   D2,D3             GET COMPARE COUNT FOR THIS LOOP
0004C4 9883                 SUB.L   D3,D4             CALCULATE # BYTES LEFT TO COMPARE
0004C6 BF3860E6             EOR.B   D7,CLCL_SW        TEST FOR COND CODE RESULT
0004CA 6604                 BNE.S   CLCBNEQ1          BR TO SET CC1
0004CC 7E20                 MOVEQ   #CC2,D7           SET CONDITION CODE 2
0004CE 6036                 BRA.S   CLINTR3           GO TO INTERRUPT EXIT
                  *
0004D0 7E10       CLCBNEQ1  MOVEQ   #CC1,D7           SET CONDITION CODE 1
0004D2 6032                 BRA.S   CLINTR3           GO TO INTERRUPT EXIT
                            PAGE
0004D4 263C00000080 CLCBYTE MOVE.L  #$80,D3           OPERATION BYTE COUNT IS X'80'
0004DA B883       CLCMPB1   CMP.L   D3,D4             TEST REMAINING WORKING COUNT
0004DC 6D40                 BLT.S   CLCMPB4           BR IF LESS THAN X'80' BYTES LEFT
0004DE 747F                 MOVEQ   #$7F,D2           LOOP COUNT FOR BYTE COMPARE
0004E0 B90E       CLCMPB2   CMPM.B  (A6)+,(A4)+       COMPARE 1 BYTE
0004E2 56CAFFFC             DBNE    D2,CLCMPB2
0004E6 66D6                 BNE.S   CLCBNEQ           BR IF NON-COMPARE, END OF OP
0004E8 9883                 SUB.L   D3,D4             ADJUST WORKING COUNT
                  *
                  *         LEAVE TO HANDLE AN INTERRUPT?
                  *
0004EA 72F8                 MOVEQ   #$F8,D1           INTERRUPT REGISTER MASK
0004EC 82385F90             OR.B    CC_INT_REG,D1     WAIT FOR ANY KIND OF INTERRUPT
0004F0 4601                 NOT.B   D1                COMPLEMENT BITS
0004F2 67E6                 BEQ.S   CLCMPB1           BR IF NO, COMPARE MORE
                  *
0004F4 4A3860E8   CLCLINTR  TST.B   EXECFLAG
0004F8 6706                 BEQ.S   CLINTR1
0004FA 59B860EC             SUBQ.L  #4,SAV_PCEX
0004FE 6004                 BRA.S   CLINTR2
000500 55B86002   CLINTR1   SUBQ.L  #2,PC
000504 7E00       CLINTR2   MOVEQ   #CC0,D7           SET CONDITION CODE 0
000506 9A84       CLINTR3   SUB.L   D4,D5             CALCULATE # BYTES WHICH COMPARED
000508 9BB8600A             SUB.L   D5,RR2O_RET       ADJUST OP2 COUNT/ADDRESS
00050C DBB86006             ADD.L   D5,RR2E_RET
000510 9BB86012             SUB.L   D5,RR1O_RET       ADJUST OP1 COUNT/ADDRESS
000514 DBB8600E             ADD.L   D5,RR1E_RET
000518 4EF805E4             JMP     CLCLEND           GO TO END OF OP
                  *
                  *         X'00' TO X'7F' BYTES LEFT FOR BYTE COMPARE
                  *
00051C 9883       CLCMPB3   SUB.L   D3,D4             ADJUST WORKING COUNT
00051E 2604       CLCMPB4   MOVE.L  D4,D3             MAKE THE OPERATION BYTE COUNT
000520 670C                 BEQ.S   CLCLPAD           IF ZERO, CHECK IF PADDING NECESSARY
000522 2404                 MOVE.L  D4,D2             MAKE LOOP COUNT
000524 5342                 SUBQ.W  #1,D2
000526 B90E       CLCMPB5   CMPM.B  (A6)+,(A4)+       COMPARE 1 BYTE
000528 56CAFFFC             DBNE    D2,CLCMPB5
00052C 6690                 BNE.S   CLCBNEQ           BR IF NON-COMPARE, END OF OP
```

```
                  *
                  *       OP1/OP2 COMPARE DONE, COMPARE REST OF LARGER OP TO PAD
                  *
00052E 9BB8600A   CLCLPAD  SUB.L   D5,RR2O_RET       ADJUST OP2 COUNT/ADDRESS
000532 DBB86006            ADD.L   D5,RR2E_RET
000536 9BB86012            SUB.L   D5,RR1O_RET       ADJUST OP1 COUNT/ADDRESS
00053A DBB8600E            ADD.L   D5,RR1E_RET
00053E 9C85                SUB.L   D5,D6             COUNT OF BYTES TO COMPARE WITH PAD
000540 7A00                MOVEQ   #$0,D5            MAKE COMPARE COUNT 0 FOR BUS ERROR
                  *
000542 7E00       CLCLPAD1 MOVEQ   #CC0,D7           SET CONDITION CODE 0, ALL COMPARED
000544 2806                MOVE.L  D6,D4             GET PAD COMPARE WORKING COUNT
000546 6700009C            BEQ     CLCLEND           BR IF ZERO, NO MORE BYTES TO COMPARE
                  *
00054A 303860E0            MOVE.W  RR2O_SAV,D0       GET PAD CHARACTER IN ALL BYTES
00054E 103860E0            MOVE.B  RR2O_SAV,D0         FOR FW COMPARE
000552 3200                MOVE.W  D0,D1
000554 4840                SWAP    D0
000556 3001                MOVE.W  D1,D0
                  *
000558 7401                MOVEQ   #$1,D2            TEST OPERAND BOUNDARY
00055A 320E                MOVE.W  A6,D1
00055C C202                AND.B   D2,D1
00055E 670C                BEQ.S   CLPFULL           BR IF ON HW BOUNDARY
                  *
000560 7602                MOVEQ   #$2,D3            SET UP FOR 1-BYTE COMPARE, D2 IS 1
                  *                                    NECESSARY FOR BUS ERROR
000562 B01E                CMP.B   (A6)+,D0          COMPARE BYTE TO ALIGN ON HW BOUNDARY
000564 660000AC            BNE     CLPBNEQ
000568 5384                SUBQ.L  #1,D4             ADJUST WORKING COUNT
00056A 6B5E                BMI.S   CLDONE            BRANCH IF ZERO, END OF OP
                  *
00056C 263C000000C0 CLPFULL MOVE.L #$C0,D3           OPERATION BYTE COUNT IS X'C0'
000572 B883       CLPADF1  CMP.L   D3,D4             TEST REMAINING WORKING COUNT
000574 6D2A                BLT.S   CLPADF3           BR IF LESS THAN X'C0' BYTES LEFT
000576 742F                MOVEQ   #$2F,D2           LOAD 4-BYTE LOOP COUNT
000578 B09E       CLPADF2  CMP.L   (A6)+,D0          COMPARE 4 BYTES TO THE PAD CHARACTER
00057A 56CAFFFC            DBNE    D2,CLPADF2
00057E 66000084            BNE     CLPFNEQ           BR IF NON-COMPARE
000582 9883                SUB.L   D3,D4             ADJUST WORKING COUNT
                  *
                  *       LEAVE TO HANDLE AN INTERRUPT?
                  *
000584 72F8                MOVEQ   #$F8,D1           INTERRUPT REGISTER MASK
000586 82385F90            OR.B    CC_INT_REG,D1     WAIT FOR ANY KIND OF INTERRUPT
00058A 4601                NOT.B   D1                COMPLEMENT BITS
00058C 67E4                BEQ.S   CLPADF1           NO, CONTINUE WITH NEXT UNIT OF OP
00058E 4A3860E8            TST.B   EXECFLAG
000592 6706                BEQ.S   CLINTR4
000594 59B860EC            SUBQ.L  #4,SAV_PCEX
000598 6030                BRA.S   CLDONE
00059A 55B86002   CLINTR4  SUBQ.L  #2,PC
00059E 602A                BRA.S   CLDONE
                  *
                  *       X'00' TO X'BF' BYTES LEFT FOR FULLWORD COMPARE
                  *
0005A0 2404       CLPADF3  MOVE.L  D4,D2             GET FULLWORD COMPARE COUNT
0005A2 024200FC            ANDI.W  #$FC,D2
0005A6 6710                BEQ.S   CLPADB1           IF NONE, JUST COMPARE BYTES
0005A8 2602                MOVE.L  D2,D3             MAKE THE OPERATION BYTE COUNT
0005AA E44A                LSR.W   2,D2              MAKE FW LOOP COUNT
0005AC 5342                SUBQ.W  #1,D2
0005AE B09E       CLPADF4  CMP.L   (A6)+,D0          COMPARE REMAINING FULLWORDS TO PAD
0005B0 56CAFFFC            DBNE    D2,CLPADF4
0005B4 664E                BNE.S   CLPFNEQ           BR IF NON-COMPARE
0005B6 9883                SUB.L   D3,D4             ADJUST WORKING COUNT
                  *
0005B8 2604       CLPADB1  MOVE.L  D4,D3             MAKE OPERATION BYTE COUNT, 0-3 BYTES
0005BA 670E                BEQ.S   CLDONE            BR IF ZERO, END OF OP
0005BC 2404                MOVE.L  D4,D2             MAKE LOOP COUNT
0005BE 5342                SUBQ.W  #1,D2
0005C0 B01E       CLPADB2  CMP.B   (A6)+,D0          COMPARE 1 BYTE
0005C2 56CAFFFC            DBNE    D2,CLPADB2
0005C6 664A                BNE.S   CLPBNEQ           BR IF NON-COMPARE, END OF OP
                  *
0005C8 9883       CLPADEND SUB.L   D3,D4             CALCULATE # BYTES WHICH COMPARED
```

```
0005CA 9C84          CLDONE    SUB.L   D4,D6
0005CC 4A3860E6                TST.B   CLCL_SW          DETERMINE WHICH OPERAND TO UPDATE
0005D0 660A                    BNE.S   CLDONE1
                     *
0005D2 90B8600A                SUB.L   D6,RR2O_RET      UPDATE OP2 REGISTERS
0005D6 DDB86006                ADD.L   D6,RR2E_RET
0005DA 6008                    BRA.S   CLCLEND
                     *
0005DC 90B86012      CLDONE1   SUB.L   D6,RR1O_RET      UPDATE OP1 REGISTERS
0005E0 DDB8600E                ADD.L   D6,RR1E_RET
                     *
0005E4 7200          CLCLEND   MOVEQ   #0,D1
0005E6 11C1600E                MOVE.B  D1,RR1E_RET      ENSURE HIGH BYTES OF REGISTERS OK
0005EA 11F8600E6012            MOVE.B  RR1O_SAV,RR1O_RET
0005F0 11C16006                MOVE.B  D1,RR2E_RET
0005F4 11F860E0600A            MOVE.B  RR2O_SAV,RR2O_RET
0005FA 021000CF                ANDI.B  #CC_RST,(A0)     RESET COND CODE IN PSR
0005FE 8F10                    OR.B    D7,(A0)          SET NEW COND CODE IN PSR
000600 4EF80200                JMP     RETURN
                     *
                     *         FW NON-COMPARE
                     *
000604 598E          CLPFNEQ   SUBQ.L  #4,A6            RESTORE ADDRESS
000606 5242                    ADDQ.W  #1,D2            RESTORE NON-COMPARE BYTE COUNT
000608 E54A                    LSL.W   2,D2
00060A 5342                    SUBQ.W  #1,D2
00060C B01E          CLPFNEQ1  CMP.B   (A6)+,D0         COMPARE 1 BYTE
00060E 56CAFFFC                DBNE    D2,CLPFNEQ1      CONTINUE TIL BYTE IS FOUND
                     *
                     *         BYTE NON-COMPARE
                     *
000612 55C7          CLPBNEQ   SCS     D7               SET FLAG, 'FF' SOURCE>DEST, '00' D>S
000614 5242                    ADDQ.W  #1,D2            ADJUST NON-COMPARE COUNT
000616 9642                    SUB.W   D2,D3            GET COMPARE BYTE COUNT FOR THIS LOOP
000618 123860E6                MOVE.B  CLCL_SW,D1       TEST FOR COND CODE RESULT
00061C BF01                    EOR.B   D7,D1
00061E 6604                    BNE.S   CLPBNEQ1         BR TO SET CC1
000620 7E20                    MOVEQ   #CC2,D7          SET CONDITION CODE 2
000622 60A4                    BRA.S   CLPADEND         GO TO UPDATE OPERAND
                     *
000624 7E10          CLPBNEQ1  MOVEQ   #CC1,D7          SET CONDITION CODE 1
000626 60A0                    BRA.S   CLPADEND         GO TO UPDATE OPERAND
                     * * * * * * * * * * * * * * * * * * * * * * * * * * * * * * * * * * *
                     *                                                                   *
                     *     DIAGNOSE  INSTRUCTION                                         *
                     *                                                                   *
                     *         DIAGNOSE INSTRUCTIONS IN THE RANGE OF X'0F00' TO X'0FFF'  *
                     *         WILL BE USED BY CP/CMS FOR VARIOUS SYSTEM REQUESTS TO     *
                     *         THE PC.  ANY OTHER EFFECTIVE ADDRESS WILL RESULT IN       *
                     *         SPECIFICATION EXCEPTION.                                  *
                     *                                                                   *
                     * * * * * * * * * * * * * * * * * * * * * * * * * * * * * * * * * * *
                     *
       00000628      DIAG      EQU     *
000628 31C7601A                MOVE.W  D7,INSTSAVE      SAVE INSTRUCTION HALFWORD
00062C 083800006031            BTST    PSW_PROB,PSW+1   TEST IF IN SUPERVISOR STATE
000632 66001D2C                BNE     PRIVEX           IF NOT, PRIVILEGED EXCEPTION
                     *
000636 0C780F006018            CMPI.W  #$0F00,OP2_EA+2  IS IT LESS THAN X'0F00'?
00063C 6B08                    BMI.S   DIAGSPEC
00063E 0C7810006018            CMPI.W  #$1000,OP2_EA+2  IS IT MORE THAN X'0FFF'?
000644 6B04                    BMI.S   DIAG1
000646 4EF8238E      DIAGSPEC  JMP     SPECEX
                     *
00064A 7204          DIAG1     MOVEQ   #$04,D1          SET BY-PASS PAT BIT FOR NO TRANSLATE
00064C 82386106                OR.B    SAVE_CNTL,D1             TO ACCESS LOW STORE
000650 11C15FE1                MOVE.B  D1,SYS_CNTL
000654 227C80000048            MOVEA.L #ACAW,A1         CAW POINTS TO PC CONTROL BLOCK
00065A 45F86054                LEA     PCIB_OUT,A2
00065E 32385F90      DIAG1A    MOVE.W  CC_INT_REG,D1    WAIT UNTIL PREVIOUS INTERRUPT TO PC
000662 6BFA                    BMI.S   DIAG1A                IS PROCESSED
000664 2611                    MOVE.L  (A1),D3          SAVE PCIB ADDRESS
000666 2483                    MOVE.L  D3,(A2)          PUT ADDRESS INTO PCIB_OUT FOR PC
000668 14BC0080                MOVE.B  #$80,(A2)        PUT 'FLAG' INTO PCIB_OUT BYTE
00066C 11FC007F5F90            MOVE.B  #INT_8088,INTR_REG  SET INTR REQUEST TO PC
000672 32385F90      DIAGWAIT  MOVE.W  CC_INT_REG,D1    WAIT WHILE THE PC PROCESSES THE
000676 6BFA                    BMI.S   DIAGWAIT              INTERRUPT
```

```
                       *
000678 1412                      MOVE.B  (A2),D2           GET CONDITION CODE BITS SET BY PC
00067A 021000CF                  ANDI.B  #CC_RST,(A0)      CLEAR CONDITION CODE,
00067E 8510                      OR.B    D2,(A0)             SET NEW CONDITION CODE
000680 0C020010                  CMPI.B  #CC1,D2
000684 6606                      BNE.S   DIAG_END
                       *
000686 7C00                      MOVEQ   #$00,D6           CLEAR UPPER HALF OF CSW
000688 2306                      MOVE.L  D6,-(A1)
00068A 2303                      MOVE.L  D3,-(A1)          PUT PCIB ADDR INTO LOWER HALF OF CSW
00068C 11F861065FE1 DIAG_END MOVE.B  SAVE_CNTL,SYS_CNTL   RESTORE ORIGINAL SYS CONTROL REG
000692 4EF80200                  JMP     RETURN
                       *
                       * * * * * * * * * * * * * * * * * * * * * * * * * * * * * * * * * * *
                       *                                                                    *
                       *    ED  (DE)  EDIT INSTRUCTION                                      *
                       *    EDMK  (DF)  EDIT AND MARK INSTRUCTION                           *
                       *                                                                    *
                       *        THE EDMK INSTRUCTION IS DISTINGUISHED FROM THE ED           *
                       *        INSTRUCTION BY ROTATING THE LOW-ORDER BIT OF THE INSTRUCTION *
                       *        TO BIT 31 OF D3. IF A SIGNIFICANT DIGIT IS FOUND,           *
                       *        THE ADDRESS OF THE DIGIT IS LOADED INTO GPR 1.              *
                       *                                                                    *
                       *        SWITCH BYTE - D0, HIGH ORDER BYTE OF HALFWORD               *
                       *                X'80' - SIGNIFICANCE INDICATOR                      *
                       *                X'40' - DIGIT 1 MARKER                              *
                       *                                                                    *
                       *        CONDITION CODE BYTE - D0, LOW ORDER OF HALFWORD             *
                       *                                                                    *
                       * * * * * * * * * * * * * * * * * * * * * * * * * * * * * * * * * * *
                       *
       00000696        ED        EQU     *
       00000696        EDMK      EQU     *
000696 31C7601A                  MOVE.W  D7,INSTSAVE       SAVE INSTRUCTION HALFWORD
00069A E49B                      ROR.L   2,D3              SET 'EDIT AND MARK' SWITCH (BIT 31)
00069C 7000                      MOVEQ   #$00,D0           CLEAR SWITCH REGISTER
00069E 247C80000000              MOVEA.L #MS_ACC,A2        SET UP MS ACCESS BIT
0006A4 284A                      MOVEA.L A2,A4
0006A6 D5F86012                  ADDA.L  SSOP1_EA,A2       GET OPERAND 1 EFFECTIVE ADDRESS
0006AA D9F8600E                  ADDA.L  SSOP2_EA,A4       GET OPERAND 2 EFFECTIVE ADDRESS
0006AE 1607                      MOVE.B  D7,D3             GET LENGTH FROM INSTRUCTION
0006B0 7EF0                      MOVEQ   #$F0,D7           SET UP ZONE MASK
0006B2 72FA                      MOVEQ   #$FA,D1           SET UP SIGN MASK
                       *
0006B4 14323000                  MOVE.B  0(A2,D3),D2       PRETEST OP1 LO-ORDER BYTE
                       *
                       *        PRETEST OPERAND 2 LO-ORDER/HI-ORDER BYTES
                       *        OPERAND 2 COULD CONCEIVABLY BE AS LONG AS OPERAND 1.....
                       *
0006B8 50F860E7                  ST      PRETEST           SET PRETEST SWITCH
0006BC 1414                      MOVE.B  (A4),D2           PRETEST OP2 HI-ORDER BYTE
0006BE 4A3860E7                  TST.B   PRETEST
0006C2 6A10                      BPL.S   EDPRETST          GO THROUGH 'DRY RUN' IF ACCESS ERR
                       *
0006C4 50F860E7                  ST      PRETEST           SET PRETEST SWITCH
0006C8 4DF43000                  LEA     0(A4,D3),A6
0006CC 1416                      MOVE.B  (A6),D2           PRETEST OP2 LO-ORDER BYTE
                       *
                       ******   IGNORE THIS ACCESS EXCEPTION IF IT EXISTS;  A TEST RUN THROUGH
                       ******   THE DATA ACTUALLY USED NEEDS TO BE MADE TO CHECK IF THE ACCESS
                       ******   EXCEPTION IS REALLY A CORRECT INDICATION.
                       *
0006CE 4A3860E7                  TST.B   PRETEST           TEST IF NO ACCESS EXCEPTIONS
0006D2 6B26                      BMI.S   ED1               GO DO INSTRUCTION IF OK
                       *
                       ***     GO THROUGH THIS LOOP SEARCHING FOR CHARACTERS WHICH ARE REPLACED
                       ***     BY SOURCE DIGITS TO SEE HOW MANY BYTES OF OPERAND 2 ARE NEEDED.
                       *
0006D4 3803            EDPRETST MOVE.W  D3,D4             COPY LENGTH FOR PRETEST
0006D6 264A                      MOVEA.L A2,A3             COPY OP1 ADDRESS FOR PRETEST
0006D8 224C                      MOVEA.L A4,A1             COPY OP2 ADDRESS FOR PRETEST
0006DA 141B            EDLOOP1  MOVE.B  (A3)+,D2          GET PATTERN CHARACTER
0006DC 04020020                  SUBI.B  #$20,D2           DIGIT SELECT CHARACTER (X'20') ?
0006E0 6704                      BEQ.S   EDTEST1           BR IF YES
0006E2 5302                      SUBQ.B  #1,D2             SIGNIFICANCE STARTER CHAR (X'21') ?
0006E4 660E                      BNE.S   EDTEST            BR IF NO
0006E6 BF00            EDTEST1  EOR.B   D7,D0             CHANGE/TEST DIGIT SWITCH
```

```
0006E8 670A                 BEQ.S   EDTEST          RETURN IF SW WAS ON, NOW OFF
0006EA 1419                 MOVE.B  (A1)+,D2        TEST IF LO-DIGIT IS SIGN
0006EC 8407                 OR.B    D7,D2
0006EE B401                 CMP.B   D1,D2
0006F0 6A02                 BPL.S   EDTEST          BR IF NO, DIGIT 1 SWITCH IS ON
0006F2 7000                 MOVEQ   #$00,D0         RESET DIGIT SWITCH
0006F4 51CCFFE4    EDTEST   DBRA    D4,EDLOOP1      LOOP UNTIL BYTE COUNT IS EXHAUSTED
0006F8 7000                 MOVEQ   #$00,D0         CLEAR SWITCHES
                   *
       000006FA    ED1      EQU     *               COME HERE IF NO ACCESS EXCEPTIONS
0006FA 51F860E7             SF      PRETEST         RESET PRETEST SWITCH
0006FE 1812                 MOVE.B  (A2),D4         GET FILL CHARACTER FROM PATTERN FIELD
                   *
                   *        PATTERN FIELD FETCH LOOP
                   *
000700 1412        EDLOOP2  MOVE.B  (A2),D2         GET PATTERN CHARACTER
000702 0C020020             CMPI.B  #$20,D2         IS IT A DIGIT SELECT CHARACTER
000706 6734                 BEQ.S   DIGITSEL        BR IF YES
000708 0C020021             CMPI.B  #$21,D2         IS IT A SIGNIFICANCE STARTER CHAR
00070C 672E                 BEQ.S   SIGNIFST        BR IF YES
00070E 0C020022             CMPI.B  #$22,D2         IS IT A FIELD SEPARATOR CHARACTER?
000712 6604                 BNE.S   ED2             BR IF NO
000714 02407F00             ANDI.W  #$7F00,D0       CLEAR COND CODE, SIGNIFICANCE IND
000718 4A40        ED2      TST.W   D0              TEST SIGNIFICANCE INDICATOR
00071A 6B02                 BMI.S   ED3             IF ON, STORE MESSAGE CHARACTER
00071C 1404                 MOVE.B  D4,D2           MOVE FILL CHAR FOR STORE
00071E 14C2        ED3      MOVE.B  D2,(A2)+        STORE MESSAGE/FILL CHARACTER
000720 51CBFFDE    ED4      DBRA    D3,EDLOOP2
                   *
000724 021000CF             ANDI.B  #CC_RST,(A0)    CLEAR CONDITION CODE BITS
000728 0200000F    -        ANDI.B  #$0F,D0         ANYTHING STORED IN FIELD
00072C 670A                 BEQ.S   EDRTN           BR IF NO, CONDITION CODE 0
00072E 7E10                 MOVEQ   #CC1,D7         SET COND CODE 1
000730 4A40                 TST.W   D0              WAS LAST FIELD GREATER THAN ZERO?
000732 6B02                 BMI.S   ED5             BR IF SIGNIFICANCE ON
000734 DE07                 ADD.B   D7,D7           MAKE IT CC2 FOR > 0
000736 8F10        ED5      OR.B    D7,(A0)         SET COND CODE 1/2 INTO PSR
000738 4EF80200    EDRTN    JMP     RETURN
       0000073C    SIGNIFST EQU     *
00073C 0840000E    DIGITSEL BCHG    DIGIT1N,D0      TEST/CHANGE DIGIT SWITCH
000740 6704                 BEQ.S   ED10            IF OFF, GO TO FETCH NEW BYTE
000742 1A06                 MOVE.B  D6,D5           COPY SAVED LO-DIGIT
000744 6010                 BRA.S   ED11            GO TO PROCESS LO-DIGIT
                   *
                   *        FETCH NEW SOURCE BYTE, DIGIT INDICATOR ALREADY TURNED ON
                   *
000746 1C1C        ED10     MOVE.B  (A4)+,D6        GET NEW SOURCE BYTE
000748 1A06                 MOVE.B  D6,D5           GET HI-DIGIT
00074A E80D                 LSR.B   4,D5            REPOSITION IT
00074C 8A07                 OR.B    D7,D5           MAKE HI-DIGIT ZONED
00074E BA01                 CMP.B   D1,D5           TEST IF HI-DIGIT ALPHA CHARACTER
000750 6A001C70             BPL     DATAEX          BR IF YES
000754 8C07                 OR.B    D7,D6           MAKE LO-DIGIT ZONED
                   *
000756 4A40        ED11     TST.W   D0              IS SIGNIFICANCE INDICATOR ON?
000758 6B14                 BMI.S   ED12            YES, GO STORE CHARACTER
00075A BA07                 CMP.B   D7,D5           IS THIS BYTE A ZERO
00075C 672A                 BEQ.S   ED15            YES, STORE FILL CHARACTER
                   *
00075E 4A83                 TST.L   D3              IS THIS AN EDIT AND MARK INSTR?
000760 6A0C                 BPL.S   ED12            NO, GO STORE CHARACTER
                   *
                   *        STORE ADDRESS FOR EDIT AND MARK
                   *
000762 14386006             MOVE.B  GPR1,D2         SAVE HIGH ORDER BYTE
000766 21CA6006             MOVE.L  A2,GPR1         STORE ADDRESS OF SIGNIFICANT CHAR
00076A 11C26006             MOVE.B  D2,GPR1         RESTORE HIGH ORDER BYTE IN REG
                   *
                   *        STORE ZONED SOURCE CHARACTER
                   *
00076E 14C5        ED12     MOVE.B  D5,(A2)+        STORE ZONED CHARACTER
000770 8005                 OR.B    D5,D0           SAVE FOR CONDITION CODE
000772 00408000    ED13     ORI.W   #$8000,D0       TURN ON SIGNIFICANCE INDICATOR
000776 BC01                 CMP.B   D1,D6           IS LOW ORDER DIGIT A SIGN CHARACTER?
000778 6BA6                 BMI.S   ED4             NO, RETURN TO PATTERN LOOP
                   *
```

```
                  *       TEST SIGN DIGIT TO CONTROL SIGNIFICANCE INDICATOR
                  *
00077A E20E               LSR.B    #1,D6            TEST IF SIGN LO-BIT ON
00077C 6404               BCC.S    ED14             BR IF OFF, PLUS SIGN (A, C OR E)
00077E 5206               ADDQ.B   #1,D6            TEST FOR 'F' (X'7F'), A PLUS SIGN
000780 6A10               BPL.S    ED16             BR IF NOT 'F', SIGN WAS 'B' OR 'D'
000782 02403FFF  ED14     ANDI.W   #$3FFF,D0        PLUS, TURN OFF SIGNIF AND DIGIT SW
000786 6098               BRA.S    ED4              RETURN TO PATTERN LOOP
                 *
                 *        STORE FILL CHARACTER
                 *
000788 14C4      ED15     MOVE.B   D4,(A2)+         STORE FILL CHARACTER
00078A E20A               LSR.B    1,D2             SIGNIFICANCE OR DIGIT ?
00078C 65E4               BCS.S    ED13             BR IF SIGNIFICANCE STARTER
00078E BC01               CMP.B    D1,D6            IS LOW ORDER DIGIT A SIGN CHARACTER?
000790 6B8E               BMI.S    ED4              NO, RETURN TO PATTERN LOOP
000792 0240BFFF  ED16     ANDI.W   #$BFFF,D0        TURN OFF DIGIT SWITCH
000796 6088               BRA.S    ED4              RETURN TO PATTERN LOOP
                 *
                 * * * * * * * * * * * * * * * * * * * * * * * * * * * * * * * * * * *
                 *                                                                   *
                 *                                                                   *
                 *    EX  (44)  EXECUTE INSTRUCTION                                  *
                 *                                                                   *
                 * * * * * * * * * * * * * * * * * * * * * * * * * * * * * * * * * * *
                 *
000798 4EF823BE  SPECEXCP JMP      SPECEX
00079C 4EF82364  EXECEXCP JMP      EXECEX
                 *
                 *
   000007A0      EX       EQU      *
0007A0 31C7601A           MOVE.W   D7,INSTSAVE      SAVE INSTRUCTION HALFWORD
0007A4 47F860D0           LEA      INST370,A3       GET ADDRESS OF TEMPORARY COPY AREA
0007A8 244B               MOVEA.L  A3,A2
0007AA 28786016           MOVEA.L  OP2_EA,A4        GET OPERAND ADDRESS
0007AE 21CC6142           MOVE.L   A4,PER_EXEC      SAVE EXECUTE TARGET FOR PER TEST
0007B2 D9FC80000000       ADDA.L   #MS_ACC,A4
0007B8 320C               MOVE.W   A4,D1
0007BA 02410001           ANDI.W   #0001,D1         IS THE EFFECTIVE ADDRESS EVEN
0007BE 66D8               BNE.S    SPECEXCP         NO, SPECIFICATION EXCEPTION
                 *
0007C0 34DC               MOVE.W   (A4)+,(A2)+      GET FIRST HALFWORD OF INSTRUCTION
0007C2 1A13               MOVE.B   (A3),D5
0007C4 0C050044           CMPI.B   #EXEC,D5         IS SUBJECT INSTRUCTION AN EXECUTE?
0007C8 67D2               BEQ.S    EXECEXCP         YES, EXECUTE EXCEPTION
                 *
0007CA 020500C0           ANDI.B   #$C0,D5
0007CE 670C               BEQ.S    EX1              BRANCH IF RR OP
0007D0 6A08               BPL.S    EX3              BRANCH IF HIGH-ORDER OFF (QUAD 2)
                 *
0007D2 02050040           ANDI.B   #$40,D5          IS SUBJECT INSTRUCTION SS?
0007D6 6702               BEQ.S    EX3              NO, GET HALFWORD
                 *
0007D8 34DC               MOVE.W   (A4)+,(A2)+      IF SS INSTR, GET 2 HALFWORDS
                 *
0007DA 34DC      EX3      MOVE.W   (A4)+,(A2)+      MOVE ANOTHER HALFWORD OF SUBJECT
0007DC 024700F0  EX1      ANDI.W   #$00F0,D7
0007E0 6708               BEQ.S    EX7              IF R1 IS ZERO, NO CHANGE TO SUBJECT
                 *
0007E2 12386015           MOVE.B   R1X+3,D1
0007E6 833860D1           OR.B     D1,INST370+1     OR REGISTER CONTENTS INTO INSTR.
0007EA 21F8600260EC EX7   MOVE.L   PC,SAV_PCEX      SAVE CURRENT STATUS
0007F0 3A10               MOVE.W   (A0),D5          GET PSR
0007F2 31C560FC           MOVE.W   D5,SAV_PSREX
0007F6 50F860E8           ST       EXECFLAG         SET 'EXECUTE' FLAG AND STEERING
0007FA 7201               MOVEQ    #INSTOV,D1       SET IFETCH OVERIDE BIT = 1 TO ALLOW
0007FC 82386106           OR.B     SAVE_CNTL,D1        IFETCH FROM PRIVATE STORAGE
000800 11C15FE1           MOVE.B   D1,SYS_CNTL
000804 21CB6002           MOVE.L   A3,PC              POINT PC TO 370 INSTRUCTION
000808 0005001E           ORI.B    #TR_MASK+L7_MASK,D5 TURN ON TRACE BIT IN PSR AND MASK
                 *                                     OUT INTERRUPTS
00080C 08850005           BCLR     PSR_EBIT,D5        MAKE SURE EXECUTE BIT IS OFF
000810 3085               MOVE.W   D5,(A0)
000812 4EB80200           JSR      RETURN             GO EXECUTE TARGET INSTRUCTION
                 *                                      (STACK ADDRESS OF EXRETURN)
```

```
                              *
                              *
000816 11F861065FE1 EXRETURN MOVE.B  SAVE_CNTL,SYS_CNTL  RESTORE ORIGINAL SYS CONTROL REG
00081C 723F                  MOVEQ   #ILC_RST,D1
00081E C210                  AND.B   (A0),D1             GET PSR HIGH BYTE, RESET ILC
000820 00010080              ORI.B   #ILC2_MSK,D1          SET BIT FOR ILC = 2 (EXECUTE)
                              *
000824 3A3C0200              MOVE.W  #$200,D5            LOAD LENGTH OF OPTABLE, TO POINT TO
000828 1A3860D0              MOVE.B  INST370,D5            BETABLE + INSTRUCTION DISPLACEMENT
00082C 7403                  MOVEQ   #03,D2
00082E C4355000              AND.B   0(A5,D5),D2         CHECK FOR BRANCH INSTRUCTIONS
000832 6732                  BEQ.S   EX5                 BRANCH IF NOT TO RESTORE PC
000834 0C020002              CMPI.B  #02,D2              THIS BRANCH NEEDS SPECIAL HANDLING?
000838 6B24                  BMI.S   EX8                 NO, CHECK 'SUCCESSFUL BRANCH LATCH'
00083A 671A                  BEQ.S   EX9                 FOR BCTR, CHECK R2 FIELD
                              *
00083C 21F860EC01A0 FIXREG   MOVE.L  SAV_PCEX,GPR        STORE POINTER TO EXECUTE INSTR +4
000842 11C101A0              MOVE.B  D1,GPR              PUT LINK INFORMATION INTO REGISTER
000846 383C00F0              MOVE.W  #$00F0,D4
00084A C853                  AND.W   (A3),D4             GET REGISTER NUMBER FROM INSTRUCTION
                              *
00084C 4EB8187C              JSR     L                   PUT CORRECT ADDRESS INTO TARGET REG
                              *
000850 0C050045              CMPI.B  #$45,D5             TEST FOR BAL INSTRUCTION
000854 6716                  BEQ.S   EX6                 DON'T TOUCH PC
                              *
000856 7A0F         EX9      MOVEQ   #$0F,D5             COME HERE FOR BCTR OR BALR
000858 CA3860D1              AND.B   INST370+1,D5        FIND OUT IF R2 IS ZERO
00085C 6708                  BEQ.S   EX5                 IF SO, POINT TO EXECUTE'S NSI
                              *
                              *
00085E 083800056001 EX8      BTST    PSR_EBIT,PSR+1
000864 6606                  BNE.S   EX6
                              *
000866 21F860EC6002 EX5      MOVE.L  SAV_PCEX,PC         RESTORE PC TO EXECUTE +4
                              *
00086C 1081         EX6      MOVE.B  D1,(A0)
00086E 11F860FD6001          MOVE.B  SAV_PSREX+1,PSR+1 PUT SAVED STATUS INTO PSR
000874 423860E8              CLR.B   EXECFLAG
000878 083800005F90          BTST    FP_INTR,CC_INT_REG    HAS THERE A CORNROW EXCEPTION
00087E 6604                  BNE.S   EX_END                BR IF NO
                              *
000880 4EF818C8              JMP     FP_TEST             GO TO TEST FOR CORNROW EXCEPTION
                              *
000884 083800046001 EX_END   BTST    PSR_TRACE,PSR+1     TEST FOR ISTEP/PER/ADSTOP
00088A 6700F974              BEQ     RETURN              BR IF NONE, TPEND IS ALREADY OFF
00088E 4E75                  RTS     *                   RETURN TO 'IENDTSTP'
                              * * * * * * * * * * * * * * * * * * * * * * * * * * * * * * * * * * *
                              *                                                                   *
                              *    ICM  (BF)  INSERT CHARACTERS UNDER MASK INSTRUCTION            *
                              *                                                                   *
                              *                                                                   *
                              *   4___________4_______4_______44_________4_________________4      *
                              *   4    'BF'   4   R1  4   M3  44    B2   4       D2        4      *
                              *   4___________4_______4_______44_________4_________________4      *
                              *                                                                   *
                              *                                                                   *
                              * * * * * * * * * * * * * * * * * * * * * * * * * * * * * * * * * * *
                              *
       00000890      ICM       EQU    *
000890 31C7601A                MOVE.W D7,INSTSAVE        SAVE INSTRUCTION
000894 0247000F                ANDI.W #$000F,D7          GET MASK ONLY
000898 E34F                    LSL.W  1,D7               MAKE IT A BR TABLE DISPLACEMENT
                              *
00089A 21F860126006 ICM_RTRY   MOVE.L R1X,R1             MOVE OPERAND 1 REGISTER FOR RETURN
0008A0 28786016                MOVEA.L OP2_EA,A4         GET OPERAND 2 MS ADDRESS
0008A4 D9FC80000004            ADDA.L #MS_ACC+4,A4
0008AA 102CFFFC                MOVE.B -4(A4),D0          PRE-TEST OP2 LO-ORDER ADDRESS
                              *
0008AE 4EFB703C                JMP    ICMTABLE(D7)       GO TO APPROPRIATE MASK ROUTINE
                              *
                              *
0008B2 11C06009     ICM01      MOVE.B D0,R1+3            MOVE BYTE TO RETURN REGISTER
0008B6 6024                    BRA.S  ICMCC              GO TO SET CONDITION CODE
                              *
                              *
```

```
0008B8 11C06008    ICM02    MOVE.B  D0,R1+2        MOVE BYTE TO RETURN REGISTER
0008BC 601E                 BRA.S   ICMCC          GO TO SET CONDITION CODE
                   *
                   *
0008BE 45F8600A    ICM03    LEA     R1+4,A2        GET OPERAND 1 BYTE ADDRESS
0008C2 554C        ICM03_1  SUBQ.W  #2,A4          ADJUST OPERAND 2 ADDRESS
0008C4 6052                 BRA.S   ICMD02         GO TO MOVE 2 BYTES TO RETURN
                   *
                   *
0008C6 11C06007    ICM04    MOVE.B  D0,R1+1        MOVE BYTE TO RETURN REGISTER
0008CA 6010                 BRA.S   ICMCC          GO TO SET CONDITION CODE
                   *
                   *
0008CC 45F86009    ICM06    LEA     R1+3,A2        GET OPERAND 1 BYTE ADDRESS
0008D0 60F0                 BRA.S   ICM03_1        GO TO MOVE 2 BYTES TO RETURN
                   *
                   *
0008D2 45F86008    ICM0C    LEA     R1+2,A2        GET OPERAND 1 BYTE ADDRESS
0008D6 60EA                 BRA.S   ICM03_1        GO TO MOVE 2 BYTES TO RETURN
                   *
                   *
0008D8 11C06006    ICM08    MOVE.B  D0,R1          MOVE BYTE TO RETURN REGISTER
0008DC 674E        ICMCC    BEQ.S   ICM00          BR IF BYTE ZERO, SET CC0
0008DE 6A48                 BPL.S   ICMCC2         BR IF BYTE PLUS, SET CC2
0008E0 7E10        ICMCC1   MOVEQ   #CC1,D7        SET CONDITION CODE 1
0008E2 021000CF    ICMRTN   ANDI.B  #CC_RST,(A0)   CLEAR PSR COND CODE
0008E6 8F10                 OR.B    D7,(A0)        SET NEW COND CODE IN PSR
0008E8 4EF80200             JMP     RETURN
                   *
                   *
       000008EC             RORG    *
       000008EC    ICMTABLE EQU     *              BRANCH TABLE BASE ADDRESS
       000008EC             ORG     *
0008EC 603E                 BRA.S   ICM00          ICM MASK 0
0008EE 60C2                 BRA.S   ICM01          ICM MASK 1
0008F0 60C6                 BRA.S   ICM02          ICM MASK 2
0008F2 60CA                 BRA.S   ICM03          ICM MASK 3
0008F4 60D0                 BRA.S   ICM04          ICM MASK 4
0008F6 6038                 BRA.S   ICM05          ICM MASK 5
0008F8 60D2                 BRA.S   ICM06          ICM MASK 6
0008FA 603C                 BRA.S   ICM07          ICM MASK 7
0008FC 60DA                 BRA.S   ICM08          ICM MASK 8
0008FE 6040                 BRA.S   ICM09          ICM MASK 9
000900 604E                 BRA.S   ICM0A          ICM MASK A
000902 6054                 BRA.S   ICM0B          ICM MASK B
000904 60CC                 BRA.S   ICM0C          ICM MASK C
000906 6066                 BRA.S   ICM0D          ICM MASK D
000908 6074                 BRA.S   ICM0E          ICM MASK E
                   *
                   *
00090A 45F8600A    ICM0F    LEA     R1+4,A2        GET OPERAND 1 BYTE ADDRESS
00090E 1524                 MOVE.B  -(A4),-(A2)    MOVE BYTE TO RETURN REGISTER
000910 56C0                 SNE     D0             SAVE BYTE CONDITION, Z '00', NZ 'FF'
000912 1524        ICMD03   MOVE.B  -(A4),-(A2)    MOVE BYTE TO RETURN REGISTER
000914 56C1                 SNE     D1             SAVE BYTE CONDITION AGAIN
000916 8001                 OR.B    D1,D0          ACCUMULATE BYTE CONDITIONS
000918 1524        ICMD02   MOVE.B  -(A4),-(A2)    MOVE BYTE TO RETURN REGISTER
00091A 56C1                 SNE     D1             SAVE BYTE CONDITION AGAIN
00091C 8001                 OR.B    D1,D0          ACCUMULATE BYTE CONDITIONS
00091E 1524        ICMD01   MOVE.B  -(A4),-(A2)    MOVE BYTE TO RETURN REGISTER
000920 6BBE                 BMI.S   ICMCC1         BR IF LAST BYTE MINUS, SET CC1
000922 6604                 BNE.S   ICMCC2         BR IF NOT ZERO, SET CC2
000924 4A00                 TST.B   D0
000926 6704                 BEQ.S   ICM00          BR IF ALL BYTES ZERO, CC0
000928 7E20        ICMCC2   MOVEQ   #CC2,D7        SET CONDITION CODE 2
00092A 60B6                 BRA.S   ICMRTN
                   *
                   *
00092C 7E00        ICM00    MOVEQ   #CC0,D7        SET CONDITION CODE 0
00092E 60B2                 BRA.S   ICMRTN
                   *
                   *
000930 45F8600A    ICM05    LEA     R1+4,A2        GET OPERAND 1 BYTE ADDRESS
000934 554C                 SUBQ.W  #2,A4          ADJUST OPERAND 2 ADDRESS
000936 602C                 BRA.S   ICM0B_1        GO TO MOVE 3 BYTES TO RETURN
                   *
                   *
```

```
000938 45F8600A     ICM07    LEA      R1+4,A2            GET OPERAND 1 BYTE ADDRESS
00093C 534C                  SUBQ.W   #1,A4              ADJUST OPERAND 2 ADDRESS
00093E 60D2                  BRA.S    ICMD03             GO TO MOVE 3 BYTES TO RETURN
                    *
                    *
000940 45F8600A     ICM09    LEA      R1+4,A2            GET OPERAND 1 BYTE ADDRESS
000944 554C                  SUBQ.W   #2,A4              ADJUST OPERAND 2 ADDRESS
000946 1524                  MOVE.B   -(A4),-(A2)        MOVE BYTE TO RETURN
000948 56C1                  SNE      D1                 SAVE BYTE CONDITION, Z '00', NZ 'FF'
00094A 8001                  OR.B     D1,D0              ACCUMULATE BYTE CONDITIONS
00094C 554A                  SUBQ.W   #2,A2              ADJUST OPERAND 1 ADDRESS
00094E 60CE                  BRA.S    ICMD01             GO TO MOVE 1 BYTE TO RETURN
                    *
                    *
000950 45F86009     ICM0A    LEA      R1+3,A2            GET OPERAND 1 BYTE ADDRESS
000954 554C                  SUBQ.W   #2,A4              ADJUST OPERAND 2 ADDRESS
000956 600C                  BRA.S    ICM0B_1            GO TO MOVE 2 BYTES TO RETURN
                    *
                    *
000958 45F8600A     ICM0B    LEA      R1+4,A2            GET OPERAND 1 BYTE ADDRESS
00095C 534C                  SUBQ.W   #1,A4              ADJUST OPERAND 2 ADDRESS
00095E 1524                  MOVE.B   -(A4),-(A2)        MOVE BYTE TO RETURN
000960 56C1                  SNE      D1                 SAVE BYTE CONDITION, Z '00', NZ 'FF'
000962 8001                  OR.B     D1,D0              ACCUMULATE BYTE CONDITIONS
000964 1524         ICM0B_1  MOVE.B   -(A4),-(A2)        MOVE BYTE TO RETURN
000966 56C1                  SNE      D1                 SAVE BYTE CONDITION AGAIN
000968 8001                  OR.B     D1,D0              ACCUMULATE BYTE CONDITIONS
00096A 534A                  SUBQ.W   #1,A2              ADJUST OPERAND 2 ADDRESS
00096C 60B0                  BRA.S    ICMD01             GO TO MOVE 1 BYTE TO RETURN
                    *
                    *
00096E 45F8600A     ICM0D    LEA      R1+4,A2            GET OPERAND 1 BYTE ADDRESS
000972 534C                  SUBQ.W   #1,A4              ADJUST OPERAND 2 ADDRESS
000974 1524                  MOVE.B   -(A4),-(A2)        MOVE BYTE TO RETURN
000976 56C1                  SNE      D1                 SAVE BYTE CONDITION, Z '00', NZ 'FF'
000978 8001                  OR.B     D1,D0              ACCUMULATE BYTE CONDITIONS
00097A 534A                  SUBQ     #1,A2              ADJUST OPERAND 2 ADDRESS
00097C 609A                  BRA.S    ICMD02             GO TO MOVE 2 BYTES TO RETURN
                    *
00097E 45F86009     ICM0E    LEA      R1+3,A2            GET OPERAND 1 BYTE ADDRESS
000982 534C                  SUBQ.W   #1,A4              ADJUST OPERAND 2 ADDRESS
000984 608C                  BRA.S    ICMD03             GO TO MOVE 3 BYTES TO RETURN
                    * * * * * * * * * * * * * * * * * * * * * * * * * * * * * * * * * * * *
                    *                                                                     *
                    *    IPK  (B20B)  INSERT PSW KEY INSTRUCTION                          *
                    *                                                                     *
                    *                                                                     *
                    * * * * * * * * * * * * * * * * * * * * * * * * * * * * * * * * * * * *
                    *
       00000986     IPK      EQU      *
000986 31C7601A              MOVE.W   D7,INSTSAVE        SAVE INSTRUCTION HALFWORD
00098A 083800006031          BTST     PSW_PROB,PSW+1     TEST IF IN SUPERVISOR STATE
000990 660019CE              BNE      PRIVEX             IF NOT, PRIVILEGED EXCEPTION
                    *
000994 72F0                  MOVEQ    #$F0,D1
000996 C2386031              AND.B    PSW+1,D1           GET KEY BITS FROM PSW
00099A 11C1600D              MOVE.B   D1,GPR2+3          PUT INTO LOW BYTE OF REGISTER
00099E 4EF80200              JMP      RETURN
                    *
                    * * * * * * * * * * * * * * * * * * * * * * * * * * * * * * * * * * * *
                    *                                                                     *
                    *    ISK (09)  INSERT STORAGE KEY INSTRUCTION                         *
                    *                                                                     *
                    *    --------------------                                             *
                    *    * '09'  * R1 * R2 *                                              *
                    *    --------------------                                             *
                    *                                                                     *
                    *    EXIT: PSR, PC AND R2 ARE UNCHANGED.                              *
                    *          R1 CONTAINS THE STORAGE KEY FOR ISK.                       *
                    *                                                                     *
                    * * * * * * * * * * * * * * * * * * * * * * * * * * * * * * * * * * * *
                    *
       000009A2     ISK      EQU      *
0009A2 31C7601A              MOVE.W   D7,INSTSAVE        SAVE INSTRUCTION HALFWORD
0009A6 083800006031          BTST     PSW_PROB,PSW+1     TEST FOR PRIVILEGED OP EXCEPTION
0009AC 660019B2              BNE      PRIVEX             BR IF PROBLEM STATE
                    *
```

```
0009B0 2438600A              MOVE.L  R2,D2              GET R2 FIELD LO-WORD
0009B4 780F                  MOVEQ   #$0F,D4            TEST R2 DATA FOR SPECIFICATION EXCP
0009B6 C802                  AND.B   D2,D4              BITS 28-31 NOT ZERO
0009B8 66001A04              BNE     SPECEX             BR IF NOT ZERO
                      *
0009BC 028200FFFFFF          ANDI.L  #$00FFFFFF,D2      SAVE BITS 8-31 FOR ADDRESS
0009C2 0C8200400000          CMPI.L  #VIRT_STR,D2       CHECK IF ADDRESS IS IN VIRTUAL RANGE
0009C8 6A001970              BPL     PAGE_FLT
                      *
0009CC 0242F000       ISK2   ANDI.W  #$F000,D2          ENSURE LAST THREE DIGITS ARE 0
0009D0 08C20017              BSET    #$17,D2            TURN ON BIT 23, PAT ACCESS
0009D4 2442                  MOVEA.L D2,A2              MOVE ADDRESS
0009D6 7208                  MOVEQ   #$08,D1            SET PAT_MOD BIT = 1 TO ALLOW
0009D8 82386106              OR.B    SAVE_CNTL,D1           PAT ACCESS
0009DC 11C15FE1              MOVE.B  D1,SYS_CNTL
0009E0 1412                  MOVE.B  (A2),D2            GET KEY BYTE
0009E2 6B0010AA              BMI     MC_0016            BR IF PAT PARITY ERROR
0009E6 11F861065FE1          MOVE.B  SAVE_CNTL,SYS_CNTL  RESTORE ORIGINAL SYS CONTROL REG
                      *
0009EC 08020002              BTST    2,D2               IS THE PAGE FAULT BIT ON?
0009F0 660019CC              BNE     SPECEX
0009F4 02020003              ANDI.B  #$03,D2            ONLY REFERENCE AND CHANGE BITS VALID
0009F8 E30A                  LSL.B   1,D2               SHIFT THEM INTO CORRECT POSITION
0009FA 083800036031          BTST    PSW_EC,PSW+1       IS THIS EC MODE?  IF YES, STORE
000A00 6602                  BNE.S   ISK1                 7-BIT KEY (4-BITS,F,R,C)
000A02 4202                  CLR.B   D2                 IN BC MODE, KEY IS ZERO
000A04 11C26009       ISK1   MOVE.B  D2,R1+3            STORE KEY INTO LOW BYTE OF REGISTER
000A08 4EF80200              JMP     RETURN
                      *
                      * * * * * * * * * * * * * * * * * * * * * * * * * * * * * * * * * * *
                      *                                                                   *
                      *     LCTL  (B7)  LOAD CONTROL INSTRUCTION                          *
                      *                                                                   *
                      * * * * * * * * * * * * * * * * * * * * * * * * * * * * * * * * * * *
                      *
       00000A0C       LCTL   EQU     *
000A0C 31C7601A              MOVE.W  D7,INSTSAVE        SAVE INSTRUCTION HALFWORD
000A10 083800006031          BTST    PSW_PROB,PSW+1     IN SUPERVISOR STATE?
000A16 66001948              BNE     PRIVEX             NO, PRIVILEGED EXCEPTION
000A1A 7203                  MOVEQ   #03,D1             TEST FOR ALIGNMENT OF OPERAND ON
000A1C C2386019              AND.B   OP2_EA+3,D1        FULLWORD BOUNDARY;  SPECIFICATION
000A20 6600199C              BNE     SPECEX               EXCEPTION IF NOT.
                      *
000A24 4241                  CLR.W   D1
000A26 43F80100              LEA     CREG0,A1           POINT TO CONTROL REGISTER 0
000A2A 2A11                  MOVE.L  (A1),D5            SAVE REGISTER 0
000A2C 1207                  MOVE.B  D7,D1              GET R1 AND R3 FROM INSTRUCTION
000A2E 3401                  MOVE.W  D1,D2
000A30 020100F0              ANDI.B  #$F0,D1            D1 HAS REGISTER 1
000A34 E409                  LSR.B   2,D1
000A36 0202000F              ANDI.B  #$0F,D2            D2 HAS REGISTER 3
000A3A E50A                  LSL.B   2,D2
                      *
000A3C B441                  CMP.W   D1,D2              COMPARE THE REGISTERS; IF D2 IS LESS
000A3E 6B3E                  BMI.S   LCTL1              THAN D1, WE MUST WRAP FROM 15 TO 0
000A40 3802                  MOVE.W  D2,D4              CALCULATE NUMBER OF BYTES FOR
000A42 9841                  SUB.W   D1,D4                PREFETCHING FROM MAIN STORAGE
                      *
000A44 28786016              MOVEA.L OP2_EA,A4
000A48 D9FC80000000          ADDA.L  #MS_ACC,A4
000A4E 10344003       LCTL3  MOVE.B  3(A4,D4),D0        GET LAST BYTE FROM OP 2 ADDRESS
                      *                                   IF NO ERRORS, GO AHEAD
000A52 239C1000       LCTLOOP MOVE.L (A4)+,0(A1,D1)     LOAD ONE CONTROL REGISTER
000A56 5841                  ADDQ.W  #4,D1              UPDATE D1 BY 4 (LENGTH IN BYTES)
000A58 B441                  CMP.W   D1,D2              HAVE WE REACHED REQUESTED NUMBER?
000A5A 6AF6                  BPL.S   LCTLOOP            IF NOT, CONTINUE LOOPING
000A5C 08010010              BTST    SW1,D1             TEST IF WE MUST WRAP FROM REG15 TO 0
000A60 6706                  BEQ.S   LCTLMSK            BRANCH IF BIT IS OFF
000A62 4842                  SWAP    D2                 RESTORE ENDING REGISTER
000A64 7200                  MOVEQ   #0,D1              START AGAIN AT REG 0  ***** THIS
                      *                                 ALSO RESETS SW1!!!  ***
000A66 60EA                  BRA.S   LCTLOOP            CONTINUE IN LOOP UNTIL DONE
                      *
000A68 BA780102       LCTLMSK CMP.W  CREG0+2,D5         HAVE EXTERNAL MASKS CHANGED?
000A6C 670C                  BEQ.S   LCTLEND
000A6E 083800006030          BTST    PSW_EXT,PSW        ARE EXTERNAL INTERRUPTS MASKED ON?
```

```
000A74 6704                     BEQ.S    LCTLEND
000A76 4EB8170A                 JSR      EX_INT            GO CHECK IF PSW SWAP
                       *
000A7A 4EF80200        LCTLEND  JMP      RETURN            INSTRUCTION IS COMPLETE
                       *
                       *
                       *
000A7E 7840            LCTL1    MOVEQ    #$40,D4
000A80 9841                     SUB.W    D1,D4             CALCULATE NUMBER OF BYTES TO BE
000A82 D842                     ADD.W    D2,D4             TRANSFERRED FOR PRE-FETCH OF STORAGE
000A84 4842                     SWAP     D2                SAVE ENDING REGISTER
000A86 343C003C                 MOVE.W   #$003C,D2         MAKE REGISTER 15 LAST REGISTER
000A8A 08C10010                 BSET     SW1,D1            SET WRAP SWITCH
000A8E 60BE                     BRA.S    LCTL3             GO PREFETCH AND LOOP UNTIL REG 15
                       * * * * * * * * * * * * * * * * * * * * * * * * * * * * * * * * * * *
                       *                                                                   *
                       *     LPSW (82)  LOAD PSW INSTRUCTION                               *
                       *                                                                   *
                       *         NEW PSW ADDRESS POINTED TO BY FIRST OPERAND               *
                       *                                                                   *
                       *         EXIT:  NEW PSW POINTED TO BY INSTRUCTION IS LOADED AS     *
                       *                CURRENT PSW                                        *
                       *         ERROR: ACCESS EXCEPTIONS, SPECIFICATION EXCEPTION IF      *
                       *                EC MODE PSW HAS INCORRECT FORMAT                   *
                       *                                                                   *
                       * * * * * * * * * * * * * * * * * * * * * * * * * * * * * * * * * * *
                       *
       00000A90        LPSW     EQU      *
)00A90 31C7601A        -        MOVE.W   D7,INSTSAVE       SAVE INSTRUCTION HALFWORD
)00A94 083800006031             BTST     PSW_PROB,PSW+1
)00A9A 660018C4                 BNE      PRIVEX
)00A9E 7207                     MOVEQ    #$07,D1           LOAD MASK BYTE TO TEST FOR
)00AA0 C2386019                 AND.B    OP2_EA+3,D1         DOUBLEWORD BOUNDARY
)00AA4 66001918                 BNE      SPECEX            IF NOT, SPECIFICATION EXCEPTION
                       *
)00AA8 28786016                 MOVEA.L  OP2_EA,A4         GET OPERAND 1 ADDRESS
)00AAC D9FC80000000             ADDA.L   #MS_ACC,A4
                       *
)00AB2 4EB8250A                 JSR      PSW_LOAD          VERIFY PSW AND LOAD IT
                       *
)00AB6 08D00007                 BSET     PSR_ILC0,(A0)     PUT ILC OF 2 INTO PSR
                       *
)00ABA 4EF81EFE                 JMP      IENDLPSW          GO TO END OF INSTRUCTION
                       *
                       * * * * * * * * * * * * * * * * * * * * * * * * * * * * * * * * * * *
                       *                                                                   *
                       *     LRA  (B1)  LOAD REAL ADDRESS INSTRUCTION                      *
                       *                                                                   *
                       *         LOAD REAL ADDRESS FROM PAT - WHEN CONTROL REG 1 IS ZERO   *
                       *                                                                   *
                       * * * * * * * * * * * * * * * * * * * * * * * * * * * * * * * * * * *
                       *
)00ABE 31C7601A        LRA      MOVE.W   D7,INSTSAVE       SAVE INSTRUCTION HALFWORD
)00AC2 21F860126006             MOVE.L   R1X,R1            MOVE REGISTER FOR RETURN
)00AC8 083800006031             BTST     PSW_PROB,PSW+1
)00ACE 66001890                 BNE      PRIVEX
                       *
                       *
)00AD2 4AB80104        LRA1     TST.L    CREG1             IF CONTROL REGISTER 1 IS NOT ZERO,
)00AD6 6600193A                 BNE      TRANSPEX            SET TRANSLATE SPEC EXCEPTION
)00ADA 7208                     MOVEQ    #$08,D1           SET PAT_MOD BIT = 1 TO ALLOW
)00ADC 82386106                 OR.B     SAVE_CNTL,D1          PAT ACCESS
)00AE0 11C15FE1                 MOVE.B   D1,SYS_CNTL
                       *
00AE4 22386016                  MOVE.L   OP2_EA,D1         GET OPERAND
00AE8 3401                      MOVE.W   D1,D2
00AEA 0C8100400000              CMPI.L   #VIRT_STR,D1      CHECK 4 MEG VIRTUAL BOUNDARY
00AF0 6A3C                      BPL.S    S_LRACC2          SET CONDITION CODE 2 IF EXCEEDED
                       *
00AF2 028100FFF000              ANDI.L   #$00FFF000,D1     ENSURE EXTRA BITS ARE OFF
00AF8 08C10017                  BSET     #$17,D1           TURN ON BIT 23, PAT ACCESS
00AFC 2241                      MOVEA.L  D1,A1
00AFE 7200                      MOVEQ    #$0,D1
00B00 3211                      MOVE.W   (A1),D1           GET PAT ENTRY
00B02 6B000F8A                  BMI      MC_0016           CHECK FOR PAT PARITY ERROR
00B06 0801000A                  BTST     PF_BIT,D1
```

```
000B0A 6622                      BNE.S   S_LRACC2
000B0C 0241007F                  ANDI.W  #$007F,D1        AND OFF UNNECESSARY BITS
000B10 E149                      LSL.W   8,D1             ALIGN ADDRESS PROPERLY
000B12 E989                      LSL.L   4,D1             ALIGN ADDRESS PROPERLY
000B14 028200000FFF              ANDI.L  #$00000FFF,D2    ISOLATE DISPLACEMENT
000B1A D282                      ADD.L   D2,D1
000B1C 21C16006                  MOVE.L  D1,R1
000B20 021000CF                  ANDI.B  #CC_RST,(A0)     CLEAR CONDITION CODE BITS  (CC0)
000B24 11F861065FE1 SLRADONE     MOVE.B  SAVE_CNTL,SYS_CNTL  RESTORE ORIGINAL SYS CONTROL REG
000B2A 4EF80200                  JMP     RETURN
                    *
                    *
000B2E 021000CF     S_LRACC2     ANDI.B  #CC_RST,(A0)     CLEAR CONDITION CODE BITS
000B32 00100020                  ORI.B   #CC2,(A0)        SET CONDITION CODE 2
000B36 60EC                      BRA.S   SLRADONE
                    *
                    * * * * * * * * * * * * * * * * * * * * * * * * * * * * * * * * * * *
                    *                                                                   *
                    *    MAD  (B21D)   MAKE ADDRESSABLE INSTRUCTION                      *
                    *                                                                   *
                    *        VIRTUAL ADDRESS IN OPERAND 2, REAL ADDRESS IN GPR2          *
                    *                                                                   *
                    * * * * * * * * * * * * * * * * * * * * * * * * * * * * * * * * * * *
                    *
       00000B38     MAD          EQU     *
000B38 31C7601A                  MOVE.W  D7,INSTSAVE      SAVE INSTRUCTION HALFWORD
000B3C 083800006031              BTST    PSW_PROB,PSW+1
000B42 6600181C                  BNE     PRIVEX
                    *
000B46 4AB80104                  TST.L   CREG1
000B4A 66001810                  BNE     OPEXCP1
                    *
000B4E 243C00FFF000              MOVE.L  #$00FFF000,D2    SET PAT ADDRESS MASK
000B54 2602                      MOVE.L  D2,D3
000B56 283C00400000              MOVE.L  #VIRT_STR,D4     GET VIRTUAL STORAGE SIZE
000B5C C4B8600A                  AND.L   GPR2,D2          GET REAL ADDRESS
000B60 C6B86016                  AND.L   OP2_EA,D3        GET VIRTUAL ADDRESS
                    *
000B64 B684                      CMP.L   D4,D3            CHECK IF ADDRESS IS IN VIRTUAL RANGE
000B66 6A0017DA                  BPL     ADDR_ERR         NO, SET ADDRESS EXCEPTION
000B6A B484                      CMP.L   D4,D2            CHECK IF REAL ADDRESS IS IN PAT RANGE
000B6C 6A0018A4                  BPL     TRANSPEX         NO, SET TRANSLATION SPEC EXCEPTION
                    *
000B70 7208                      MOVEQ   #$08,D1          SET PAT_MOD BIT = 1 TO ALLOW
000B72 82386106                  OR.B    SAVE_CNTL,D1         PAT ACCESS
000B76 11C15FE1                  MOVE.B  D1,SYS_CNTL
                    *
000B7A 08C20017                  BSET    #$17,D2          TURN ON BIT 23, PAT ACCESS
000B7E 2242                      MOVEA.L D2,A1            TEST IF REAL ADDRESS ENTRY CONTAINS
000B80 08110003                  BTST    #$3,(A1)             'REAL OUT OF BOUNDS' BIT
000B84 6600188C                  BNE     TRANSPEX         BR IF YES, SET TRANSLATION SPEC EXCP
                    *
000B88 08C30017                  BSET    #$17,D3          TURN ON BIT 23, PAT ACCESS
000B8C 2243                      MOVEA.L D3,A1                FOR VIRTUAL PAT ADDRESS
                    *
000B8E E98A                      LSL.L   4,D2             MAKE REAL ADDRESS PAT ENTRY
000B90 4842                      SWAP    D2
000B92 024203FF                  ANDI.W  #$03FF,D2        GET RID OF EXTRA BITS
                    *
000B96 3811                      MOVE.W  (A1),D4          SAVE 'REAL OUT OF BOUNDS' BIT
000B98 02440800                  ANDI.W  #$0800,D4            FOR NEW ENTRY
000B9C 8444                      OR.W    D4,D2
000B9E 3282                      MOVE.W  D2,(A1)          STORE THE NEW ENTRY IN THE PAT
000BA0 11F861065FE1              MOVE.B  SAVE_CNTL,SYS_CNTL  RESTORE ORIGINAL SYS CONTROL REG
000BA6 4EF80200                  JMP     RETURN
                    *
                    * * * * * * * * * * * * * * * * * * * * * * * * * * * * * * * * * * *
                    *                                                                   *
                    *    MUN  (B21E)   MAKE UNADDRESSABLE INSTRUCTION                    *
                    *                                                                   *
                    * * * * * * * * * * * * * * * * * * * * * * * * * * * * * * * * * * *
                    *
       00000BAA     MUN          EQU     *
000BAA 31C7601A                  MOVE.W  D7,INSTSAVE      SAVE INSTRUCTION HALFWORD
000BAE 083800006031              BTST    PSW_PROB,PSW+1
000BB4 660017AA                  BNE     PRIVEX
                    *
000BB8 4AB80104                  TST.L   CREG1            IF CONTROL REGISTER 1 DOES NOT
```

```
00BBC 6600179E          BNE    OPEXCP1              CONTAIN ZERO, OP CHECK
                *
00BC0 26386016          MOVE.L OP2_EA,D3            GET OPERAND
00BC4 0C8300400000      CMPI.L #VIRT_STR,D3         CHECK IF ADDRESS IS IN VIRTUAL RANGE
00BCA 6A001776          BPL    ADDR_ERR
                *
00BCE 7208              MOVEQ  #$08,D1              SET PAT_MOD BIT = 1 TO ALLOW
00BD0 82386106          OR.B   SAVE_CNTL,D1             PAT ACCESS
00BD4 11C15FE1          MOVE.B D1,SYS_CNTL
                *
00BD8 028300FFF000      ANDI.L #$00FFF000,D3        ENSURE EXTRA BITS ARE OFF
00BDE 08C30017          BSET   #$17,D3              TURN ON BIT 23, PAT ACCESS
00BE2 2243              MOVEA.L D3,A1
00BE4 343C0400          MOVE.W #$0400,D2            PAGE FAULT BIT
                *
00BE8 3811              MOVE.W (A1),D4              SAVE 'REAL OUT OF BOUNDS' BIT
00BEA 02440800          ANDI.W #$0800,D4                 FOR NEW ENTRY
00BEE 8444              OR.W   D4,D2
                *
00BF0 3282              MOVE.W D2,(A1)              INVALIDATE ENTRY
00BF2 11F861065FE1      MOVE.B SAVE_CNTL,SYS_CNTL  RESTORE ORIGINAL SYS CONTROL REG
00BF8 4EF80200          JMP    RETURN
                * * * * * * * * * * * * * * * * * * * * * * * * * * * * * * * * * * *
                *   MC  (AF)  MONITOR CALL INSTRUCTION                              *
                *                                                                   *
                * * * * * * * * * * * * * * * * * * * * * * * * * * * * * * * * * * *
                *
      00000BFC  MC      EQU    *
00BFC 31C7601A          MOVE.W D7,INSTSAVE          SAVE INSTRUCTION HALFWORD
00C00 3807              MOVE.W D7,D4
00C02 024700F0          ANDI.W #$00F0,D7            TEST IF HIGH-ORDER BITS ARE 0
00C06 660017B6          BNE    SPECEX               SPECIFICATION EXCEPTION IF NOT
                *
00C0A 720F              MOVEQ  #$0F,D1              GET IBM BIT NUMBER
00C0C C841              AND.W  D1,D4
00C0E 9244              SUB.W  D4,D1                SUBTRACT IT FROM 'F' FOR MOT BIT #
00C10 36380122          MOVE.W CREG8+2,D3
00C14 0303              BTST   D1,D3                IS THIS CLASS INTERRUPT ALLOWED?
00C16 6700F5E8          BEQ    RETURN               IF NOT MASKED ON, NO PROG CHECK
                *
00C1A 247C80000094      MOVEA.L #AMONCLAS,A2        GET MAIN STORE ADDR FOR CLASS CODE
00C20 7204              MOVEQ  #$04,D1              SET BY-PASS PAT BIT FOR NO TRANSLATE
00C22 82386106          OR.B   SAVE_CNTL,D1                TO ACCESS LOW STORE
00C26 11C15FE1          MOVE.B D1,SYS_CNTL
00C2A 3484              MOVE.W D4,(A2)              PUT MONITOR CLASS AT LOC. X'94'
00C2C 257860160008      MOVE.L OP2_EA,8(A2)         PUT MONITOR CODE AT X'9C'
00C32 7440              MOVEQ  #$0040,D2            MONITOR CALL PROGRAM INTERRUPT CODE
00C34 4EF82424          JMP    PCK_MC               GO TO PROG CHK PSW SWAP
                *
                * * * * * * * * * * * * * * * * * * * * * * * * * * * * * * * * * * *
                *                                                                   *
                *    MVCIN  (E8)  MOVE CHARACTER INVERSE INSTRUCTION                *
                *                                                                   *
                *                                                                   *
                * * * * * * * * * * * * * * * * * * * * * * * * * * * * * * * * * * *
                *
                *
      00000C38  MVCIN   EQU    *                    MOVE INVERSE  -  E8
00C38 31C7601A          MOVE.W D7,INSTSAVE          SAVE INSTRUCTION
00C3C 7200              MOVEQ  #$00,D1              GET LOOP COUNT
00C3E 1207              MOVE.B D7,D1
00C40 227C80000000      MOVEA.L #MS_ACC,A1          SET UP MS ACCESS
00C46 2449              MOVEA.L A1,A2
00C48 D3F86012          ADDA.L SSOP1_EA,A1          GET OP1 MS ADDRESS
00C4C 1E311000          MOVE.B 0(A1,D1),D7          PRETEST LAST OP1 ADDRESS
00C50 D5F8600E          ADDA.L SSOP2_EA,A2          GET OP2 MS ADDRESS
00C54 264A              MOVEA.L A2,A3               PRETEST LAST OP2 ADDRESS
00C56 97C1              SUBA.L D1,A3
00C58 1E13              MOVE.B (A3),D7
00C5A 528A              ADDQ.L #1,A2                ADJUST OP2 ADDRESS FOR MOVE
                *
00C5C 12E2      MVCINLP MOVE.B -(A2),(A1)+          MOVE EACH CHARACTER
00C5E 51C9FFFC          DBRA   D1,MVCINLP
00C62 4EF80200          JMP    RETURN
```

```
* * * * * * * * * * * * * * * * * * * * * * * * * * * * * * * * * * * *
*                                                                     *
*    MVCL  (0E)  MOVE CHARACTER LONG                                  *
*                                                                     *
*                                                                     *
*                               LABEL      CONTENTS                   *
*                               -----      --------                   *
*       INPUT:  AT COMM+8       RR1_ODD    (R1+1) - OP1 LENGTH        *
*                      +C       RR2_EVEN   (R2)   - OP2 ADDRESS       *
*                      +10      RR1_EVEN   (R1)   - OP1 ADDRESS       *
*                      +14      RR2_ODD    (R2+1) - PAD, OP2 LENGTH   *
*                                                                     *
*                                                                     *
*       OUTPUT: AT COMM+8       RR2E_RET   (R2)                       *
*                      +C       RR2O_RET   (R2+1)                     *
*                      +10      RR1E_RET   (R1)                       *
*                      +14      RR1O_RET   (R1+1)                     *
*                                                                     *
*                                                                     *
*       MOVES DATA FROM OPERAND 2 LOCATION TO OPERAND 1 LOCATION      *
*       ALSO SETS CONDITION CODE IN THE PSR                           *
*                                                                     *
* * * * * * * * * * * * * * * * * * * * * * * * * * * * * * * * * * * *
*
     00000C66        MVCL     EQU       *
000C66 31C7601A               MOVE.W    D7,INSTSAVE         SAVE INSTRUCTION
000C6A 22386006               MOVE.L    RR1_ODD,D1
000C6E 21F8600A6006           MOVE.L    RR2_EVEN,RR2E_RET   MOVE REGISTERS TO CORRECT LOCATION
000C74 21F86012600A           MOVE.L    RR2_ODD,RR2O_RET      FOR RETURN
000C7A 21C16012               MOVE.L    D1,RR1O_RET
                     *
000C7E 11F8600A60E0           MOVE.B    RR2O_RET,RR2O_SAV   SAVE PAD BYTE
000C84 11F86012600E           MOVE.B    RR1O_RET,RR1O_SAV   SAVE OP1 LENGTH REG HI-BYTE
                     *
000C8A 7400                   MOVEQ     #0,D2
000C8C 11C2600E               MOVE.B    D2,RR1E_RET         CLEAR OP1 ADDRESS HI-BYTE
000C90 11C26006               MOVE.B    D2,RR2E_RET         CLEAR OP2 ADDRESS HI-BYTE
000C94 11C26012               MOVE.B    D2,RR1O_RET         CLEAR HI-BYTE OF OP1 LENGTH REGISTER
000C98 11C2600A               MOVE.B    D2,RR2O_RET         CLEAR HI-BYTE OF OP2 LENGTH REGISTER
                     *
000C9C 2A386012               MOVE.L    RR1O_RET,D5         GET OP1 COUNT
000CA0 2C38600A               MOVE.L    RR2O_RET,D6         GET OP2 COUNT
000CA4 287C80000000           MOVEA.L   #MS_ACC,A4          GET MAIN STORAGE ADDRESSES
000CAA 2C4C                   MOVEA.L   A4,A6
000CAC D9F8600E               ADDA.L    RR1E_RET,A4         OP1 MS ADDRESS
000CB0 DDF86006               ADDA.L    RR2E_RET,A6         OP2 MS ADDRESS
000CB4 BC85                   CMP.L     D5,D6               COMPARE OPERAND COUNTS
000CB6 6604                   BNE.S     MVCL1               BR IF NOT EQUAL
000CB8 7E00                   MOVEQ     #CC0,D7             SET COND CODE 0, OP1 = OP2
000CBA 600C                   BRA.S     MVCL3
                     *
000CBC 6B06          MVCL1    BMI.S     MVCL2               BR IF MINUS, OP1 LARGER SET CC2
000CBE 7E10                   MOVEQ     #CC1,D7             SET COND CODE 1, OP2 GT OP1
000CC0 2C05                   MOVE.L    D5,D6               MOVE COUNT TO PAD COUNT, NO PAD
000CC2 6004                   BRA.S     MVCL3
                     *
000CC4 7E20          MVCL2    MOVEQ     #CC2,D7             SET COND CODE 2, OP1 GT OP2
000CC6 CD45                   EXG.L     D6,D5               MOVE COUNT TO D5, PAD COUNT TO D6
                     *
000CC8 2805          MVCL3    MOVE.L    D5,D4               MOVE WORKING COUNT
000CCA 670000CE               BEQ       MVCLPAD             IF ZERO, CHECK PADDING
                     *
                     *    TEST FOR DESTRUCTIVE OVERLAP - NO MOVEMENT TAKES PLACE IF
                     *    AN ADDRESS IS USED AS SOURCE AFTER IT HAS BEEN MODIFIED.
                     *
000CCE 223C81000000           MOVE.L    #$81000000,D1       SET UP 16MB MS ADDRESS
000CD4 43F648FF               LEA       -1(A6,D4.L),A1      GET LAST ADDRESS OF SOURCE
000CD8 93C1                   SUBA.L    D1,A1               IS IT ABOVE 16 MB? (WRAPPED)
000CDA 6C08                   BGE.S     MVCL4               BRANCH IF YES (WRAPPED 16MB)
                     *
000CDC D3C1                   ADDA.L    D1,A1               RESTORE VALID LAST ADDRESS
000CDE B3CC                   CMPA.L    A4,A1               IS THE 1ST DEST ADDR > LAST SOURCE
000CE0 6B10                   BMI.S     MVCL7               BR IF YES, NO OVERLAP
000CE2 6004                   BRA.S     MVCL5               GO TO TEST 1ST SOURCE ADDR
                     *
000CE4 B3CC          MVCL4    CMPA.L    A4,A1               IS THE 1ST DEST ADDR > LAST SOURCE
```

```
000CE6 6A04                  BPL.S    MVCL6          BR IF NO, OVERLAP, SET CC3
000CE8 BDCC        MVCL5     CMPA.L   A4,A6          IS THE 1ST DEST ADDR <= 1ST SOURCE
000CEA 6A06                  BPL.S    MVCL7          BR IF YES, NO OVERLAP
                   *
000CEC 7E30        MVCL6     MOVEQ    #CC3,D7        SET CONDITION CODE 3 FOR DESTRUCTIVE
000CEE 4EF80E30              JMP      MVCLEND          OVERLAP, DON'T MOVE.
                   *
000CF2 7401        MVCL7     MOVEQ    #1,D2
000CF4 300C                  MOVE.W   A4,D0
000CF6 C042                  AND.W    D2,D0          CHECK IF BOTH ADDRESSES ARE ON
000CF8 320E                  MOVE.W   A6,D1            EVEN OR ODD BYTE BOUNDARIES
000CFA C242                  AND.W    D2,D1
000CFC B141                  EOR.W    D0,D1          IF BOUNDARIES ARE UNEQUAL,
000CFE 666A                  BNE.S    MVCLBYTE         MOVE BYTES
000D00 4A40                  TST.W    D0             IF BOTH ON EVEN BOUNDARY, GO
000D02 670A                  BEQ.S    MVCLFULL         MOVE FULLWORDS
                   *
000D04 7602                  MOVEQ    #$2,D3         SET UP FOR 1-BYTE MOVE, D2 IS 1
                   *                                   NECESSARY FOR BUS ERROR HANDLING
000D06 18DE                  MOVE.B   (A6)+,(A4)+    MOVE BYTE TO ALIGN ON HW BOUNDARY
000D08 5384                  SUBQ.L   #1,D4          ADJUST WORKING COUNT
000D0A 6700008E              BEQ      MVCLPAD        BR IF ZERO, GO CHECK PADDING
                   *
000D0E 263C00000080 MVCLFULL MOVE.L   #$80,D3        OPERATION BYTE COUNT IS X'80'
000D14 B883        MVCLF1    CMP.L    D3,D4          TEST REMAINING WORKING COUNT
000D16 6D3C                  BLT.S    MVCLF3         BRANCH IF LESS THAN X'80' BYTES LEFT
000D18 741F                  MOVEQ    #$1F,D2        LOAD LOOP COUNT
000D1A 28DE        MVCLF2    MOVE.L   (A6)+,(A4)+    MOVE 4 BYTES
000D1C 51CAFFFC              DBRA     D2,MVCLF2
000D20 9883                  SUB.L    D3,D4          ADJUST WORKING COUNT
                   *
000D22 72F8                  MOVEQ    #$F8,D1        INTERRUPT REGISTER MASK
000D24 82385F90              OR.B     CC_INT_REG,D1  WAIT FOR ANY KIND OF INTERRUPT
000D28 4601                  NOT.B    D1             COMPLEMENT BITS
000D2A 67E8                  BEQ.S    MVCLF1         BR IF NO, MOVE MORE FULLWORDS
                   *
000D2C 9A84        MVCLINTR  SUB.L    D4,D5          CALCULATE # BYTES MOVED
000D2E 9BB8600A              SUB.L    D5,RR2O_RET    ADJUST OP2 COUNT/ADDRESS
000D32 DBB86006              ADD.L    D5,RR2E_RET
000D36 9BB86012              SUB.L    D5,RR1O_RET    ADJUST OP1 COUNT/ADDRESS
000D3A DBB8600E              ADD.L    D5,RR1E_RET
000D3E 4A3860E8              TST.B    EXECFLAG
000D42 6708                  BEQ.S    MVINTR1
000D44 59B860EC              SUBQ.L   #4,SAV_PCEX
000D48 4EF80E30              JMP      MVCLEND
000D4C 55B86002    MVINTR1   SUBQ.L   #2,PC
000D50 4EF80E30              JMP      MVCLEND
                   *
                   *         X'00' TO X'7F' BYTES LEFT FOR FULLWORD MOVE
                   *
000D54 2404        MVCLF3    MOVE.L   D4,D2          GET FULLWORD MOVE COUNT
000D56 024200FC              ANDI.W   #$FC,D2
000D5A 6730                  BEQ.S    MVCLB4         IF NONE, JUST MOVE BYTES
000D5C 2602                  MOVE.L   D2,D3          MAKE THE OPERATION BYTE COUNT
000D5E E44A                  LSR.W    2,D2           MAKE FW LOOP COUNT
000D60 5342                  SUBQ.W   #1,D2
000D62 28DE        MVCLF4    MOVE.L   (A6)+,(A4)+    MOVE REMAINING FULLWORDS
000D64 51CAFFFC              DBRA     D2,MVCLF4
000D68 6020                  BRA.S    MVCLB3         GO TO DO ANY REMAINING BYTES
000D6A 263C00000080 MVCLBYTE MOVE.L   #$80,D3        OPERATION BYTE COUNT IS X'80'
000D70 B883        MVCLB1    CMP.L    D3,D4          TEST REMAINING WORKING COUNT
000D72 6D18                  BLT.S    MVCLB4         BRANCH IF LESS THAN X'80' BYTES LEFT
000D74 747F                  MOVEQ    #$7F,D2        LOOP COUNT FOR BYTE MOVE
000D76 18DE        MVCLB2    MOVE.B   (A6)+,(A4)+    MOVE 1 BYTE
000D78 51CAFFFC              DBRA     D2,MVCLB2
000D7C 9883                  SUB.L    D3,D4          ADJUST WORKING COUNT
                   *
000D7E 72F8                  MOVEQ    #$F8,D1        INTERRUPT REGISTER MASK
000D80 82385F90              OR.B     CC_INT_REG,D1  WAIT FOR ANY KIND OF INTERRUPT
000D84 4601                  NOT.B    D1             COMPLEMENT BITS
000D86 67E8                  BEQ.S    MVCLB1         NO, CONTINUE WITH NEXT UNIT OF OP
000D88 60A2                  BRA.S    MVCLINTR       OTHERWISE GO HANDLE INTERRUPT FIRST
                   *
                   *         X'00' TO X'7F' BYTES LEFT FOR BYTE MOVE
                   *
000D8A 9883        MVCLB3    SUB.L    D3,D4          ADJUST WORKING COUNT
```

```
000D8C 2604          MVCLB4   MOVE.L  D4,D3           MAKE THE OPERATION BYTE COUNT
000D8E 670A                   BEQ.S   MVCLPAD         BR IF ZERO, TEST FOR PADDING
000D90 2404                   MOVE.L  D4,D2           MAKE LOOP COUNT
000D92 5342                   SUBQ.W  #1,D2
000D94 18DE          MVCLB5   MOVE.B  (A6)+,(A4)+     MOVE 1 BYTE
000D96 51CAFFFC               DBRA    D2,MVCLB5
000D9A 9BB8600A      MVCLPAD  SUB.L   D5,RR2O_RET     ADJUST OP2 COUNT/ADDRESS
000D9E DBB86006               ADD.L   D5,RR2E_RET
000DA2 9BB86012               SUB.L   D5,RR1O_RET     ADJUST OP1 COUNT/ADDRESS
000DA6 DBB8600E               ADD.L   D5,RR1E_RET
000DAA 9C85                   SUB.L   D5,D6
000DAC 7A00                   MOVEQ   #$0,D5          PAD FLAG FOR BUS ERROR
                     *
000DAE 2806                   MOVE.L  D6,D4           GET PAD MOVE WORKING COUNT
000DB0 677E                   BEQ.S   MVCLEND         BR IF ZERO, NO MORE BYTES TO MOVE
                     *
000DB2 303860E0               MOVE.W  RR2O_SAV,D0     GET PAD CHARACTER IN ALL BYTES
000DB6 103860E0               MOVE.B  RR2O_SAV,D0       FOR FW MOVE
000DBA 3200                   MOVE.W  D0,D1
000DBC 4640                   SWAP    D0
000DBE 3001                   MOVE.W  D1,D0
                     *
000DC0 7401                   MOVEQ   #$1,D2          TEST OPERAND BOUNDARY
000DC2 320C                   MOVE.W  A4,D1
000DC4 C242                   AND.W   D2,D1
000DC6 6708                   BEQ.S   MVPFULL         BR IF ON HW BOUNDARY
                     *
000DC8 7602                   MOVEQ   #$2,D3          SET UP FOR 1-BYTE MOVE, D2 IS 1
                     *                                  NECESSARY FOR BUS ERROR HANDLING
000DCA 18C0                   MOVE.B  D0,(A4)+        MOVE FIRST PAD CHARACTER TO ALIGN
000DCC 5384                   SUBQ.L  #1,D4           ADJUST WORKING COUNT
000DCE 6B56                   BMI.S   MVCLDONE        BR IF ZERO, END OF OP
                     *
000DD0 263C000000C0  MVPFULL  MOVE.L  #$C0,D3         OPERATION BYTE COUNT IS X'C0'
000DD6 B883          MVCLPF1  CMP.L   D3,D4           TEST REMAINING WORKING COUNT
000DD8 6D26                   BLT.S   MVCLPF3         BRANCH IF LESS THAN X'C0' BYTES LEFT
000DDA 742F                   MOVEQ   #$2F,D2         LOAD LOOP COUNT
000DDC 28C0          MVCLPF2  MOVE.L  D0,(A4)+        MOVE 4 BYTES
000DDE 51CAFFFC               DBRA    D2,MVCLPF2
000DE2 9883                   SUB.L   D3,D4           ADJUST WORKING COUNT
                     *
000DE4 72F8                   MOVEQ   #$F8,D1         INTERRUPT REGISTER MASK
000DE6 82385F90               OR.B    CC_INT_REG,D1   WAIT FOR ANY KIND OF INTERRUPT
000DEA 4601                   NOT.B   D1              COMPLEMENT BITS
000DEC 67E8                   BEQ.S   MVCLPF1         NO, CONTINUE WITH NEXT UNIT OF OP
000DEE 4A3860E8               TST.B   EXECFLAG
000DF2 6706                   BEQ.S   MVINTR2
000DF4 59B860EC               SUBQ.L  #4,SAV_PCEX
000DF8 602C                   BRA.S   MVCLDONE
000DFA 55B86002      MVINTR2  SUBQ.L  #2,PC
000DFE 6026                   BRA.S   MVCLDONE
                     *
                     *        X'00' TO X'BF' BYTES LEFT FOR BYTE MOVE
                     *
000E00 2404          MVCLPF3  MOVE.L  D4,D2           GET FULLWORD MOVE COUNT
000E02 020200FC               ANDI.B  #$FC,D2
000E06 670E                   BEQ.S   MVCLPB1         IF NONE, JUST MOVE BYTES
000E08 2602                   MOVE.L  D2,D3           MAKE OPERATION BYTE COUNT
000E0A E44A                   LSR.W   2,D2            MAKE FW LOOP COUNT
000E0C 5342                   SUBQ.W  #1,D2
000E0E 28C0          MVCLPF4  MOVE.L  D0,(A4)+        PAD REMAINING FULLWORDS
000E10 51CAFFFC               DBRA    D2,MVCLPF4
000E14 9883                   SUB.L   D3,D4           ADJUST WORKING COUNT
                     *
000E16 2604          MVCLPB1  MOVE.L  D4,D3           MAKE OPERATION BYTE COUNT, 0-3 BYTES
000E18 670C                   BEQ.S   MVCLDONE        BR IF ZERO, END OF OP
000E1A 2404                   MOVE.L  D4,D2           MAKE LOOP COUNT
000E1C 5342                   SUBQ.W  #1,D2
000E1E 18C0          MVCLPB2  MOVE.B  D0,(A4)+        MOVE 1 BYTE
000E20 51CAFFFC               DBRA    D2,MVCLPB2      PAD REMAINING BYTES
                     *
000E24 9883          MVPADEND SUB.L   D3,D4           CALCULATE #BYTES MOVED
000E26 9C84          MVCLDONE SUB.L   D4,D6
000E28 9DB86012               SUB.L   D6,RR1O_RET     UPDATE OP1 COUNT/ADDRESS REGISTERS
000E2C DDB8600E               ADD.L   D6,RR1E_RET
                     *
000E30 7200          MVCLEND  MOVEQ   #0,D1
```

```
000E32 11C1600E                 MOVE.B  D1,RR1E_RET
000E36 11F860DE6012             MOVE.B  RR1O_SAV,RR1O_RET     ENSURE HIGH BYTES OF REGISTERS OK
000E3C 11C16006                 MOVE.B  D1,RR2E_RET
000E40 11F860E0600A             MOVE.B  RR2O_SAV,RR2O_RET
                        *
000E46 021000CF                 ANDI.B  #CC_RST,(A0)          RESET COND CODE IN PSR
000E4A 8F10                     OR.B    D7,(A0)               SET NEW COND CODE IN PSR
000E4C 4EF80200                 JMP     RETURN
                        * * * * * * * * * * * * * * * * * * * * * * * * * * * * * * * * * * *
                        *                                                                   *
                        *   PTLB  (B20D)  PURGE TLB                                         *
                        *                                                                   *
                        * * * * * * * * * * * * * * * * * * * * * * * * * * * * * * * * * * *
                        *
       00000E50         PTLB    EQU     *
000E50 31C7601A                 MOVE.W  D7,INSTSAVE           SAVE INSTRUCTION HALFWORD
000E54 083800006031             BTST    PSW_PROB,PSW+1        TEST FOR PRIVILEGED OP EXCEPTION
000E5A 66001504                 BNE     PRIVEX                BR IF PROBLEM STATE
                        *
000E5E 4AB80104                 TST.L   CREG1
000E62 6604                     BNE.S   PTLB1                 IF CONTROL REG 1 IS 0, JUST
000E64 4EB81F62                 JSR     PURGE                   PURGE THE PAT
000E68 4EF80200         PTLB1   JMP     RETURN
                        *
                        * * * * * * * * * * * * * * * * * * * * * * * * * * * * * * * * * * *
                        *                                                                   *
                        *   RRB  (B213)  RESET REFERENCE BIT INSTRUCTION                    *
                        *                                                                   *
                        *                                                                   *
                        * * * * * * * * * * * * * * * * * * * * * * * * * * * * * * * * * * *
                        *
       00000E6C         RRB     EQU     *
000E6C 31C7601A                 MOVE.W  D7,INSTSAVE           SAVE INSTRUCTION HALFWORD
000E70 083800006031             BTST    PSW_PROB,PSW+1        TEST FOR PRIVILEGED OP EXCEPTION
000E76 660014E8                 BNE     PRIVEX                BR IF PROBLEM STATE
                        *
000E7A 24386016                 MOVE.L  OP2_EA,D2             GET STORAGE ADDRESS
000E7E 0C8200400000             CMPI.L  #VIRT_STR,D2
000E84 6A0014B4                 BPL     PAGE_FLT
000E88 0242F000                 ANDI.W  #$F000,D2             ENSURE LAST THREE DIGITS ARE 0
000E8C 08C20017                 BSET    #$17,D2               TURN ON BIT 23, PAT ACCESS
000E90 2442                     MOVEA.L D2,A2                 MOVE ADDRESS
000E92 7608                     MOVEQ   #$08,D3               SET PAT_MOD BIT = 1 TO ALLOW
000E94 86386106                 OR.B    SAVE_CNTL,D3              PAT ACCESS
000E98 11C35FE1                 MOVE.B  D3,SYS_CNTL
000E9C 1412                     MOVE.B  (A2),D2               GET PAT HIGH BYTE
000E9E 3612                     MOVE.W  (A2),D3               GET PAT ENTRY
000EA0 6B000BEC                 BMI     MC_0016               CHECK PAT PARITY
000EA4 0243FDFF                 ANDI.W  #$FDFF,D3             RESET THE REFERENCE BIT
000EA8 3483                     MOVE.W  D3,(A2)               PUT PAT ENTRY BACK
                        *
000EAA 08020002                 BTST    2,D2                  CHECK IF PAGE FAULT BIT IS ON
000EAE 6600150E                 BNE     SPECEX                SET SPECIFICATION EXCEPTION
000EB2 11F861065FE1             MOVE.B  SAVE_CNTL,SYS_CNTL    RESTORE TRANSLATE STATE
000EB8 72CF                     MOVEQ   #CC_RST,D1
000EBA C210                     AND.B   (A0),D1               CLEAR CONDITION CODE
000EBC E20A                     LSR.B   1,D2                  CHECK 'CHANGE' BIT
000EBE 6404                     BCC.S   RRB1
000EC0 00010010                 ORI.B   #CC1,D1               IF ON, SET CC BIT
000EC4 E20A             RRB1    LSR.B   1,D2                  CHECK 'REFERENCE' BIT
000EC6 6404                     BCC.S   RRB2                  CC3 GETS SET IF BOTH BITS ARE ON.
000EC8 00010020                 ORI.B   #CC2,D1               IF ON, SET CC BIT
000ECC 1081             RRB2    MOVE.B  D1,(A0)               PUT BACK INTO PSR
000ECE 4EF80200                 JMP     RETURN
                        * * * * * * * * * * * * * * * * * * * * * * * * * * * * * * * * * * *
                        *                                                                   *
                        *   SCK  (B204)  SET CLOCK INSTRUCTION                              *
                        *                                                                   *
                        *                                                                   *
                        * * * * * * * * * * * * * * * * * * * * * * * * * * * * * * * * * * *
                        *
       00000ED2         SCK     EQU     *
000ED2 31C7601A                 MOVE.W  D7,INSTSAVE           SAVE INSTRUCTION
000ED6 083800006031             BTST    PSW_PROB,PSW+1        TEST IF IN PROBLEM STATE
000EDC 66001482                 BNE     PRIVEX                BR IF YES, THIS IS PRIV OP
000EE0 7207                     MOVEQ   #$07,D1
000EE2 C2386019                 AND.B   OP2_EA+3,D1           TEST FOR DOUBLEWORD BOUNDARY
000EE6 660014D6                 BNE     SPECEX
```

```
                          *
                          *-----------------------------------------------------------------
                          *   CONTROL IS NOT PASSED TO THE PC FOR THIS INSTRUCTION, AND
                          *   IT IS ACTUALLY 'NOOPED';  CONDITION CODE 1 IS ALWAYS SET.
                          *-----------------------------------------------------------------
                          *
000EEA 021000CF                 ANDI.B  #CC_RST,(A0)      CLEAR CONDITION CODE
000EEE 00100010                 ORI.B   #CC1,(A0)         SET CONDITION CODE FOR CLOCK SECURED
                          *
000EF2 4EF80200                 JMP     RETURN            GO DO THE NEXT INSTRUCTION
                          *
                          * * * * * * * * * * * * * * * * * * * * * * * * * * * * * * * * * * *
                          *                                                                   *
                          *   SCKC  (B206)  SET CLOCK COMPARATOR INSTRUCTION                  *
                          *                                                                   *
                          *                                                                   *
                          * * * * * * * * * * * * * * * * * * * * * * * * * * * * * * * * * * *
                          *
       00000EF6           SCKC    EQU     *
000EF6 31C7601A                 MOVE.W  D7,INSTSAVE       SAVE INSTRUCTION
000EFA 083800006031             BTST    PSW_PROB,PSW+1    TEST IF IN PROBLEM STATE
000F00 6600145E                 BNE     PRIVEX            BR IF YES, THIS IS PRIV OP
000F04 7207                     MOVEQ   #$07,D1
000F06 C2386019                 AND.B   OP2_EA+3,D1       TEST FOR DOUBLEWORD BOUNDARY
000F0A 660014B2                 BNE     SPECEX
                          *
000F0E 28786016                 MOVEA.L OP2_EA,A4         GET THE ADDRESS OF THE DATA
000F12 D9FC80000000             ADDA.L  #MS_ACC,A4        SET THE 370 BIT ON
000F18 21DC606C                 MOVE.L  (A4)+,TIM_DATA
000F1C 21D46070                 MOVE.L  (A4),TIM_DAT2     PUT CLOCK DATA INTO TIMER PCIB
000F20 11FC00036061             MOVE.B  #03,TIMER_CB+1    'SET CLOCK COMPARATOR' COMMAND
000F26 4EB826D4                 JSR     TIMERS
                          *
000F2A 08B800076105 TIME_END BCLR   #7,IO_INT_PND+1   CHECK IF WE STACKED AN INTERRUPT
000F30 6712                     BEQ.S   TIME_EN1            WHILE WAITING FOR TIMER RESPONSE
000F32 363C0500                 MOVE.W  #$0500,D3         SET UP COUNTER
000F36 32385F90     TIME_EN2 MOVE.W  CC_INT_REG,D1
000F3A 08010009                 BTST    PC_INTR,D1        WAIT FOR INTERRUPT FROM PC
000F3E 6704                     BEQ.S   TIME_EN1
000F40 51CBFFF4                 DBRA    D3,TIME_EN2       IF NO INTR, WAIT UP TO 10 MILLISEC
                          *
000F44 11F860686102 TIME_EN1 MOVE.B  INTR_VEC,EXT_INT_PND  COPY INTERRUPT VECTOR FROM PCIB
000F4A 670C                     BEQ.S   SCKC_END          IF NO INTR PENDING, DONE
000F4C 083800006030             BTST    PSW_EXT,PSW       CHECK EXTERNAL INTERRUPT MASK BIT
000F52 6704                     BEQ.S   SCKC_END          IF OFF, DONE
000F54 4EB817DA                 JSR     EX_INT            SEE IF WE TAKE EXTERNAL INTERRUPT
000F58 4EF80200     SCKC_END JMP     RETURN            GO DO THE NEXT INSTRUCTION
                          *
                          * * * * * * * * * * * * * * * * * * * * * * * * * * * * * * * * * * *
                          *                                                                   *
                          *   SPKA  (B20A)  SET PSW KEY FROM ADDRESS INSTRUCTION              *
                          *                                                                   *
                          *                                                                   *
                          * * * * * * * * * * * * * * * * * * * * * * * * * * * * * * * * * * *
                          *
       00000F5C           SPKA    EQU     *
000F5C 31C7601A                 MOVE.W  D7,INSTSAVE       SAVE INSTRUCTION HALFWORD
000F60 083800006031             BTST    PSW_PROB,PSW+1    TEST FOR PRIVILEGED OP EXCEPTION
000F66 660013F8                 BNE     PRIVEX            BRANCH IF PROBLEM STATE
                          *
000F6A 72F0                     MOVEQ   #$F0,D1
000F6C C2386019                 AND.B   OP2_EA+3,D1       GET KEY BITS
000F70 0238000F6031             ANDI.B  #$0F,PSW+1        ZERO ALL KEY BITS IN CURRENT PSW
000F76 83386031                 OR.B    D1,PSW+1          SET NEW BITS
000F7A 4EF80200                 JMP     RETURN
                          *
                          * * * * * * * * * * * * * * * * * * * * * * * * * * * * * * * * * * *
                          *                                                                   *
                          *   SPM (04)  SET PROGRAM MASK INSTRUCTION                          *
                          *                                                                   *
                          *       TIMINGS:                                                    *
                          *                                                                   *
                          * * * * * * * * * * * * * * * * * * * * * * * * * * * * * * * * * * *
                          *
       00000F7E           SPM     EQU     *
000F7E 31C7601A                 MOVE.W  D7,INSTSAVE       SAVE INSTRUCTION
000F82 723F                     MOVEQ   #$3F,D1           GET COND CODE AND MASK BITS FROM OP 1
```

```
000F84 C2386006               AND.B    R1,D1
000F88 11C16047               MOVE.B   D1,PRGMMASK        SAVE IN A-ENGINE MASK ACCESS AREA
000F8C 31FC76005FA2           MOVE.W   #FP_SMSK,FP_CMD    SET MASK IN FP PROCESSOR
000F92 31F860465FA0           MOVE.W   FP_MASK,FP_DATA
000F98 74C0                   MOVEQ    #$C0,D2            PSR/PSW RESET MASK
000F9A C5386000               AND.B    D2,PSR             UPDATE PSR WITH NEW CC AND MASK
000F9E 83386000               OR.B     D1,PSR
000FA2 083800036031           BTST.B   PSW_EC,PSW+1       IS THIS EC MODE
000FA8 670C                   BEQ.S    SPM_BC             NO, BRANCH
                    *
000FAA C5386032               AND.B    D2,PSW+2           UPDATE EC PSW WITH NEW CC AND MASK
000FAE 83386032               OR.B     D1,PSW+2
000FB2 4EF80200               JMP      RETURN
                    *
000FB6 C5386034     SPM_BC    AND.B    D2,PSW+4           UPDATE BC PSW WITH NEW CC AND MASK
000FBA 83386034               OR.B     D1,PSW+4
000FBE 4EF80200               JMP      RETURN
                    *
                    * * * * * * * * * * * * * * * * * * * * * * * * * * * * * * * * * * *
                    *                                                                   *
                    *    SPT  (B208)  SET CPU TIMER INSTRUCTION                         *
                    *                                                                   *
                    *                                                                   *
                    * * * * * * * * * * * * * * * * * * * * * * * * * * * * * * * * * * *
                    *
       00000FC2     SPT       EQU      *
000FC2 31C7601A               MOVE.W   D7,INSTSAVE        SAVE INSTRUCTION
000FC6 083800006031           BTST     PSW_PROB,PSW+1     TEST IF IN PROBLEM STATE
000FCC 66001392               BNE      PRIVEX             BR IF YES, THIS IS PRIV OP
000FD0 7207                   MOVEQ    #$07,D1
000FD2 C2386019               AND.B    OP2_EA+3,D1        TEST FOR DOUBLEWORD BOUNDARY
000FD6 660013E6               BNE      SPECEX
                    *
000FDA 28786016               MOVEA.L  OP2_EA,A4          GET THE ADDRESS OF THE DATA
000FDE D9FC80000000           ADDA.L   #MS_ACC,A4         SET THE 370 BIT ON
000FE4 21DC606C               MOVE.L   (A4)+,TIM_DATA
000FE8 21046070               MOVE.L   (A4),TIM_DAT2      PUT CLOCK DATA INTO TIMER PCIB
000FEC 11FC00056061           MOVE.B   #05,TIMER_CB+1     'SET CPU TIMER' COMMAND
000FF2 4EB82604               JSR      TIMERS
                    *
000FF6 4EF80F2A               JMP      TIME_END           GO SEE IF THERE IS AN EXTERNAL
                    *                                       INTERRUPT PENDING
                    * * * * * * * * * * * * * * * * * * * * * * * * * * * * * * * * * * *
                    *                                                                   *
                    *    SSK (08)  SET STORAGE KEY INSTRUCTION                          *
                    *     0                 15                                          *
                    *     --------------------                                          *
                    *     *  '08'  * R1 * R2 *                                          *
                    *     --------------------                                          *
                    * * * * * * * * * * * * * * * * * * * * * * * * * * * * * * * * * * *
                    *
       00000FFA     SSK       EQU      *
000FFA 31C7601A               MOVE.W   D7,INSTSAVE        SAVE INSTRUCTION HALFWORD
000FFE 083800006031           BTST     PSW_PROB,PSW+1     TEST FOR PRIVILEGED OP EXCEPTION
001004 6600135A               BNE      PRIVEX             BR IF PROBLEM STATE
                    *
001008 2438600A               MOVE.L   R2,D2              GET STORAGE ADDRESS
00100C 780F                   MOVEQ    #$0F,D4            TEST R2 DATA FOR SPECIFICATION EXCP
00100E C802                   AND.B    D2,D4                BITS 28-31 NOT ZERO
001010 660013AC               BNE      SPECEX             BR IF NOT ZERO
                    *
001014 028200FFFFFF           ANDI.L   #$00FFFFFF,D2      SAVE BITS 8-31 FOR ADDRESS
00101A 0C8200400000           CMPI.L   #VIRT_STR,D2       CHECK UPPER LIMIT OF VIRTUAL STORAGE
001020 6A001318               BPL      PAGE_FLT
001024 7206                   MOVEQ    #$06,D1            TURN OFF ALL BIT REF AND CHANGE BITS
001026 C2386009               AND.B    R1+3,D1            GET KEY BYTE
00102A EF49                   LSL.W    7,D1               PUT INTO HIGHER BYTE
00102C 0242F000               ANDI.W   #$F000,D2          ENSURE LAST THREE DIGITS ARE 0
001030 08C20017               BSET     #$17,D2            TURN ON BIT 23, PAT ACCESS
001034 2442                   MOVE.L   D2,A2              MOVE ADDRESS
001036 7608                   MOVEQ    #$08,D3            SET PAT_MOD BIT = 1 TO ALLOW
001038 86386106               OR.B     SAVE_CNTL,D3           PAT ACCESS
00103C 11C35FE1               MOVE.B   D3,SYS_CNTL
001040 3412                   MOVE.W   (A2),D2            GET PAT HALFWORD
001042 6B000A4A               BMI      MC_0016
                    *
001046 0802000A               BTST     10,D2              IS THIS PAGE VALID?
00104A 66001372               BNE      SPECEX             IF NOT, SPEC CHECK
```

```
00104E 0242FCFF             ANDI.W  #$FCFF,D2          TURN OFF REFERENCE AND CHANGE BITS
001052 8441                 OR.W    D1,D2
001054 3482                 MOVE.W  D2,(A2)            WRITE KEY BYTE
001056 11F861065FE1         MOVE.B  SAVE_CNTL,SYS_CNTL  RESTORE SYS CONTROL REGISTER
                   *
00105C 4EF80200             JMP     RETURN
                   *
                   * * * * * * * * * * * * * * * * * * * * * * * * * * * * * * * * * * *
                   *                                                                   *
                   *    SSM (80)  SET SYSTEM MASK INSTRUCTION                           *
                   *                                                                   *
                   * * * * * * * * * * * * * * * * * * * * * * * * * * * * * * * * * * *
                   *
       00001060    SSM      EQU     *
001060 31C7601A             MOVE.W  D7,INSTSAVE        SAVE INSTRUCTION HALFWORD
001064 083800006031         BTST    PSW_PROB,PSW+1     TEST IF IN PROBLEM STATE; MUST BE
00106A 660012F4             BNE     PRIVEX               IN SUPERVISOR STATE TO EXECUTE
00106E 083800060100         BTST    SSMSUPR,CREG0      IS SET SYS MASK SUPPRESS BIT ON?
001074 660013A0             BNE     SPOPEXCP           YES, PROGRAM CHECK
                   *
001078 28786016             MOVEA.L OP2_EA,A4
00107C D9FC80000000         ADDA.L  #MS_ACC,A4
001082 11D46030             MOVE.B  (A4),PSW           GET BYTE FROM MAIN STORE
                   *
       00001086    TESTMASK EQU  *
001086 08F800026106         BSET    BYP_PAT,SAVE_CNTL TURN OFF TRANS FLAG IN SHADOW BYTE
00108C 083800036031         BTST    PSW_EC,PSW+1       EC OR BC MODE?
001092 6734                 BEQ.S   SSM_BC             BR IF BC MODE
                   *
001094 72B8                 MOVEQ   #$B8,D1            GET MASK FOR PSW BYTE 1
001096 C2386030             AND.B   PSW,D1             ALL BITS SHOULD BE ZERO
00109A 6704                 BEQ.S   SSM_EC
00109C 4EF823B6             JMP     SPECEX2            SPECIFICATION EXCEPTION
                   *
0010A0 11F860306131 SSM_EC  MOVE.B  PSW,PER_XLAT       PER - SAVE TRANSLATE BIT FOR PER
0010A6 083800026030         BTST    PSW_XLAT,PSW       TEST FOR TRANSLATE BIT IN NEW PSW
0010AC 6706                 BEQ.S   SSM_NX             BR IF OFF
0010AE 08B800026106         BCLR    BYP_PAT,SAVE_CNTL TURN ON TRANS FLAG IN SHADOW BYTE
0010B4 427860E2    SSM_NX   CLR.W   IOMASK             CLEAR I/O MASK REGISTER
0010B8 083800016030         BTST    PSW_IO,PSW         I/O INTERRUPTS MASKED OFF
0010BE 670E                 BEQ.S   SSM_END            BR IF YES, FINISH PSW LOAD
0010C0 31F8010860E2         MOVE.W  CREG2,IOMASK       SET IOMASK FROM CTRL REG
0010C6 6006                 BRA.S   SSM_END            FINISH MASK LOAD
                   *
0010C8 11F8603060E2 SSM_BC  MOVE.B  PSW,IOMASK         SET IOMASK FROM THE PSW
0010CE 11F861065FE1 SSM_END MOVE.B  SAVE_CNTL,SYS_CNTL  SET TRANS IN THE SYS CONTROL REG
0010D4 4EF81E96             JMP     IENDTSTP           GO TO TEST FOR PER AND INTERRUPTS
                   *
                   * * * * * * * * * * * * * * * * * * * * * * * * * * * * * * * * * * *
                   *                                                                   *
                   *    STCK  (B205)  STORE CLOCK INSTRUCTION                           *
                   *                  CC0 - CLOCK IN SET STATE                          *
                   *                  CC1 - NOT SET                                     *
                   *                  CC2 - ERROR STATE                                 *
                   *                  CC3 - NOT OPERATIONAL                             *
                   *                                                                   *
                   * * * * * * * * * * * * * * * * * * * * * * * * * * * * * * * * * * *
                   *
       000010D8    STCK     EQU     *
0010D8 31C7601A             MOVE.W  D7,INSTSAVE        SAVE INSTRUCTION
0010DC 28786016             MOVEA.L OP2_EA,A4          GET OPERAND ADDRESS
0010E0 D9FC80000000         ADDA.L  #MS_ACC,A4
0010E6 4A14                 TST.B   (A4)               PRETEST FIRST AND
0010E8 4A2C0007             TST.B   7(A4)                LAST BYTE
0010EC 11FC00026061         MOVE.B  #02,TIMER_CB+1     'STORE CLOCK' COMMAND
0010F2 4EB826D4             JSR     TIMERS
                   *
0010F6 7207                 MOVEQ   #7,D1
0010F8 43F8606C             LEA     TIM_DATA,A1
0010FC 18D9        STCK1    MOVE.B  (A1)+,(A4)+        GET CLOCK DATA FROM TIMER PCIB
0010FE 51C9FFFC             DBRA    D1,STCK1
001102 1010                 MOVE.B  (A0),D0
001104 020000CF             ANDI.B  #CC_RST,D0         CLEAR CONDITION CODE
001108 80386054             OR.B    PCIB_OUT,D0        SET CONDITION CODE
00110C 1080                 MOVE.B  D0,(A0)
00110E 4EF80F2A             JMP     TIME_END           GO SEE IF THERE IS AN EXTERNAL
                   *                                     INTERRUPT PENDING
```

```
                    * * * * * * * * * * * * * * * * * * * * * * * * * * * * * * * * * * *
                    *                                                                   *
                    *    STCKC  (B207)  STORE CLOCK COMPARATOR INSTRUCTION              *
                    *                                                                   *
                    *                                                                   *
                    * * * * * * * * * * * * * * * * * * * * * * * * * * * * * * * * * * *
                    *
       00001112     STCKC    EQU     *
001112 31C7601A              MOVE.W  D7,INSTSAVE        SAVE INSTRUCTION
001116 083800006031          BTST    PSW_PROB,PSW+1     TEST IF IN PROBLEM STATE
00111C 66001242              BNE     PRIVEX             BR IF YES, THIS IS PRIV OP
001120 7207                  MOVEQ   #$07,D1
001122 C2386019              AND.B   OP2_EA+3,D1        TEST FOR DOUBLEWORD BOUNDARY
001126 66001296              BNE     SPECEX
                    *
00112A 28786016              MOVEA.L OP2_EA,A4          GET THE ADDRESS OF THE DATA
00112E D9FC80000000          ADDA.L  #MS_ACC,A4         SET THE 370 BIT ON
001134 4A14                  TST.B   (A4)               PRETEST FIRST AND
001136 4A2C0007              TST.B   7(A4)                LAST BYTE
00113A 11FC00046061          MOVE.B  #04,TIMER_CB+1     'STORE CLOCK COMPARATOR' COMMAND
001140 4EB826D4              JSR     TIMERS
                    *
001144 28F8606C              MOVE.L  TIM_DATA,(A4)+
001148 28B86070              MOVE.L  TIM_DAT2,(A4)      GET CLOCK DATA FROM TIMER PCIB
00114C 4EF80F2A              JMP     TIME_END           GO SEE IF THERE IS AN EXTERNAL
                    *                                     INTERRUPT PENDING
                    * * * * * * * * * * * * * * * * * * * * * * * * * * * * * * * * * * *
                    *                                                                   *
                    *    STCM  (BE)  STORE CHARACTERS UNDER MASK INSTRUCTION            *
                    *                                                                   *
                    *                                                                   *
                    * * * * * * * * * * * * * * * * * * * * * * * * * * * * * * * * * * *
                    *
       00001150     STCM     EQU     *
001150 31C7601A              MOVE.W  D7,INSTSAVE        SAVE INSTRUCTION
001154 0247000F              ANDI.W  #$000F,D7          GET MASK ONLY
001158 673E                  BEQ.S   STCM00             BRANCH IF MASK IS ZERO, RETURN
00115A E34F                  LSL.W   1,D7                 MAKE IT A BR TABLE DISPLACEMENT
                    *
00115C 45F86012              LEA     R1X,A2             GET OPERAND 1 ADDRESS
001160 28786016              MOVEA.L OP2_EA,A4          GET OPERAND 2 MS ADDRESS
001164 D9FC80000000          ADDA.L  #MS_ACC,A4
                    *
00116A 4EFB7002              JMP     STCTABLE(D7)       GO TO APPROPRIATE MASK ROUTINE
                    *
       0000116E              RORG    *
       0000116E     STCTABLE EQU     *                  BRANCH TABLE BASE ADDRESS
       0000116E              ORG     *
00116E 6028                  BRA.S   STCM00             STC MASK 0
001170 6054                  BRA.S   STCM01             STC MASK 1
001172 605C                  BRA.S   STCM02             STC MASK 2
001174 6026                  BRA.S   STCM03             STC MASK 3
001176 6034                  BRA.S   STCM04             STC MASK 4
001178 602A                  BRA.S   STCM05             STC MASK 5
00117A 6034                  BRA.S   STCM06             STC MASK 6
00117C 603A                  BRA.S   STCM07             STC MASK 7
00117E 6016                  BRA.S   STC1               STC MASK 8
001180 603E                  BRA.S   STCM09             STC MASK 9
001182 6046                  BRA.S   STCM0A             STC MASK A
001184 604E                  BRA.S   STCM0B             STC MASK B
001186 6056                  BRA.S   STCM0C             STC MASK C
001188 605A                  BRA.S   STCM0D             STC MASK D
00118A 6064                  BRA.S   STCM0E             STC MASK E
                    *
00118C B02C0003     STCM0F   CMP.B   3(A4),D0           PRETEST
001190 18DA                  MOVE.B  (A2)+,(A4)+        STORE 4 BYTE ENTRY
001192 18DA         STC3     MOVE.B  (A2)+,(A4)+        STORE 3 BYTE ENTRY
001194 18DA         STC2     MOVE.B  (A2)+,(A4)+        STORE 2 BYTE ENTRY
001196 1892         STC1     MOVE.B  (A2),(A4)          STORE 1 BYTE ENTRY
001198 4EF80200     STCM00   JMP     RETURN
                    *
                    *
00119C B02C0001     STCM03   CMP.B   1(A4),D0           PRETEST
0011A0 544A                  ADDQ.W  #2,A2              ADJUST OPERAND 1 ADDRESS
0011A2 60F0                  BRA.S   STC2               GO TO STORE 2 BYTES
                    *
                    *
```

```
0011A4 B02C0001     STCM05   CMP.B    1(A4),D0          PRETEST
0011A8 524A                  ADDQ.W   #1,A2             ADJUST OPERAND 1 ADDRESS
0011AA 18DA                  MOVE.B   (A2)+,(A4)+       STORE 1 BYTE
0011AC 524A         STCM04   ADDQ.W   #1,A2             ADJUST OPERAND 1 ADDRESS
0011AE 60E6                  BRA.S    STC1              GO TO STORE 1 BYTE
                    *
                    *
0011B0 B02C0001     STCM06   CMP.B    1(A4),D0          PRETEST
0011B4 524A                  ADDQ.W   #1,A2             ADJUST OPERAND 1 ADDRESS
0011B6 60DC                  BRA.S    STC2              GO TO STORE 2 BYTES
                    *
                    *
0011B8 B02C0002     STCM07   CMP.B    2(A4),D0          PRETEST
0011BC 524A                  ADDQ.W   #1,A2             ADJUST OPERAND 1 ADDRESS
0011BE 60D2                  BRA.S    STC3              GO TO STORE 3 BYTES
                    *
                    *
0011C0 B02C0001     STCM09   CMP.B    1(A4),D0          PRETEST
0011C4 18D2                  MOVE.B   (A2),(A4)+        STORE 1 BYTE
0011C6 564A         STCM01   ADDQ.W   #3,A2             ADJUST OPERAND 1 ADDRESS
0011C8 60CC                  BRA.S    STC1              GO TO STORE 1 BYTE
                    *
                    *
0011CA B02C0001     STCM0A   CMP.B    1(A4),D0          PRETEST
0011CE 18D2                  MOVE.B   (A2),(A4)+        STORE 1 BYTE
0011D0 544A         STCM02   ADDQ.W   #2,A2             ADJUST OPERAND 1 ADDRESS
0011D2 60C2                  BRA.S    STC1              GO TO STORE 1 BYTE
                    *
                    *
0011D4 B02C0002     STCM0B   CMP.B    2(A4),D0          PRETEST
0011D8 18D2                  MOVE.B   (A2),(A4)+        STORE 1 BYTE
0011DA 544A                  ADDQ.W   #2,A2             ADJUST OPERAND 1 ADDRESS
0011DC 60B6                  BRA.S    STC2              GO TO STORE 2 BYTES
                    *
                    *
0011DE B02C0001     STCM0C   CMP.B    1(A4),D0          PRETEST
0011E2 60B0                  BRA.S    STC2              GO TO STORE 2 BYTES
                    *
                    *
0011E4 B02C0002     STCM0D   CMP.B    2(A4),D0          PRETEST
0011E8 18DA                  MOVE.B   (A2)+,(A4)+       STORE 2 BYTES
0011EA 18DA                  MOVE.B   (A2)+,(A4)+
0011EC 524A                  ADDQ.W   #1,A2             ADJUST OPERAND 1 ADDRESS
0011EE 60A6                  BRA.S    STC1              GO TO STORE 1 BYTE
                    *
                    *
0011F0 B02C0002     STCM0E   CMP.B    2(A4),D0          PRETEST
0011F4 609C                  BRA.S    STC3              GO TO STORE 3 BYTES
                    * * * * * * * * * * * * * * * * * * * * * * * * * * * * * * * * * * *
                    *                                                                   *
                    *    STCTL  (B6)   STORE CONTROL INSTRUCTION                        *
                    *                                                                   *
                    * * * * * * * * * * * * * * * * * * * * * * * * * * * * * * * * * * *
                    *
      000011F6      STCTL    EQU      *
0011F6 31C7601A              MOVE.W   D7,INSTSAVE       SAVE INSTRUCTION HALFWORD
0011FA 083800006031          BTST     PSW_PROB,PSW+1    ARE WE IN SUPERVISOR STATE?
001200 6600115E              BNE      PRIVEX            PRIVILEGED EXCEPTION IF NOT
001204 7203                  MOVEQ    #03,D1            TEST FOR ALIGNMENT OF OPERAND ON
001206 C2386019              AND.B    OP2_EA+3,D1       FULLWORD BOUNDARY;  SPECIFICATION
00120A 660011B2              BNE      SPECEX              EXCEPTION IF NOT.
                    *
00120E 4241                  CLR.W    D1
001210 43F80100              LEA      CREG0,A1          POINT TO CONTROL REGISTER 0
001214 1207                  MOVE.B   D7,D1             GET R1 AND R3 FROM INSTRUCTION
001216 3401                  MOVE.W   D1,D2
001218 020100F0              ANDI.B   #$F0,D1           D1 HAS REGISTER 1
00121C E409                  LSR.B    2,D1
00121E 0202000F              ANDI.B   #$0F,D2           D2 HAS REGISTER 3
001222 E50A                  LSL.B    2,D2
001224 28786016              MOVEA.L  OP2_EA,A4
001228 D9FC80000000          ADDA.L   #MS_ACC,A4        TURN ON BIT 31
                    *
00122E B441                  CMP.W    D1,D2             COMPARE THE REGISTERS; IF D2 IS LESS
001230 6B1C                  BMI.S    STCTL1            THAN D1, WE MUST WRAP FROM 15 TO 0
001232 3802                  MOVE.W   D2,D4             CALCULATE NUMBER OF BYTES FOR
001234 9841                  SUB.W    D1,D4               PREFETCHING FROM MAIN STORAGE
```

```
001236 10344003       STCTL3   MOVE.B  3(A4,D4),D0        GET LAST BYTE FROM OP 2 ADDRESS
                      *                                     IF NO ERRORS, GO AHEAD
00123A 28F11000       STCLOOP  MOVE.L  0(A1,D1),(A4)+     STORE ONE CONTROL REGISTER
00123E 5841                    ADDQ.W  #4,D1              UPDATE D1 BY 4 (LENGTH IN BYTES)
001240 B441                    CMP.W   D1,D2              HAVE WE REACHED REQUESTED NUMBER?
001242 6AF6                    BPL.S   STCLOOP            IF NOT, CONTINUE LOOPING
001244 08010010                BTST    SW1,D1             TEST IF WE MUST WRAP FROM REG15 TO 0
001248 6616                    BNE.S   STCTL2             BRANCH IF BIT IS ON
00124A 4EF80200                JMP     RETURN             INSTRUCTION IS COMPLETE
                      *
00124E 7840           STCTL1   MOVEQ   #$40,D4
001250 9841                    SUB.W   D1,D4              CALCULATE NUMBER OF BYTES TO BE
001252 D842                    ADD.W   D2,D4              TRANSFERRED FOR PRE-FETCH OF STORAGE
001254 4842                    SWAP    D2                 SAVE ENDING REGISTER
001256 343C003C                MOVE.W  #$003C,D2          MAKE REGISTER 15 LAST REGISTER
00125A 08C10010                BSET    SW1,D1             SET WRAP SWITCH
00125E 60D6                    BRA.S   STCTL3             GO PREFETCH AND LOOP UNTIL REG 15
                      *
001260 4842           STCTL2   SWAP    D2                 RESTORE ENDING REGISTER
001262 7200                    MOVEQ   #0,D1              START AGAIN AT REG 0  ***** THIS
                      *                                     ALSO RESETS SW1!!!  ***
001264 60D4                    BRA.S   STCLOOP            CONTINUE IN LOOP UNTIL DONE
                      *
                      * * * * * * * * * * * * * * * * * * * * * * * * * * * * * * * * * * *
                      *                                                                   *
                      *    STIDP  (B202)  STORE CPU ID INSTRUCTION                        *
                      *                                                                   *
                      *                                                                   *
                      * * * * * * * * * * * * * * * * * * * * * * * * * * * * * * * * * * *
                      *
       00001266       STIDP    EQU     *
001266 31C7601A                MOVE.W  D7,INSTSAVE        SAVE INSTRUCTION HALFWORD
00126A 083800006031            BTST    PSW_PROB,PSW+1     ARE WE IN SUPERVISOR STATE?
001270 660010EE                BNE     PRIVEX             NO, PRIVILEGED EXCEPTION
001274 7207                    MOVEQ   #07,D1             TEST FOR ALIGNMENT OF OPERAND ON
001276 C2386019                AND.B   OP2_EA+3,D1        DOUBLEWORD BOUNDARY;  SPECIFICATION
00127A 66001142                BNE     SPECEX               EXCEPTION IF NOT.
                      *
00127E 28786016                MOVEA.L OP2_EA,A4          GET OPERAND1 ADDRESS
001282 D9FC80000000            ADDA.L  #MS_ACC,A4
001288 4A2C0007                TST.B   7(A4)              PRETEST
00128C 7800                    MOVEQ   #$00,D4            SET UP SERIAL NUMBER OF '000000'
00128E 2884                    MOVE.L  D4,(A4)            STORE IT
001290 18B86049                MOVE.B  CONFIG+1,(A4)      STORE VERSION NUMBER
001294 588C                    ADDQ.L  #4,A4
001296 28BC51600000            MOVE.L  #$51600000,(A4)    MODEL NUMBER
00129C 4EF80200                JMP     RETURN
                      *
                      * * * * * * * * * * * * * * * * * * * * * * * * * * * * * * * * * * *
                      *                                                                   *
                      *    STNSM  (AC)  STORE THEN AND SYSTEM MASK INSTRUCTION            *
                      *                                                                   *
                      * * * * * * * * * * * * * * * * * * * * * * * * * * * * * * * * * * *
                      *
       000012A0       STNSM    EQU     *
0012A0 31C7601A                MOVE.W  D7,INSTSAVE        SAVE INSTRUCTION HALFWORD
0012A4 083800006031            BTST    PSW_PROB,PSW+1     ARE WE IN SUPERVISOR STATE?
0012AA 660010B4                BNE     PRIVEX             NO, PRIVILEGED EXCEPTION
                      *
0012AE 28786016                MOVEA.L OP2_EA,A4          GET OPERAND1 ADDRESS
0012B2 D9FC80000000            ADDA.L  #MS_ACC,A4
0012B8 18B86030                MOVE.B  PSW,(A4)           STORE FIRST BYTE OF PSW AT OPERAND1
0012BC CF386030                AND.B   D7,PSW             AND IMMEDIATE BYTE INTO THE PSW
0012C0 4EF81086                JMP     TESTMASK           GO CHECK IF PSW IS VALID
                      *                                   GO TO RETURN WHEN OP IS COMPLETE
                      *
                      *
                      *
                      *
                      *
                      *
                      * * * * * * * * * * * * * * * * * * * * * * * * * * * * * * * * * * *
                      *                                                                   *
                      *    STOSM  (AD)  STORE THEN AND SYSTEM MASK INSTRUCTION            *
                      *                                                                   *
                      * * * * * * * * * * * * * * * * * * * * * * * * * * * * * * * * * * *
                      *
```

```
      000012C4    STOSM    EQU      *
0012C4 31C7601A            MOVE.W   D7,INSTSAVE        SAVE INSTRUCTION HALFWORD
0012C8 083800006031        BTST     PSW_PROB,PSW+1     ARE WE IN SUPERVISOR STATE?
0012CE 66001090            BNE      PRIVEX             NO, PRIVILEGED EXCEPTION
                  *
0012D2 28786016            MOVE.L   OP2_EA,A4          GET OPERAND1 ADDRESS
0012D6 D9FC80000000        ADDA.L   #MS_ACC,A4
0012DC 18B86030            MOVE.B   PSW,(A4)           STORE FIRST BYTE OF PSW AT OPERAND1
0012E0 8F386030            OR.B     D7,PSW             OR IT INTO THE PSW
0012E4 4EF81086            JMP      TESTMASK           GO CHECK IF PSW IS VALID
                  *                                    GO TO RETURN WHEN OP IS COMPLETE
                  *
                  * * * * * * * * * * * * * * * * * * * * * * * * * * * * * * * * * * * *
                  *                                                                     *
                  *    STPT  (B209)  STORE CPU TIMER INSTRUCTION                        *
                  *                                                                     *
                  *                                                                     *
                  * * * * * * * * * * * * * * * * * * * * * * * * * * * * * * * * * * * *
                  *
      000012E8    STPT     EQU      *
0012E8 31C7601A            MOVE.W   D7,INSTSAVE        SAVE INSTRUCTION
0012EC 083800006031        BTST     PSW_PROB,PSW+1     TEST IF IN PROBLEM STATE
0012F2 6600106C            BNE      PRIVEX             BR IF YES, THIS IS PRIV OP
0012F6 7207                MOVEQ    #$07,D1
0012F8 C2386019            AND.B    OP2_EA+3,D1        TEST FOR DOUBLE WORD BOUNDARY
0012FC 660010C0            BNE      SPECEX
                  *
001300 28786016            MOVEA.L  OP2_EA,A4          GET OPERAND ADDRESS
001304 D9FC80000000        ADDA.L   #MS_ACC,A4         SET 370 BIT
00130A 4A14                TST.B    (A4)               PRETEST FIRST AND
00130C 4A2C0007            TST.B    7(A4)                LAST BYTE
001310 11FC00066061        MOVE.B   #06,TIMER_CB+1     'STORE CPU TIMER' COMMAND
001316 4EB826D4            JSR      TIMERS
                  *
00131A 28F8606C            MOVE.L   TIM_DATA,(A4)+
00131E 28B86070            MOVE.L   TIM_DAT2,(A4)      GET CLOCK DATA FROM TIMER PCIB
001322 4EF80F2A            JMP      TIME_END           GO SEE IF THERE IS AN EXTERNAL
                  *                                      INTERRUPT PENDING
                  * * * * * * * * * * * * * * * * * * * * * * * * * * * * * * * * * * * *
                  *                                                                     *
                  *    SVC (0A)  SUPERVISOR CALL INSTRUCTION                            *
                  *                                                                     *
                  *         EXIT:  PSW STORED AS SVC OLD, SVC NEW IS NOW CURRENT.       *
                  *                                                                     *
                  * * * * * * * * * * * * * * * * * * * * * * * * * * * * * * * * * * * *
                  *
      00001326    SVC      EQU      *
001326 31C7601A            MOVE.W   D7,INSTSAVE        SAVE INSTRUCTION HALFWORD
00132A 4A3860E8            TST.B    EXECFLAG           EXECUTE IN PROGRESS?
00132E 6710                BEQ.S    SVCOK
001330 21F860EC6002        MOVE.L   SAV_PCEX,PC        RESTORE PROGRAM COUNTER
001336 30B860FC            MOVE.W   SAV_PSREX,(A0)
00133A 423860E8            CLR.B    EXECFLAG
00133E 584F                ADDQ.W   #4,A7              ADJUST STACK POINTER PAST EX RETURN
001340 024700FF   SVCOK    ANDI.W   #$00FF,D7          GET INTERRUPTION CODE FROM INSTR
001344 7204                MOVEQ    #$04,D1            SET BY-PASS PAT BIT FOR NO TRANSLATE
001346 82386106            OR.B     SAVE_CNTL,D1              TO ACCESS LOW STORE
00134A 11C15FE1            MOVE.B   D1,SYS_CNTL
00134E 247C80000020        MOVE.L   #ASUPVOLD,A2       GET MAIN STORAGE ADDRESS FOR OLD PSW
001354 287C80000060        MOVE.L   #ASUPVNEW,A4       GET MAIN STORAGE ADDRESS FOR NEW PSW
00135A 083800036031        BTST     PSW_EC,PSW+1
001360 6618                BNE.S    SVCEC
                  *
001362 21F860026034 SVCBC  MOVE.L   PC,PSW+4           GET PROGRAM COUNTER
001368 11D06034            MOVE.B   (A0),PSW+4         MOVE ILC, CC, AND PROGRAM MASK
00136C 24F86030            MOVE.L   PSW,(A2)+          STORE CURRENT PSW AS OLD
001370 24B86034            MOVE.L   PSW+4,(A2)
001374 3547FFFE            MOVE.W   D7,-2(A2)          STORE INT CODE INTO OLD PSW
001378 602A                BRA.S    SVC1               GET NEW PSW, CONTINUE
                  *
00137A 11F860036035 SVCEC  MOVE.B   PC+1,PSW+5         MOVE PROGRAM COUNTER
001380 31F860046036        MOVE.W   PC+2,PSW+6
001386 723F                MOVEQ    #$3F,D1
001388 C210                AND.B    (A0),D1            MOVE CC AND PROGRAM MASK
00138A 11C16032            MOVE.B   D1,PSW+2
                  *
00138E 24F86030            MOVE.L   PSW,(A2)+          STORE CURRENT PSW AS OLD
001392 24B86034            MOVE.L   PSW+4,(A2)
```

```
001396 3947002A                MOVE.W  D7,SVCINT-SVCNEW(A4)  INTERRUPT CODE
00139A 72C0                    MOVEQ   #$C0,D1
00139C C210                    AND.B   (A0),D1              GET ILC FROM PSR
00139E E719                    ROL.B   3,D1
0013A0 19410029                MOVE.B  D1,SVCILC-SVCNEW(A4)  ILC
                       *
0013A4 4EF81F24        SVC1    JMP     IENDSVC              GO TO LOAD PSW AND END
                       * * * * * * * * * * * * * * * * * * * * * * * * * * * * * * * * * * *
                       *                                                                   *
                       *    TS  (93)  TEST AND SET INSTRUCTION                             *
                       *                                                                   *
                       * * * * * * * * * * * * * * * * * * * * * * * * * * * * * * * * * * *
                       *
       000013A8        TS      EQU     *
0013A8 31C7601A                MOVE.W  D7,INSTSAVE          SAVE INSTRUCTION
0013AC 28786016                MOVEA.L OP2_EA,A4            GET OPERAND 2 MS ADDRESS
0013B0 D9FC80000000            ADDA.L  #MS_ACC,A4
0013B6 7E00                    MOVEQ   #CC0,D7              SET CONDITION CODE 0
0013B8 4A14                    TST.B   (A4)                 TEST HI-ORDER BIT OF OPERAND 2
0013BA 50D4                    ST      (A4)                 TURN ALL BITS ON
0013BC 6A02                    BPL.S   TS1                  BR IF HI-ORDER BIT WAS OFF, CC0
0013BE 7E10                    MOVEQ   #CC1,D7              SET CONDITION CODE 1
0013C0 021000CF        TS1     ANDI.B  #CC_RST,(A0)         CLEAR COND CODE IN PSR
0013C4 8F10                    OR.B    D7,(A0)              SET NEW COND CODE IN PSR
0013C6 4EF80200                JMP     RETURN
                       * * * * * * * * * * * * * * * * * * * * * * * * * * * * * * * * * * *
                       *                                                                   *
                       *    TR  (DC)  TRANSLATE INSTRUCTION                                *
                       *                                                                   *
                       * * * * * * * * * * * * * * * * * * * * * * * * * * * * * * * * * * *
                       *
       000013CA        TR      EQU     *
0013CA 31C7601A                MOVE.W  D7,INSTSAVE          SAVE INSTRUCTION
0013CE 247C80000000            MOVEA.L #MS_ACC,A2           SET UP FOR MAIN STORAGE ACCESS
0013D4 284A                    MOVEA.L A2,A4
0013D6 D9F86012                ADDA.L  SSOP1_EA,A4          GET OPERAND 1 MS ADDRESS
0013DA D5F8600E                ADDA.L  SSOP2_EA,A2          GET OPERAND 2 MS ADDRESS
0013DE 7600                    MOVEQ   #$0,D3
0013E0 1607                    MOVE.B  D7,D3                GET LENGTH FROM INSTRUCTION
0013E2 3803                    MOVE.W  D3,D4                SAVE LENGTH
                       *
                       * * * * * * * * * * * * * * * * * * * * * * * * * * * * * * * * * * *
                       *
0013E4 12343000                MOVE.B  0(A4,D3),D1          PRETEST END OF OP1
0013E8 50F860E7                ST      PRETEST              SET PRETEST SWITCH TO 'FF'
0013EC 1212                    MOVE.B  (A2),D1              PRETEST 1ST AND LAST BYTES OF OPER 2
0013EE 4A3860E7                TST.B   PRETEST
0013F2 6A12                    BPL.S   TRTEST
                       *
0013F4 43EA00FF                LEA     255(A2),A1
0013F8 50F860E7                ST      PRETEST
0013FC 1211                    MOVE.B  (A1),D1
                       *
                       *
                       ******  IGNORE THIS ACCESS EXCEPTION IF IT EXISTS;  A TEST RUN THROUGH
                       ******  THE DATA ACTUALLY USED NEEDS TO BE MADE TO CHECK IF THE ACCESS
                       ******  EXCEPTION IS REALLY A CORRECT INDICATION.
                       *
                       * * * * * * * * * * * * * * * * * * * * * * * * * * * * * * * * * * *
                       *
0013FE 7200                    MOVEQ   #$0,D1
001400 4A3860E7                TST.B   PRETEST              TEST IF NO ACCESS EXCEPTIONS
001404 6B0C                    BMI.S   TR1                  GO DO INSTRUCTION IF OK
                       *
001406 224C            TRTEST  MOVEA.L A4,A1                GO THROUGH THE MOTIONS TO SEE IF ALL
                       *                                      THE BYTES WE NEED ARE IN STORAGE
001408 1219            TRLOOP1 MOVE.B  (A1)+,D1             GET BYTE FROM OPERAND 1
00140A 12321000                MOVE.B  0(A2,D1),D1          SEE IF 'TRANSLATABLE'; IF NO ACCESS
00140E 51CCFFF8                DBRA    D4,TRLOOP1           EXCEPTION, SEARCH THROUGH OP1
                       *
001412 51F860E7        TR1     SF      PRETEST              SET PRETEST TO '00'
001416 1214            TRLOOP2 MOVE.B  (A4),D1              DO INSTRUCTION HERE - GET
001418 18F21000                MOVE.B  0(A2,D1),(A4)+       BYTE; STORE IN OPERAND 1.LOCATION
00141C 51CBFFF8                DBRA    D3,TRLOOP2           CONTINUE TILL BYTE COUNT RUNS OUT
                       *
001420 4EF80200                JMP     RETURN               DONE; CONDITION CODE UNCHANGED
                       *
```

```
            * * * * * * * * * * * * * * * * * * * * * * * * * * * * * * * * * * *
            *                                                                   *
            *    TRT  (DD)  TRANSLATE AND TEST INSTRUCTION                      *
            *                                                                   *
            *                                                                   *
            * * * * * * * * * * * * * * * * * * * * * * * * * * * * * * * * * * *
            *
       00001424  TRT      EQU      *
001424 31C7601A           MOVE.W   D7,INSTSAVE        SAVE INSTRUCTION
001428 247C80000000       MOVEA.L  #MS_ACC,A2         SET UP FOR MAIN STORAGE ACCESS
00142E 284A               MOVEA.L  A2,A4
001430 D9F86012           ADDA.L   SSOP1_EA,A4        GET OPERAND 1 MS ADDRESS
001434 D5F8600E           ADDA.L   SSOP2_EA,A2        GET OPERAND 2 MS ADDRESS
001438 7600               MOVEQ    #$0,D3
00143A 1607               MOVE.B   D7,D3              LOAD LENGTH FROM INSTRUCTION
            *
00143C 7A00               MOVEQ    #$0,D5
00143E 1A1C      TRTLOOP  MOVE.B   (A4)+,D5           GET BYTE FROM FIRST OPERAND
001440 1A325000           MOVE.B   0(A2,D5),D5        USE AS DISPLACEMENT INTO TABLE
001444 56CBFFF8           DBNE     D3,TRTLOOP         CONTINUE IN LOOP IF CHARACTER NOT 0
            *                                           OR BYTE COUNT NOT EXHAUSTED
            *
001448 6604               BNE.S    TRT1               BRANCH IF LAST BYTE NOT ZERO
00144A 7E00               MOVEQ    #CC0,D7            SET COND CODE 0
00144C 601C               BRA.S    TRT_RTN
            *
00144E 12386006  TRT1     MOVE.B   GPR1,D1            SAVE HIGH-ORDER BYTE OF R1
001452 538C               SUBQ.L   #1,A4              BACK UP ADDRESS
001454 21CC6006           MOVE.L   A4,GPR1            STORE UPDATED ARGUMENT ADDRESS
001458 11C16006           MOVE.B   D1,GPR1            RESTORE HIGH-ORDER BYTE
00145C 11C5600D           MOVE.B   D5,GPR2+3          PUT FUNCTION BYTE INTO R2
            *
001460 4A43               TST.W    D3                 WAS THE NON-ZERO BYTE THE LAST BYTE?
001462 6704               BEQ.S    TRT2               BRANCH IF YES
001464 7E10               MOVEQ    #CC1,D7            SET CC1; NON-ZERO BYTE FOUND
001466 6002               BRA.S    TRT_RTN              BEFORE END OF ARGUMENT
            *
001468 7E20      TRT2     MOVEQ    #CC2,D7            SET CC2; LAST BYTE NON-ZERO BYTE
00146A 021000CF  TRT_RTN  ANDI.B   #CC_RST,(A0)       CLEAR COND CODE IN PSR
00146E 8F10               OR.B     D7,(A0)            SET NEW COND CODE IN PSR
001470 4EF80200           JMP      RETURN
            * * * * * * * * * * * * * * * * * * * * * * * * * * * * * * * * * * *
            *                                                                   *
            *        IO INSTRUCTIONS                                            *
            *        OP TABLE (SIOSIOF,TIOCLRIO ONLY)                           *
            *        OVERLAYED BY PCIO OR PCACIA MODULE                         *
            *                                                                   *
            * * * * * * * * * * * * * * * * * * * * * * * * * * * * * * * * * * *
            *
            *
       00001474  SIOSIOF  EQU      *         I/O INSTRUCTIONS
       00001474  TIOCLRIO EQU      *
       00001474  HIOHDV   EQU      *
       00001474  TCHCLRCH EQU      *
001474 31C7601A           MOVE.W   D7,INSTSAVE        SAVE INSTRUCTION HALFWORD
001478 083800006031       BTST     PSW_PROB,PSW+1     TEST FOR PROBLEM STATE
00147E 66000EE0           BNE      PRIVEX             IF YES, GO TO PRIV EXCP
            *
            *     .  FALL THROUGH TO OPERATION EXCEPTION
            *
            * * * * * * * * * * * * * * * * * * * * * * * * * * * * * * * * * * *
            *                                                                   *
            *        DECIMAL OPS                                                *
            *        OP TABLE OVERLAYED BY DECCODE MODULE                       *
            *                                                                   *
            * * * * * * * * * * * * * * * * * * * * * * * * * * * * * * * * * * *
            *
       00001482  CVD      EQU      *
       00001482  CVB      EQU      *
       00001482  AP       EQU      *
       00001482  SUBDEC   EQU      *
       00001482  CP       EQU      *
       00001482  MP       EQU      *
       00001482  DP       EQU      *
       00001482  SRP      EQU      *
       00001482  ZAP      EQU      *
```

```
                         * * * * * * * * * * * * * * * * * * * * * * * * * * * * * * * * * * *
                         *                                                                   *
                         *      FLOATING POINT EXTENDED OPS                                  *
                         *      OP TABLE OVERLAYED BY FCODE MODULE                           *
                         *                                                                   *
                         * * * * * * * * * * * * * * * * * * * * * * * * * * * * * * * * * * *
                         *
                         *
        00001482         MXR      EQU    *         FLOATING-POINT EXTENDED INSTRUCTIONS
        00001482         MXDR     EQU    *
        00001482         AXR      EQU    *
        00001482         SXR      EQU    *
        00001482         LRDR     EQU    *
        00001482         LRER     EQU    *
        00001482         MXD      EQU    *
001482 4EF8235C                   JMP    OPEXCP1
                         * * * * * * * * * * * * * * * * * * * * * * * * * * * * * * * * * * *
                         *                                                                   *
                         *      BUS ERROR SUBROUTINE     ( D0 HAS BUS ERROR REGISTER )       *
                         *                                                                   *
                         *         COME HERE ON ANY BUS ERROR TO ANALYZE ERROR REGISTER      *
                         *                                                                   *
                         * * * * * * * * * * * * * * * * * * * * * * * * * * * * * * * * * * *
                         *
001486 0800000B          BUS_ERR  BTST   PAT_PAR,D0         PAT PARITY ERROR?
00148A 6604                       BNE.S  BUS1
00148C 7416                       MOVEQ  #PAR_CHK,D2        SET MACHINE CHECK CODE
00148E 6026                       BRA.S  BE_DONE
                         *
001490 0800000C          BUS1     BTST   ODD_PC,D0          ODD PROGRAM COUNTER?
001494 6604                       BNE.S  BUS2
001496 7406                       MOVEQ  #PC_ODD,D2         SET ODD PC
001498 601C                       BRA.S  BE_DONE
                         *
00149A 0800000A          BUS2     BTST   REAL_OOB,D0        REAL ADDRESS OUT OF BOUNDS?
00149E 6604                       BNE.S  BUS3
0014A0 7405                       MOVEQ  #INV_ADDR,D2       SET INVALID ADDRESS
0014A2 6012                       BRA.S  BE_DONE
                         *
0014A4 0800000E          BUS3     BTST   VIRT_OOB,D0        VIRTUAL ADDRESS OUT OF BOUNDS?
0014A8 6604                       BNE.S  BUS4
0014AA 7411              BE_PGXLT MOVEQ  #PAGE_EXC,D2       SET PAGE TRANSLATION EXCEPTION
0014AC 6008                       BRA.S  BE_DONE
                         *
0014AE 08000009          BUS4     BTST   PG_FAULT,D0        PAGE FAULT?
0014B2 67F6                       BEQ.S  BE_PGXLT           BR TO SET PG XLATE XCPT
                         *
0014B4 7415              BUS5     MOVEQ  #MACHCHK,D2        IF NONE OF THE ABOVE, SET MACHINE CK
0014B6 31C06206          BE_DONE  MOVE.W D0,BECB_BER
0014BA 31C26200                   MOVE.W D2,BECB            FILL IN BUS ERROR CONTROL BLOCK
0014BE 21F85FCE6202               MOVE.L ADDR_REG,BECB_ADR        SAVE FAILING ADDRESS
0014C4 42386202                   CLR.B  BECB_ADR           CLEAR BITS 31-24
0014C8 4E75                       RTS
                         *
                         * * * * * * * * * * * * * * * * * * * * * * * * * * * * * * * * * * *
                         *                                                                   *
                         *      B U S    E R R O R    R O U T I N E S                        *
                         *                                                                   *
                         *         COME HERE WHEN E-ENGINE GETS A BUS ERROR                  *
                         *                                                                   *
                         * * * * * * * * * * * * * * * * * * * * * * * * * * * * * * * * * * *
                         *
        000014CA         BUSERROR EQU    *                  COME HERE FROM VECTOR SWAP
0014CA 48E7E000                   MOVEM.L D0-D2,-(A7)       SAVE REGISTERS
                         *
0014CE 30385FB0                   MOVE.W BER_REG,D0         READ BUS ERROR REGISTER
0014D2 4EB81486                   JSR    BUS_ERR            GET BUS ERROR CONTROL BLOCK FILLED
                         *
0014D6 7204                       MOVEQ  #$04,D1            SET BY-PASS PAT BIT FOR NO TRANSLATE
0014D8 82386106                   OR.B   SAVE_CNTL,D1             TO ACCESS LOW STORE
0014DC 11C15FE1                   MOVE.B D1,SYS_CNTL
0014E0 4A3980000000               TST.B  MS_ACC             CLEAR BUS ERROR REG (ACCESS 370 0)
0014E6 11F861065FE1               MOVE.B SAVE_CNTL,SYS_CNTL       RESTORE ORIGINAL
                         *
0014EC 4CDF0007                   MOVEM.L (A7)+,D0-D2       RESTORE REGISTERS
0014F0 4A3860E7                   TST.B  PRETEST            IS PRETEST SWITCH SET?
0014F4 6648                       BNE.S  BUSPRTST           YES, RETURN TO ROUTINE
```

```
0014F6 083800036038           BTST     PST_RESET,PUSTAT   IS A RESET IN PROGRESS?
0014FC 6644                   BNE.S    BERET              YES, RETURN TO ROUTINE
0014FE 11F861065FE1           MOVE.B   SAVE_CNTL,SYS_CNTL RESTORE ORIGINAL SYS CONTROL REG
001504 303C0200               MOVE.W   #$200,D0           LOAD LENGTH OF 'OPTABLE'
001508 1038601A               MOVE.B   INSTSAVE,D0        GET SAVED INSTRUCTION
                    *
00150C 12350000               MOVE.B   0(A5,D0),D1        GET ENTRY OF 'BETABLE'
001510 6B6E                   BMI.S    BEFPDEC            GO TO A-ENGINE TO GET PC AND PSR
001512 020100F0               ANDI.B   #$F0,D1            ANY OTHER SPECIAL CONDITIONS?
001516 664E                   BNE.S    BERSPEC            BR IF YES
                    *
       00001518     BUSERRET EQU      *
001518 DEFC000E               ADDA.W   #14,A7             STRAIGHTEN OUT SYSTEM STACK
                    *
00151C 31FC66005FA2 BUSERRA7 MOVE.W   #FP_INIT,FP_CMD    REINITIALIZE FLOATING POINT CHIP
001522 31FC76005FA2           MOVE.W   #FP_SMSK,FP_CMD      AFTER BUS ERROR
001528 31F860465FA0           MOVE.W   FP_MASK,FP_DATA
00152E 34386200               MOVE.W   BECB,D2            GET BUS ERROR CODE
001532 0C420015               CMPI.W   #$0015,D2          IS IT MACHINE CHECK?
001536 6B000EEC               BMI      PROGCHK            NO, SWAP PROGRAM CHECK PSWS
00153A 4EF81A92               JMP      MC_0015            GO TO CAUSE A MACH CHK, D2 = 0015
                    *
00153E 423860E7     BUSPRTST CLR.B    PRETEST            SET ERROR, RESET SWITCH, RETURN
001542 504F         BERET    ADDQ.W   #8,A7              STRAIGHTEN OUT SYSTEM STACK
001544 4E73                   RTE                         GET RETURN ADDRESS FROM STACK
                    *
001546 0C38004E6006 BUSERRA1 CMPI.B   #$4E,R1            TEST FOR CONVERT TO BINARY OR
00154C 6712                   BEQ.S    BEUPDPC              CONVERT TO DECIMAL OPS...
00154E 0C38004F6006           CMPI.B   #$4F,R1                THEY NEED PC UPDATED ON A100 CODE
001554 670A                   BEQ.S    BEUPDPC
                    *
001556 72C0         BUSERRA2 MOVEQ    #$C0,D1            GET ILC OF FAILING INSTRUCTION
001558 C210                   AND.B    (A0),D1
00155A 0C0100C0               CMPI.B   #$C0,D1            IS IT IN QUADRANT 4?
00155E 66BC                   BNE.S    BUSERRA7           NO, PC MATCHES ILC
001560 54B86002     BEUPDPC  ADDQ.L   #2,PC              OTHERWISE LINE UP PC
001564 60B6                   BRA.S    BUSERRA7
                    *
001566 E309         BERSPEC  LSL.B    1,D1               IF IT'S MVCL OR CLCL,
001568 6B22                   BMI.S    BECLML               FIRST NEED SPECIAL HANDLING
00156A E309                   LSL.B    1,D1
00156C 6B0E                   BMI.S    BEEXCP
00156E 0C0000C3               CMPI.B   #$C3,D0            IS IT AN A-ENGINE OFF-BOUNDARY
001572 6604                   BNE.S    BEINVOP            BR IF NO, ERROR
001574 4EF80278               JMP      A_BAGIT1           HANDLE PAGE-FAULT ON A-OFF-BOUNDARY
                    *
001578 4EF81BBA     BEINVOP  JMP      CS_4010            UNRECOVERABLE BUS ERROR
                    *
00157C 4EF81BC2     BEEXCP   JMP      CS_4020            BUS ERROR DURING EXCEPTION HANDLING
                    *
                    *
                    *
                    *
001580 343CA7A7     BEFPDEC  MOVE.W   #$A7A7,D2          SPECIAL RETURN CODE
001584 DEFC000E               ADDA.W   #14,A7             STRAIGHTEN OUT STACK
001588 4EF80202               JMP      RETURNEX           (CONTROL WILL RETURN TO THE E-ENGINE
                    *                                       WHEN A-ENGINE SEES BAD RETURN CODE)
                    *
                    *
                    *
00158C 08000000     BECLML   BTST     0,D0               WAS IT MVCL OR CLCL?
001590 660A                   BNE.S    BECLCL             BRANCH IF CLCL
001592 3E3C2000               MOVE.W   #$2000,D7
001596 50F860E6               ST       CLCL_SW
00159A 6004                   BRA.S    BECLML1
00159C 3E3C00C0     BECLCL   MOVE.W   #$00C0,D7
0015A0 322F0006     BECLML1  MOVE.W   6(A7),D1           GET FAILING INSTRUCTION FROM STACK
0015A4 5242                   ADDQ.W   #1,D2              ADJUST LOOP COUNT
0015A6 C247                   AND.W    D7,D1              FIND SIZE FIELD
0015A8 6702                   BEQ.S    BECLML2            BRANCH IF BYTE COMPARE
                    *
0015AA E54A                   LSL.W    2,D2               MAKE FW COUNT BYTE COUNT
0015AC 9642         BECLML2  SUB.W    D2,D3              FIND COUNT ALREADY COMPARED
0015AE 9883                   SUB.L    D3,D4              SUBTRACT TO FIND TOTAL COUNT LEFT
                    *
```

```
0015B0 4A85                   TST.L   D5                  WERE WE PADDING?
0015B2 6714                   BEQ.S   BECLML4             YES, ADJUST ONLY ONE OPERAND
                      *
0015B4 9A84           BECLML3 SUB.L   D4,D5               FIND TOTAL COUNT COMPARED
0015B6 DBB8600E               ADD.L   D5,RR1E_RET         ADJUST ADDRESS REGISTER OF OP1
0015BA DBB86006               ADD.L   D5,RR2E_RET         ADJUST ADDRESS REGISTER OF OP2
                      *
0015BE 9BB86012               SUB.L   D5,RR1O_RET         ADJUST COUNT OF OP1
0015C2 9BB8600A               SUB.L   D5,RR2O_RET         ADJUST COUNT OF OP2
0015C6 601A                   BRA.S   BECLML6
                      *
0015C8 9C84           BECLML4 SUB.L   D4,D6               FIND TOTAL COUNT PADDED
0015CA 4A3860E6               TST.B   CLCL_SW             WAS OP2 LONGER THAN OP1?
0015CE 660A                   BNE.S   BECLML5             NO, GO ADJUST OP1
                      *
0015D0 DDB86006               ADD.L   D6,RR2E_RET         ADJUST ADDRESS OF OP2
0015D4 9DB8600A               SUB.L   D6,RR2O_RET         ADJUST COUNT OF OP2
0015D8 6008                   BRA.S   BECLML6
                      *
0015DA DDB8600E       BECLML5 ADD.L   D6,RR1E_RET         ADJUST ADDRESS OF OP1
0015DE 9DB86012               SUB.L   D6,RR1O_RET         ADJUST COUNT OF OP1
                      *
0015E2 7200           BECLML6 MOVEQ   #0,D1
0015E4 11C1600E               MOVE.B  D1,RR1E_RET         ENSURE HIGH BYTES OF REGISTERS OK
0015E8 11F860DE6012           MOVE.B  RR1O_SAV,RR1O_RET
0015EE 11C16006               MOVE.B  D1,RR2E_RET
0015F2 11F860E0600A           MOVE.B  RR2O_SAV,RR2O_RET
0015F8 7204                   MOVEQ   #$04,D1             SET BY-PASS PAT BIT FOR NO TRANSLATE
0015FA 82386106               OR.B    SAVE_CNTL,D1              TO ACCESS LOW STORE
0015FE 11C15FE1               MOVE.B  D1,SYS_CNTL
001602 227C80000028           MOVEA.L #APROGOLD,A1
001608 4A11                   TST.B   (A1)                ACCESS MAIN STORE TO RESET BUS ERROR
                      *
00160A 343C4500               MOVE.W  #$4500,D2           RETURN TO PRIMARY WITH POS. RETURN
00160E 4EF80202               JMP     RETURNEX              CODE; RETURN TO 'BUSERRET' TO CONT
                      *
                      * * * * * * * * * * * * * * * * * * * * * * * * * * * * * * * * * * *
                      *                                                                   *
                      *       DIAGNOSTIC ROUTINE FOR PU HARDWARE                          *
                      *           TESTS PAT, MAIN STORAGE, AND FLOATING-POINT ENGINE      *
                      *                                                                   *
                      * * * * * * * * * * * * * * * * * * * * * * * * * * * * * * * * * * *
                      *
                      *
                      *
       00001612       FP_DIAG EQU     *                   SUBROUTINE TO DIAGNOSE CORNROW
001612 43F85FA0               LEA     FP_DATA,A1
001616 31FC64405FA2           MOVE.W  #FP_EXCH,FP_CMD     TELL CORNROW TO SAVE ITS REGISTERS
00161C 31FC64401654           MOVE.W  #FP_EXCH,SAVE       SAVE COMMAND WE TRIED TO DO
001622 31F85F901656           MOVE.W  CC_INT_REG,STAT     READ STATUS
                      *
001628 31FC2001605C           MOVE.W  #$2001,REFCODE      SET DIAGNOSTIC PROGRESS CODE
00162E 45F81658               LEA     DIAGSEED,A2
001632 31FC68005FA2           MOVE.W  #LD_FPR0,FP_CMD     LOAD FP REG 0 WITH DIAGNOSE SEED
001638 31FC68001654           MOVE.W  #LD_FPR0,SAVE       SAVE COMMAND
00163E 329A                   MOVE.W  (A2)+,(A1)
001640 329A                   MOVE.W  (A2)+,(A1)
001642 329A                   MOVE.W  (A2)+,(A1)
001644 329A                   MOVE.W  (A2)+,(A1)
                      *
001646 31FC64025FA2           MOVE.W  #FP_CHK,FP_CMD      TELL CORNROW TO DO CHECK INSTR
00164C 31FC64021654           MOVE.W  #FP_CHK,SAVE        SAVE COMMAND
001652 601C                   BRA.S   DIAG_PU             CONTINUE WITH OTHER DIAGNOSTICS,
                      *                                     CHECK CORNROW LATER.
                      *
001654 0000           SAVE     DC     0
001656 0000           STAT     DC     0
001658 00000000       DIAGSEED DC.L   0                   LOAD FP REG0 (BEFORE DIAGNOSE)
00165C 00000000                DC.L   0
001660 00000000       DIAGDATA DC.L   0                   STORE FP REG0 (AFTER DIAGNOSE)
001664 00000000                DC.L   0
001668 00000000       DIAGCODE DC.L   0                   STORE FP REG2
00166C 00000000                DC.L   0
                      *
                      *
                      *
                      *
```

```
                        *
        00001670        DIAG_PU  EQU      *
001670 08F800036038              BSET     PST_RESET,PUSTAT  SET INFORMATION BIT IN CASE OF BUS
                        *                                     ERROR (TO RETURN TO THIS ROUTINE)
                        *
                        *    PAT TEST -
                        *    STORE FFFF INTO EACH PAT ENTRY, READ BACK, CHECK PARITY AND DATA
                        *
001676 31FC2002605C              MOVE.W   #$2002,REFCODE    SET DIAGNOSTIC PROGRESS CODE
00167C 227C00800000              MOVEA.L  #PAT,A1
001682 243C00001000              MOVE.L   #$00001000,D2     ADDRESS INCREMENT FOR NEXT ENTRY
001688 363C03FF                  MOVE.W   #$3FF,D3          NUMBER OF PAT ENTRIES
00168C 303CFFFF                  MOVE.W   #$FFFF,D0         SET FIRST PATTERN
001690 323C8F7F                  MOVE.W   #$8F7F,D1         SET MASK PATTERN
001694 3C3C0F7F                  MOVE.W   #$0F7F,D6
001698 7808                      MOVEQ    #$08,D4           SET PAT_MOD BIT = 1 TO ALLOW
00169A 88386106                  OR.B     SAVE_CNTL,D4          PAT ACCESS
00169E 11C45FE1                  MOVE.B   D4,SYS_CNTL
                        *
0016A2 3280             DIAGPU1  MOVE.W   D0,(A1)           STORE DATA INTO PAT ENTRY
0016A4 3A01                      MOVE.W   D1,D5             GET MASK
0016A6 CA51                      AND.W    (A1),D5           AND PAT ENTRY INTO MASK
0016A8 6B5E                      BMI.S    PAT_ERR           CHECK FOR PAT PARITY
0016AA BA46                      CMP.W    D6,D5             CHECK THAT DATA COMPARES
0016AC 6662                      BNE.S    PAT_DATA          BRANCH IF NOT
                        *
0016AE D3C2                      ADDA.L   D2,A1             POINT TO NEXT PAT ENTRY
0016B0 51CBFFF0                  DBRA     D3,DIAGPU1        CONTINUE THROUGH ALL ENTRIES
                        *
                        *
                        *    STORE 5555 INTO EACH PAT ENTRY, READ BACK, CHECK PARITY AND DATA
                        *
0016B4 227C00800000              MOVEA.L  #PAT,A1
0016BA 363C03FF                  MOVE.W   #$3FF,D3          NUMBER OF PAT ENTRIES
0016BE 303C5555                  MOVE.W   #$5555,D0         SET SECOND PATTERN
0016C2 3C3C0555                  MOVE.W   #$0555,D6         DATA FOR COMPARE
                        *
0016C6 3280             DIAGPU2  MOVE.W   D0,(A1)           STORE DATA INTO PAT ENTRY
0016C8 3A01                      MOVE.W   D1,D5             GET MASK
0016CA CA51                      AND.W    (A1),D5           AND PAT ENTRY INTO MASK
0016CC 6B3A                      BMI.S    PAT_ERR           CHECK FOR PAT PARITY
0016CE BA46                      CMP.W    D6,D5             CHECK THAT DATA COMPARES
0016D0 663E                      BNE.S    PAT_DATA          BRANCH IF NOT
                        *
0016D2 D3C2                      ADDA.L   D2,A1             POINT TO NEXT PAT ENTRY
0016D4 51CBFFF0                  DBRA     D3,DIAGPU2        CONTINUE THROUGH ALL ENTRIES
                        *
                        *
                        *    STORE AAAA INTO EACH PAT ENTRY, READ BACK, CHECK PARITY AND DATA
                        *
0016D8 227C00800000              MOVEA.L  #PAT,A1
0016DE 363C03FF                  MOVE.W   #$3FF,D3          NUMBER OF PAT ENTRIES
0016E2 303CAAAA                  MOVE.W   #$AAAA,D0         SET THIRD PATTERN
0016E6 3C3C0A2A                  MOVE.W   #$0A2A,D6         DATA FOR COMPARE
                        *
0016EA 3280             DIAGPU3  MOVE.W   D0,(A1)           STORE DATA INTO PAT ENTRY
0016EC 3A01                      MOVE.W   D1,D5             GET MASK
0016EE CA51                      AND.W    (A1),D5           AND PAT ENTRY INTO MASK
0016F0 6B16                      BMI.S    PAT_ERR           CHECK FOR PAT PARITY
0016F2 BA46                      CMP.W    D6,D5             CHECK THAT DATA COMPARES
0016F4 661A                      BNE.S    PAT_DATA          BRANCH IF NOT
                        *
0016F6 D3C2                      ADDA.L   D2,A1             POINT TO NEXT PAT ENTRY
0016F8 51CBFFF0                  DBRA     D3,DIAGPU3        CONTINUE THROUGH ALL ENTRIES
                        *
                        *
0016FC 4EB81F62                  JSR      PURGE             GO LOAD UP PAT CORRECTLY
001700 31FC2005605C              MOVE.W   #$2005,REFCODE    SET DIAGNOSTIC PROGRESS CODE
001706 601A                      BRA.S    DIAG_PU4          BRANCH AROUND ERROR ROUTINES
                        *
                        *
        00001708        PAT_ERR  EQU      *
001708 31FC2003605C              MOVE.W   #$2003,REFCODE    SET DIAGNOSTIC ERROR CODE
00170E 600E                      BRA.S    DIAGE
        00001710        PAT_DATA EQU      *
001710 31FC2004605C              MOVE.W   #$2004,REFCODE    SET DIAGNOSTIC ERROR CODE
001716 6006                      BRA.S    DIAGE
```

```
       00001718      MAIN_ERR EQU      *
001718 31FC2006605C           MOVE.W   #$2006,REFCODE    SET DIAGNOSTIC ERROR CODE
00171E 4EF817D0      DIAGE    JMP      DIAGEND
                     *
                     *
                     *    MAIN STORE TEST -
                     *    STORE ALL 01010101 IN FULLWORDS
                     *
001722 223C01010101  DIAG_PU4 MOVE.L   #$01010101,D1
001728 247C80000000           MOVE.L   #ARSTRT_N,A2      LOAD MAIN STORE ADDRESS 0
00172E 42786200               CLR.W    BECB
001732 2481          DIAGPU4  MOVE.L   D1,(A2)           STORE DATA
001734 241A                   MOVE.L   (A2)+,D2          READ DATA
001736 4A786200               TST.W    BECB              COME HERE ON STORE BUS ERROR
00173A 4A786200               TST.W    BECB              COME HERE ON READ BUS ERROR
00173E 67F2                   BEQ.S    DIAGPU4           CONTINUE UNTIL BUS ERROR
                     *
001740 0C7800056200           CMPI.W   #$0005,BECB       CHECK FOR ADDRESSING EXCEPTION
001746 66D0                   BNE.S    MAIN_ERR
                     *
                     *
                     *    STORE ALL FFFFFFFF IN FULLWORDS
                     *
001748 72FF                   MOVE.L   #$FFFFFFFF,D1
00174A 247C80000000           MOVE.L   #ARSTRT_N,A2      LOAD MAIN STORE ADDRESS 0
001750 42786200               CLR.W    BECB
001754 2481          DIAGPU5  MOVE.L   D1,(A2)           STORE DATA
001756 241A                   MOVE.L   (A2)+,D2          READ DATA
001758 4A786200               TST.W    BECB              COME HERE ON STORE BUS ERROR
00175C 4A786200               TST.W    BECB              COME HERE ON READ BUS ERROR
001760 67F2                   BEQ.S    DIAGPU5           CONTINUE UNTIL BUS ERROR
                     *
001762 0C7800056200           CMPI.W   #$0005,BECB       CHECK FOR ADDRESSING EXCEPTION
001768 66AE                   BNE.S    MAIN_ERR
                     *
00176A 08B800036038           BCLR     PST_RESET,PUSTAT
001770 31FC2007605C           MOVE.W   #$2007,REFCODE
001776 31F85F901656           MOVE.W   CC_INT_REG,STAT   READ CORNROW STATUS
                     *
00177C 43F85FA0               LEA      FP_DATA,A1
001780 45F81660               LEA      DIAGDATA,A2
001784 31FC60005FA2           MOVE.W   #ST_FPR0,FP_CMD   GET CONTENTS OF FP REG2 AFTER DIAG
00178A 31FC60001654           MOVE.W   #ST_FPR0,SAVE     SAVE COMMAND
001790 34D1                   MOVE.W   (A1),(A2)+
001792 34D1                   MOVE.W   (A1),(A2)+
001794 34D1                   MOVE.W   (A1),(A2)+
001796 34D1                   MOVE.W   (A1),(A2)+
                     *
001798 31FC60205FA2           MOVE.W   #ST_FPR2,FP_CMD   GET CONTENTS OF FP REG6 AFTER DIAG
00179E 31FC60201654           MOVE.W   #ST_FPR2,SAVE     SAVE COMMAND
0017A4 34D1                   MOVE.W   (A1),(A2)+
0017A6 34D1                   MOVE.W   (A1),(A2)+
0017A8 34D1                   MOVE.W   (A1),(A2)+
0017AA 34D1                   MOVE.W   (A1),(A2)+
                     *
0017AC 31FC64405FA2           MOVE.W   #FP_EXCH,FP_CMD   TELL CORNROW TO RESTORE SAVED REGS
0017B2 31FC64401654           MOVE.W   #FP_EXCH,SAVE     SAVE COMMAND
0017B8 31F85F901656           MOVE.W   CC_INT_REG,STAT
                     *
                     *
0017BE 31FC2008605C           MOVE.W   #$2008,REFCODE    SET FP DIAG ERROR REFERENCE CODE
0017C4 4AB81668               TST.L    DIAGCODE          CHECK RETURN CODE
0017C8 6606                   BNE.S    DIAGEND           IF NON-ZERO, BYPASS GOOD END CODE
0017CA 31FC2009605C           MOVE.W   #$2009,REFCODE    SET DIAGNOSTIC GOOD COMPLETION CODE
0017D0 11FC00FD5F90  DIAGEND  MOVE.B   #PC_RESET,INTR_REG  RESET PC INTERRUPT
0017D6 4EF81E2A               JMP      STOP_LP           GO TO WAIT FOR AN INTERRUPT
                     *
                     * * * * * * * * * * * * * * * * * * * * * * * * * * * * * * * * * * *
                     *                                                                   *
                     *        EX_INT :  SUBROUTINE TO CHECK PENDING EXTERNAL             *
                     *                  INTERRUPTS AGAINST CURRENT MASKS.                *
                     *                                                                   *
                     *        EXIT :  - RETURNS TO CALLER IF NO INTERRUPT                *
                     *                                                                   *
```

```
                     *                 - UNSTACKS RETURN ADDRESS, GOES TO EXTERNAL        *
                     *                   INTERRUPT HANDLER (EXT_INTR) IF INTERRUPT        *
                     *                   TO BE PRESENTED.                                 *
                     *                                                                    *
                     * * * * * * * * * * * * * * * * * * * * * * * * * * * * * * * * * * *
                     *
       000017DA      EX_INT    EQU      *
0017DA 4A786102                TST.W    EXT_INT_PND        ANY EXTERNAL INTERRUPTS PENDING?
0017DE 6602                    BNE.S    EXMASK
0017E0 4E75          EX_RET    RTS                         IF NOT, RETURN
                     *
0017E2 36380102      EXMASK    MOVE.W   CREG0+2,D3         GET EXTERNAL MASKS FROM CONTROL REG
0017E6 C6786102                AND.W    EXT_INT_PND,D3     COMPARE WITH PENDING INTERRUPTS
0017EA 67F4                    BEQ.S    EX_RET             IF NONE MATCH, RETURN
                     *------------------------------------------------------------------
                     *   AN INTERRUPT CONDITION EXISTS WHICH IS MASKED ON; RETURN TO
                     *       THE CALLING SUBROUTINE WILL NOT BE MADE.
                     *------------------------------------------------------------------
0017EC 584F                    ADDQ.W   #4,A7              UNSTACK RETURN ADDRESS
0017EE 4EB824B8                JSR      FETCHPSW           GET CURRENT PSW CONTENTS
0017F2 4A03                    TST.B    D3                 INTERRUPT KEY? (OTHERS NOT SUPPORTED
                     *                                       AT THIS TIME)
0017F4 6708                    BEQ.S    EXINT1
0017F6 42386103                CLR.B    EXT_INT_PND+1      CLEAR PENDING INTERRUPT
0017FA 7440                    MOVEQ    #$0040,D2          LOAD INTERRUPT KEY CODE
0017FC 600C                    BRA.S    EXT_INTR           GO TAKE EXTERNAL INTERRUPT
                     *
                     *
0017FE 343C1004      EXINT1    MOVE.W   #$1004,D2          LOAD CLOCK COMPARATOR CODE
001802 0803000B                BTST     #CCOMP,D3          CLOCK COMPARATOR INTERRUPT PENDING?
001806 6602                    BNE.S    EXT_INTR
001808 5242                    ADDQ.W   #1,D2              MAKE IT CPU TIMER CODE
                     * * * * * * * * * * * * * * * * * * * * * * * * * * * * * * * * * * *
                     *                                                                    *
                     *       EXTERNAL INTERRUPTS                                          *
                     *                                                                    *
                     * * * * * * * * * * * * * * * * * * * * * * * * * * * * * * * * * * *
                     *
                     *
00180A 7204          EXT_INTR MOVEQ     #$04,D1            SET BY-PASS PAT BIT FOR NO TRANSLATE
00180C 82386106               OR.B      SAVE_CNTL,D1               TO ACCESS LOW STORE
001810 11C15FE1               MOVE.B    D1,SYS_CNTL
001814 247C80000018           MOVEA.L   #AEXTROLD,A2       GET MAIN STORAGE ADDRESS FOR OLD PSW
00181A 287C80000058           MOVEA.L   #AEXTRNEW,A4       GET MAIN STORAGE ADDRESS FOR NEW PSW
001820 24F86030               MOVE.L    PSW,(A2)+          STORE CURRENT PSW AS OLD
001824 24B86034               MOVE.L    PSW+4,(A2)
001828 083800036031           BTST      PSW_EC,PSW+1
00182E 6708                   BEQ.S     EXBCCODE
001830 3942002E               MOVE.W    D2,EXINT-EXNEW(A4)
                     *
001834 4EF81F0A      EXT1     JMP       IENDINT            GO TO LOAD PSW AND END
                     *
                     *
001838 3502          EXBCCODE MOVE.W    D2,-(A2)           STORE INTERRUPTION CODE
00183A 60F8                   BRA.S     EXT1
                     * * * * * * * * * * * * * * * * * * * * * * * * * * * * * * * * * * *
                     *                                                                    *
                     *       STORE/LOAD REGISTER SUBROUTINES                              *
                     *                                                                    *
                     *       THESE ROUTINES WILL GENERATE APPROPRIATE INSTRUCTIONS, TURN  *
                     *       ON THE TRACE BIT IN THE PSR, AND STORE/LOAD GPR CONTENTS     *
                     *       TO/FROM PRIVATE STORE.                                       *
                     *                                                                    *
                     *       FOR 'ST' AND 'L' FUNCTIONS                                   *
                     *       ENTRY:  GPR NO. IN D4  (FOUR HIGH ORDER BITS).               *
                     *               FOR 'L' DATA FOR GPR IS AT LABEL 'GPR'.              *
                     *       EXIT :  FOR 'ST' DATA FROM GPR IS AT LABEL 'GPR'.            *
                     *                                                                    *
                     *       FOR 'GPRALTER' AND 'GPRDISP' FUNCTIONS                       *
                     *       ENTRY:  FOR 'GPRALTER' DATA FOR GPRS IS AT LABEL 'GPRSAVE'.  *
                     *       EXIT :  FOR 'GPRDISP' DATA FROM GPRS IS AT LABEL 'GPRSAVE'.  *
                     *                                                                    *
                     * * * * * * * * * * * * * * * * * * * * * * * * * * * * * * * * * * *
                     *
00183C 11C460C1      ST        MOVE.B   D4,ST_INST+1
```

```
001840 21F8600260F4              MOVE.L  PC,SAV_PC
001846 21FC000060C0
       6002                      MOVE.L  #ST_INST,PC
00184E 31D060F8         GPRACC   MOVE.W  (A0),SAV_PSR
001852 0038001E6001              ORI.B   #TR_MASK+L7_MASK,PSR+1  MAKE SURE WE TAKE NO INTERRUPTS
001858 7003                      MOVEQ   #INSTOV+OPEROV,D0     SET IFETCH AND OPRND OVERIDE BITS
00185A 80386106                  OR.B    SAVE_CNTL,D0              TO ALLOW PRIVATE STORE ACCESS
00185E 11C05FE1                  MOVE.B  D0,SYS_CNTL
001862 343CC0C0                  MOVE.W  #$C0C0,D2             FORCE A-ENGINE TO TOP
001866 4EB80202                  JSR     RETURNEX
                        *
00186A 11F861065FE1              MOVE.B  SAVE_CNTL,SYS_CNTL    RESET STORAGE OVERRIDE
001870 21F860F46002              MOVE.L  SAV_PC,PC
001876 30B860F8                  MOVE.W  SAV_PSR,(A0)
00187A 4E75                      RTS
                        *
00187C 11C460C9         L        MOVE.B  D4,L_INST+1
001880 21F8600260F4              MOVE.L  PC,SAV_PC
001886 21FC000060C8
       6002                      MOVE.L  #L_INST,PC
00188E 60BE                      BRA.S   GPRACC
                        *
       00001890         GPRALTER EQU     *
001890 21F8600260F4              MOVE.L  PC,SAV_PC
001896 21FC000060CC
       6002                      MOVE.L  #LM_INST,PC
00189E 60AE                      BRA.S   GPRACC
                        *
       000018A0         GPRDISP  EQU     *
0018A0 21F8600260F4              MOVE.L  PC,SAV_PC
0018A6 21FC000060C4
       6002                      MOVE.L  #STM_INST,PC
0018AE 609E                      BRA.S   GPRACC
                        ***************************************************************
                        *                                                             *
                        *        INTERRUPT HANDLER                                    *
                        *                                                             *
                        *        INTERUPT - ENTERED WHEN THE A-ENGINE DETECTS AN INTERRUPT.   *
                        *                   THE PC IS ADJUSTED.                       *
                        *        INTERPTA - ENTERED FROM E-ENGINE 'STOP' OR 'WAIT' STATE    *
                        *                                                             *
                        *        INTFRPC  - ENTERED FROM E-ENGINE 'I/O UNSTACK' ROUTINE     *
                        *                                                             *
                        *        FP_TEST  - ENTERED FROM E-ENGINE 'EXECUTE' ROUTINE   *
                        *                                                             *
                        *        FOR WASHINGTON, THESE ARE THE INTERRUPTS...          *
                        *            IPL 2 -  ALTER/DISPLAY AND ADDRESS COMPARE  RESET = 5F80 *
                        *                  -  (DEBUG CARD ONLY)                       *
                        *                                                RESET = 5F90 *
                        *            IPL 1 -  PC INTERRUPT                            *
                        *            IPL 0 -  8087I (CORNROW) INTERRUPT               *
                        *                  -  EXT INT KEY (DEBUG CARD ONLY)  RESET = 5F8C *
                        *                                                             *
                        ***************************************************************
                        *
                        *        IPL0 WAS DETECTED BUT WAS NOT FROM CORNROW. TEST DEBUG
                        *
                        *--------------------------------------------------------------
0018B0 4EF82F00         INTDBUG0 JMP     IPL0TST          TEST FOR EXT INT FROM DEBUG CARD
                        *                                 RETURN TO 'IPL0_ERR' IF THE DEBUG
                        *                                 CARD IS NOT INSTALLED.
                        *--------------------------------------------------------------
                        *
0018B4 4EF81A76         IPL0_ERR JMP     MC_3011
                        *
                        *        SPURIOUS CORNROW EXCEPTION INTERRUPT
                        *
0018B8 4EF81A7C         FPEX_ERR JMP     MC_3040
                        *
                        *        A-ENGINE INTERRUPT DETECTED, IPL BITS NOT ON
                        *
0018BC 4EF81A82         INT_ERR  JMP     MC_3010
                        *
                        *        NO IPL0 OR IPL1, IPL2 ASSUMED, TEST DEBUG
                        *
```

```
                        *----------------------------------------------------------------
0018C0 4EF82F08         INTDBUG2 JMP     IPL2TST              TEST FOR A/D OR ACS FROM DEBUG CARD
                        *                                     RETURN TO 'IPL2_ERR' IF THE DEBUG
                        *                                     CARD IS NOT INSTALLED.
                        *----------------------------------------------------------------
                        *
0018C4 4EF81A70         IPL2_ERR JMP     MC_3012

                        *        IPL0 DETECTED, TEST FOR CORNROW/DEBUG
                        *
0018C8 31FC74005FA2 FP_TEST MOVE.W  #FP_PAC,FP_CMD       ISSUE 'POLL AND CLEAR' TO CORNROW
0018CE 34385FA0                  MOVE.W  FP_DATA,D2              TO GET EXCEPTION DATA
0018D2 4A02                      TST.B   D2                   TEST FOR ANY CORNROW EXCEPTION
0018D4 67DA                      BEQ.S   INTDBUG0             BR IF NONE, TEST FOR DEBUG
                        *                                                                    *
                        *        FLOATING-POINT CHIP EXCEPTION ROUTINE                       *
                        *                                                                    *
0018D6 31FC76005FA2              MOVE.W  #FP_SMSK,FP_CMD      SET MASK.IN FP PROCESSOR
0018DC 31F860465FA0              MOVE.W  FP_MASK,FP_DATA
0018E2 E20A                      LSR.B   1,D2
0018E4 6404                      BCC.S   FP_1                 BRANCH IF NOT SIGNIFICANCE
0018E6 740E                      MOVEQ   #$0E,D2
0018E8 6016                      BRA.S   FP_PROG
0018EA E20A             FP_1     LSR.B   1,D2
0018EC 6404                      BCC.S   FP_2                 BRANCH IF NOT EXPONENT UNDERFLOW
0018EE 740D                      MOVEQ   #$0D,D2
0018F0 600E                      BRA.S   FP_PROG
0018F2 E20A             FP_2     LSR.B   1,D2
0018F4 6404                      BCC.S   FP_3                 BRANCH IF NOT FLOATING POINT DIVIDE
0018F6 740F                      MOVEQ   #$0F,D2
0018F8 6006                      BRA.S   FP_PROG
0018FA E20A             FP_3     LSR.B   1,D2
0018FC 64BA                      BCC.S   FPEX_ERR             BR IF NO EXCEPTION, MACHINE CHECK
0018FE 740C                      MOVEQ   #$0C,D2              EXPONENT OVERFLOW
001900 4EF82424         FP_PROG  JMP     PROGCHK
                        *
                        *        INTERRUPT HAS DETECTED IN A-ENGINE
                        *
       00001904         INTERUPT EQU     *
001904 0250FFF1                  ANDI.W  #$FFF1,(A0)          GET BACK TO LEVEL 0 TO ALLOW INTRPTS
001908 55B86002                  SUBQ.L  #2,PC
00190C 323CF8FF                  MOVE.W  #$F8FF,D1            TEST INTERRUPT REGISTER FOR PC,
001910 82785F90                  OR.W    CC_INT_REG,D1             CORNROW OR DEBUG REQUEST
001914 4641                      NOT.W   D1
001916 67A4                      BEQ.S   INT_ERR              BR IF NONE ARE ON, MACHINE CHECK
001918 08010008         INTERPTA BTST    EX_INTR,D1           TEST FOR IPL0 INTERRUPT
00191C 66AA.                     BNE.S   FP_TEST              BR IF IPL0, TEST CORNROW/DEBUG
00191E 08010009                  BTST    PC_INTR,D1           TEST FOR IPL1 INTERRUPT FROM PC
001922 679C                      BEQ.S   INTDBUG2             BR IF NO, TEST FOR IPL2 INTERRUPT
                        *                                                                    *
                        *        PC INTERRUPT ROUTINE                                        *
                        *                                                                    *
001924 22786050         INTFRPC  MOVEA.L PCIB_IN,A1
001928 B3FC00058000              CMPA.L  #MAIN_STR,A1         IS THE PCIB IN PRIVATE STORE?
00192E 6A7A                      BPL.S   INTMOTMR             BR IF YES, MANOPS OR TIMER INTERRUPT
                        *
                        *        PC INTERRUPT FOR DIAGNOSE INITIATED IO OPERATIONS
                        *
001930 4A386038                  TST.B   PUSTAT               ARE WE IN STOPPED STATE?
001934 6B5A                      BMI.S   INTSTACK             YES, STACK INTERRUPT
001936 4A3860E2                  TST.B   IOMASK               CHECK IF ANY I/O INTERRUPTS ENABLED
00193A 6754                      BEQ.S   INTSTACK             NO, STACK INTERRUPT
                        *
                        *        IO INTERRUPT PSW SWAP
                        *
00193C 11FC00806050              MOVE.B  #GO_AHEAD,PCIB_IN    SET CONDITION CODE BIT FOR PC
001942 4A386050         INTWAIT1 TST.B   PCIB_IN              WAIT FOR PC TO SEE CONDITION CODE
001946 66FA                      BNE.S   INTWAIT1               AND RESET IT TO ZERO
001948 247C80000040              MOVEA.L #ACSW,A2
00194E 7204                      MOVEQ   #$04,D1              SET BY-PASS PAT BIT FOR NO TRANSLATE
001950 82386106                  OR.B    SAVE_CNTL,D1                 TO ACCESS LOW STORE
001954 11C15FE1                  MOVE.B  D1,SYS_CNTL
001958 2489                      MOVE.L  A1,(A2)              STORE PCIB ADDRESS INTO CSW
00195A 11FC00FD5F90              MOVE.B  #PC_RESET,INTR_REG
                        *
001960 4EB824B8         IO_INTR  JSR     FETCHPSW             GET PSW FROM PC AND PSR
                        *                                     RESET TRANSLATE BIT EARLIER
001964 42386104                  CLR.B   IO_INT_PND
```

```
                        *
001968 247C80000038               MOVEA.L #AIOOLD,A2          GET MAIN STORAGE ADDRESS FOR OLD PSW
00196E 287C80000078               MOVEA.L #AIONEW,A4          GET MAIN STORAGE ADDRESS FOR NEW PSW
001974 24F86030                   MOVE.L  PSW,(A2)+           STORE CURRENT PSW AS OLD
001978 24B86034                   MOVE.L  PSW+4,(A2)
00197C 083800036031               BTST    PSW_EC,PSW+1
001982 6708                       BEQ.S   IOBCCODE
001984 39420042                   MOVE.W  D2,IOINT-IONEW(A4)
                        *
001988 4EF81F0A         IO1       JMP     IENDINT             GO TO LOAD PSW AND END
                        *
00198C 3502             IOBCCODE  MOVE.W  D2,-(A2)            STORE INTERRUPTION CODE
00198E 60F8                       BRA.S   IO1
                        *
                        *         STACK IO INTERRUPT
                        *
001990 11FC00906051     INTSTACK  MOVE.B  #MASK_NIO,PCIB_IN+1  DISABLE I/O INTERRUPTS IN MASK
001996 11FC00406050               MOVE.B  #STACK,PCIB_IN      SET CONDITION CODE BIT FOR PC
00199C 003800806104               ORI.B   #$80,IO_INT_PND     SET 'I/O INTERRUPT PENDING'
0019A2 4A386050         INTWAIT2  TST.B   PCIB_IN             WAIT FOR PC TO SEE CONDITION CODE
0019A6 66FA                       BNE.S   INTWAIT2              AND RESET IT TO ZERO
0019A8 6050                       BRA.S   RESINT              END OF INTERRUPT
                        *
                        *         PC INTERRUPT FOR TIMERS/MANOPS
                        *
0019AA 11FC00806050     INTMOTMR  MOVE.B  #GO_AHEAD,PCIB_IN   SET CONDITION CODE BIT FOR PC
0019B0 93FC00058000               SUBA.L  #MAIN_STR,A1          SO IT CAN TRANSFER THE PCIB
0019B6 4A386050         INTWAIT   TST.B   PCIB_IN             WAIT FOR PC TO SEE CONDITION CODE
0019BA 66FA                       BNE.S   INTWAIT               AND RESET IT TO ZERO
0019BC 0C110005                   CMPI.B  #$05,(A1)           IS THIS A TIMER PCIB?
0019C0 6632                       BNE.S   MANOPTST            NO, GO TO TEST FOR MANOP
                        *
                        *         TIMER PCIB
                        *
0019C2 0C2900FF0001               CMPI.B  #$FF,1(A1)          IS THIS AN ASYNCHRONOUS INTR
0019C8 6622                       BNE.S   TMRRQERR            BR IF NO, TEST FOR SIO EMULATION
0019CA 11E900086102               MOVE.B  8(A1),TMR_INT_PND   SET PENDING INTERRUPTS
0019D0 11FC00FD5F90               MOVE.B  #PC_RESET,INTR_REG
0019D6 4A386038                   TST.B   PUSTAT              ARE WE IN STOPPED STATE?
0019DA 6B00049C                   BMI     WAIT_LP             YES, WAIT FOR A START INTERRUPT
0019DE 083800006030               BTST    #PSW_EXT,PSW        CHECK IF INTERRUPTS ARE MASKED ON
0019E4 671A                       BEQ.S   INT_RTN             GO TO TEST FOR WAIT
0019E6 4EB817DA                   JSR     EX_INT              SEE IF ANY CAN BE PRESENTED
0019EA 6014                       BRA.S   INT_RTN             GO TO TEST FOR WAIT
                        *
       000019EC         TMRRQERR  EQU     *
                        *----------------------------------------------------------------------
0019EC 4EB82F30                   JSR     TMR_SIO             TEST FOR ASYNCHRONOUS IO INTERRUPT
                        *                                     RETURN HERE IF THE SIO EMULATION CODE
                        *                                     IS NOT PRESENT OR THE TIMER CODE IS
                        *                                     NOT '20' OR '21'.
                        *----------------------------------------------------------------------
                        *
0019F0 4EF81A6A                   JMP     MC_3050
0019F4 0C110004         MANOPTST  CMPI.B  #$04,(A1)           IS THIS A MANOP PCIB?
0019F8 6714                       BEQ.S   MANOPINT            YES, GO TO MANOP
                        *
                        *         PC INTERRUPT PCIB TYPE UNKNOWN, RESET IT
                        *
0019FA 11FC00FD5F90     RESINT    MOVE.B  #PC_RESET,INTR_REG  RESET PC INTERRUPT
001A00 083800056038     INT_RTN   BTST    PST_WAIT,PUSTAT     IS WAIT ON ?
001A06 66000470                   BNE     WAIT_LP             BR IF YES, RETURN TO WAIT LOOP
001A0A 4EF81EC8                   JMP     IENDNTR             GO TO END TO RETURN TO A-ENGINE
                        *
                        *         MANOPS PCIB
                        *
001A0E 31E9001A603A     MANOPINT  MOVE.W  26(A1),PU_CMD       PUT COMMAND FROM 'IN' TO 'OUT' PCIB
001A14 21E900086028               MOVE.L  ADDR1(A1),ADDRESS1  COPY ADDRESS1 FIELD TO MANOP_CB
001A1A 4A386038                   TST.B   PUSTAT              ARE WE STOPPED?
001A1E 6A0C                       BPL.S   MANOPFET            BR IF NO, DONT UPDATE PSW
001A20 21E900106030               MOVE.L  PSW1(A1),PSW        COPY PSW FROM MANOP_CB
001A26 21E900146034               MOVE.L  PSW2(A1),PSW+4
       00001A2C         MANOP_AD  EQU     *                   ENTRY FROM 'DEBUG', COMMAND IN PU_CMD
001A2C 3C38603A         MANOPFET  MOVE.W  PU_CMD,D6           GET COMMAND
001A30 0C060022                   CMPI.B  #$22,D6             IS IT A VALID COMMAND ?
001A34 6302                       BLS.S   MANOPOK             BR IF 22 OR LESS, VALID COMMAND
```

```
001A36 7C00                     MOVEQ   #$00,D6          MAKE IT A NO_CMD, INVALID
001A38 42786022       MANOPOK   CLR.W   MANOP_CB+2       INITIALIZE MANOP RTN CODE TO 0000
001A3C 45F81A46                 LEA     MANOPTAB,A2
001A40 34726000                 MOVEA.W 0(A2,D6),A2      GO TO APPROPRIATE ROUTINE
001A44 4ED2                     JMP     (A2)
                      *
       00001A46       MANOPTAB  EQU     *
001A46 1BEC                     DC      NO_CMD           X'00' - NO COMMAND
001A48 25B0                     DC      MO_RESET         X'02' - PROGRAM RESET
001A4A 25B0                     DC      MO_RESET         X'04' - CLEAR RESET
001A4C 1DC4                     DC      ISTEP            X'06' - INSTRUCTION STEP ON
001A4E 1BE2                     DC      SET_EXT          X'08' - SET EXT INTERRUPT (INTR KEY)
001A50 1C44                     DC      ADDRCOMP         X'0A' - ADDRESS COMPARE SETUP
001A52 1C74                     DC      ADRCMPOFF        X'0C' - ADDRESS COMPARE OFF
001A54 1CCE                     DC      DISP_PAT         X'0E' - DISPLAY PAT BYTE
001A56 1D1A                     DC      ALT_PAT          X'10' - ALTER PAT BYTE
001A58 1DBC                     DC      START_PU         X'12' - START PU
001A5A 1D86                     DC      STOP_PU          X'14' - STOP PU
001A5C 1C80                     DC      TRAN_VA          X'16' - TRANSLATE VIRTUAL ADDRESS
001A5E 25B0                     DC      IPL              X'18' - IPL  (SIO)
001A60 2F28                     DC      SET_ATTN         X'1A' - SET ATTN INTERRUPT (01F)
001A62 1BEC                     DC      NO_CMD           X'1C' -
001A64 1BEC                     DC      NO_CMD           X'1E' -
001A66 1BF4                     DC      NOOP             X'20' - DIAGNOSTIC NOOP
001A68 1612                     DC      FP_DIAG          X'22' - PU HARDWARE DIAGNOSTIC
                      * * * * * * * * * * * * * * * * * * * * * * * * * * * * * * * * * * *
                      *                                                                   *
                      *       MACHINE CHECK INTERRUPTS                                    *
                      *                                                                   *
                      *           D2 HAS MACHINE CHECK CODE                               *
                      *                                                                   *
                      *    1.  FLOATING-POINT, GENERAL, AND CONTROL REGISTERS ARE STORED  *
                      *        IN THEIR RESPECTIVE LOCATIONS                              *
                      *    2.  THE CPU TIMER AND CLOCK COMPARATOR ARE NOT STORED, AND ARE *
                      *        MARKED AS INVALID IN THE MACHINE-CHECK INTERRUPTION CODE.  *
                      *    3.  THE FAILING STORAGE ADDRESS IS STORED                      *
                      *    4.  THE MACHINE-CHECK INTERRUPTION CODE IS STORED              *
                      *    5.  CURRENT PSW IS STORED IN MACHINE CHECK OLD PSW LOCATION    *
                      *    6.  THE MACHINE-CHECK NEW PSW IS LOADED, AND PROCESSING CONTINUES*
                      *                                                                   *
                      *        IF MACHINE CHECKS ARE NOT ENABLED IN THE CURRENT PSW,      *
                      *        GO TO HARDSTOP.  D2 IS PUT INTO REFCODE.                   *
                      *                                                                   *
                      *        THE INSTRUCTION MUST BE NULLIFIED FOR RECOVERY TO BE       *
                      *        POSSIBLE.                                                  *
                      *                                                                   *
                      * * * * * * * * * * * * * * * * * * * * * * * * * * * * * * * * * * *
                      *
001A6A 343C3050       MC_3050   MOVE.W  #$3050,D2        SET ERRONEOUS TIMER REQUEST ERROR
001A6E 6022                     BRA.S   MACH_CHK
001A70 343C3012       MC_3012   MOVE.W  #$3012,D2        SET SPURIOUS IPL2 ERROR
001A74 601C                     BRA.S   MACH_CHK
001A76 343C3011       MC_3011   MOVE.W  #$3011,D2        SET SPURIOUS IPL0 ERROR
001A7A 6016                     BRA.S   MACH_CHK
001A7C 343C3040       MC_3040   MOVE.W  #$3040,D2        SET SPURIOUS CORNROW INTERRUPT
001A80 6010                     BRA.S   MACH_CHK
001A82 343C3010       MC_3010   MOVE.W  #$3010,D2        SPURIOUS A-ENGINE DETECTED INTERRUPT
001A86 600A                     BRA.S   MACH_CHK
001A88 343CA600       MC_A600   MOVE.W  #$A600,D2        A-ENGINE DETECTED MACHINE CHECK
001A8C 6004                     BRA.S   MACH_CHK
                      *
                      *
001A8E 343C0016       MC_0016   MOVE.W  #PAR_CHK,D2      MICROCODE DETECTED PAT PARITY
                      *   THIS ERROR IS DETECTED WHEN THE MICROCODE READS THE PAT, AND THE
                      *     HIGH ORDER BIT IS SET IN THE DATA.
                      *
       00001A92       MC_0015   EQU     *                BUS ERROR MACH CHK, D2 = 0015
       00001A92       MACH_CHK  EQU     *
001A92 4EB824B8                 JSR     FETCHPSW         GET PSW FROM PC AND PSR
001A96 31C2605C                 MOVE.W  D2,REFCODE       SAVE MACHINE CHECK CODE
001A9A 083800026031             BTST    PSW_MCK,PSW+1    SEE IF MACHINE CHECKS ARE MASKED ON
001AA0 6604                     BNE.S   MACH_A           OK IF BIT IS ON
001AA2 4EF81BB0                 JMP     CS_MCHK          OTHERWISE GO TO HARDSTOP
                      *
001AA6 7204           MACH_A    MOVEQ   #$04,D1          SET BY-PASS PAT BIT FOR NO TRANSLATE
001AA8 82386106                 OR.B    SAVE_CNTL,D1            TO ACCESS LOW STORE
001AAC 11C15FE1                 MOVE.B  D1,SYS_CNTL
                      *
```

```
001AB0 4EB83000                 JSR      FPRDISP          GET FLOATING-POINT REGS FROM CORNROW
001AB4 247C80000160             MOVEA.L  #AMC_FPR,A2
EN983024
001ABA 47F80180                 LEA      FPRSAVE,A3
001ABE 7607                     MOVEQ    #7,D3            COUNT OF 8
001AC0 24DB            MACH_B   MOVE.L   (A3)+,(A2)+      MOVE REGISTERS TO SAVE AREA
001AC2 51CBFFFC                 DBRA     D3,MACH_B
                       *
001AC6 4EB818A0                 JSR      GPRDISP          GET GENERAL PURPOSE REGISTERS
001ACA 47F80140                 LEA      GPRSAVE,A3
001ACE 760F                     MOVEQ    #$F,D3           COUNT OF 16
001AD0 24DB            MACH_C   MOVE.L   (A3)+,(A2)+      MOVE REGISTERS TO SAVE AREA
001AD2 51CBFFFC                 DBRA     D3,MACH_C
                       *
001AD6 47F80100                 LEA      CTRL_REG,A3      MOVE CONTROL REGISTERS
001ADA 760F                     MOVEQ    #$F,D3           COUNT OF 16
001ADC 24DB            MACH_D   MOVE.L   (A3)+,(A2)+      MOVE REGISTERS TO SAVE AREA
001ADE 51CBFFFC                 DBRA     D3,MACH_D
                       *
001AE2 247C800000F8             MOVEA.L  #AMC_FADR,A2
001AE8 24B86202                 MOVE.L   BECB_ADR,(A2)    STORE FAILING ADDRESS
001AEC 4212                     CLR.B    (A2)             CLEAR HIGH-ORDER BYTE
                       *
001AEE 95FC00000010             SUBA.L   #$10,A2          POINT TO INTR CODE ADDRESS
001AF4 0C420016                 CMPI.W   #PAR_CHK,D2      SEE IF IT'S PAT PARITY
001AF8 6628                     BNE.S    MACH_E
                       *
001AFA 24F81B42                 MOVE.L   PAT_MCIC,(A2)+   MOVE PAT ERROR INTERRUPT CODE
001AFE 24B81B46                 MOVE.L   PAT_MCIC+4,(A2)
001B02 26386034                 MOVE.L   PSW+4,D3
001B06 5583                     SUBQ.L   #2,D3            NULLIFY THE INSTRUCTION BY FINDING
001B08 3210                     MOVE.W   (A0),D1            THE BEGINNING USING THE ILC,
001B0A 6A0A                     BPL.S    MACH_D1              AND POINT THE PC BACK TO IT.
001B0C 5583                     SUBQ.L   #2,D3
001B0E 0801000E                 BTST     PSR_ILC1,D1
001B12 6702                     BEQ.S    MACH_D1
001B14 5583                     SUBQ.L   #2,D3
001B16 31C36036        MACH_D1  MOVE.W   D3,PSW+6         STORE PSW BACK, WITHOUT
001B1A 4843                     SWAP     D3                 DISTURBING BYTE 4
001B1C 11C36035                 MOVE.B   D3,PSW+5
001B20 6008                     BRA.S    MACH_F
                       *
001B22 24F81B4A        MACH_E   MOVE.L   MCIC,(A2)+       MOVE ERROR INTERRUPT CODE
001B26 24B81B4E                 MOVE.L   MCIC+4,(A2)
                       *
001B2A 247C80000030    MACH_F   MOVEA.L  #AMCHKOLD,A2     GET MAIN STORAGE ADDRESS FOR OLD PSW
001B30 287C80000070             MOVEA.L  #AMCHKNEW,A4     GET MAIN STORAGE ADDRESS FOR NEW PSW
001B36 24F86030                 MOVE.L   PSW,(A2)+        STORE CURRENT PSW AS OLD
001B3A 24B86034                 MOVE.L   PSW+4,(A2)
                       *
001B3E 4EF81F0A                 JMP      IENDINT          GO TO LOAD PSW AND END
                       *
                       *
001B42 40022F9C        PAT_MCIC DC.L     $40022F9C
001B46 00000000                 DC.L     $00000000
001B4A 80000000        MCIC     DC.L     $80000000        SYSTEM DAMAGE
001B4E 00000000                 DC.L     $00000000
EN983024
                                PAGE
001B52 31FC3030605C    CS_3030  MOVE.W   #$3030,REFCODE   INVALID A-ENGINE OP
001B58 6056                     BRA.S    HARDSTOP
                       *
001B5A 31FC5010605C    CS_5010  MOVE.W   #$5010,REFCODE   UNEXPECTED BRANCH TO ZERO
001B60 604E                     BRA.S    HARDSTOP
                       *
001B62 31FC000C605C    CS_000C  MOVE.W   #$000C,REFCODE   E-ENGINE ADDRESS ERROR
001B68 6046                     BRA.S    HARDSTOP
                       *
001B6A 31FC0010605C    CS_0010  MOVE.W   #$0010,REFCODE   E-ENGINE ILLEGAL INSTRUCTION
001B70 603E                     BRA.S    HARDSTOP
                       *
001B72 31FC0014605C    CS_0014  MOVE.W   #$0014,REFCODE   E-ENGINE DIVIDE BY ZERO ERROR
001B78 6036                     BRA.S    HARDSTOP
                       *
001B7A 31FC0018605C    CS_0018  MOVE.W   #$0018,REFCODE   E-ENGINE CHK INSTRUCTION
001B80 602E                     BRA.S    HARDSTOP
                       *
```

```
001B82 31FC001C605C CS_001C  MOVE.W  #$001C,REFCODE      E-ENGINE TRAPV INSTRUCTION
001B88 6026                  BRA.S   HARDSTOP
                    *
001B8A 31FC0020605C CS_0020  MOVE.W  #$0020,REFCODE      E-ENGINE PRIVILEGED INSTRUCTION
001B90 601E                  BRA.S   HARDSTOP
                    *
001B92 31FC0024605C CS_0024  MOVE.W  #$0024,REFCODE      E-ENGINE TRACE
001B98 6016                  BRA.S   HARDSTOP
                    *
001B9A 31FC0028605C CS_0028  MOVE.W  #$0028,REFCODE      UNIMPLEMENTED AXXX INSTRUCTION
001BA0 600E                  BRA.S   HARDSTOP
                    *
001BA2 31FC002C605C CS_002C  MOVE.W  #$002C,REFCODE      UNIMPLEMENTED FXXX INSTRUCTION
001BA8 6006                  BRA.S   HARDSTOP
                    *
001BAA 31FC0030605C CS_0030  MOVE.W  #$0030,REFCODE      UNEXPECTED E-ENGINE INTERRUPT
                    *
       00001BB0     CS_MCHK  EQU     *                   FROM MACHINE CHECK
001BB0 08F800026038 HARDSTOP BSET    PST_ERR,PUSTAT      SET 'HARDSTOP'
001BB6 4EF81D80              JMP     STOP_PUA            GO TO ASYNCHRONOUS PU STOP
                    *
001BBA 31FC4010605C CS_4010  MOVE.W  #$4010,REFCODE      UNRECOVERABLE BUS ERROR
001BC0 60EE                  BRA.S   HARDSTOP
                    *
001BC2 31FC4020605C CS_4020  MOVE.W  #$4020,REFCODE      BUS ERROR DURING EXCEPTION HANDLING
001BC8 60E6                  BRA.S   HARDSTOP
                    *
001BCA 31FCDEAF605C CS_DEAF  MOVE.W  #$DEAF,REFCODE      PC RESPONSE TIME-OUT, MANOPS
001BD0 60DE                  BRA.S   HARDSTOP
                    *
001BD2 31FC3020605C CS_3020  MOVE.W  #$3020,REFCODE      NEW PSW FORMAT ERROR
001BD8 60D6                  BRA.S   HARDSTOP
                    *
001BDA 31FC1005605C CS_1005  MOVE.W  #$1005,REFCODE      370 STORAGE ERROR DURING CLR RESET
001BE0 60CE                  BRA.S   HARDSTOP
                    * * * * * * * * * * * * * * * * * * * * * * * * * * * * * * * * * * *
                    *
                    *        MANOPS SUBROUTINES                                          *
                    *                                                                    *
                    * * * * * * * * * * * * * * * * * * * * * * * * * * * * * * * * * * *
                    *
                    *
                    *        INTERRUPT KEY MAY BE SET FROM PC MANOPS
                    *
001BE2 08F800066103 SET_EXT  BSET    INTKEY,EXT_INT_PND+1  SET INTERRUPT PENDING
001BE8 4EF81E36              JMP     INTR_PCR            GO SET PC INTERRUPT, THEN CONTINUE
                    *                                      NORMAL OPERATION
                    *
001BEC 52786022     NO_CMD   ADDQ.W  #1,MANOP_CB+2       SET 'INV REQST' RETURN CODE 0001
001BF0 4EF81E36              JMP     INTR_PCR            GO BACK TO PC
                    *
                    *
001BF4 11FC00FD5F90 NOOP     MOVE.B  #PC_RESET,INTR_REG  RESET INTERRUPT FROM PC
001BFA 343C03E8              MOVE.W  #1000,D2
001BFE 32385F90     NOOP1    MOVE.W  CC_INT_REG,D1       WAIT TIL INTERFACE IS FREE
001C02 6A08                  BPL.S   NOOP2               BRANCH IF OK TO SET INTERRUPT
001C04 51CAFFF8              DBRA    D2,NOOP1            TIME OUT IN CASE WE CAN'T GET THROUGH
001C08 4EF81BCA              JMP     CS_DEAF
                    *
001C0C 21F860B86054 NOOP2    MOVE.L  MAN_CBADR,PCIB_OUT  POINT TO MANOP PCIB
001C12 11FC007F5F90          MOVE.B  #INT_8088,INTR_REG  SET INTERRUPT TO PC
001C18 4A386054     NOOPWAIT TST.B   PCIB_OUT            CHECK IF PC HAS SET CC
001C1C 67FA                  BEQ.S   NOOPWAIT
001C1E 42386054              CLR.B   PCIB_OUT            CLEAR BYTE AGAIN
                    *
001C22 4EF81E2A              JMP     STOP_LP             GO TO INTERRUPT HANDLER
                    *
       00001C26     UN_ADSTOP EQU    *
001C26 243860D8              MOVE.L  ADS_ADDR,D2         GET COMPARE ADDRESS
001C2A 6716                  BEQ.S   UN1                 IF ZERO, NO COMPARE ACTIVE
                    *
001C2C 7204         UN_ADSTX MOVEQ   #$04,D1
001C2E 82386106              OR.B    SAVE_CNTL,D1        SET BY-PASS PAT BIT FOR NO TRANSLATE
001C32 11C15FE1              MOVE.B  D1,SYS_CNTL           TO ACCESS LOW STORE
001C36 2442                  MOVE.L  D2,A2
001C38 34B860D6              MOVE.W  ADS_INSTR,(A2)      PUT INSTRUCTION HALFWORD BACK
001C3C 11F861065FE1          MOVE.B  SAVE_CNTL,SYS_CNTL  RESTORE TRANSLATE BIT FOR EXECUTION
                    *                                      OF THIS INSTRUCTION
```

```
001C42 4E75            UN1       RTS
001C44 24690008        ADDRCOMP  MOVE.L   ADDR1(A1),A2
001C48 B5FC00058000              CMPA.L   #MAIN_STR,A2     MAKE SURE IT'S IN MAIN-STORE RANGE
001C4E 6A000076                  BPL      SET_RC02         IF NOT, SET RETURN CODE OF X'02'
001C52 7204                      MOVEQ    #$04,D1          SET BY-PASS PAT BIT FOR NO TRANSLATE
001C54 82386106                  OR.B     SAVE_CNTL,D1           TO ACCESS LOW STORE
001C58 11C15FE1                  MOVE.B   D1,SYS_CNTL
001C5C D5FC80000000              ADDA.L   #MS_ACC,A2
001C62 21CA60D8                  MOVE.L   A2,ADS_ADDR      SAVE ADDRESS
001C66 31D260D6                  MOVE.W   (A2),ADS_INSTR   GET INSTRUCTION
001C6A 11F861065FE1              MOVE.B   SAVE_CNTL,SYS_CNTL  RESTORE TRANSLATE BIT
001C70 4EF81E36                  JMP      INTR_PCR         GO BACK TO PC
                       *
                       *
                       *
001C74 42B860D8        ADRCMPOFF CLR.L    ADS_ADDR
001C78 427860D6                  CLR.W    ADS_INSTR
001C7C 4EF81E36                  JMP      INTR_PCR         GO BACK TO PC
                       *
                       *
                       *
       00001C80        TRAN_VA   EQU      *
001C80 22386028                  MOVE.L   ADDRESS1,D1      GET ADDRESS FROM PCIB
001C84 3401                      MOVE.W   D1,D2
001C86 0C8100400000              CMPI.L   #VIRT_STR,D1     MAKE SURE IT'S IN 4-MEG RANGE
001C8C 6A38                      BPL.S    SET_RC02         IF NOT, SET RETURN CODE OF X'02'
                       *
001C8E 7608                      MOVEQ    #$08,D3          SET PAT_MOD BIT = 1 TO ALLOW
001C90 86386106                  OR.B     SAVE_CNTL,D3         PAT ACCESS
001C94 11C35FE1                  MOVE.B   D3,SYS_CNTL
                       *
001C98 028100FFF000              ANDI.L   #$00FFF000,D1    ENSURE EXTRA BITS ARE OFF
001C9E 08C10017                  BSET     #$17,D1          TURN ON BIT 23, PAT ACCESS
001CA2 2241                      MOVEA.L  D1,A1
001CA4 7200                      MOVEQ    #$00,D1
001CA6 3211                      MOVE.W   (A1),D1          GET PAT ENTRY
001CA8 0801000A                  BTST     PF_BIT,D1        IF THE PAGE IS INVALID,
001CAC 6618                      BNE.S    SET_RC02           SET RETURN CODE X'02'
001CAE 0241007F                  ANDI.W   #$007F,D1
001CB2 E149                      LSL.W    8,D1             ALIGN ADDRESS PROPERLY
001CB4 E989                      LSL.L    4,D1             ALIGN ADDRESS PROPERLY
001CB6 028200000FFF              ANDI.L   #$00000FFF,D2    ISOLATE DISPLACEMENT
001CBC D282                      ADD.L    D2,D1
001CBE 21C1602C                  MOVE.L   D1,ADDRESS2      PUT ADDRESS BACK INTO PCIB
001CC2 4EF81E36                  JMP      INTR_PCR         GO BACK TO PC
                       *
                       *
001CC6 54786022        SET_RC02  ADDQ.W   #2,MANOP_CB+2    SET 'INV ADDR' RETURN CODE 0002
001CCA 4EF81E36                  JMP      INTR_PCR         GO BACK TO PC
001CCE 22386028        DISP_PAT  MOVE.L   ADDRESS1,D1      GET ADDRESS FROM PCIB
001CD2 0C8100400000              CMPI.L   #VIRT_STR,D1     MAKE SURE IT'S IN 4-K RANGE
001CD8 6AEC                      BPL.S    SET_RC02         IF NOT, SET RETURN CODE OF X'02'
                       *
001CDA 028100FFF000              ANDI.L   #$00FFF000,D1    ENSURE EXTRA BITS ARE OFF
001CE0 08C10017                  BSET     #$17,D1          TURN ON BIT 23, PAT ACCESS
001CE4 2241                      MOVEA.L  D1,A1
001CE6 45F86108                  LEA      PAT_BUFF,A2      ADDRESS TO STORE PAT ENTRIES
001CEA 21CA602C                  MOVE.L   A2,ADDRESS2      PUT ADDRESS INTO PCIB
001CEE 243C00001000              MOVE.L   #$00001000,D2    ADDRESS INCREMENT FOR NEXT ENTRY
001CF4 760B                      MOVEQ    #$0B,D3          ONLY GET 12 ENTRIES AT A TIME
001CF6 3A3C8F7F                  MOVE.W   #$8F7F,D5
001CFA 7808                      MOVEQ    #$08,D4          SET PAT_MOD BIT = 1 TO ALLOW
001CFC 88386106                  OR.B     SAVE_CNTL,D4         PAT ACCESS
001D00 11C45FE1                  MOVE.B   D4,SYS_CNTL
                       *
001D04 3211            DIS_LOOP  MOVE.W   (A1),D1          GET PAT ENTRY
001D06 C245                      AND.W    D5,D1            TURN OFF UNPREDICTABLE BITS
001D08 34C1                      MOVE.W   D1,(A2)+         PUT PAT ENTRY INTO BUFFER
001D0A D3C2                      ADDA.L   D2,A1            POINT TO NEXT ONE
001D0C 51CBFFF6                  DBRA     D3,DIS_LOOP
                       *
001D10 11F861065FE1              MOVE.B   SAVE_CNTL,SYS_CNTL
001D16 4EF81E36                  JMP      INTR_PCR
                       *
001D1A 22386028        ALT_PAT   MOVE.L   ADDRESS1,D1      GET ADDRESS FROM PCIB
001D1E 0C8100400000              CMPI.L   #VIRT_STR,D1     MAKE SURE IT'S IN 4-K RANGE
001D24 6AA0                      BPL.S    SET_RC02         IF NOT, SET RETURN CODE OF X'02'
```

```
                    *
001D26 028100FFF000           ANDI.L  #$00FFF000,D1     ENSURE EXTRA BITS ARE OFF
001D2C 08C10017               BSET    #$17,D1           TURN ON BIT 23, PAT ACCESS
001D30 2241                   MOVEA.L D1,A1
001D32 45F86108               LEA     PAT_BUFF,A2       GET BUFFER ADDRESS
001D36 243C00001000           MOVE.L  #$00001000,D2     ADDRESS INCREMENT FOR NEXT ENTRY
001D3C 760B                   MOVEQ   #$0B,D3           ONLY 12 ENTRIES AT A TIME
001D3E 7808                   MOVEQ   #$08,D4           SET PAT_MOD BIT = 1 TO ALLOW
001D40 88386106               OR.B    SAVE_CNTL,D4          PAT ACCESS
001D44 11C45FE1               MOVE.B  D4,SYS_CNTL
001D48 323C0800               MOVE.W  #$0800,D1         SET 'REAL OUT-BOUND' SAVE MASK
                    *
001D4C 3A1A         ALT_LOOP  MOVE.W  (A2)+,D5          GET NEW PAT ENTRY
001D4E 3C11                   MOVE.W  (A1),D6           GET OLD PAT ENTRY 'REAL OUT-BND' BIT
001D50 CC41                   AND.W   D1,D6
001D52 8A46                   OR.W    D6,D5             PUT IT WITH NEW PAT ENTRY
001D54 3285                   MOVE.W  D5,(A1)           STORE IT
001D56 D3C2                   ADDA.L  D2,A1             POINT TO NEXT ONE
001D58 51CBFFF2               DBRA    D3,ALT_LOOP
                    *
001D5C 11F861065FE1           MOVE.B  SAVE_CNTL,SYS_CNTL
001D62 4EF81E36               JMP     INTR_PCR
                    * * * * * * * * * * * * * * * * * * * * * * * * * * * * * * * * * * *
                    *                                                                   *
                    *         STOP PU - WILL COME HERE ON  'STOP PU' INTERRUPT ...      *
                    *                   NEED TO GET GPRS FROM A-ENGINE, UPDATE PSW,     *
                    *                   THEN SET BIT IN 'PUSTAT' AND WAIT FOR START PU  *
                    *                   REQUEST.                                        *
                    *         START PU - THIS ROUTINE WILL LOAD THE GPRS TO THE A--ENGINE, *
                    *                   LOAD THE NEW PSW, AND CONTINUE RUNNING.         *
                    *                                                                   *
                    * * * * * * * * * * * * * * * * * * * * * * * * * * * * * * * * * * *
                    *
                    *
       00001D66     ADSTOP    EQU     *                 COME HERE ON 'B20E' INSTRUCTIONS
001D66 243860D8               MOVE.L  ADS_ADDR,D2       GET COMPARE ADDRESS
001D6A 670005F0               BEQ     OPEXCP1           IF ZERO, NO ADSTOP ACTIVE, OP EXCPT
001D6E 59B86002               SUBQ.L  #4,PC             DECREMENT PC TO POINT TO BEGINNING
                    *                                     OF B2 INSTRUCTION;
001D72 4EB81C2C               JSR     UN_ADSTX          PUT ORIGINAL INSTRUCTION BACK
001D76 08F800046038           BSET    #PST_ADST,PUSTAT  SET ADSTOP FLAG
001D7C 4EF81E88               JMP     IENDTRON          GO TO IEND TO EXECUTE TARGET INST
                    *
                    *
001D80 11FC00016021 STOP_PUA  MOVE.B  #$01,MANOP_CB+1   SET 'ASYNCHRONOUS INTERRUPT' FLAG
                    *
       00001D86     STOP_PU   EQU     *
001D86 08B800046001           BCLR    #PSR_TRACE,PSR+1  TURN OFF TRACE BIT
001D8C 48F8FFFF6800           MOVEM.L D0-A7,M68_SAVE    SAVE 68000 REGISTERS (E-ENGINE)
001D92 4EB824B8               JSR     FETCHPSW          UPDATE CURRENT PSW
001D96 4EB83000               JSR     FPRDISP           GET FPRS FROM THE CORNROW
001D9A 4EB818A0               JSR     GPRDISP           GET GPRS FROM A-ENGINE
001D9E 4EB81C26               JSR     UN_ADSTOP         TAKE OUT ADSTOPS
                    *
                    *         RESET PER IF IT IS ACTIVE
                    *
001DA2 4A7860EA               TST.W   PERFLAG           PER - IF PER IS ACTIVE, TURN IT OFF
001DA6 6704                   BEQ.S   STOP_PU1          PER -
001DA8 4EB82308               JSR     PER_STOP          PER -
                    *
001DAC 08F800026106 STOP_PU1  BSET    BYP_PAT,SAVE_CNTL TURN OFF TRANS FLAG IN SHADOW BYTE
001DB2 11F861065FE1           MOVE.B  SAVE_CNTL,SYS_CNTL  SET THE SYS CONTROL REG
                    *
                    *-------------------------------------------------------------------
001DB8 4EF82F10               JMP     AD_CALL           TEST FOR A/D REQUEST FROM DEBUG CARD
                    *
                    *         IF NO DEBUG CARD, RETURN TO 'STOP_LP'
                    *-------------------------------------------------------------------
                    * * * * * * * * * * * * * * * * * * * * * * * * * * * * * * * * * * *
                    *                                                                   *
                    *         START PU ROUTINE -                                        *
                    *                                                                   *
                    * * * * * * * * * * * * * * * * * * * * * * * * * * * * * * * * * * *
                    *
001DBC 08B800066038 START_PU  BCLR    PST_ISTEP,PUSTAT  RESET I-STEP
001DC2 6012                   BRA.S   START_P1
                    *
```

```
                        *
001DC4 08F8000760E9 ISTEP    BSET    #7,EXECFLAG+1      TURN ON ISTEP AND START FLAG
001DCA 08F800066038          BSET    PST_ISTEP,PUSTAT
001DD0 31F8602A6146          MOVE.W  ADDRESS1+2,I_COUNT  SAVE INSTRUCTION COUNT
                        *
001DD6 083800026038 START_P1 BTST    PST_ERR,PUSTAT     IS CHECK-STOP STILL ON
001DDC 6658                  BNE.S   INTR_PCR           BR IF YES, GIVE INTERRUPT BACK TO PC
001DDE 4EB81890              JSR     GPRALTER           RESTORE GPRS IN CASE THEY CHANGED
001DE2 4EB83058              JSR     FPRALTER           RESTORE FPRS IN CASE THEY CHANGED
001DE6 11FC00FD5F90          MOVE.B  #PC_RESET,INTR_REG  RESET PC INTERRUPT
                        *
001DEC 0238006F6038          ANDI.B  #$6F,PUSTAT         RESET STOPPED AND ADR COMP BITS
001DF2 21F860B86054          MOVE.L  MAN_CBADR,PCIB_OUT  POINT TO MANOP PCIB
001DF8 11FC007F5F90          MOVE.B  #INT_8088,INTR_REG  SET INTERRUPT TO PC
001DFE 4A385F90     ST_LOOP  TST.B   CC_INT_REG         WAIT UNTIL PC SEES INTERRUPT
001E02 6BFA                  BMI.S   ST_LOOP             (IN CASE WE RETURN AGAIN TOO SOON)
                        *
                        *        SET UP ADDRESS COMPARE STOP
                        *
001E04 243860D8              MOVE.L  ADS_ADDR,D2        GET COMPARE ADDRESS
001E08 670A                  BEQ.S   ST_NOACS           BR IF IT IS ZERO
001E0A 2442                  MOVE.L  D2,A2
001E0C 31D260D6              MOVE.W  (A2),ADS_INSTR     SAVE INSTRUCTION
001E10 34BCB20E              MOVE.W  #$B20E,(A2)        PUT IN ADDRESS COMPARE OP CODE
                        *
001E14 2C386030     ST_NOACS MOVE.L  PSW,D6
001E18 4EB82514              JSR     PSW_LDST           VERIFY AND LOAD NEW PSW
                        *
001E1C 083800066030          BTST    #PSW_PER,PSW       PER - IS PER ACTIVE IN NEW PSW?
001E22 67000082              BEQ     IENDNPER           PER - IF NOT, ALL SET
001E26 4EF82014              JMP     PERSETUP           PER - GO SET UP PER
                        *
                        * * * * * * * * * * * * * * * * * * * * * * * * * * * * * * * * * * *
                        *                                                                   *
                        *        INTERRUPT PC ROUTINE - PRESENT INTERRUPT TO PC             *
                        *                                                                   *
                        * * * * * * * * * * * * * * * * * * * * * * * * * * * * * * * * * * *
                        *
001E2A 08F800076038 STOP_LP  BSET    PST_STOP,PUSTAT
001E30 4A386021              TST.B   MANOP_CB+1         IS THIS AN ASYNCHRONOUS INTR TO PC?
001E34 660C                  BNE.S   INTR_PC            YES, DON'T RESET PC INTERRUPT
001E36 11FC00FD5F90 INTR_PCR MOVE.B  #PC_RESET,INTR_REG  RESET PC INTERRUPT
001E3C 4A386048              TST.B   CONFIG             CHECK CONFIG BYTE FOR PC MANOPS
001E40 6A36                  BPL.S   WAIT_LP            IF REQUEST NOT FROM THERE, WAIT
001E42 32385F90     INTR_PC  MOVE.W  CC_INT_REG,D1
001E46 6BFA                  BMI.S   INTR_PC            WAIT UNTIL INTERRUPT MAY BE SET
                        *
001E48 21F860B86054          MOVE.L  MAN_CBADR,PCIB_OUT  POINT TO MANOP PCIB
001E4E 11FC007F5F90          MOVE.B  #INT_8088,INTR_REG  SET INTERRUPT TO PC
                        *
001E54 4A386038              TST.B   PUSTAT             ARE WE IN STOPPED STATE
001E58 6A4C                  BPL.S   IENDNPER           NO, CONTINUE RUNNING
001E5A 42386021              CLR.B   MANOP_CB+1         CLEAR ID
001E5E 083800026038          BTST    PST_ERR,PUSTAT     IS CHECK-STOP ON
001E64 6712                  BEQ.S   WAIT_LP            BR IF NO, BYPASS TERMINATION PCIB
001E66 32385F90     INTR_PC1 MOVE.W  CC_INT_REG,D1
001E6A 6BFA                  BMI.S   INTR_PC1           WAIT UNTIL INTERRUPT MAY BE SET
001E6C 21F861486054          MOVE.L  TRM_CBADR,PCIB_OUT  POINT TO TERMINATION PCIB
001E72 11FC007F5F90          MOVE.B  #INT_8088,INTR_REG  SET INTERRUPT TO PC
                        *
001E78 323CF9FF     WAIT_LP  MOVE.W  #$F9FF,D1          TEST INTERRUPT REGISTER FOR
001E7C 82785F90              OR.W    CC_INT_REG,D1           PC OR DEBUG REQUEST
001E80 4641                  NOT.W   D1
001E82 67F4                  BEQ.S   WAIT_LP            LOOP UNTIL REQUEST DETECTED
001E84 4EF81918              JMP     INTERPTA           GO TO HANDLE INTERRUPT
                        *
                        * * * * * * * * * * * * * * * * * * * * * * * * * * * * * * * * * * *
                        *                                                                   *
                        *        COMMON RETURN LOOP FOR INSTRUCTION END                     *
                        *                                                                   *
                        * * * * * * * * * * * * * * * * * * * * * * * * * * * * * * * * * * *
                        *
001E88 343CC0C0     IENDTRON MOVE.W  #$C0C0,D2          SET UP TO CLEAR TPEND ON RETURN
001E8C 08F800046001          BSET    PSR_TRACE,PSR+1    SET PSR TRACE FOR A-ENGINE RETURN
001E92 4EB80202              JSR     RETURNEX           GO TO RETURN, STACK ADDRESS FOR RTN
                        *
```

```
                     *        RETURN AFTER INSTRUCTION EXECUTION - ISTEP, ADSTOP, PER
                     *
001E96 08B800046001 IENDTSTP BCLR   PSR_TRACE,PSR+1    CLEAR PSR TRACE ON RETURN
001E9C 4A3860EA              TST.B  PERFLAG            PER - SHORT HIT, LONG ACTIVE ?
001EA0 6704                  BEQ.S  IENDNPER           PER - BR IF NO, BYPASS PER TEST
                     *
001EA2 4EB821AC              JSR    PERTST             PER - GO TO TEST FOR PER EVENT
                     *
001EA6 083800006030 IENDNPER BTST   PSW_EXT,PSW        IS EXTERNAL MASK ON?
001EAC 6704                  BEQ.S  IENDNEXT           BR IF NO
                     *
001EAE 4EB817DA              JSR    EX_INT             GO TO TEST FOR EXT INTERRUPT
                     *
001EB2 123860E2     IENDNEXT MOVE.B IOMASK,D1          GET SAVED IO MASK
001EB6 C2386104              AND.B  IO_INT_PND,D1      COMPARE WITH PENDING INTERRUPTS
001EBA 667A                  BNE.S  IENDIO             BR IF PENDING IO INTERRUPT
                     *
001EBC 4A386038     IENDNIO  TST.B  PUSTAT             ANY EXCEPTION IN PUSTAT ?
001EC0 660E                  BNE.S  IENDEXCP           BR IF YES, GO TO HANDLE
001EC2 4A3860EA              TST.B  PERFLAG            TEST FOR LONG PER
001EC6 66C0                  BNE.S  IENDTRON           BR IF YES, DO ANOTHER INST
001EC8 343CC0C0     IENDNTR  MOVE.W #$C0C0,D2          SET UP FOR A-ENGINE RETURN
001ECC 4EF80202              JMP    RETURNEX           GO TO A-ENGINE, RESET TPEND
                     *
001ED0 083800046038 IENDEXCP BTST   PST_ADST,PUSTAT   TEST IF RETURN FROM ADDR-COMP STOP
001ED6 6622                  BNE.S  IENDSTOP          BR IF YES, GO TO STOP
001ED8 083800056038          BTST   PST_WAIT,PUSTAT   IS WAIT STATE ON ?
001EDE 670C                  BEQ.S  IENDSTEP          BR IF NO, IT IS ISTEP
001EE0 083800066038          BTST   PST_ISTEP,PUSTAT  IS ISTEP ON ?
001EE6 6612                  BNE.S  IENDSTOP          BR IF YES, GO TO STOP
001EE8 4EF81E78              JMP    WAIT_LP           GO TO WAIT FOR PC/DEBUG INTERRUPT
                     *
001EEC 08B8000760E9 IENDSTEP BCLR   #7,EXECFLAG+1      CLEAR AND TEST START FLAG
001EF2 6694                  BNE.S  IENDTRON           BR IF IT WAS ON, DO ONE INST
                     *
001EF4 53786146              SUBQ.W #1,I_COUNT         DECREMENT ISTEP COUNT
001EF8 668E                  BNE.S  IENDTRON           BR IF NOT ZERO, DO ONE MORE INST
001EFA 4EF81D80     IENDSTOP JMP    STOP_PUA           GO TO ASYNCHRONOUS PU STOP
001EFE 083800066030 IENDLPSW BTST   PSW_PER,PSW        PER - IS PER ACTIVE IN NEW PSW
001F04 6712                  BEQ.S  IENDPOFF           PER - BR IF NO, BYPASS PER SETUP
                     *
001F06 4EF82014              JMP    PERSETUP           PER - GO TO SET UP PER
                     *
001F0A 4EB8250A     IENDINT  JSR    PSW_LOAD           LOAD PSW
                     *
001F0E 4A7860EA     IENDSVCA TST.W  PERFLAG            PER - WAS PER ACTIVE IN OLD PSW?
001F12 6704                  BEQ.S  IENDPOFF           PER - NO, OK
                     *
001F14 4EB82308              JSR    PER_STOP           PER - GO TURN PER OFF
                     *
001F18 08B800046001 IENDPOFF BCLR   PSR_TRACE,PSR+1    CLEAR PSR TRACE
001F1E 6786                  BEQ.S  IENDNPER           BR IF IT WAS OFF, BYPASS PER TEST
001F20 584F                  ADDQ.W #4,A7              ADJUST STACK TO REMOVE TR ADDR
001F22 6082                  BRA.S  IENDNPER           BYPASS PER TEST
                     *
001F24 4EB8250A     IENDSVC  JSR    PSW_LOAD           TEST AND LOAD PSW
001F28 4A3860EA              TST.B  PERFLAG            PER - SHORT HIT, LONG ACTIVE ?
001F2C 67E0                  BEQ.S  IENDSVCA           PER - BR IF NO, GO TO CORRECT STACK
001F2E 08F8000160EA          BSET   PSWSWAP,PERFLAG    PER - SET PSW SWAP FLAG
001F34 4E75                  RTS    *                  PER - GO TO 'IENDTSTP' FOR PER TEST
                     *
001F36 42386104     IENDIO   CLR.B  IO_INT_PND         CLEAR 'PENDING INTERRUPT'
                     *
                     *-------------------------------------------------------------------
001F3A 4EB82F20              JSR    INTTEST            TEST FOR SIO CODE IO INTERRUPT
                     *-------------------------------------------------------------------
                     *
                     *        RETURN FROM SIO CODE TEST - DIAGNOSE INTERRUPT OR NO SIO CODE
                     *
001F3E 32385F90     IO_UNSTK MOVE.W CC_INT_REG,D1
001F42 6BFA                  BMI.S  IO_UNSTK            WAIT UNTIL INTERRUPT MAY BE SET
001F44 21F860BC6054          MOVE.L MSK_CBADR,PCIB_OUT  POINT TO MASK CHANGE PCIB
001F4A 11FC00D0609C          MOVE.B #MASK_ALL,INT_MASK  ANY INTERRUPTS ARE ALLOWED
001F50 11FC007F5F90          MOVE.B #INT_8088,INTR_REG  SET INTERRUPT TO PC
                     *
001F56 083800015F90 IO_WAIT  BTST   PC_INTR,CC_INT_REG  WAIT FOR ANY PC INTERRUPT
001F5C 66F8                  BNE.S  IO_WAIT
```

```
                        *
001F5E 4EF81924                     JMP      INTFRPC              GO TO INTERRUPT HANDLER
                        * * * * * * * * * * * * * * * * * * * * * * * * * * * * * * * * * * * *
                        *                                                                     *
                        *           PURGE PAT SUBROUTINE                                      *
                        *                                                                     *
                        * * * * * * * * * * * * * * * * * * * * * * * * * * * * * * * * * * * *
                        *
       00001F62         PURGE       EQU      *
001F62 227C00800000                 MOVEA.L  #PAT,A1
001F68 323C0400                     MOVE.W   #$0400,D1            PAGE FAULT BIT
001F6C 243C00001000                 MOVE.L   #$00001000,D2        ADDRESS INCREMENT FOR NEXT ENTRY
001F72 7657                         MOVEQ    #$57,D3              LOAD COUNT FOR 352K 370 STORAGE
001F74 4A386049                     TST.B    CONFIG+1             TEST STORAGE CONFIGURATION
001F78 6702                         BEQ.S    PUR_352K             BR IF ZERO, 352K STORAGE
001F7A 7677                         MOVEQ    #$77,D3              LOAD COUNT FOR 480K 370 STORAGE
001F7C 3E3C03FE         PUR_352K    MOVE.W   #$3FE,D7             SET UP 'REAL OUT OF BOUNDS' COUNT
001F80 9E43                         SUB.W    D3,D7
001F82 7808                         MOVEQ    #$08,D4              SET PAT_MOD BIT = 1 TO ALLOW
001F84 88386106                     OR.B     SAVE_CNTL,D4             PAT ACCESS
001F88 11C45FE1                     MOVE.B   D4,SYS_CNTL
                        *
001F8C 3281             PUR_LOOP    MOVE.W   D1,(A1)              PURGE ENTRY
001F8E D3C2                         ADDA.L   D2,A1                POINT TO NEXT ONE
001F90 51CBFFFA                     DBRA     D3,PUR_LOOP          FIRST PURGE ALL PAGES IN REAL STORE
                        *
                        *
001F94 323C0C00                     MOVE.W   #$0C00,D1            SET 'REAL OUT OF BOUNDS' BIT
                        *                                           AND PAGE FAULT BIT
001F98 3281             PUR_LP2     MOVE.W   D1,(A1)              PURGE ENTRY
001F9A D3C2                         ADDA.L   D2,A1                POINT TO NEXT ONE
001F9C 51CFFFFA                     DBRA     D7,PUR_LP2           CONTINUE UNTIL ENTIRE PAT PURGED
                        *
001FA0 11F861065FE1                 MOVE.B   SAVE_CNTL,SYS_CNTL   RESTORE ORIGINAL SYS CONTROL REG
001FA6 4E75                         RTS
                        *
                        *
                        * * * * * * * * * * * * * * * * * * * * * * * * * * * * * * * * * * * *
                        *                                                                     *
                        *           DUMP PAT SUBROUTINE  -  FOR DEBUG PURPOSES                *
                        *              JUMP TO THIS SUBROUTINE FROM STOP PU ROUTINE           *
                        * * * * * * * * * * * * * * * * * * * * * * * * * * * * * * * * * * * *
                        *
       00001FA8         DUMP_PAT    EQU      *
001FA8 227C00800000                 MOVEA.L  #PAT,A1
001FAE 247C00005000                 MOVE.L   #$5000,A2            ADDRESS TO STORE PAT ENTRIES
001FB4 243C00001000                 MOVE.L   #$00001000,D2        ADDRESS INCREMENT FOR NEXT ENTRY
001FBA 363C03FF                     MOVE.W   #$3FF,D3
001FBE 7808                         MOVEQ    #$08,D4              SET PAT_MOD BIT = 1 TO ALLOW
001FC0 88386106                     OR.B     SAVE_CNTL,D4             PAT ACCESS
001FC4 11C45FE1                     MOVE.B   D4,SYS_CNTL
                        *
001FC8 34D1             DMP_LOOP    MOVE.W   (A1),(A2)+           GET PAT ENTRY
001FCA D3C2                         ADDA.L   D2,A1                POINT TO NEXT ONE
001FCC 51CBFFFA                     DBRA     D3,DMP_LOOP
                        *
001FD0 11F861065FE1                 MOVE.B   SAVE_CNTL,SYS_CNTL   RESTORE ORIGINAL SYS CONTROL REG


EN983024
001FD6 4E75                         RTS
                        *
                        * * * * * * * * * * * * * * * * * * * * * * * * * * * * * * * * * * * *
                        *                                                                     *
                        *           LOAD PAT SUBROUTINE  (VIRTUAL = REAL)                     *
                        *                                                                     *
                        * * * * * * * * * * * * * * * * * * * * * * * * * * * * * * * * * * * *
                        *
       00001FD8         LOADPAT     EQU      *
001FD8 227C00800000                 MOVEA.L  #PAT,A1
001FDE 7200                         MOVEQ    #$0000,D1            PAGE FAULT BIT
001FE0 243C00001000                 MOVE.L   #$00001000,D2        ADDRESS INCREMENT FOR NEXT ENTRY
001FE6 7657                         MOVEQ    #$57,D3              LOAD COUNT FOR REAL STORE SIZE
001FE8 7808                         MOVEQ    #$08,D4              SET PAT_MOD BIT = 1 TO ALLOW
001FEA 88386106                     OR.B     SAVE_CNTL,D4             PAT ACCESS
001FEE 11C45FE1                     MOVE.B   D4,SYS_CNTL
```

```
                         *
001FF2 3281              PAT_LOOP MOVE.W  D1,(A1)              PURGE ENTRY
001FF4 5241                       ADDQ.W  #1,D1
001FF6 D3C2                       ADDA.L  D2,A1                POINT TO NEXT ONE
001FF8 51CBFFF8                   DBRA    D3,PAT_LOOP          FIRST PURGE ALL PAGES IN REAL STORE
                         *
                         *
001FFC 363C03A7                   MOVE.W  #$3A7,D3             COUNT FOR REST OF ENTRIES
002000 323C0C00                   MOVE.W  #$0C00,D1            SET 'REAL OUT OF BOUNDS' BIT
                         *                                       AND PAGE FAULT BIT
002004 3281              PAT_LP2  MOVE.W  D1,(A1)              PURGE ENTRY
002006 D3C2                       ADDA.L  D2,A1                POINT TO NEXT ONE
002008 51CBFFFA                   DBRA    D3,PAT_LP2           CONTINUE UNTIL ENTIRE PAT PURGED
                         *
00200C 11F861065FE1               MOVE.B  SAVE_CNTL,SYS_CNTL  RESTORE ORIGINAL SYS CONTROL REG
002012 4E75                       RTS
                         *
                         * * * * * * * * * * * * * * * * * * * * * * * * * * * * * * * * * * *
                         *                                                                   *
                         *        ROUTINES TO MAKE THE PER ACTIVE OR INACTIVE -              *
                         *          CALLED FROM LPSW AND OTHER PSW SWAPS                     *
                         *                                                                   *
                         *                                                                   *
                         *        THERE ARE 2 KINDS OF PER -                                 *
                         *           1)  SHORT I-FETCH:  ONLY ONE PARTICULAR INSTRUCTION     *
                         *               IS REQUESTED;  ROUTINE PUTS 'B20F' INTO FIRST       *
                         *               HALFWORD OF INSTRUCTION, DOES NOT SET TRACE, AND    *
                         *               DOES NOT SET 'PERFLAG'.  NORMAL EXECUTION CONTINUES. *
                         *                                                                   *
                         *           2)  'NORMAL' PER:  ANY EVENT MAY BE REQUESTED, AND      *
                         *                THE CPU IS I-STEPPED WITH A CHECK BETWEEN EACH     *
                         *                INSTRUCTION FOR AN EVENT.                          *
                         *                                                                   *
                         * * * * * * * * * * * * * * * * * * * * * * * * * * * * * * * * * * *
                         *
       00002014          PERSETUP EQU     *
002014 21F860026128               MOVE.L  PC,PER_OLDPC         SAVE INSTRUCTION COUNTER
00201A 11F860306131               MOVE.B  PSW,PER_XLAT         SAVE TRANSLATE BIT
                         *
002020 0C3800400124 PER_S1        CMPI.B  #$40,CREG9           TEST FOR IFETCH TRACE ONLY
002026 6662                       BNE.S   PER_S2               BR IF OTHER TRACE BITS ON
002028 083800026106               BTST    BYP_PAT,SAVE_CNTL IS TRANSLATE ON
00202E 664C                       BNE.S   PER_S3               IF NOT, BYPASS SETUP
002030 24380128                   MOVE.L  CREG10,D2
002034 B4B8012C                   CMP.L   CREG11,D2            IF CREG10 = CREG11, DO SHORT I-FETCH
002038 66000122                   BNE     PER_S5               BR IF LONG IFETCH RANGE
                         *
00203C 020200FE                   ANDI.B  #$FE,D2              MAKE THE ADDRESS EVEN
002040 2442                       MOVEA.L D2,A2                SAVE IT FOR LATER
002042 0282003FF000               ANDI.L  #$003FF000,D2        MASK FOR PAT PAGE ACCESS
002048 08C20017                   BSET    #$17,D2
00204C 2242                       MOVE.L  D2,A1
00204E 7808                       MOVEQ   #$08,D4              SET PAT_MOD BIT = 1 TO ALLOW
002050 88386106                   OR.B    SAVE_CNTL,D4             PAT ACCESS
002054 11C45FE1                   MOVE.B  D4,SYS_CNTL
                         *
002058 08110002                   BTST    #$2,(A1)             IS THE PAGE VALID ?
00205C 6622                       BNE.S   PER_S3A              BR IF INVALID
00205E 11F861065FE1               MOVE.B  SAVE_CNTL,SYS_CNTL  RESTORE NORMAL ACCESS
002064 D5FC80000000               ADDA.L  #MS_ACC,A2           MAKE IT A MS ADDRESS
00206A 21CA613E                   MOVE.L  A2,PER_ADRS          SAVE THE INSTRUCTION ADDRESSO
00206E 31D2613C                   MOVE.W  (A2),PER_INST        SAVE NEW INSTRUCTION HALFWORD
002072 34BCB20F                   MOVE.W  #$B20F,(A2)          REPLACE WITH CODED INSTRUCTION
002076 08F8000160EB               BSET    #PER_IFS,PERFLAG1    SET SHORT I-FETCH FLAG
00207C 4EF81F18          PER_S3   JMP     IENDPOFF             GO TO CLEAR STACK
                         *
002080 11F861065FE1 PER_S3A       MOVE.B  SAVE_CNTL,SYS_CNTL  RESTORE NORMAL ACCESS
002086 4EF81F18                   JMP     IENDPOFF             GO TO CLEAR STACK
                         *
00208A 16380124          PER_S2   MOVE.B  CREG9,D3             GET PER TRACE BITS
00208E EA0B                       LSR.B   5,D3
002090 643C                       BCC.S   PER_S4               BR IF GPR ALTERATION TRACE OFF
```

```
EN983024
002092 50C4                     ST       D4                  SET REGISTER BYTE TO FF
002094 12380126                 MOVE.B   CREG9+2,D1          CHECK IF HIGH ORDER BYTE HAS BIT ON
002098 6606                     BNE.S    SET2                BRANCH IF REGISTER NO. IS LESS THAN 8
00209A 5004                     ADDQ.B   #8,D4               CHANGE TO 07
00209C 12380127                 MOVE.B   CREG9+3,D1          IT MUST BE IN LOW ORDER BYTE
0020A0 7407           SET2      MOVEQ    #$7,D2
0020A2 5204           SET1      ADDQ.B   #1,D4               UPDATE THE REGISTER BYTE
0020A4 E309                     LSL.B    1,D1                CHECK IF THE CORRESPONDING BIT IS ON
0020A6 55CAFFFA                 DBCS     D2,SET1
0020AA 641C                     BCC.S    SET3                BR IF NO REGISTER BIT ON
0020AC E90C                     LSL.B    4,D4                MAKE IT A 4-BYTE GPR DISPACEMENT
0020AE 11C46130                 MOVE.B   D4,PER_GPRNO        SAVE GPR-NUMBER
0020B2 4EB8183C                 JSR      ST
0020B6 21F801A0612C             MOVE.L   GPR,PER_GPR         SAVE GPR CONTENTS
0020BC 083800026106             BTST     BYP_PAT,SAVE_CNTL   IS TRANSLATE ON
0020C2 6712                     BEQ.S    PER_S4A             BR IF YES, SET UP OTHER EVENTS
0020C4 4EF8215C                 JMP      PER_S5              BR TO END OF SETUP
                      *
0020C8 0038000160EA   SET3      ORI.B    #$01,PERFLAG        SET GPR BYPASS FLAG, NO GPR SPECIFIED
                      *
0020CE 083800026106   PER_S4    BTST     BYP_PAT,SAVE_CNTL   IS TRANSLATE ON
0020D4 66A6                     BNE.S    PER_S3              BR IF NO, BYPASS SETUP
0020D6 E20B           PER_S4A   LSR.B    1,D3
0020D8 64000082                 BCC      PER_S5              BR IF STORAGE ALTERATION TRACE OFF
0020DC 223C003FF000             MOVE.L   #$003FF000,D1       GET PAT ACCESS PAGE MASK
0020E2 2601                     MOVE.L   D1,D3
0020E4 C2B80128                 AND.L    CREG10,D1           GET THE STARTING ADDRESS PAGE
0020E8 C6B8012C                 AND.L    CREG11,D3           GET THE ENDING ADDRESS PAGE
0020EC 7808                     MOVEQ    #$08,D4             SET PAT_MOD BIT = 1 TO ALLOW
0020EE 88386106                 OR.B     SAVE_CNTL,D4            PAT ACCESS
0020F2 11C45FE1                 MOVE.B   D4,SYS_CNTL
0020F6 21F801286138             MOVE.L   CREG10,PER_ADDR     SAVE THE STARTING ADDRESS
0020FC B681                     CMP.L    D1,D3               ARE THE PAGES THE SAME ?
0020FE 6618                     BNE.S    PER_NE              BR IF NO
002100 08C10017                 BSET     #$17,D1             TURN ON BIT 23, PAT ACCESS
002104 2241                     MOVEA.L  D1,A1               GET PAT ADDRESS
002106 2638012C       PER_X8    MOVE.L   CREG11,D3           GET THE ENDING ADDRESS
00210A 08110002                 BTST     #$2,(A1)            IS THE PAGE VALID ?
00210E 6726                     BEQ.S    PER_X5              BR IF VALID
002110 31FC80006132             MOVE.W   #$8000,PER_COUNT    MAKE INVALID COUNT
002116 6026                     BRA.S    PER_X6              GO TO END
002118 08C10017       PER_NE    BSET     #$17,D1             SET BIT 23
00211C 2241                     MOVEA.L  D1,A1               GET 1ST PAGE PAT ADDRESS
00211E 08110002                 BTST     #$2,(A1)            IS THE PAGE VALID ?
002122 D2FC1000                 ADDA.W   #$1000,A1           GET 2ND PAGE PAT ADDRESS
002126 6706                     BEQ.S    PER_X7              BR IF 1ST PAGE VALID
002128 31C3613A                 MOVE.W   D3,PER_ADDR+2       SAVE THE START OF THE NEXT PAGE
00212C 60D8                     BRA.S    PER_X8              BR TO TEST THE 2ND PAGE
00212E 08110002       PER_X7    BTST     #$2,(A1)            IS THE PAGE VALID ?
002132 6702                     BEQ.S    PER_X5              BR IF BOTH VALID
002134 5383                     SUBQ.L   #1,D3               MAKE THE ENDING ADDRESS END OF PAGE
002136 9678613A       PER_X5    SUB.W    PER_ADDR+2,D3       GET COUNT (START ADDR - END ADDR)
00213A 31C36132                 MOVE.W   D3,PER_COUNT        STORE IT
00213E 11F861065FE1   PER_X6    MOVE.B   SAVE_CNTL,SYS_CNTL    TURN OFF PAT ACCESS BIT
002144 4A43                     TST.W    D3                  IS THERE ANYTHING TO SAVE FOR COMP
002146 6B14                     BMI.S    PER_S5              BR IF NO PAGES VALID
EN983024
002148 11FC00806138             MOVE.B   #$80,PER_ADDR       MAKE IT A MS ADDRESS
00214E 22786138                 MOVEA.L  PER_ADDR,A1
002152 45F86134                 LEA      PER_DATA,A2
002156 14D9           PER_X9    MOVE.B   (A1)+,(A2)+         SAVE ONE BYTE AT A TIME
002158 51C8FFFC                 DBRA     D3,PER_X9           BR UNTIL VALID BYTES GONE
                      *
                      *
00215C 0038004060EA   PER_S5    ORI.B    #$40,PERFLAG        SET PER FLAG
002162 08A800050001             BCLR     PSR_EBIT,1(A0)      CLEAR E-BIT FOR S/BRANCH
002168 4EF81F18                 JMP      IENDPOFF            GO TO CLEAR STACK
                      *-----------------------------------------------------------------
                      *         NOTE - PER CAN ALSO BE 'TURNED OFF' AFTER A PER EVENT IF
                      *         THE PROGRAM NEW PSW DOES NOT HAVE PER BIT SET.
                      *         CHECK AT LABEL 'PER_OFF'.
                      *-----------------------------------------------------------------
                      *
                      *
                      *
                      *
```

```
     0000216C     PER_ADST EQU    *                 COME HERE ON 'B20F' INSTRUCTIONS
00216C 4A3860EB            TST.B   PERFLAG+1         SHORT IF PER ACTIVE ?
002170 670001EA            BEQ     OPEXCP1           BR IF NO, REAL OP EXCEPTION
002174 2278613E            MOVEA.L PER_ADRS,A1       PUT ORIGINAL INSTRUCTION BACK
002178 32B8613C            MOVE.W  PER_INST,(A1)
00217C 08F8000360EA        BSET    #PER_SHRT,PERFLAG SET FLAG FOR PER TEST AT END
002182 4A3860E8            TST.B   EXECFLAG          WAS THIS TARGET OF EXECUTE
002186 6716                BEQ.S   PER_NOEX          BR IF NO, RE-ISSUE ORGINAL INSTRUCTIO
                  *
                  *        PER TRACE INSTRUCTION WAS TARGET OF EXECUTE, RE-ISSUE EXECUTE
                  *
002188 11F861065FE1        MOVE.B  SAVE_CNTL,SYS_CNTL  RESTORE ORIGINAL SYS CONTROL REG
00218E 423860E8            CLR.B   EXECFLAG          RESET EXECUTE FLAG
002192 31F860FC6000        MOVE.W  SAV_PSREX,PSR     RESTORE ORIGINAL PSR
002198 21F860EC6002        MOVE.L  SAV_PCEX,PC       RESTORE UPDATED PC
                  *
00219E 59886002   PER_NOEX SUBQ.L  #4,PC             DECREMENT PC TO POINT TO BEGINNING
                  *                                    OF RE-ISSUE INSTRUCTION
0021A2 21F860026128        MOVE.L  PC,PER_OLDPC      SAVE PC ADDRESS FOR PER PROG CHECK
0021A8 4EF81E88            JMP     IENDTRON          GO TO EXECUTE ONE INSTRUCTION

                  * * * * * * * * * * * * * * * * * * * * * * * * * * * * * * * * * * *
                  *                                                                   *
                  *       PROGRAM EVENT RECORDING                                     *
                  *                                                                   *
                  *       PER_OLDPC - USED FOR CHECKING RANGE                         *
                  *       PER_GPR   - USED FOR GPR ALTERATION CHECK                   *
                  *       PER_GPRNO - USED FOR GPR ALTERATION CHECK                   *
                  *       PER_DATA  - USED FOR STORAGE ALTERATION CHECK               *
                  *       PER_ADDR  - USED FOR STORAGE ALTERATION CHECK               *
                  *       PER_COUNT - USED FOR STORAGE ALTERATION CHECK               *
                  *       PER_XLAT  - USED FOR CHECKING IF TRANSLATE WAS ON           *
                  *                   AFTER A PSW SWAP                                *
                  *                                                                   *
                  *       D2 CONTAINS THE PROGRAM CHECK INTERRUPTION CODE IF          *
                  *         ENTRY IS FROM PROGRAM CHECK HANDLER                       *
                  *                                                                   *
                  * * * * * * * * * * * * * * * * * * * * * * * * * * * * * * * * * * *
                  *
     000021AC     PERTST   EQU     *
0021AC 083800005F90        BTST    FP_INTR,CC_INT_REG    FLOATING POINT INTERRUPT ?
0021B2 6606                BNE.S   PERTST1           BR IF NONE
                  *
0021B4 584F                ADDQ.W  #4,A7             REMOVE RETURN ADDRESS FROM STACK
0021B6 4EF818C8            JMP     FP_TEST           GO TO TEST CORNROW EXCEPTION
                  *
0021BA 4242       PERTST1  CLR.W   D2                ACCUMULATE PROGRAM CHECK CODE HERE
0021BC 4246       PERTSTX  CLR.W   D6
0021BE 08B8000360EA        BCLR    PER_SHRT,PERFLAG  CLEAR SHORT PER FLAG
0021C4 6708                BEQ.S   PERTGO            BR IF IT WAS OFF, TEST OTHER PERS
0021C6 00464000            ORI.W   #$4000,D6         SET PER INTERRUPT IN D6
0021CA 600000F0            BRA     PERTSHRT          GO TO PER EVENT INTERRUPT
0021CE 10380124   PERTGO   MOVE.B  CREG9,D0          GET PER EVENT MASK
                  *
                  *
                  *
     000021D2     PERTGRA  EQU     *          CHECKS FOR ALTERATION OF ONLY ONE REGISTER
0021D2 EA08                LSR.B   5,D0              CHECK FOR GENERAL REGISTER ALTERATION
0021D4 641E                BCC.S   PERTSTOR          BRANCH IF NOT ON
                  *
0021D6 0838000160EA        BTST    #$1,PERFLAG       WAS THERE ANY REGISTER SPECIFIED
0021DC 6616                BNE.S   PERTSTOR          BR IF NO, BYPASS GPR COMPARE
0021DE 18386130            MOVE.B  PER_GPRNO,D4      GET SAVED GPR NUMBER
0021E2 4EB8183C            JSR     ST
0021E6 223801A0            MOVE.L  GPR,D1
0021EA B2B8612C            CMP.L   PER_GPR,D1        COMPARE NEW VALUE TO OLD
0021EE 6704                BEQ.S   PERTSTOR          IF EQUAL, CONTINUE
                  *
0021F0 00461000   PERTSET4 ORI.W   #$1000,D6         SET PER INTERRUPT IN D2
                  *
                  *
                  *
0021F4 083800026030 PERTSTOR BTST  PSW_XLAT,PSW      IS TRANSLATE ON?
0021FA 661A                BNE.S   PERTSA            YES, OK
0021FC 0838000160EA        BTST    PSWSWAP,PERFLAG   DID WE JUST SWAP PSWS?
002202 673A                BEQ.S   PERTRANG          NO, THEN DON'T CHECK
```

```
EN983024
002204 083800026131           BTST     PSW_XLAT,PER_XLAT WAS PER ON IN OLD PSW?
00220A 6732                   BEQ.S    PERTRANG          NO, CAN'T HAVE EVENT
                    *
00220C 72FB                   MOVEQ    #$FB,D1           SET BYP_PAT BIT = 0 FOR TRANSLATE
00220E C2386106               AND.B    SAVE_CNTL,D1          OF MAIN STORAGE ADDRESSES
002212 11C15FE1               MOVE.B   D1,SYS_CNTL
                    *
002216 E208         PERTSA    LSR.B    1,D0              CHECK FOR STORAGE ALTERATION
002218 6424                   BCC.S    PERTRANG          BRANCH IF NOT ON
                    *
00221A 32386132               MOVE.W   PER_COUNT,D1      GET VARIABLE COUNT
00221E 6B1E                   BMI.S    PERTRANG          BR IF MINUS, NOTHING TO COMPARE
002220 22786138               MOVEA.L  PER_ADDR,A1       GET MAIN STORE ADDRESS
002224 45F86134               LEA      PER_DATA,A2       GET ADDRESS OF SAVED DATA
002228 B509         PERTSA1   CMPM.B   (A1)+,(A2)+       COMPARE ONE BYTE AT A TIME,
00222A 56C9FFFC               DBNE     D1,PERTSA1          UP TO FOUR BYTES
00222E 670E                   BEQ.S    PERTRANG
                    *
002230 00462000     PERTSET3  ORI.W    #$2000,D6         SET PER INTERRUPT IN D2
                    *
                    *         DATA CHANGED, SAVE IT FOR NEXT COMPARE
                    *
002234 32386132               MOVE.W   PER_COUNT,D1      GET VARIABLE COUNT
002238 1521         PERTSA2   MOVE.B   -(A1),-(A2)       MOVE ONE BYTE AT A TIME,
00223A 51C9FFFC               DBRA     D1,PERTSA2          UP TO FOUR BYTES
                    *
                    *
                    *
00223E 4A00         PERTRANG  TST.B    D0                SUCC BR OR IFETCH ?
002240 6776                   BEQ.S    PERTDONE          BR IF NO, BYPASS RANGE TEST
                    *
002242 22386128               MOVE.L   PER_OLDPC,D1      GET ADDRESS OF EXECUTED INSTRUCTION
002246 2241         PERTEXEC  MOVEA.L  D1,A1             SAVE IT FOR LATER TEST
002248 D3FC80000000           ADDA.L   #MS_ACC,A1        POINT TO MAIN STORE
00224E B2B8012C               CMP.L    CREG11,D1         CHECK UPPER BOUNDARY
002252 6E16                   BGT.S    PERTNHIT          IF IF INSTR GREATER, NO ADDRESS HIT
002254 92B80128               SUB.L    CREG10,D1         CHECK LOWER BOUNDARY
002258 6A1C                   BPL.S    PERTIF            IF INSTR EQUAL OR GREATER, ADDR HIT
00225A 263C000000C0           MOVE.L   #$C0,D3           GET CURRENT INST LENGTH CODE
002260 C6386000               AND.B    PSR,D3
002264 E71B                   ROL.B    3,D3              MAKE IT A BYTE COUNT
002266 D283                   ADD.L    D3,D1             IS ADDRESS WITHIN INST LENGTH ?
002268 6E0C                   BGT.S    PERTIF            BR IF PLUS, ADDRESS HIT
00226A 0C110044     PERTNHIT  CMP.B    #$44,(A1)         WAS THE INSTRUCTION AN EXECUTE ?
00226E 6648                   BNE.S    PERTDONE          NO, END OF TEST, EXECUTE WILL NOT BE
                    *                                        THE TARGET OF AN EXECUTE
002270 22386142               MOVE.L   PER_EXEC,D1       GET EXECUTE TARGET ADDRESS
002274 60D0                   BRA.S    PERTEXEC          GO TO TEST EXECUTE TARGET ADDRESS
                    *
                    *
                    *
002276 E208         PERTIF    LSR.B    1,D0              CHECK FOR INSTRUCTION FETCH
002278 6404                   BCC.S    PERTSBR           BRANCH IF NOT ON
                    *
00227A 00464000     PERTSET2  ORI.W    #$4000,D6         SET PER INTERRUPT IN D2
                    *
EN983024
                    *
                    *
00227E 4A00         PERTSBR   TST.B    D0                CHECK FOR SUCCESSFUL BRANCH
002280 6736                   BEQ.S    PERTDONE          BR IF NOT ON
                    *
002282 0838000160EA           BTST     PSWSWAP,PERFLAG   DID WE JUST SWAP PSWS?
002288 662E                   BNE.S    PERTDONE          YES, THEN DON'T TEST FOR BRANCH
                    *                                    HIT ADDRESS IN A1
00228A 3A3C0200               MOVE.W   #$200,D5          LOAD LENGTH OF OPTABLE, TO POINT TO
00228E 1A11                   MOVE.B   (A1),D5             BETABLE + INSTRUCTION DISPLACEMENT
002290 7603                   MOVEQ    #03,D3
002292 C6355000               AND.B    0(A5,D5),D3       CHECK FOR BRANCH INSTRUCTIONS
002296 6720                   BEQ.S    PERTDONE          NONE, PER DONE
002298 0C030002               CMPI.B   #02,D3            THIS BRANCH NEEDS SPECIAL CHECKING?
00229C 6B0E                   BMI.S    PERTSBR1          NO, CHECK 'SUCCESSFUL BRANCH LATCH'
                    *
00229E 0C050045               CMPI.B   #$45,D5           TEST FOR BAL INSTRUCTION
0022A2 6708                   BEQ.S    PERTSBR1          BR IF 'BAL', DONT TEST R2
```

```
                          *
0022A4 7A0F                     MOVEQ     #$0F,D5              COME HERE FOR BCTR OR BALR
0022A6 CA290001                 AND.B     1(A1),D5             FIND OUT IF R2 IS ZERO
0022AA 670C                     BEQ.S     PERTDONE             IF SO, NO SUCCESSFUL BRANCH
                          *
0022AC 082800050001 PERTSBR1 BTST       PSR_EBIT,1(A0)       WAS THIS A SUCCESSFUL BRANCH?
0022B2 6704                     BEQ.S     PERTDONE             NO, PER DONE
                          *
0022B4 00468000     PERTSET1 ORI.W      #$8000,D6            SET PER INTERRUPT IN D2
                          *
                          *
0022B8 4A46         PERTDONE TST.W      D6                   DO WE HAVE AN EVENT TO REPORT?
0022BA 6726                     BEQ.S     PERTRET
0022BC 584F         PERTSHRT ADDQ.W     #4,A7                REMOVE RETURN ADDRESS FROM STACK
                          *
                          *
                          *---------------------------------------------------------------
                          *       PER EVENT DETECTED;  TAKE PER PROGRAM CHECK
                          *---------------------------------------------------------------
0022BE 227C80000096             MOVEA.L   #APERCODE,A1         GET 370 LOW STORE ADDRESS
0022C4 7204                     MOVEQ     #$04,D1              SET BY-PASS PAT BIT FOR NO TRANSLATE
0022C6 82386106                 OR.B      SAVE_CNTL,D1               TO ACCESS LOW STORE
0022CA 11C15FE1                 MOVE.B    D1,SYS_CNTL
0022CE 32C6                     MOVE.W    D6,(A1)+             STORE PER INTERRUPTION CODE
0022D0 22B86128                 MOVE.L    PER_OLDPC,(A1)       STORE PER ADDRESS
0022D4 4211                     CLR.B     (A1)                 MAKE SURE HIGH ORDER BYTE IS ZERO
0022D6 00420080                 ORI.W     #$0080,D2            SET PER INTERRUPT CODE
0022DA 4EB824B8                 JSR       FETCHPSW             GET PSW FROM PC AND PSR
0022DE 4EF82438                 JMP       PROGCHKA             GO TAKE PROGRAM CHECK
                          *
                          *
0022E2 08A800050001 PERTRET  BCLR       PSR_EBIT,1(A0)       MAKE SURE E_BIT IS OFF FOR S/BRANCH
0022E8 21F860026128             MOVE.L    PC,PER_OLDPC         SAVE PC
0022EE 11F860306131             MOVE.B    PSW,PER_XLAT         SAVE TRANSLATE BIT
0022F4 21F801A0612C             MOVE.L    GPR,PER_GPR          SAVE GPR CONTENTS
                          *
0022FA 11F861065FE1             MOVE.B    SAVE_CNTL,SYS_CNTL  RESTORE TRANSLATE BIT
                          *
EN983024
002300 08B8000160EA             BCLR      #PSWSWAP,PERFLAG  WERE WE IN A PSW-SWAP INSTRUCTION?
002306 6730                     BEQ.S     PER_RTN              BR IF NO, RETURN
                          *
       00002308     PER_STOP EQU        *
002308 4A3860EB                 TST.B     PERFLAG+1            WAS IT SHORT I-FETCH?
00230C 6726                     BEQ.S     PER_CLR              BR IF NO
00230E 0838000360EA             BTST      #PER_SHRT,PERFLAG HAD INSTRUCTION BEEN REACHED?
002314 661E                     BNE.S     PER_CLR              BR IF YES, INSTR ALREADY REPLACED
002316 72FB                     MOVEQ     #$FB,D1              SET BYP_PAT BIT = 0 FOR TRANSLATE
002318 C2386106                 AND.B     SAVE_CNTL,D1             OF MAIN STORAGE ADDRESSES
00231C 11C15FE1                 MOVE.B    D1,SYS_CNTL
002320 2278613E                 MOVEA.L   PER_ADRS,A1          GET INSTRUCTION ADDRESS
002324 0C51B20F                 CMPI.W    #$B20F,(A1)          IS THE INSTRUCTION STILL 'B20F' ?
002328 6604                     BNE.S     PER_ST1              BR IF NO, BYPASS INSTRUCTION RESTORE
00232A 32B8613C                 MOVE.W    PER_INST,(A1)        RESTORE INSTRUCTION
00232E 11F861065FE1 PER_ST1     MOVE.B    SAVE_CNTL,SYS_CNTL   RESTORE ORIGINAL CONDITION
002334 427860EA     PER_CLR     CLR.W     PERFLAG              CLEAR PER FLAGS
002338 4E75         PER_RTN     RTS       *                    RETURN TO CALLER

00233A 21C26202     PAGE_FLT MOVE.L     D2,BECB_ADR          SAVE FAILING ADDRESS
00233E 7411                     MOVEQ     #$0011,D2            (THESE ERRORS ARE DETECTED BY THE
002340 607E                     BRA.S     BRPROG                 MICROCODE IN KEY OPS)
                          *
002342 21C36202     ADDR_ERR MOVE.L     D3,BECB_ADR          SAVE FAILING ADDRESS
002346 7405                     MOVEQ     #$0005,D2            (THESE ERRORS ARE DETECTED BY THE
002348 6076                     BRA.S     BRPROG                 MICROCODE IN MAD, MUN)
                          *
00234A 72C0         OPEXCP      MOVEQ     #$C0,D1
00234C C210                     AND.B     (A0),D1
00234E 6A0C                     BPL.S     OPEXCP1              PC OK IF ONLY ILC = 1
002350 54B86002                 ADDQ.L    #2,PC
002354 E309                     LSL.B     1,D1
002356 6A04                     BPL.S     OPEXCP1
002358 54B86002                 ADDQ.L    #2,PC
00235C 7401         OPEXCP1     MOVEQ     #$0001,D2            OPERATION EXCEPTION
00235E 6060                     BRA.S     BRPROG
                          *
                          *
```

```
002360 7402          PRIVEX    MOVEQ   #0002,D2           IF IN PROBLEM STATE, PRIVILEGED
002362 605C                    BRA.S   BRPROG               OPERATION EXCEPTION
                     *
                     *
002364 7403          EXECEX    MOVEQ   #0003,D2           LOAD EXECUTE EXCEPTION CODE
002366 6058                    BRA.S   BRPROG             RETURN WITH BAD CODE, PROGRAM CHECK
                     *
                     *
       00002368      ACCESSX1 EQU      *                  ACCESS EXCEPTION ON FIRST
002368 083800046001            BTST    PSR_TRACE,PSR+1      INSTRUCTION HALFWORD
00236E 671E                    BEQ.S   ACCX1              CHECK FOR PER OR I-STEP
002370 0878000060EB            BCHG    PERBUSER,PERFLAG1  SET/RESET BIT
002376 6616                    BNE.S   ACCX1              COME HERE EVERY OTHER TIME
002378 55B86002                SUBQ.L  #2,PC              CORRECT PROGRAM COUNTER
00237C 22386002                MOVE.L  PC,D1              TEST IF INSTRUCTION WAS EXECUTED
002380 B2B86128                CMP.L   PER_OLDPC,D1
002384 6704                    BEQ.S   PERBYPS            BYPASS PER TEST IF NO EXECUTION
002386 4EB821AC                JSR     PERTST             PER - CHECK FOR PER EVENT
00238A 4EF80200      PERBYPS   JMP     RETURN             RETURN TO A-ENGINE, GET ERROR AGAIN
                     *
00238E 0210003F      ACCX1     ANDI.B  #$3F,(A0)
002392 00100040                ORI.B   #$40,(A0)          SET ILC OF 1
002396 7201                    MOVEQ   #1,D1
002398 C2386005                AND.B   PC+3,D1            CHECK IF PC IS ODD
00239C 6620                    BNE.S   SPECEX             IF IT IS, SPECIFICATION EXCEPTION
00239E 4EF8151C                JMP     BUSERRA7
                     *
                     *
0023A2 72C0          SPECEXC   MOVEQ   #$C0,D1
0023A4 C210                    AND.B   (A0),D1
0023A6 6A16                    BPL.S   SPECEX             PC OK IF ONLY ILC = 1
0023A8 54B86002                ADDQ.L  #2,PC
0023AC E309                    LSL.B   1,D1
0023AE 6A0E                    BPL.S   SPECEX
0023B0 54B86002                ADDQ.L  #2,PC
0023B4 6008                    BRA.S   SPECEX
                     *
                     *
0023B6 0210003F      SPECEX2   ANDI.B  #$3F,(A0)
0023BA 00100080                ORI.B   #ILC2_MSK,(A0)     SET ILC2
0023BE 7406          SPECEX    MOVEQ   #0006,D2           SET SPECIFICATION EXCEPTION
0023C0 6062          BRPROG    BRA.S   PROGCHK
                     *
                     *
0023C2 7407          DATAEX    MOVEQ   #$0007,D2
0023C4 605E                    BRA.S   PROGCHK
0023C6 55B86002      FIXPTOVF  SUBQ.L  #2,PC              CORRECT PROGRAM COUNTER
0023CA 08100003                BTST    PSR_FIXP,(A0)
0023CE 674A                    BEQ.S   NOPROGCK
0023D0 7408                    MOVEQ   #$0008,D2
0023D2 6050                    BRA.S   PROGCHK
                     *
                     *
0023D4 7409          FIXPTDIV  MOVEQ   #$0009,D2
0023D6 604C                    BRA.S   PROGCHK
                     *
                     *
0023D8 55B86002      DECOVFX2  SUBQ.L  #2,PC              CORRECT PROGRAM COUNTER
0023DC 08100002      DECOVFEX  BTST    PSR_DEC,(A0)       TEST IF MASK FOR INTERRUPT IS ON
0023E0 6738                    BEQ.S   NOPROGCK           IF NOT, NO PROGRAM CHECK; CONTINUE
0023E2 740A                    MOVEQ   #$000A,D2
0023E4 603E                    BRA.S   PROGCHK
                     *
                     *
0023E6 740B          DECDIVEX  MOVEQ   #$000B,D2
0023E8 603A                    BRA.S   PROGCHK
                     *
                     *
0023EA 55B86002      EXPOVFX2  SUBQ.L  #2,PC              CORRECT PROGRAM COUNTER
0023EE 740C          EXPOVFEX  MOVEQ   #$000C,D2
0023F0 6032                    BRA.S   PROGCHK
                     *
                     *
0023F2 55B86002      EXPUNDX2  SUBQ.L  #2,PC              CORRECT PROGRAM COUNTER
0023F6 08100001      EXPUNDEX  BTST    PSR_EXPO,(A0)      TEST IF MASK FOR INTERRUPT IS ON
0023FA 671E                    BEQ.S   NOPROGCK           IF NOT, NO PROGRAM CHECK; CONTINUE
```

```
0023FC 740D                  MOVEQ   #$000D,D2
0023FE 6024                  BRA.S   PROGCHK
                   *
                   *
002400 55B86002    SIGNIFX2 SUBQ.L  #2,PC                CORRECT PROGRAM COUNTER
002404 08100000    SIGNIFEX BTST    PSR_SIG;(A0)
002408 6710                  BEQ.S   NOPROGCK
00240A 740E                  MOVEQ   #$000E,D2
00240C 6016                  BRA.S   PROGCHK
                   *
                   *
00240E 740F        FPDIVEX  MOVEQ   #$000F,D2
002410 6012                  BRA.S   PROGCHK
                   *
                   *
002412 7412        TRANSPEX MOVEQ   #$0012,D2            SET TRANSLATION SPECIFICATION
002414 600E                  BRA.S   PROGCHK                EXCEPTION CODE
                   *
                   *
002416 7413        SPOPEXCP MOVEQ   #$0013,D2            SET SPECIAL OPERATION EXCEPTION
002418 600A                  BRA.S   PROGCHK
                   *
00241A 4A3860E8    NOPROGCK TST.B   EXECFLAG             IS AN EXECUTE IN PROGRESS?
00241E 6700DDE0             BEQ     RETURN               NO, RETURN TO NSI
002422 4E75                 RTS     .                    RETURN TO EXECUTE RETURN
                   * * * * * * * * * * * * * * * * * * * * * * * * * * * * * * * * * * *
                   *                                                                   *
                   *         PROGRAM INTERRUPT ROUTINE                                 *
                   *                                                                   *
                   *     COME HERE TO SWAP PROGRAM PSWS:                               *
                   *         TO PROGCHK IF PSW IN PRIVATE STORE IS NOT CURRENT         *
                   *         TO PROGCHKA IF PSW IN PRIVATE STORE IS CURRENT            *
                   *              D2 HAS PROGRAM CHECK INTERRUPTION CODE               *
                   *                                                                   *
                   * * * * * * * * * * * * * * * * * * * * * * * * * * * * * * * * * * *
                   *
     00002424      PCK_MC   EQU     *                    ENTRY FROM MONITOR CALL
002424 4EB824B8    PROGCHK  JSR     FETCHPSW             GET PSW FROM PC AND PSR
002428 4A3860EA             TST.B   PERFLAG              PER - LONG/SHORT DONE ?
00242C 670A                 BEQ.S   PROGCHKA             PER - NO, BYPASS PER CHECK
00242E 08020004             BTST    TRANEX,D2            PER - TRANSLATION EXCEPTION?
002432 6604                 BNE.S   PROGCHKA             PER - BR IF YES, BYPASS PER EVENT
002434 4EB821BC             JSR     PERTSTX              PER - GO CHECK FOR PER EVENT
                   *
002438 247C80000028 PROGCHKA MOVEA.L #APROGOLD,A2        GET MAIN STORAGE ADDRESS FOR OLD PSW
00243E 287C80000068         MOVEA.L #APROGNEW,A4         GET MAIN STORAGE ADDRESS FOR NEW PSW
002444 7204                 MOVEQ   #$04,D1              SET BY-PASS PAT BIT FOR NO TRANSLATE
002446 82386106             OR.B    SAVE_CNTL,D1               TO ACCESS LOW STORE
00244A 11C15FE1             MOVE.B  D1,SYS_CNTL
                   *
00244E 31F8601A601C         MOVE.W  INSTSAVE,INSTSAVE2  MOVE LAST INSTRUCTION
002454 31FCC0FF601A         MOVE.W  #$C0FF,INSTSAVE     SPECIAL CODE FOR 'PROGRAM CHECK'
                   *                                       (IN CASE OF BUS ERROR)
00245A 08020004             BTST    TRANEX,D2            IS THIS A TRANSLATION EXCEPTION?
00245E 672A                 BEQ.S   PROGCHKB
002460 0C020012             CMPI.B  #$12,D2              IS IT TRANS SPEC OR SPECIAL OP EXCP?
002464 6A24                 BPL.S   PROGCHKB
                   *
002466 297862020028         MOVE.L  BECB_ADR,TRANSADR-PROGNEW(A4)  STORE FAILING ADDR
00246C 26386034             MOVE.L  PSW+4,D3
002470 5583                 SUBQ.L  #2,D3                NULLIFY THE INSTRUCTION BY FINDING
002472 3210                 MOVE.W  (A0),D1                THE BEGINNING USING THE ILC,
002474 6A0A                 BPL.S   PROGCHKC                 AND POINT THE PC BACK TO IT.
002476 5583                 SUBQ.L  #2,D3
002478 0801000E             BTST    PSR_ILC1,D1
00247C 6702                 BEQ.S   PROGCHKC
00247E 5583                 SUBQ.L  #2,D3
002480 31C36036    PROGCHKC MOVE.W  D3,PSW+6             STORE PSW BACK, WITHOUT
002484 4843                 SWAP    D3                     DISTURBING BYTE 4
002486 11C36035             MOVE.B  D3,PSW+5
                   *
                   *
EN983024
00248A 24F86030    PROGCHKB MOVE.L  PSW,(A2)+            STORE CURRENT PSW AS OLD
00248E 24B86034             MOVE.L  PSW+4,(A2)
002492 083800036031         BTST    PSW_EC,PSW+1
```

```
002498 6718                    BEQ.S    BCCODE
00249A 39420026                MOVE.W   D2,PGMINT-PROGNEW(A4)
00249E 72C0                    MOVEQ    #$C0,D1
0024A0 C210                    AND.B    (A0),D1
0024A2 E719                    ROL.B    3,D1
0024A4 19410025                MOVE.B   D1,PGMILC-PROGNEW(A4)
                    *
0024A8 08F8000660E9            BSET     #6,EXECFLAG+1       SET PROG CHECK FLAG TO CAUSE
                    *                                              HARD STOP IF PSW INVALID
0024AE 4EF81F0A                JMP      IENDINT             GO TO LOAD PSW AND END
                    *
0024B2 3502         BCCODE     MOVE.W   D2,-(A2)            STORE INTERRUPTION CODE
0024B4 4EF81F0A                JMP      IENDINT             GO TO LOAD PSW AND END
                    *
                    * * * * * * * * * * * * * * * * * * * * * * * * * * * * * * * * * * * *
                    *                                                                     *
                    *       SUBROUTINE TO UPDATE PSW WITH INFORMATION FROM PC AND PSR     *
                    *                                                                     *
                    *                                                                     *
                    * * * * * * * * * * * * * * * * * * * * * * * * * * * * * * * * * * * *
                    *
      000024B8      FETCHPSW EQU  *
0024B8 225F                    MOVEA.L (A7)+,A1            GET RETURN ADDRESS
0024BA 4A3860E8                TST.B    EXECFLAG           EXECUTE IN PROGRESS?
0024BE 6720                    BEQ.S    FETCHOK
0024C0 11F861065FE1            MOVE.B   SAVE_CNTL,SYS_CNTL  CLEAR ANY OVERRIDES
0024C6 21F860EC6002            MOVE.L   SAV_PCEX,PC        RESTORE PROGRAM COUNTER
0024CC 11F860FD6001            MOVE.B   SAV_PSREX+1,PSR+1
0024D2 0210003F                ANDI.B   #ILC_RST,(A0)      RESET ILC,
0024D6 00100080                ORI.B    #ILC2_MSK,(A0)       SET TO REFLECT EXECUTE
0024DA 423860E8                CLR.B    EXECFLAG
0024DE 584F                    ADDQ.W   #4,A7              POINT STACK PAST EXECUTE RETURN
0024E0 083800036031 FETCHOK    BTST     PSW_EC,PSW+1
0024E6 6716                    BEQ.S    FETCHBC
0024E8 11F860036035            MOVE.B   PC+1,PSW+5         MOVE PROGRAM COUNTER
0024EE 31F860046036            MOVE.W   PC+2,PSW+6
0024F4 723F                    MOVEQ    #$3F,D1
0024F6 C210                    AND.B    (A0),D1            MOVE CC AND PROGRAM MASK
0024F8 11C16032                MOVE.B   D1,PSW+2
0024FC 4ED1                    JMP      (A1)               RETURN
                    *
0024FE 21F860026034 FETCHBC    MOVE.L   PC,PSW+4           GET PROGRAM COUNTER
002504 11D06034                MOVE.B   (A0),PSW+4         MOVE ILC, CC, AND PROGRAM MASK
002508 4ED1                    JMP      (A1)               RETURN
                    *
EN983024
002588 31F860465FA0            MOVE.W   FP_MASK,FP_DATA
00258E 11F861065FE1            MOVE.B   SAVE_CNTL,SYS_CNTL  SET TRANS IN THE SYS CONTROL REG
                    *
002594 088800056038            BCLR     PST_WAIT,PUSTAT    CLEAR WAIT FLAG
00259A 083800016031            BTST     PSW_WAIT,PSW+1     TEST FOR WAIT IN NEW PSW
0025A0 6706                    BEQ.S    PSW_RTN            BR IF OFF
0025A2 08F800056038            BSET     PST_WAIT,PUSTAT    SET WAIT FLAG
0025A8 4E75         PSW_RTN    RTS      *                  RETURN TO CALLING ROUTINE
                    * * * * * * * * * * * * * * * * * * * * * * * * * * * * * * * * * * * *
                    *                                                                     *
                    *       L O A D   N E W   P S W   S U B R O U T I N E                 *
                    *                                                                     *
                    *       CALLED FROM:   PSW SWAPPING ROUTINES - LPSW, SVC, EXT INT,    *
                    *                                              I/O INT, START,        *
                    *                                              PROG CHK, MACH CHK     *
                    *                                                                     *
                    *       ENTRY:  AT 'PSW_LOAD'; A4 HAS ADDRESS OF NEW PSW              *
                    *                                                                     *
                    *       EXIT:   NEW PSW LOADED, PSR AND PC UPDATED, INTERRUPT MASKS   *
                    *               SET (PRGM, EXT I/O), TRANSLATION SET/RESET            *
                    *                                                                     *
                    *       ERRORS: ACCESS EXCEPTIONS (BUS ERRORS) ON LPSW                *
                    *               SPECIFICATION EXCEPTION IF INVALID EC MODE PSW        *
                    *                                                                     *
                    * * * * * * * * * * * * * * * * * * * * * * * * * * * * * * * * * * * *
                    *
00250A 2C1C         PSW_LOAD MOVE.L (A4)+,D6           FETCH 1ST DBL WORD INTO D6 IN
                    *                                        CASE OF STORAGE ACCESS ERROR
00250C 21D46034              MOVE.L (A4),PSW+4         PUT 2ND DBL WORD INTO THE PSW
002510 21C66030              MOVE.L D6,PSW             PUT 1ST DBL WORD INTO THE PSW
```

```
002514 21F860346002 PSW_LDST MOVE.L  PSW+4,PC            PUT THE INST ADDR INTO THE PROG CTR
00251A 42386002               CLR.B   PC                  CLEAR THE HI BYTE OF THE PC
00251E 08F800026106           BSET    BYP_PAT,SAVE_CNTL   TURN OFF TRANS FLAG IN SHADOW BYTE
002524 08060013               BTST    PSW_EC,D6           TEST FOR EC MODE IN NEW PSW
002528 674A                   BEQ.S   PSW_LDBC            BR IF BC MODE
                     *
00252A 0806001A               BTST    PSW_XLAT,D6         TEST FOR TRANSLATE BIT IN NEW PSW
00252E 6706                   BEQ.S   PSW_LDNX            BR IF OFF
002530 08B800026106           BCLR    BYP_PAT,SAVE_CNTL   TURN ON TRANS FLAG IN SHADOW BYTE
002536 4A386034      PSW_LDNX TST.B   PSW+4               IF EC MODE, BITS 32-39 MUST BE ZERO
00253A 6608                   BNE.S   PSW_LDEX            BR IF NOT ZERO
00253C 0286B800C0FF           ANDI.L  #$B800C0FF,D6       ALSO, BITS 0,2-4,16-17, AND 24-31
002542 6718                   BEQ.S   PSW_LDEC              MUST BE ZERO.
002544 584F          PSW_LDEX ADDQ.W  #4,A7               ADJUST STACK
002546 08B8000660E9           BCLR    #6,EXECFLAG+1       CLEAR AND TEST PROG CHK FLAG
00254C 660A                   BNE.S   PSW_LDHS            BR IF PROG CHK PSW SWAP
00254E 0210003F               ANDI.B  #ILC_RST,(A0)       SET ILC TO ZERO FOR PSW SPEC CHK
002552 7406                   MOVEQ   #$06,D2             SET SPECIFICATION CHECK
002554 4EF82438               JMP     PROGCHKA            GO TO PROGRAM CHECK
                     *
002558 4EF81B02      PSW_LDHS JMP     CS_3020             PSW FORMAT ERROR, CHECK-STOP
                     *
00255C 10B86032      PSW_LDEC MOVE.B  PSW+2,(A0)          MOVE CC & PRGM MASK TO THE PSR
002560 427860E2               CLR.W   IOMASK              CLEAR I/O MASK REGISTER
002564 083800016030           BTST    PSW_IO,PSW          I/O INTERRUPTS MASKED OFF
00256A 6712                   BEQ.S   PSW_LEND            BR IF YES, FINISH PSW LOAD
00256C 31F8010860E2           MOVE.W  CREG2,IOMASK        SET IOMASK FROM CTRL REG
002572 600A                   BRA.S   PSW_LEND            FINISH PSW LOAD
                     *
002574 10B86034      PSW_LDBC MOVE.B  PSW+4,(A0)          MOVE CC & PRGM MASK TO THE PSR
002578 11F8603060E2           MOVE.B  PSW,IOMASK          SET IOMASK FROM THE PSW
00257E 11D06047      PSW_LEND MOVE.B  (A0),PRGMMASK       SAVE THE CC & PRGM MASK IN PRIV STOR
002582 31FC76005FA2           MOVE.W  #FP_SMSK,FP_CMD     SET THE PRGM MASK IN THE FP ENGINE

                     * * * * * * * * * * * * * * * * * * * * * * * * * * * * * * * * * * *
                     *                                                                   *
                     *        RESET  ROUTINES - CLEAR RESET AND PROGRAM RESET            *
                     *                                                                   *
                     * * * * * * * * * * * * * * * * * * * * * * * * * * * * * * * * * * *
                     *
       000025AA      HW_RESET EQU     *                   ENTRY POINT FOR HARDWARE RESET
0025AA 7C00                   MOVEQ   #$00,D6             SET UP 00 COMMAND
0025AC 21C66038               MOVE.L  D6,PUSTAT           SET PU STATUS AND PU COMMAND TO 0000
       000025B0      IPL      EQU     *                   ENTRY FOR EMULATED IPL RESET
       000025B0      MO_RESET EQU     *                   ENTRY POINT FOR MANOPS/DEBUG RESET
                     *                                    COMMAND IN D6
0025B0 4FF86700               LEA     STACKST,A7          RE-INITIALIZE STACK POINTER
0025B4 08F800036038           BSET    PST_RESET,PUSTAT    SET BIT FOR BUS ERROR HANDLING
0025BA 41F86000               LEA     PSR,A0              POINT TO COMMUNICATION AREA
0025BE 4BF83C00               LEA     OPTABLE,A5          GET OP ADDRESS TABLE
0025C2 7000                   MOVEQ   #0,D0
0025C4 21C060E6               MOVE.L  D0,SWITCHES         CLEAR VARIOUS 'MARKS ON THE WALL'
0025C8 31C060EA               MOVE.W  D0,PERFLAG
0025CC 4EB824B8               JSR     FETCHPSW            MAKE PSW MATCH PC & PSR
0025D0 7234                   MOVEQ   #$34,D1
0025D2 11C16106               MOVE.B  D1,SAVE_CNTL
0025D6 11C15FE1               MOVE.B  D1,SYS_CNTL       * ENSURE WE'RE ACCESSING MAIN STORE
0025DA 31FC1001605C           MOVE.W  #$1001,REFCODE      SET RESET PROGRESS CODE
0025E0 4EB81F62               JSR     PURGE             * CLEAR AND INITIALIZE PAT
0025E4 31FC1002605C           MOVE.W  #$1002,REFCODE      SET RESET PROGRESS CODE
0025EA 0C060004               CMPI.B  #CMD_CRST,D6        IS THIS A CLEAR RESET?
0025EE 6658                   BNE.S   RESCONT
                     *
                     *
0025F0 21C06030      CLRESET  MOVE.L  D0,PSW              CLEAR PSW/PC TO ZEROS
0025F4 21C06034               MOVE.L  D0,PSW+4
0025F8 21C06002               MOVE.L  D0,PC
0025FC 31C06000               MOVE.W  D0,PSR
                     *
002600 761B                   MOVEQ   #27,D3              CLEAR CONTROL REGISTER, GPRS AND FPRS
002602 43F80100               LEA     REG_AREA,A1         START WITH CONTROL REG 0
002606 22C0          CLR_REGS MOVE.L  D0,(A1)+            CLEAR 0100 - 019F
002608 51CBFFFC               DBRA    D3,CLR_REGS
                     *
                     *   THE GPRS NEED TO BE LOADED INTO THE A-ENGINE; IT MUST HAVE A
                     *   CHANCE TO GET RESET FIRST, THEN DO 'GPRALTER' AT LABEL 'RESGPR'
```

```
00260C 21FCFFFFFFFF
       0108             MOVE.L  #$FFFFFFFF,CREG2  INITIALIZE CHANNEL MASKS TO ALL ON
002614 11FC00E00103     MOVE.B  #$E0,CREG0+3      INITIALIZE CONTROL REG 0
00261A 11FC00C20138     MOVE.B  #$C2,CREG14       REG 14 INITIAL VALUE
002620 31FC0200013E     MOVE.W  #$0200,CREG15+2   REG 15 INITIAL VALUE
002626 31FC1003605C     MOVE.W  #$1003,REFCODE    SET RESET PROGRESS CODE
                *
00262C 247C80000000     MOVEA.L #ARSTRT_N,A2      LOAD MAIN STORE ADDRESS 0
002632 24C0   CLRSTORE  MOVE.L  D0,(A2)+
002634 60FC             BRA.S   CLRSTORE          CLEAR MAIN STORAGE
002636 31FC1004605C     MOVE.W  #$1004,REFCODE    SET RESET PROGRESS CODE
00263C 0C7800056200     CMPI.W  #$0005,BECB       CHECK FOR ADDRESSING EXCEPTION
002642 6704             BEQ.S   RESCONT           CONTINUE WITH RESET CODE
002644 4EF81EDA         JMP     CS_1005           GO TO HARDSTOP IF VALIDATE
                *                                   IS UNSUCCESSFUL
                *
002648 31FC00016040 RESCONT MOVE.W #$0001,$6040   FLOATING POINT PROCESSOR IS PRESENT
00264E 31C06046         MOVE.W  D0,$6046          CLEAR CORNROW PROGRAM MASK SAVE
002652 31FC1006605C     MOVE.W  #$1006,REFCODE    SET RESET PROGRESS CODE
002658 31FC66005FA2     MOVE.W  #FP_INIT,FP_CMD * INITIALIZE THE FP PROCESSOR
00265E 21C060E2         MOVE.L  D0,IOMASK         CLEAR MASKS (IO AND EXTERNAL)
002662 31C06038         MOVE.W  D0,PUSTAT
002666 21C06102         MOVE.L  D0,TMR_INT_PND    ( TIMER AND I/O INTERRUPTS )
00266A 31C0601A         MOVE.W  D0,INSTSAVE
00266E 21C0601C         MOVE.L  D0,INSTSAVE2
002672 31C060D6         MOVE.W  D0,ADS_INSTR
002676 21C060D8         MOVE.L  D0,ADS_ADDR
                *
00267A 4A46             TST.W   D6                IS THIS A MICROCODE-ONLY RESET?
                *                                   (IPL OR ALTER/DISPLAY)
00267C 6624             BNE.S   RES3              IF SO, DON'T GO TO A-ENGINE
00267E 31FC1007605C     MOVE.W  #$1007,REFCODE    SET RESET PROGRESS CODE
002684 21C06042         MOVE.L  D0,$6042          THESE BYTES ARE CHECKED BY THE A-ENG
                *-----------------------------------------------------------------
002688 31C05FF0         MOVE.W  D0,ENGINE_A    *  GO TO A-ENGINE FOR RESET
                *-----------------------------------------------------------------
00268C 21F860346002     MOVE.L  PSW+4,PC          RESTORE PC AFTER RESET
002692 30B86032         MOVE.W  PSW+2,(A0)        SET UP PSR
002696 083800036031     BTST    PSW_EC,PSW+1
00269C 6604             BNE.S   RES3
00269E 30B86034         MOVE.W  PSW+4,(A0)
0026A2 11C06001   RES3  MOVE.B  D0,PSR+1          CLEAR PSR STATUS BITS
                *
0026A6 0C060004         CMPI.B  #CMD_CRST,D6      IS THIS A CLEAR RESET?
0026AA 6614             BNE.S   RES5
0026AC 31FC1008605C RESGPR MOVE.W #$1008,REFCODE  SET RESET PROGRESS CODE
0026B2 4EB81890         JSR     GPRALTER          LOAD GPRS
0026B6 31FC1009605C     MOVE.W  #$1009,REFCODE    SET RESET PROGRESS CODE
0026BC 4EB83058         JSR     FPRALTER          LOAD FPRS
```

EN983024 PAGE 118 APPENDIX A

```
                        PAGE
0026C0 31FC100A605C RES5 MOVE.W #$100A,REFCODE    SET RESET FINISHED CODE
0026C6 11FC00FD5F90     MOVE.B  #PC_RESET,INTR_REG  CLEAR PC INTERRUPTS
                *-----------------------------------------------------------------
0026CC 4EB82F18         JSR     RST_CALL          GO TO RESET SIO CODE/DEBUG CARD
                *-----------------------------------------------------------------
                *
                *       RETURN FROM RESET - NO IPL, NO SIO CODE OR NO DEBUG CARD
                *
0026D0 4EF81E2A         JMP     STOP_LP           GO TO WAIT FOR PC/DEBUG INTERRUPT
                * * * * * * * * * * * * * * * * * * * * * * * * * * * * * * * * * * *
                *                                                                   *
                *       PC INTERFACE LOOP FOR TIMER HANDLING                        *
                *                                                                   *
                * * * * * * * * * * * * * * * * * * * * * * * * * * * * * * * * * * *
                *
0026D4 32385F90   TIMERS  MOVE.W CC_INT_REG,D1
0026D8 6BFA             BMI.S   TIMERS              WAIT UNTIL INTERRUPT MAY BE SET
                *
0026DA 31FCFFFF6062     MOVE.W  #$FFFF,TIMER_CB+2   INIT RETURN CODE
0026E0 21F860B46054     MOVE.L  TIM_CBADR,PCIB_OUT  POINT TO TIMER PCIB
```

```
0026E6 11FC007F5F90            MOVE.B  #INT_8088,INTR_REG  SET INTERRUPT TO PC
0026EC 32385F90       TIM_WAIT MOVE.W  CC_INT_REG,D1
0026F0 08010009                BTST    PC_INTR,D1          CHECK IF PC IS SENDING SOMETHING
0026F4 66F6                    BNE.S   TIM_WAIT            INTERRUPT IS PENDING WHEN = 0
                      *
0026F6 22786050                MOVEA.L PCIB_IN,A1          GET PCIB ADDRESS
0026FA B3FC0005E074            CMPA.L  #ASYNC_MO+MAIN_STR,A1  CHECK IF IT'S A MANOP REQUEST
002700 670E                    BEQ.S   TIMSTACK
002702 B3FC00058000            CMPA.L  #MAIN_STR,A1        CHECK IF IT'S IN MAIN STORE
002708 6A26                    BPL.S   TIM_GO              IF GREATER, THEN IT'S A TIMER INTR
00270A 003800806104            ORI.B   #$80,IO_INT_PND
002710 11FC00A06051 TIMSTACK   MOVE.B  #MASK_TIM+MASK_E,PCIB_IN+1
002716 11FC00406050            MOVE.B  #STACK,PCIB_IN
00271C 4A386050       TIM_W1   TST.B   PCIB_IN             WAIT FOR PC TO SEE CONDITION CODE
002720 66FA                    BNE.S   TIM_W1              AND RESET IT TO ZERO
002722 11FC00FD5F90            MOVE.B  #PC_RESET,INTR_REG  RESET PC INTERRUPT
002728 08F800076105            BSET    #7,IO_INT_PND+1     SET 'INTERRUPT STACKED' FLAG
00272E 60BC                    BRA.S   TIM_WAIT
                      *
                      *
002730 11FC00806050 TIM_GO     MOVE.B  #GO_AHEAD,PCIB_IN   SET CONDITION CODE BIT FOR PC
002736 93FC00058000            SUBA.L  #MAIN_STR,A1          SO IT CAN TRANSFER THE PCIB
00273C 4A386050       TIM_W2   TST.B   PCIB_IN             WAIT FOR PC TO SEE CONDITION CODE
002740 66FA                    BNE.S   TIM_W2                AND RESET IT TO ZERO
002742 11FC00FD5F90            MOVE.B  #PC_RESET,INTR_REG
002748 0C2900FF0001            CMPI.B  #$FF,1(A1)          IS THIS AN ASYNCHRONOUS INTR
00274E 679C                    BEQ.S   TIM_WAIT            YES, GO WAIT SOME MORE
                      *
002750 4A386105       TIM_RESP TST.B   IO_INT_PND+1        CHECK IF WE HAVE STACKED AN INTR
002754 671E                    BEQ.S   TIM_R2              IF NOT, DONE;  OTHERWISE SEND
                      *                                      MASK-CHANGE REQUEST
002756 11FC0000609C            MOVE.B  #MASK_ALL,INT_MASK  MASK ON INTERRUPTS AGAIN
00275C 4A3860E2                TST.B   IOMASK              CHECK I/O INTERRUPTS
002760 6606                    BNE.S   TIM_R1              IF ENABLED, OK
002762 04380040609C            SUBI.B  #MASK_IO,INT_MASK   TURN OFF I/O MASK
002768 21F8608C6054 TIM_R1     MOVE.L  MSK_CBADR,PCIB_OUT  POINT TO MASK CHANGE PCIB
00276E 11FC007F5F90            MOVE.B  #INT_8088,INTR_REG  SET INTERRUPT TO PC
002774 4E75           TIM_R2   RTS
                      *
                      * * * * * * * * * * * * * * * * * * * * * * * * * * * * * * * * * * *
                      *                                                                   *
                      *    SUBROUTINE TO GO TO THE A-ENGINE AND RETURN AFTER              *
                      *      EXECUTING ONE INSTRUCTION                                    *
                      *                                                                   *
                      * * * * * * * * * * * * * * * * * * * * * * * * * * * * * * * * * * *
                      *
        00002776      TRACERET EQU     *
002776 55886002                SUBQ.L  #2,PC               PC WAS UPDATED BY NEXT IFETCH
00277A 4E75                    RTS     *                       ADJUST IT
                      *
                      * * * * * * * * * * * * * * * * * * * * * * * * * * * * * * * * * * *
                      *                                                                   *
                      *        S U P E R    T R A C E                                     *
                      *                                                                   *
                      *                                                                   *
                      *                                                                   *
                      *        SUPER TRACE IS AN AID FOR DEBUGGING THE 68000 MICROCODE.   *
                      *        IT IS ACTIVE WHEN THE CONTROL TABLE AT TRACETCB HAS VALID  *
                      *        DATA IN IT.  THE REQUESTED INSTRUCTIONS ARE REPLACED WITH  *
                      *        AN INVALID INSTRUCTION OF X'FFXX', WHICH WILL CAUSE A      *
                      *        LINE1111 EXCEPTION WHEN EXECUTED.  THE INSTRUCTION WHICH   *
                      *        WAS OVERLAID IS PUT BACK, AND EXECUTED WITH THE TRACE BIT  *
                      *        ON IN THE STATUS REGISTER.  THEN THE TRACE VECTOR AND THE  *
                      *        INSTRUCTION LOCATION ARE RESTORED TO THEIR PREVIOUS VALUES,*
                      *        AND THE EVENT IS STORED IN THE TRACE TABLE, ALONG WITH     *
                      *        ANY REQUESTED REGISTER CONTENTS OR STORAGE LOCATION.       *
                      *                                                                   *
                      *                                                                   *
                      *        TRACETCB - TRACE CONTROL BLOCK                             *
                      *                                                                   *
                      *            +0  |---------------------------------|            *
                      *                |  CURRENT POINTER IN TRACE AREA  |            *
                      *                |---------------------------------|            *
                      *            +2  |                                 |            *
                      *                |  STARTING ADDR OF TRACE AREA    |            *
                      *                |                                 |            *
                      *            +4  |---------------------------------|            *
```

```
                  *              4  ENDING ADDRESS OF TRACE AREA  4                *
                  *              4________________________________4                *
                  *          +6  4                                4                *
                  *              4  TR 0 - ORIGINAL INSTRUCTION   4                *
                  *              4________________________________4                *
                  *          +8  4                                4                *
                  *              4  TR 0 - TRACED ADDRESS         4                *
                  *              4________________________________4                *
                  *          +A  4                                4                *
                  *              4  TR 0 - REGISTER MASK          4                *
                  *              4________________________________4                *
                  *          +C  4                                4                *
                  *              4  TR 0 - STORAGE ADDRESS COUNT  4                *
                  *              4________________________________4                *
                  *                        . . . . .                               *
                  *              4________________________________4                *
                  *          +E  4                                4                *
                  *              4  TR 1 - 7 ENTRIES              4                *
                  *              4________________________________4                *
                  *         +46  4                                4                *
                  *              4  TR 0 - STORAGE TABLE ENTRIES  4 8 2-BYTES ADDRS *
                  *              4________________________________4                *
                  *                        . . . . .                               *
                  *              4________________________________4                *
                  *         +56  4                                4                *
                  *              4  TR 1 - 7 ENTRIES              4                *
                  *              4________________________________4                *
                  *       TRVSAVE  - CONTENTS OF TRACE VECTOR (0024) AT SUPER TRACE *
                  *                ENTRY. SAVE TO RESTORE.                          *
                  *                                                                 *
                  *       TRACREGS - FOUR FULLWORDS TO SAVE D0, D1, A0 AND A1 BETWEEN *
                  *                THE 1ST AND 2ND ENTRIES HANDLING AN INTERRUPT.   *
                  *                                                                 *
                  *       REGSAVE  - SIXTEEN FULLWORDS TO SAVE ALL USER'S REGISTERS *
                  *                ON SECOND ENTRY  (D0 - D7, A0 - A7)              *
                  *                                                                 *
                  *       REGSAVEA - POINTER TO ADDRESS REGISTERS SAVED ABOVE       *
                  *                                                                 *
                  * * * * * * * * * * * * * * * * * * * * * * * * * * * * * * * * * *
                  *
00277C 48E7C0C0   SUPERTR  MOVEM.L D0-D1/A0-A1,-(A7)  STACK CONTENTS OF D0, D1, A0, A1
002780 206F0012            MOVEA.L 18(A7),A0        GET ADDRESS OF CODED OP FROM STACK
002784 3010                MOVE.W  (A0),D0          GET CODED OP
002786 7207                MOVEQ   #$07,D1          MAKE CODED OP TABLE INDEX
002788 C240                AND.W   D0,D1
00278A E749                LSL.W   #3,D1
00278C 43F86940            LEA     TRACEDEF,A1      POINT TO TRACE DEFINITION TABLE
002790 B0F11002            CMPA.W  2(A1,D1),A0      COMPARE DEFINITION ADDR TO TRAP ADDR
002794 6704                BEQ.S   SUPER0           BR IF ADDRESSES COMPARE
002796 4EF81BA2            JMP     CS_002C          NO, INVALID OP CODE
                  *
00279A 30B11000   SUPER0   MOVE.W  0(A1,D1),(A0)    RESTORE INSTRUCTION FOR EXECUTION
00279E 002F00800010        ORI.B   #$80,16(A7)        TURN ON TRACE BIT IN STATUS REG
0027A4 48F80303285A        MOVEM.L D0-D1/A0-A1,TRACREGS  SAVE REGISTERS
0027AA 4CDF0303            MOVEM.L (A7)+,D0-D1/A0-A1  UNSTACK CONTENTS OF D0-D1, A0-A1
0027AE 21F800242856        MOVE.L  TRACEV,TRVSAVE     SAVE CURRENT TRACE VECTOR
0027B4 21FC000027BE
       0024                MOVE.L  #SUPERRET,TRACEV
0027BC 4E73                RTE
                  *
                  *
                  *
0027BE 08970007   SUPERRET BCLR    #$7,(A7)         CLEAR TRACE BIT IN SAVED STATUS
0027C2 21F828560024        MOVE.L  TRVSAVE,TRACEV   RESTORE VECTOR TRACE VECTOR
0027C8 48F8FFFF286A        MOVEM.L D0-A7,REGSAVE    SAVE REGISTERS
0027CE 4CF80303285A        MOVEM.L TRACREGS,D0-D1/A0-A1   GET SAVED TRACE REGISTERS
                  *
0027D4 3080                MOVE.W  D0,(A0)          RESTORE CODED OP
0027D6 3078693A            MOVEA.W TRACETCB,A0      GET ADDRESS OF NEXT TRACE ENTRY
0027DA 3478693E            MOVEA.W TRACEEND,A2      GET ENDING ADDRESS OF TRACE AREA
0027DE 30C0                MOVE.W  D0,(A0)+         TRACE OCCURRENCE
0027E0 B4C8                CMPA.W  A0,A2            ARE WE AT THE END OF TRACE AREA?
0027E2 6604                BNE.S   SUPER1           BR IF NO
0027E4 3078693C            MOVEA.W TRACEBEG,A0      LOAD TABLE START ADDRESS
                  *
```

```
0027E8 34311004      SUPER1   MOVE.W  4(A1,D1),D2        GET REGISTER MASKS
0027EC 6726                   BEQ.S   SUPER4             SKIP IF NO REGS TO BE TRACED
0027EE 700F                   MOVEQ   #15,D0             COUNT FOR 16 REGISTERS
0027F0 47F8286A               LEA     REGSAVE,A3         ADDRESS OF REGISTER SAVE AREA
0027F4 E34A          SUPERLP  LSL.W   1,D2               CHECK IF TRACE NEXT REGISTER
0027F6 6416                   BCC.S   SUPER3             BRANCH IF BIT IS NOT ON
0027F8 30D3                   MOVE.W  (A3),(A0)+         MOVE REGISTER CONTENTS TO TRACE AREA
0027FA B4C8                   CMPA.W  A0,A2              ARE WE AT THE END OF TRACE AREA?
0027FC 6604                   BNE.S   SUPER2             BR IF NO
0027FE 3078693C               MOVE.W  TRACEBEG,A0        LOAD TABLE START ADDRESS
                     *
002802 30EB0002      SUPER2   MOVE.W  2(A3),(A0)+        MOVE REGISTER CONTENTS TO TRACE AREA
002806 B4C8                   CMPA.W  A0,A2              ARE WE AT THE END OF TRACE AREA?
002808 6604                   BNE.S   SUPER3             BR IF NO
00280A 3078693C               MOVE.W  TRACEBEG,A0        LOAD TABLE START ADDRESS
                     *
00280E 584B          SUPER3   ADDQ.W  #4,A3              POINT TO NEXT REGISTER
002810 51C8FFE2               DBRA    D0,SUPERLP         CONTINUE FOR EACH REGISTER
                     *
                     *
                     *
       00002814      SUPER4   EQU     *
002814 34311006               MOVE.W  6(A1,D1),D2        GET STORAGE TABLE COUNT
002818 E349                   LSL.W   #1,D1              ADJUST INDEX FOR STORAGE TABLE
00281A 47F11040               LEA     64(A1,D1),A3       GET START OF STORAGE ENTRIES
00281E 51CA0004      SUPER5   DBRA    D2,SUPER6          BR IF IT WAS NO ZERO
002822 600E                   BRA.S   SUPER7             END OF TRACE
                     *
002824 325B          SUPER6   MOVEA.W (A3)+,A1           GET TRACE ADDRESS
002826 30D1                   MOVE.W  (A1),(A0)+         MOVE DATA TO TRACE AREA
002828 B4C8                   CMPA.W  A0,A2              ARE WE AT THE END OF TRACE AREA?
00282A 66F2                   BNE.S   SUPER5             BR IF NO
00282C 3078693C               MOVE.W  TRACEBEG,A0        LOAD TABLE START ADDRESS
002830 60EC                   BRA.S   SUPER5
                     *
002832 31C8693A      SUPER7   MOVE.W  A0,TRACETCB        SAVE POINTER
002836 4CF80007286A           MOVEM.L REGSAVE,D0-D2      RESTORE REGISTERS
00283C 4CF80F00288A           MOVEM.L REGSAVEA,A0-A3     RESTORE REGISTERS
002842 BEFC6680               CMPA.W  #$6680,A7          IS STACK RUNNING AWAY
002846 6B02                   BMI.S   SUPERSTP           BR IF YES, CHK-STOP
002848 4E73                   RTE                        RETURN TO NORMAL EXECUTION
                     *
00284A 5C4F          SUPERSTP ADDQ.W  #6,A7              ADJUST STACK
00284C 31FCFFFF605C           MOVE.W  #$FFFF,REFCODE
002852 4EF82852      SUPERHNG JMP     SUPERHNG           HANG
                     *
                     *
002856 0004          TRVSAVE  DS.L    1                  TRACE VECTOR SAVE AREA
00285A 0004          TRACREGS DS.L    1                  D0 - CODED OP
00285E 0004                   DS.L    1                  D1 - CODED OP TABLE INDEX
002862 0004                   DS.L    1                  A0 - CODED OP ADDRESS
002866 0004                   DS.L    1                  A1 - TRACE DEFINITION TABLE POINTER
00286A 0020          REGSAVE  DS.L    8                  DATA REGISTERS
00288A 0020          REGSAVEA DS.L    8                  ADDRESS REGISTERS
                     *
       0000693A               ORG     $693A
                     *
00693A 6A00          TRACETCB DC.W    $6A00              CURRENT TRACE POINTER
00693C 6A00          TRACEBEG DC.W    $6A00              TRACE TABLE START ADDRESS
00693E 7F00          TRACEEND DC.W    $7F00              TRACE TABLE END ADDRESS
       00006940      TRACEDEF EQU     *                  TRACE DEFINITION TABLE
006940 FF00                   DC.W    $FF00              TRACE 0 - ORIGINAL INSTRUCTION
006942 FFFF                   DC.W    $FFFF              TRACE 0 - TRACED ADDRESS
006944 0000                   DC.W    0                  TRACE 0 - REGISTER MASK
006946 0000                   DC.W    0                  TRACE 0 - STORAGE ADDR TABLE COUNT
006948 FF01                   DC.W    $FF01              TRACE 1 - DEFINITION
00694A FFFF                   DC.W    $FFFF
00694C 00000000               DC.L    0
006950 FF02                   DC.W    $FF02              TRACE 2 - DEFINITION
006952 FFFF                   DC.W    $FFFF
006954 00000000               DC.L    0
006958 FF03                   DC.W    $FF03              TRACE 3 - DEFINITION
00695A FFFF                   DC.W    $FFFF
00695C 00000000               DC.L    0
006960 FF04                   DC.W    $FF04              TRACE 4 - DEFINITION
006962 FFFF                   DC.W    $FFFF
```

```
006964 00000000            DC.L    0
006968 FF05                DC.W    $FF05          TRACE 5 - DEFINITION
00696A FFFF                DC.W    $FFFF
00696C 00000000            DC.L    0
006970 FF06                DC.W    $FF06          TRACE 6 - DEFINITION
006972 FFFF                DC.W    $FFFF
006974 00000000            DC.L    0
006978 FF07                DC.W    $FF07          TRACE 7 - DEFINITION
00697A FFFF                DC.W    $FFFF
00697C 00000000            DC.L    0
                  *
                  *        STORAGE ADDRESS TABLE
                  *
006980 FFFFFFFF            DC.L    $FFFFFFFF,$FFFFFFFF,$FFFFFFFF,$FFFFFFFF    TRACE 0
006984 FFFFFFFF
006988 FFFFFFFF
00698C FFFFFFFF
006990 FFFFFFFF            DC.L    $FFFFFFFF,$FFFFFFFF,$FFFFFFFF,$FFFFFFFF    TRACE 1
006994 FFFFFFFF
006998 FFFFFFFF
00699C FFFFFFFF
0069A0 FFFFFFFF            DC.L    $FFFFFFFF,$FFFFFFFF,$FFFFFFFF,$FFFFFFFF    TRACE 2
0069A4 FFFFFFFF
0069A8 FFFFFFFF
0069AC FFFFFFFF
0069B0 FFFFFFFF            DC.L    $FFFFFFFF,$FFFFFFFF,$FFFFFFFF,$FFFFFFFF    TRACE 3
0069B4 FFFFFFFF
0069B8 FFFFFFFF
0069BC FFFFFFFF
0069C0 FFFFFFFF            DC.L    $FFFFFFFF,$FFFFFFFF,$FFFFFFFF,$FFFFFFFF    TRACE 4
0069C4 FFFFFFFF
0069C8 FFFFFFFF
0069CC FFFFFFFF
0069D0 FFFFFFFF            DC.L    $FFFFFFFF,$FFFFFFFF,$FFFFFFFF,$FFFFFFFF    TRACE 5
0069D4 FFFFFFFF
0069D8 FFFFFFFF
0069DC FFFFFFFF
0069E0 FFFFFFFF            DC.L    $FFFFFFFF,$FFFFFFFF,$FFFFFFFF,$FFFFFFFF    TRACE 6
0069E4 FFFFFFFF
0069E8 FFFFFFFF
0069EC FFFFFFFF
0069F0 FFFFFFFF            DC.L    $FFFFFFFF,$FFFFFFFF,$FFFFFFFF,$FFFFFFFF    TRACE 7
0069F4 FFFFFFFF
0069F8 FFFFFFFF
0069FC FFFFFFFF
       00002D00            ORG     $2D00
                  * * * * * * * * * * * * * * * * * * * * * * * * * * * * * * * * * * *
                  *                                                                   *
                  *        SUBROUTINE TO TRACE DATA ON I/O INTERRUPTS                 *
                  *                                                                   *
                  * 5000                                                              *
                  *                                                                   *
                  * 4____________________________________________________________4   *
                  * 4               P  S  W           4      P  C      4   PCIB_IN  4   *
                  * 4         4         4         4         4         4         4     4   *
                  * 4EXT_PND4 IO_PND4  MAIN_ST X40   4  MAIN_ST X48   4 INST   4 PUSTAT4 *
                  * 4         4         4         4         4         4 _SAVE_ 4       4   *
                  * 4 IOMASK4         4         4         4         4         4       4   *
                  * 4_________4_________4_________4_________4_________4_________4___4   *
                  *                                                                   *
                  *                                                                   *
                  * * * * * * * * * * * * * * * * * * * * * * * * * * * * * * * * * * *
                  *
       00002D00   IOTRACE  EQU     *
002D00 47F85000            LEA     $5000,A3             POINT TO BUFFER AREA
002D04 26F86030            MOVE.L  PSW,(A3)+
002D08 26F86034            MOVE.L  PSW+4,(A3)+
002D0C 26F86002            MOVE.L  PC,(A3)+
002D10 26C9                MOVE.L  A1,(A3)+
002D12 26F86102            MOVE.L  EXT_INT_PND,(A3)+  (ALSO IO_INT_PND)
002D16 287C80000040        MOVEA.L #ACSW,A4
002D1C 26D4                MOVE.L  (A4),(A3)+
002D1E 26EC0008            MOVE.L  8(A4),(A3)+
002D22 36F8601A            MOVE.W  INSTSAVE,(A3)+
002D26 36F86038            MOVE.W  PUSTAT,(A3)+
002D2A 36F860E2            MOVE.W  IOMASK,(A3)+
002D2E 4E75                RTS
```

```
         00002E00          ORG    $2E00
002E00 00000000            DC.L   0,0,0,0,0,0,0,0,0,0,0,0,0,0,0,0
002E04 00000000
002E08 00000000
002E0C 00000000
002E10 00000000
002E14 00000000
002E18 00000000
002E1C 00000000
002E20 00000000
002E24 00000000
002E28 00000000
002E2C 00000000
002E30 00000000
002E34 00000000
002E38 00000000
002E3C 00000000
002E40 00000000            DC.L   0,0,0,0,0,0,0,0,0,0,0,0,0,0,0,0
002E44 00000000
002E48 00000000
002E4C 00000000
002E50 00000000
002E54 00000000
002E58 00000000
002E5C 00000000
002E60 00000000
002E64 00000000
002E68 00000000
002E6C 00000000
002E70 00000000
002E74 00000000
002E78 00000000
002E7C 00000000
002E80 00000000            DC.L   0,0,0,0,0,0,0,0,0,0,0,0,0,0,0,0
002E84 00000000
002E88 00000000
002E8C 00000000
002E90 00000000
002E94 00000000
002E98 00000000
002E9C 00000000
002EA0 00000000
002EA4 00000000
002EA8 00000000
002EAC 00000000
002EB0 00000000
002EB4 00000000
002EB8 00000000
002EBC 00000000
002EC0 00000000            DC.L   0,0,0,0,0,0,0,0,0,0,0,0,0,0,0,0
002EC4 00000000
002EC8 00000000
002ECC 00000000
002ED0 00000000
002ED4 00000000
002ED8 00000000
002EDC 00000000
002EE0 00000000
002EE4 00000000
002EE8 00000000
002EEC 00000000
002EF0 00000000
002EF4 00000000
002EF8 00000000
002EFC 00000000
                   ************************************************************************
                   *                                                                      *
                   *       INTERFACE AREA TO/FROM CODE WHICH IS ASSOCIATED WITH           *
                   *       THE DEBUG CARD OR SIO/TIO EMULATION. THE SIO/TIO EMULATION     *
                   *       MAY BE TO EITHER PCIO OR TO A CHANNEL EMULATOR VIA THE         *
                   *       PC ACIA. THIS CODE IS DESIGNED TO PROVIDE HOOKS TO THE         *
                   *       CODE AND TO PROVIDE FIXED RETURN PATHS FROM THE CODE.          *
                   *       IF THE DEBUG CARD OR SIO/TIO EMULATION IS PRESENT, THE HOOKS   *
                   *       WILL BE OVERLAYED TO ALLOW ACCESS TO THE APPROPRIATE CODE.     *
                   *                                                                      *
                   ************************************************************************
```

```
       00002F00          ORG     $2F00
       00002F00  IPL0TST EQU     *
002F00 4EF81684          JMP     IPL0_ERR          RETURN FOR NO DEBUG CARD
                 *
                 *----------------------------------------------------------------------
                 *                                                                     *
                 *        THE FOLLOWING INSTRUCTION WILL OVERLAY '2F00' WHEN THE       *
                 *        DEBUG CARD CODE IS PRESENT.                                  *
                 *                                                                     *
                 *        JMP     DEBUGINT          GO TO DEBUG CODE FOR EXT/ACIA      *
                 *                                                                     *
                 *----------------------------------------------------------------------
                 *
       00002F08          ORG     $2F08
       00002F08  IPL2TST EQU     *
002F08 4EF818C4          JMP     IPL2_ERR          RETURN FOR NO DEBUG CARD
                 *
                 *----------------------------------------------------------------------
                 *                                                                     *
                 *        THE FOLLOWING INSTRUCTION WILL OVERLAY '2F08' WHEN THE       *
                 *        DEBUG CARD CODE IS PRESENT.                                  *
                 *                                                                     *
                 *        JMP     DEBUGI2           GO TO DEBUG CODE FOR A/D REQUEST   *
                 *                                                                     *
                 *----------------------------------------------------------------------
                 *
       00002F10          ORG     $2F10
       00002F10  AD_CALL EQU     *
002F10 4EF81E2A          JMP     STOP_LP           RETURN FOR NO DEBUG CARD
                 *
                 *----------------------------------------------------------------------
                 *                                                                     *
                 *        THE FOLLOWING INSTRUCTION WILL OVERLAY '2F10' WHEN THE       *
                 *        DEBUG CARD CODE IS PRESENT.                                  *
                 *                                                                     *
                 *        JMP     DEBUGAD           GO TO DEBUG CODE FOR A/D CALL      *
                 *                                                                     *
                 *----------------------------------------------------------------------
       00002F18          ORG     $2F18
       00002F18  RST_CALL EQU    *
002F18 4E75              RTS     *                 RETURN FOR NO SIO/DEBUG CODE
                 *
                 *----------------------------------------------------------------------
                 *                                                                     *
                 *        THE FOLLOWING INSTRUCTION WILL OVERLAY '2F18' WHEN THE       *
                 *        SIO CODE OR DEBUG CARD IS PRESENT.                           *
                 *                                                                     *
                 *        JMP     DEBUGRST          GO TO SIO/DEBUG CODE FOR RESET     *
                 *                                                                     *
                 *----------------------------------------------------------------------
                 *
       00002F20          ORG     $2F20
       00002F20  INTTEST EQU     *
002F20 4E75              RTS     *                 RETURN FOR NO SIO CODE
                 *
                 *----------------------------------------------------------------------
                 *                                                                     *
                 *        THE FOLLOWING INSTRUCTION WILL OVERLAY '2F20' WHEN THE       *
                 *        SIO CODE IS PRESENT.                                         *
                 *                                                                     *
                 *        JMP     INTTEST           GO TO SIO CODE FOR INTERRUPT TEST  *
                 *                                                                     *
                 *----------------------------------------------------------------------
                 *
       00002F28          ORG     $2F28
       00002F28  SET_ATTN EQU    *
002F28 4EB81FD8          JSR     LOADPAT           INITIALIZE PAT (VIRTUAL = REAL)
002F2C 4EF81BEC          JMP     NO_CMD            RETURN FOR NO SIO CODE
                 *
                 *----------------------------------------------------------------------
                 *                                                                     *
                 *        THE FOLLOWING INSTRUCTION WILL OVERLAY '2F2C' WHEN THE       *
                 *        SIO CODE IS PRESENT.                                         *
                 *                                                                     *
                 *        JMP     SET_ATTN          GO TO SIO CODE TO SET ATTENTION    *
```

```
                         *                                                                    *
                         *--------------------------------------------------------------------
                         *
        00002F30                   ORG      $2F30
        00002F30         TMR_SIO  EQU       *
002F30 4E75                        RTS      *                 RETURN FOR NO SIO CODE
                         *
                         *--------------------------------------------------------------------
                         *                                                                    *
                         *         THE FOLLOWING INSTRUCTION WILL OVERLAY '2F30' WHEN THE    *
                         *         SIO CODE IS PRESENT.                                       *
                         *                                                                    *
                         *         JMP      TMR_SIO           GO TO TEST ASYNCH TIMER INTERRUPT *
                         *                                                                    *
                         *--------------------------------------------------------------------
        00002F40                   ORG      $2F40
                         *********************************************************************
                         *                                                                    *
                         *         ENTRY POINTS FOR SIO/DEBUG CODE TO RETURN TO ECODE         *
                         *                                                                    *
                         *********************************************************************
                         *
002F40 4EF82360          RTN_PREX JMP       PRIVEX            GO TO PRIVILEDGED OP EXCEPTION
002F44 4EF824B8          RTN_FPSW JMP       FETCHPSW          GO TO FETCH PSW
002F48 4EF8180A          RTN_EXTI JMP       EXT_INTR          GO TO EXTERNAL INTERRUPT
002F4C 4EF81BB0          RTN_HSTP JMP       HARDSTOP          GO TO ERROR HARD STOP
002F50 4EF81EBC          RTN_NIO  JMP       IENDNIO           GO TO IO2 IN IO INTERRUPT
002F54 4EF81960          RTN_INTR JMP       IO_INTR           GO TO IO INTERRUPT
002F58 4EF81F0A          RTN_LPSW JMP       IENDINT           GO TO LOAD NEW PSW AND END
002F5C 4EF81E78          RTN_WAIT JMP       WAIT_LP           GO TO WAIT LOOP
002F60 4EF81A2C          RTN_MNOP JMP       MANOP_AD          GO TO MANOP FETCH
002F64 4EF81E36          RTN_ATTN JMP       INTR_PCR          GO TO MANOPS RETURN
002F68 4EF81E42          RTN_INPC JMP       INTR_PC           GO TO INTR_PC
002F6C 4EF81E2A          RTN_STOP JMP       STOP_LP           GO TO STOP LOOP
                         *********************************************************************
                         *                                                                    *
                         *        THE OP TABLE IS A BRANCH ADDRESS TABLE USED TO ACCESS THE   *
                         *        APPROPRIATE ROUTINE WHEN CONTROL IS SWITCHED FROM THE       *
                         *        A-ENGINE TO THE E-ENGINE. A BYTE IN THE OBATCH REG IS USED  *
                         *        TO INDEX INTO THE TABLE. THE BYTE MAY INDICATE THE 370      *
                         *        INSTRUCTION WHICH MUST BE EMULATED IN THE E-ENGINE. IT MAY  *
                         *        ALSO BE AN EXCEPTION CODE WHICH INDICATES VARIOUS ERROR OR  *
                         *        CONTROL CONDITIONS WHICH MUST BE PROCESSED IN THE E-ENGINE. *
                         *        MANY OF THE EXCEPTION CODES USED ARE FOR 370 INSTRUCTIONS   *
                         *        WHICH ARE EXECUTED WHOLLY IN THE A-ENGINE. THE TABLE WILL   *
                         *        INDICATE THE EXECUTION ENGINE. ANY CODE WHICH IS PROCESSED  *
                         *        IN THE A-ENGINE AND DOES NOT HAVE AN EXCEPTION FUNCTION     *
                         *        ASSIGNED WILL SET AN ERROR REFERENCE CODE.                  *
                         *                                                                    *
                         *********************************************************************
        00003C00                  ORG       OPTABLE
                         *
003C00 1B52                       DC        CS_3030           INVALID IN A-ENGINE         00   A
003C02 1B52                       DC        CS_3030           INVALID IN A-ENGINE         01   A
003C04 1B52                       DC        CS_3030           INVALID IN A-ENGINE         02   A
003C06 1B52                       DC        CS_3030           INVALID IN A-ENGINE         03   A
003C08 0F7E                       DC        SPM               SET PROGRAM MASK     SPM    04   E
003C0A 1B52                       DC        CS_3030           BRANCH AND LINK      BALR   05   A
003C0C 1B52                       DC        CS_3030           BRANCH ON COUNT      BCTR   06   A
003C0E 1B52                       DC        CS_3030           BRANCH ON CONDITION  BCR    07   A
003C10 0FFA                       DC        SSK               SET STORAGE KEY      SSK    08   E
003C12 09A2                       DC        ISK               INSERT STORAGE KEY   ISK    09   E
003C14 1326                       DC        SVC               SUPERVISOR CALL      SVC    0A   E
003C16 1B52                       DC        CS_3030           INVALID IN A-ENGINE         0B   A
003C18 1B52                       DC        CS_3030           INVALID IN A-ENGINE         0C   A
003C1A 1B52                       DC        CS_3030           INVALID IN A-ENGINE  BASR   0D   A
003C1C 0C66                       DC        MVCL              MOVE LONG            MVCL   0E   E
003C1E 03F8                       DC        CLCL              COMPARE LOGICAL LONG CLCL   0F   E
                         *
003C20 1B52                       DC        CS_3030           LOAD POSITIVE        LPR    10   A
003C22 1B52                       DC        CS_3030           LOAD NEGATIVE        LNR    11   A
003C24 1B52                       DC        CS_3030           LOAD AND TEST        LTR    12   A
003C26 1B52                       DC        CS_3030           LOAD COMPLEMENT      LCR    13   A
003C28 1B52                       DC        CS_3030           AND                  NR     14   A
003C2A 1B52                       DC        CS_3030           COMPARE LOGICAL      CLR    15   A
```

```
003C2C 1B52          DC     CS_3030     OR                       OR     16  A
003C2E 1B52          DC     CS_3030     EXCLUSIVE OR             XR     17  A
003C30 1B52          DC     CS_3030     LOAD                     LR     18  A
003C32 1B52          DC     CS_3030     COMPARE                  CR     19  A
003C34 1B52          DC     CS_3030     ADD                      AR     1A  A
003C36 1B52          DC     CS_3030     SUBTRACT                 SR     1B  A
003C38 1B52          DC     CS_3030     MULTIPLY                 MR     1C  A
003C3A 1B52          DC     CS_3030     DIVIDE                   DR     1D  A
003C3C 1B52          DC     CS_3030     ADD LOGICAL              ALR    1E  A
003C3E 1B52          DC     CS_3030     SUBTRACT LOGICAL         SLR    1F  A
003C40 1B52          DC     CS_3030     LOAD POSITIVE            LPDR   20  A
003C42 1B52          DC     CS_3030     LOAD NEGATIVE            LNDR   21  A
003C44 1B52          DC     CS_3030     LOAD AND TEST            LTDR   22  A
003C46 1B52          DC     CS_3030     LOAD COMPLEMENT          LCDR   23  A
003C48 1B52          DC     CS_3030     HALVE                    HDR    24  A
003C4A 1482          DC     LRDR        LOAD ROUNDED             LRDR   25  E
003C4C 1482          DC     MXR         MULTIPLY                 MXR    26  E
003C4E 1482          DC     MXDR        MULTIPLY                 MXDR   27  E
003C50 1B52          DC     CS_3030     LOAD                     LDR    28  A
003C52 1B52          DC     CS_3030     COMPARE                  CDR    29  A
003C54 1B52          DC     CS_3030     ADD NORMALIZED           ADR    2A  A
003C56 1B52          DC     CS_3030     SUBTRACT NORMALIZED      SDR    2B  A
003C58 1B52          DC     CS_3030     MULTIPLY                 MDR    2C  A
003C5A 1B52          DC     CS_3030     DIVIDE                   DDR    2D  A
003C5C 1B52          DC     CS_3030     ADD UNNORMALIZED         AWR    2E  A
003C5E 1B52          DC     CS_3030     SUBTRACT UNNORMALIZED    SWR    2F  A
                *
003C60 1B52          DC     CS_3030     LOAD POSITIVE            LPER   30  A
003C62 1B52          DC     CS_3030     LOAD NEGATIVE            LNER   31  A
003C64 1B52          DC     CS_3030     LOAD AND TEST            LTER   32  A
003C66 1B52          DC     CS_3030     LOAD COMPLEMENT          LCER   33  A
003C68 1B52          DC     CS_3030     HALVE                    HER    34  A
003C6A 1482          DC     LRER        LOAD ROUNDED             LRER   35  E
003C6C 1482          DC     AXR         ADD NORMALIZED           AXR    36  E
003C6E 1482          DC     SXR         SUBTRACT NORMALIZED      SXR    37  E
003C70 1B52          DC     CS_3030     LOAD                     LER    38  A
003C72 1B52          DC     CS_3030     COMPARE                  CER    39  A
003C74 1B52          DC     CS_3030     ADD NORMALIZED           AER    3A  A
003C76 1B52          DC     CS_3030     SUBTRACT NORMALIZED      SER    3B  A
003C78 1B52          DC     CS_3030     MULTIPLY                 MER    3C  A
003C7A 1B52          DC     CS_3030     DIVIDE                   DER    3D  A
003C7C 1B52          DC     CS_3030     ADD UNNORMALIZED         AUR    3E  A
003C7E 1B52          DC     CS_3030     SUBTRACT UNNORMALIZED    SUR    3F  A
003C80 1B52          DC     CS_3030     STORE HALFWORD           STH    40  A
003C82 1B52          DC     CS_3030     LOAD ADDRESS             LA     41  A
003C84 1B52          DC     CS_3030     STORE CHARACTER          STC    42  A
003C86 1B52          DC     CS_3030     INSERT CHARACTER         IC     43  A
003C88 07A0          DC     EX          EXECUTE                  EX     44  E
                *                       BRANCH AND LINK          BAL    45  A
003C8A 1518          DC     BUSERRET    BUS ERROR DURING CLCL/MVCL      45  X
003C8C 1B52          DC     CS_3030     BRANCH ON COUNT          BCT    46  A
003C8E 1B52          DC     CS_3030     BRANCH ON CONDITION      BC     47  A
003C90 1B52          DC     CS_3030     LOAD HALFWORD            LH     48  A
                *                       COMPARE HALFWORD         CH     49  A
003C92 23D4          DC     FIXPTDIV    FIXED POINT DIVIDE EXCEPTION    49  X
                *                       ADD HALFWORD             AH     4A  A
003C94 23D8          DC     DECOVFX2    DECIMAL OVERFLOW EXCEPTION      4A  X
003C96 1B52          DC     CS_3030     SUBTRACT HALFWORD        SH     4B  A
                *                       MULTIPLY HALFWORD        MH     4C  A
003C98 23EA          DC     EXPOVFX2    EXPONENT OVERFOW EXCEPTION      4C  X
003C9A 1B52          DC     CS_3030     INVALID IN A-ENGINE      BAS    4D  A
003C9C 1482          DC     CVD         CONVERT TO DECIMAL       CVD    4E  E
003C9E 1482          DC     CVB         CONVERT TO BINARY        CVB    4F  E
                *
003CA0 1B52          DC     CS_3030     STORE                    ST     50  A
003CA2 1B52          DC     CS_3030     INVALID IN A-ENGINE             51  A
003CA4 1B52          DC     CS_3030     INVALID IN A-ENGINE             52  A
003CA6 1B52          DC     CS_3030     INVALID IN A-ENGINE             53  A
003CA8 1B52          DC     CS_3030     AND                      N      54  A
003CAA 1B52          DC     CS_3030     COMPARE LOGICAL          CL     55  A
003CAC 1B52          DC     CS_3030     OR                       O      56  A
003CAE 1B52          DC     CS_3030     EXCLUSIVE OR             X      57  A
003CB0 1B52          DC     CS_3030     LOAD                     L      58  A
003CB2 1B52          DC     CS_3030     COMPARE                  C      59  A
003CB4 1B52          DC     CS_3030     ADD                      A      5A  A
003CB6 1B52          DC     CS_3030     SUBTRACT                 S      5B  A
```

```
003CB8 1B52          DC   CS_3030    MULTIPLY                    M      5C    A
                *                    DIVIDE                      D      5D    A
003CBA 23F2          DC   EXPUNDX2   EXPONENT UNDERFLOW EXCEPTION       5D    X
                *                    ADD LOGICAL                 AL     5E    A
003CBC 2400          DC   SIGNIFX2   SIGNIFICANCE EXCEPTION             5E    X
003CBE 1B52          DC   CS_3030    SUBTRACT LOGICAL            SL     5F    A
003CC0 1B52          DC   CS_3030    STORE                       STD    60    A
003CC2 1B52          DC   CS_3030    INVALID IN A-ENGINE                61    A
003CC4 1B52          DC   CS_3030    INVALID IN A-ENGINE                62    A
003CC6 1B52          DC   CS_3030    INVALID IN A-ENGINE                63    A
003CC8 1B52          DC   CS_3030    INVALID IN A-ENGINE                64    A
003CCA 1B52          DC   CS_3030    INVALID IN A-ENGINE                65    A
003CCC 1B52          DC   CS_3030    INVALID IN A-ENGINE                66    A
003CCE 1482          DC   MXD        MULTIPLY                    MXD    67    E
003CD0 1B52          DC   CS_3030    LOAD                        LD     68    A
003CD2 1B52          DC   CS_3030    COMPARE                     CD     69    A
003CD4 1B52          DC   CS_3030    ADD NORMALIZED              AD     6A    A
003CD6 1B52          DC   CS_3030    SUBTRACT NORMALIZED         SD     6B    A
003CD8 1B52          DC   CS_3030    MULTIPLY                    MD     6C    A
003CDA 1B52          DC   CS_3030    DIVIDE                      DD     6D    A
003CDC 1B52          DC   CS_3030    ADD UNNORMALIZED            AW     6E    A
003CDE 1B52          DC   CS_3030    SUBTRACT UNNORMALIZED       SW     6F    A
                *
003CE0 1B52          DC   CS_3030    STORE                       STE    70    A
003CE2 1B52          DC   CS_3030    INVALID IN A-ENGINE                71    A
003CE4 1B52          DC   CS_3030    INVALID IN A-ENGINE                72    A
003CE6 1B52          DC   CS_3030    INVALID IN A-ENGINE                73    A
003CE8 1B52          DC   CS_3030    INVALID IN A-ENGINE                74    A
003CEA 1B52          DC   CS_3030    INVALID IN A-ENGINE                75    A
003CEC 1B52          DC   CS_3030    INVALID IN A-ENGINE                76    A
003CEE 1B52          DC   CS_3030    INVALID IN A-ENGINE                77    A
003CF0 1B52          DC   CS_3030    LOAD                        LE     78    A
003CF2 1B52          DC   CS_3030    COMPARE                     CE     79    A
003CF4 1B52          DC   CS_3030    ADD NORMALIZED              AE     7A    A
003CF6 1B52          DC   CS_3030    SUBTRACT NORMALIZED         SE     7B    A
003CF8 1B52          DC   CS_3030    MULTIPLY                    ME     7C    A
003CFA 1B52          DC   CS_3030    DIVIDE                      DE     7D    A
003CFC 1B52          DC   CS_3030    ADD UNNORMALIZED            AU     7E    A
003CFE 1B52          DC   CS_3030    SUBTRACT UNNORMALIZED       SU     7F    A
                *
003D00 1060          DC   SSM        SET SYSTEM MASK             SSM    80    E
003D02 1B52          DC   CS_3030    INVALID IN A-ENGINE                81    A
003D04 0A90          DC   LPSW       LOAD PSW                    LPSW   82    E
003D06 0628          DC   DIAG       DIAGNOSE                           83    E
003D08 235C          DC   OPEXCP1    INVALID IN E-ENGINE         WRD    84    E
003D0A 235C          DC   OPEXCP1    INVALID IN E-ENGINE         RDD    85    E
003D0C 1B52          DC   CS_3030    BRANCH ON INDEX HI          BXH    86    A
003D0E 1B52          DC   CS_3030    BRANCH ON INDEX LO/EQ       BXLE   87    A
003D10 1B52          DC   CS_3030    SHIFT RIGHT SNGL LOG        SRL    88    A
003D12 1B52          DC   CS_3030    SHIFT LEFT SNGL LOG         SLL    89    A
003D14 1B52          DC   CS_3030    SHIFT RIGHT SINGLE          SRA    8A    A
003D16 1B52          DC   CS_3030    SHIFT LEFT SINGLE           SLA    8B    A
003D18 1B52          DC   CS_3030    SHIFT RIGHT DBL LOG         SRDL   8C    A
003D1A 1B52          DC   CS_3030    SHIFT LEFT DBL LOG          SLDL   8D    A
003D1C 1B52          DC   CS_3030    SHIFT RIGHT DOUBLE          SRDA   8E    A
003D1E 1B52          DC   CS_3030    SHIFT LEFT DOUBLE           SLDA   8F    A
003D20 1B52          DC   CS_3030    STORE MULTIPLE              STM    90    A
003D22 1B52          DC   CS_3030    TEST UNDER MASK             TM     91    A
003D24 1B52          DC   CS_3030    MOVE IMMEDIATE              MVI    92    A
003D26 13A8          DC   TS         TEST AND SET                TS     93    E
003D28 1B52          DC   CS_3030    AND IMMEDIATE               NI     94    A
003D2A 1B52          DC   CS_3030    COMPARE LOGICAL IMMED       CLI    95    A
                *                    OR IMMEDIATE                OI     96    A
003D2C 238E          DC   SPECEX     SPECIFICATION EXCEPTION            96    X
003D2E 1B52          DC   CS_3030    EXCLUSIVE OR IMMED          XI     97    A
003D30 1B52          DC   CS_3030    LOAD MULTIPLE               LM     98    A
003D32 1B52          DC   CS_3030    INVALID IN  A-ENGINE               99    A
003D34 1B52          DC   CS_3030    INVALID IN A-ENGINE                9A    A
003D36 1B52          DC   CS_3030    INVALID IN A-ENGINE                9B    A
003D38 1474          DC   SIOSIOF    START I/O                   SIO    9C00  E
                *                    START I/O FAST RELEASE      SIOF   9C01  E
                *                    RESUME I/O                  RIO    9C02  E
003D3A 1474          DC   TIOCLRIO   TEST I/O                    TIO    9D00  E
                *                    CLEAR I/O                   CLRIO  9D01  E
003D3C 1474          DC   HIOHDV     HALT I/O                    HIO    9E00  E
```

```
                *                               HALT DEVICE         HDV     9E01 E
003D3E 1474             DC      TCHCLRCH        TEST CHANNEL        TCH     9F00 E
                *                               CLEAR CHANNEL       CLRCH   9F01 E
                *
                *                               INVALID IN A-ENGINE         A0   A
003D40 2368             DC      ACCESSX1        A-ENGINE IFETCH1 ACCESS ERROR A0 X
                *                               INVALID IN A-ENGINE         A1   A
003D42 1546             DC      BUSERRA1        A-ENGINE IFETCH2 ACCESS ERROR A1 X
                *                               INVALID IN A-ENGINE         A2   A
003D44 1556             DC      BUSERRA2        A-ENGINE PRIV/OPER ACC ERROR A2  X
                *                               INVALID IN A-ENGINE         A3   A
003D46 2776             DC      TRACERET        PSR TRACE ACTIVE            A3   X
                *                               INVALID IN A-ENGINE         A4   A
003D48 1904             DC      INTERUPT        INTERRUPT DETECTED          A4   X
                *                               INVALID IN A-ENGINE         A5   A
003D4A 1B52             DC      CS_3030         ERRONEOUS A-ENGINE RESET RTN A5  X
                *                               INVALID IN A-ENGINE         A6   A
003D4C 1A88             DC      MC_A600         A-ENGINE MICROCODE BR ERROR A6   X
                *                               INVALID IN A-ENGINE         A7   A
003D4E 151C             DC      BUSERRA7        BUS ERROR, DEC OR FLT PT    A7   X
003D50 1B52             DC      CS_3030         INVALID IN A-ENGINE         A8   A
003D52 1B52             DC      CS_3030         INVALID IN A-ENGINE         A9   A
003D54 1B52             DC      CS_3030         INVALID IN A-ENGINE         AA   A
003D56 1B52             DC      CS_3030         INVALID IN A-ENGINE         AB   A
003D58 12A0             DC      STNSM           STORE/AND SYS MASK  STNSM   AC   E
003D5A 12C4             DC      STOSM           STORE/OR SYS MASK   STOSM   AD   E
003D5C 235C             DC      OPEXCP1         INVALID IN E-ENGINE SIGP    AE   E
003D5E 0BFC             DC      MC              MONITOR CALL        MC      AF   E
003D60 1B52             DC      CS_3030         INVALID IN A-ENGINE         B0   A
003D62 0ABE             DC      LRA             LOAD REAL ADDRESS   LRA     B1   E
003D64 027C             DC      B2OPS           B2 OPS SUB-TABLE            B2   E
                *
                *               ALL SHOWN IN B2 OPERATION TABLE
                *
003D66 1B52             DC      CS_3030         INVALID IN A-ENGINE         B3   A
003D68 1B52             DC      CS_3030         INVALID IN A-ENGINE         B4   A
003D6A 1B52             DC      CS_3030         INVALID IN A-ENGINE         B5   A
003D6C 11F6             DC      STCTL           STORE CONTROL       STCTL   B6   E
003D6E 0A0C             DC      LCTL            LOAD CONTROL        LCTL    B7   E
003D70 1B52             DC      CS_3030         INVALID IN A-ENGINE         B8   A
003D72 1B52             DC      CS_3030         INVALID IN A-ENGINE         B9   A
003D74 02D2             DC      CS              COMPARE AND SWAP    CS      BA   E
003D76 030A             DC      CDS             COMPARE DBL AND SWAP CDS    BB   E
003D78 1B52             DC      CS_3030         INVALID IN A-ENGINE         BC   A
003D7A 036A             DC      CLM             COMPARE LOGICAL CHARS CLM   BD   E
003D7C 1150             DC      STCM            STORE CHARS UNDER MASK STCM BE   E
003D7E 0890             DC      ICM             INSERT CHAR UNDER MASK ICM  BF   E
                *
                *                               INVALID IN A-ENGINE         C0   A
003D80 0200             DC      RETURN          E-ENGINE HAD ABORT/ PSW SWAP C0  X
                *                               INVALID IN A-ENGINE         C1   A
003D82 234A             DC      OPEXCP          OPERATION EXCEPTION         C1   X
003D84 1B52             DC      CS_3030         INVALID IN A-ENGINE         C2   A
003D86 1B52             DC      CS_3030         INVALID IN A-ENGINE         C3   A
003D88 1B52             DC      CS_3030         INVALID IN A-ENGINE         C4   A
003D8A 1B52             DC      CS_3030         INVALID IN A-ENGINE         C5   A
                *                               INVALID IN A-ENGINE         C6   A
003D8C 23A2             DC      SPECEXC         SPECIFICATION EXCEPTION     C6   X
                *                               INVALID IN A-ENGINE         C7   A
003D8E 23C2             DC      DATAEX          DATA EXCEPTION              C7   X
                *                               INVALID IN A-ENGINE         C8   A
003D90 23C6             DC      FIXPTOVF        FIXED-POINT OVERFLOW        C8   X
                *                               INVALID IN A -ENGINE        C9   A
003D92 23D4             DC      FIXPTDIV        FIXED-POINT DIVIDE EXCEPTION C9  X
003D94 1B52             DC      CS_3030         INVALID IN A-ENGINE         CA   A
                *                               INVALID IN A-ENGINE         CB   A
003D96 23E6             DC      DECDIVEX        DECIMAL DIVIDE EXCEPTION    CB   X
                *                               INVALID IN A_ENGINE         CC   A
003D98 23EE             DC      EXPOVFEX        EXPONENT OVERFLOW           CC   X
                *                               INVALID IN A-ENGINE         CD   A
003D9A 23F6             DC      EXPUNDEX        EXPONENT UNDERFLOW          CD   X
                *                               INVALID IN A-ENGINE         CE   A
003D9C 2404             DC      SIGNIFEX        SIGNIFICANCE EXCEPTION      CE   X
003D9E 1B52             DC      CS_3030         INVALID IN A-ENGINE         CF   A
```

```
0030A0 1B52          DC      CS_3030        INVALID IN A-ENGINE             D0   A
0030A2 1B52          DC      CS_3030        MOVE NUMERICS         MVN       D1   A
0030A4 1B52          DC      CS_3030        MOVE CHARACTER        MVC       D2   A
0030A6 1B52          DC      CS_3030        MOVE ZONES            MVZ       D3   A
0030A8 1B52          DC      CS_3030        AND CHARACTER         NC        D4   A
0030AA 1B52          DC      CS_3030        COMPARE LOGICAL CHAR  CLC       D5   A
0030AC 1B52          DC      CS_3030        OR CHARACTER          OC        D6   A
0030AE 1B52          DC      CS_3030        EXCLUSIVE OR CHAR     XC        D7   A
0030B0 1B52          DC      CS_3030        INVALID IN A-ENGINE             D8   A
0030B2 1B52          DC      CS_3030        INVALID IN A-ENGINE   MVCK      D9   A
0030B4 1B52          DC      CS_3030        INVALID IN A-ENGINE   MVCP      DA   A
0030B6 1B52          DC      CS_3030        INVALID IN A-ENGINE   MVCS      DB   A
0030B8 13CA          DC      TR             TRANSLATE             TR        DC   E
0030BA 1424          DC      TRT            TRANSLATE AND TEST    TRT       DD   E
0030BC 0696          DC      ED             EDIT                  ED        DE   E
0030BE 0696          DC      EDMK           EDIT AND MARK         EDMK      DF   E
               *
0030C0 1B52          DC      CS_3030        INVALID IN A-ENGINE             E0   A
0030C2 1B52          DC      CS_3030        INVALID IN A-ENGINE             E1   A
0030C4 1B52          DC      CS_3030        INVALID IN A-ENGINE             E2   A
0030C6 1B52          DC      CS_3030        INVALID IN A-ENGINE             E3   A
0030C8 1B52          DC      CS_3030        INVALID IN A-ENGINE             E4   A
0030CA 1B52          DC      CS_3030        INVALID IN A-ENGINE   LASP      E500 A
               *                            INVALID IN A-ENGINE   TPROT     E501 A
0030CC 1B52          DC      CS_3030        INVALID IN A-ENGINE             E6   A
0030CE 1B52          DC      CS_3030        INVALID IN A-ENGINE             E7   A
0030D0 0C38          DC      MVCIN          MOVE CHAR INVERSE     MVCIN     E8   E
0030D2 1B52          DC      CS_3030        INVALID IN A-ENGINE             E9   A
0030D4 1B52          DC      CS_3030        INVALID IN A-ENGINE             EA   A
0030D6 1B52          DC      CS_3030        INVALID IN A-ENGINE             EB   A
0030D8 1B52          DC      CS_3030        INVALID IN A-ENGINE             EC   A
0030DA 1B52          DC      CS_3030        INVALID IN A-ENGINE             ED   A
0030DC 1B52          DC      CS_3030        INVALID IN A-ENGINE             EE   A
0030DE 1B52          DC      CS_3030        INVALID IN A-ENGINE             EF   A
               *
0030E0 1482          DC      SRP            SHIFT AND ROUND DEC   SRP       F0   E
0030E2 1B52          DC      CS_3030        MOVE WITH OFFSET      MVO       F1   A
0030E4 1B52          DC      CS_3030        PACK                  PACK      F2   A
0030E6 1B52          DC      CS_3030        UNPACK                UNPK      F3   A
0030E8 1B52          DC      CS_3030        INVALID IN A-ENGINE             F4   A
0030EA 1B52          DC      CS_3030        INVALID IN A-ENGINE             F5   A
0030EC 1B52          DC      CS_3030        INVALID IN A-ENGINE             F6   A
0030EE 1B52          DC      CS_3030        INVALID IN A-ENGINE             F7   A
0030F0 1482          DC      ZAP            ZERO AND ADD          ZAP       F8   E
0030F2 1482          DC      CP             COMPARE DECIMAL       CP        F9   E
0030F4 1482          DC      AP             ADD DECIMAL           AP        FA   E
0030F6 1482          DC      SUBDEC         SUBTRACT DECIMAL      SP        FB   E
0030F8 1482          DC      MP             MULTIPLY DECIMAL      MP        FC   E
0030FA 1482          DC      DP             DIVIDE DECIMAL        DP        FD   E
0030FC 1B52          DC      CS_3030        INVALID IN A-ENGINE             FE   A
0030FE 1B52          DC      CS_3030        INVALID IN A-ENGINE             FF   A
               *
               * * * * * * * * * * * * * * * * * * * * * * * * * * * * * * * * * * *
               *                                                                   *
               *         FLAGS                                                     *
               *     BIT 7 -  PC/PSR INVALID  (DECIMAL OR FP OP) ON BUS ERROR      *
               *         6 -  SPECIAL PROCESSING FOR CLCL/MVCL BUS ERRORS          *
               *         5 -  MACHINE CHECK CONDITION - BUS ERROR DURING EXCEPTION *
               *         4 -  INVALID OP FOR E-ENGINE                              *
               *         3 -  SPARE                                                *
               *         2 -  SPARE                                                *
               *         1 -  BRANCH INSTRUCTION - SPECIAL EXECUTE/PER HANDLING    *
               *         0 -  BRANCH INSTRUCTION - SPECIAL EXECUTE/PER HANDLING    *
               *                                                                   *
               * * * * * * * * * * * * * * * * * * * * * * * * * * * * * * * * * * *
               *
       00003E00      ORG     BETABLE
003E00 10            DC.B    $10            .          00
003E01 10            DC.B    $10            .          01
003E02 10            DC.B    $10            .          02
003E03 10            DC.B    $10            .          03
003E04 00            DC.B    $00            SPM        04
003E05 13            DC.B    $13            BALR       05
003E06 12            DC.B    $12            BCTR       06
003E07 11            DC.B    $11            BCR        07
```

```
003E08 00          DC.B    $00          SSK        08
003E09 00          DC.B    $00          ISK        09
003E0A 00          DC.B    $00          SVC        0A
003E0B 10          DC.B    $10          .          0B
003E0C 10          DC.B    $10          .          0C
003E0D 10          DC.B    $10          .          0D
003E0E 40          DC.B    $40          MVCL       0E
003E0F 40          DC.B    $40          CLCL       0F
            *
003E10 10          DC.B    $10          LPR        10
003E11 10          DC.B    $10          LNR        11
003E12 10          DC.B    $10          LTR        12
003E13 10          DC.B    $10          LCR        13
003E14 10          DC.B    $10          NR         14
003E15 10          DC.B    $10          CLR        15
003E16 10          DC.B    $10          OR         16
003E17 10          DC.B    $10          XR         17
003E18 10          DC.B    $10          LR         18
003E19 10          DC.B    $10          CR         19
003E1A 10          DC.B    $10          AR         1A
003E1B 10          DC.B    $10          SR         1B
003E1C 10          DC.B    $10          MR         1C
003E1D 10          DC.B    $10          DR         1D
003E1E 10          DC.B    $10          ALR        1E
003E1F 10          DC.B    $10          SLR        1F
003E20 10          DC.B    $10          LPDR       20
003E21 10          DC.B    $10          LNDR       21
003E22 10          DC.B    $10          LTDR       22
003E23 10          DC.B    $10          LCDR       23
003E24 10          DC.B    $10          HDR        24
003E25 80          DC.B    $80          LRDR       25
003E26 80          DC.B    $80          MXR        26
003E27 80          DC.B    $80          MXDR       27
003E28 10          DC.B    $10          LDR        28
003E29 10          DC.B    $10          CDR        29
003E2A 10          DC.B    $10          ADR        2A
003E2B 10          DC.B    $10          SDR        2B
003E2C 10          DC.B    $10          MDR        2C
003E2D 10          DC.B    $10          DDR        2D
003E2E 10          DC.B    $10          AWR        2E
003E2F 10          DC.B    $10          SWR        2F
            *
003E30 10          DC.B    $10          LPER       30
003E31 10          DC.B    $10          LNER       31
003E32 10          DC.B    $10          LTER       32
003E33 10          DC.B    $10          LCER       33
003E34 10          DC.B    $10          HER        34
003E35 80          DC.B    $80          LRER       35
003E36 80          DC.B    $80          AXR        36
003E37 80          DC.B    $80          SXR        37
003E38 10          DC.B    $10          LER        38
003E39 10          DC.B    $10          CER        39
003E3A 10          DC.B    $10          AER        3A
003E3B 10          DC.B    $10          SER        3B
003E3C 10          DC.B    $10          MER        3C
003E3D 10          DC.B    $10          DER        3D
003E3E 10          DC.B    $10          AUR        3E
003E3F 10          DC.B    $10          SUR        3F
            *
003E40 10          DC.B    $10          STH        40
003E41 10          DC.B    $10          LA         41
003E42 10          DC.B    $10          STC        42
003E43 10          DC.B    $10          IC         43
003E44 00          DC.B    $00          EX         44
003E45 13          DC.B    $13          BAL        45
003E46 11          DC.B    $11          BCT        46
003E47 11          DC.B    $11          BC         47
003E48 10          DC.B    $10          LH         48
003E49 30          DC.B    $30          FIXP DIV   49
003E4A 30          DC.B    $30          DEC OVFLOW 4A
003E4B 10          DC.B    $10          .          4B
003E4C 30          DC.B    $30          EXP OVFLOW 4C
003E4D 10          DC.B    $10          .          4D
003E4E 80          DC.B    $80          CVD        4E
003E4F 80          DC.B    $80          CVB        4F
            *
```

```
                 *
003E50 10              DC.B    $10          ST          50
003E51 10              DC.B    $10          .           51
003E52 10              DC.B    $10          .           52
003E53 10              DC.B    $10          .           53
003E54 10              DC.B    $10          N           54
003E55 10              DC.B    $10          CL          55
003E56 10              DC.B    $10          O           56
003E57 10              DC.B    $10          X           57
003E58 10              DC.B    $10          L           58
003E59 10              DC.B    $10          C           59
003E5A 10              DC.B    $10          A           5A
003E5B 10              DC.B    $10          S           5B
003E5C 10              DC.B    $10          M           5C
003E5D 30              DC.B    $30          EXP UNDFLW  5D
003E5E 30              DC.B    $30          SIGNIF XCP  5E
003E5F 10              DC.B    $10          SL          5F
                 *
003E60 10              DC.B    $10          STD         60
003E61 10              DC.B    $10          .           61
003E62 10              DC.B    $10          .           62
003E63 10              DC.B    $10          .           63
003E64 10              DC.B    $10          .           64
003E65 10              DC.B    $10          .           65
003E66 10              DC.B    $10          .           66
003E67 80              DC.B    $80          MXD         67
003E68 10              DC.B    $10          LD          68
003E69 10              DC.B    $10          CD          69
003E6A 10              DC.B    $10          AD          6A
003E6B 10              DC.B    $10          SD          6B
003E6C 10              DC.B    $10          MD          6C
003E6D 10              DC.B    $10          DD          6D
003E6E 10              DC.B    $10          AW          6E
003E6F 10              DC.B    $10          SW          6F
                 *
003E70 10              DC.B    $10          STE         70
003E71 10              DC.B    $10          .           71
003E72 10              DC.B    $10          .           72
003E73 10              DC.B    $10          .           73
003E74 10              DC.B    $10          .           74
003E75 10              DC.B    $10          .           75
003E76 10              DC.B    $10          .           76
003E77 10              DC.B    $10          .           77
003E78 10              DC.B    $10          LE          78
003E79 10              DC.B    $10          CE          79
003E7A 10              DC.B    $10          AE          7A
003E7B 10              DC.B    $10          SE          7B
003E7C 10              DC.B    $10          ME          7C
003E7D 10              DC.B    $10          DE          7D
003E7E 10              DC.B    $10          AU          7E
003E7F 10              DC.B    $10          SU          7F
                 *
                 *
003E80 00              DC.B    $00          SSM         80
003E81 10              DC.B    $10          .           81
003E82 00              DC.B    $00          LPSW        82
003E83 00              DC.B    $00          DIAG        83
003E84 00              DC.B    $00          WRD         84
003E85 00              DC.B    $00          RDD         85
003E86 11              DC.B    $11          BXH         86
003E87 11              DC.B    $11          BXLE        87
003E88 10              DC.B    $10          SRL         88
003E89 10              DC.B    $10          SLL         89
003E8A 10              DC.B    $10          SRA         8A
003E8B 10              DC.B    $10          SLA         8B
003E8C 10              DC.B    $10          SRDL        8C
003E8D 10              DC.B    $10          SLDL        8D
003E8E 10              DC.B    $10          SRDA        8E
003E8F 10              DC.B    $10          SLDA        8F
                 *
003E90 10              DC.B    $10          STM         90
003E91 10              DC.B    $10          TM          91
003E92 10              DC.B    $10          MVI         92
003E93 00              DC.B    $00          TS          93
003E94 10              DC.B    $10          NI          94
003E95 10              DC.B    $10          CLI         95
```

```
003E96 30          DC.B    $30          SPEC EXCP  96
003E97 10          DC.B    $10          XI         97
003E98 10          DC.B    $10          LM         98
003E99 10          DC.B    $10          .          99
003E9A 10          DC.B    $10          .          9A
003E9B 10          DC.B    $10          .          9B
003E9C 00          DC.B    $00          SIO/SIOF   9C
003E9D 00          DC.B    $00          TIO/CLRIO  9D
003E9E 00          DC.B    $00          HIO/HDV    9E
003E9F 00          DC.B    $00          TCH/CLRCH  9F
            *
003EA0 30          DC.B    $30          ACCERR     A0
003EA1 30          DC.B    $30          BUSERRA1   A1
003EA2 30          DC.B    $30          BUSERRA2   A2
003EA3 00          DC.B    $00          TRACE      A3
003EA4 30          DC.B    $30          INTERRUPT  A4
003EA5 10          DC.B    $10          .          A5
003EA6 30          DC.B    $30          AENGMC     A6
003EA7 10          DC.B    $10          BUSERRA7   A7
003EA8 10          DC.B    $10          .          A8
003EA9 10          DC.B    $10          .          A9
003EAA 10          DC.B    $10          .          AA
003EAB 10          DC.B    $10          .          AB
003EAC 00          DC.B    $00          STNSM      AC
003EAD 00          DC.B    $00          STOSM      AD
003EAE 00          DC.B    $00          SIGP       AE
003EAF 00          DC.B    $00          MC         AF
            *
            *
003EB0 10          DC.B    $10          .          B0
003EB1 00          DC.B    $00          LRA        B1
003EB2 00          DC.B    $00          B2 OPS     B2
003EB3 10          DC.B    $10          .          B3
003EB4 10          DC.B    $10          .          B4
003EB5 10          DC.B    $10          .          B5
003EB6 00          DC.B    $00          STCTL      B6
003EB7 00          DC.B    $00          LCTL       B7
003EB8 10          DC.B    $10          .          B8
003EB9 10          DC.B    $10          .          B9
003EBA 00          DC.B    $00          CS         BA
003EBB 00          DC.B    $00          CDS        BB
003EBC 10          DC.B    $10          .          BC
003EBD 00          DC.B    $00          CLM        BD
003EBE 00          DC.B    $00          STCM       BE
003EBF 00          DC.B    $00          ICM        BF
            *
003EC0 30          DC.B    $30          PSW SWAP   C0
003EC1 30          DC.B    $30          OP EXCP    C1
003EC2 10          DC.B    $10          A-ENG BUS  C2
003EC3 10          DC.B    $10          A-ENG BND  C3
003EC4 10          DC.B    $10          .          C4
003EC5 10          DC.B    $10          .          C5
003EC6 30          DC.B    $30          SPEC EXCP  C6
003EC7 30          DC.B    $30          DATA EXCP  C7
003EC8 30          DC.B    $30          FIX OVFLOW C8
003EC9 30          DC.B    $30          FIX DIVIDE C9
003ECA 10          DC.B    $10          .          CA
003ECB 30          DC.B    $30          DEC DIVIDE CB
003ECC 30          DC.B    $30          EXP OVFLOW CC
003ECD 30          DC.B    $30          EXP UNFLOW CD
003ECE 30          DC.B    $30          SIGNIF     CE
003ECF 10          DC.B    $10          .          CF
            *
            *
003ED0 10          DC.B    $10          .          D0
003ED1 10          DC.B    $10          MVN        D1
003ED2 10          DC.B    $10          MVC        D2
003ED3 10          DC.B    $10          MVZ        D3
003ED4 10          DC.B    $10          NC         D4
003ED5 10          DC.B    $10          CLC        D5
003ED6 10          DC.B    $10          OC         D6
003ED7 10          DC.B    $10          XC         D7
003ED8 10          DC.B    $10          .          D8
003ED9 10          DC.B    $10          .          D9
003EDA 10          DC.B    $10          .          DA
003EDB 10          DC.B    $10          .          DB
```

```
003EDC 00              DC.B    $00            TR          DC
003EDD 00              DC.B    $00            TRT         DD
003EDE 00              DC.B    $00            ED          DE
003EDF 00              DC.B    $00            EDMK        DF
                *
003EE0 10              DC.B    $10            .           E0
003EE1 10              DC.B    $10            .           E1
003EE2 10              DC.B    $10            .           E2
003EE3 10              DC.B    $10            .           E3
003EE4 10              DC.B    $10            .           E4
003EE5 10              DC.B    $10            .           E5
003EE6 10              DC.B    $10            .           E6
003EE7 10              DC.B    $10            .           E7
003EE8 00              DC.B    $00            MVCIN       E8
003EE9 10              DC.B    $10            .           E9
003EEA 10              DC.B    $10            .           EA
003EEB 10              DC.B    $10            .           EB
003EEC 10              DC.B    $10            .           EC
003EED 10              DC.B    $10            .           ED
003EEE 10              DC.B    $10            .           EE
003EEF 10              DC.B    $10            .           EF
                *
003EF0 80              DC.B    $80            SRP         F0
003EF1 10              DC.B    $10            MVO         F1
003EF2 10              DC.B    $10            PACK        F2
003EF3 10              DC.B    $10            UNPK        F3
003EF4 10              DC.B    $10            .           F4
003EF5 10              DC.B    $10            .           F5
003EF6 10              DC.B    $10            .           F6
003EF7 10              DC.B    $10            .           F7
003EF8 80              DC.B    $80            ZAP         F8
003EF9 80              DC.B    $80            CP          F9
003EFA 80              DC.B    $80            AP          FA
003EFB 80              DC.B    $80            SP          FB
003EFC 80              DC.B    $80            MP          FC
003EFD 80              DC.B    $80            DP          FD
003EFE 10              DC.B    $10            .           FE
003EFF 10              DC.B    $10            .           FF
                *
       00006020        ORG     PC_COMM1
                *------------------------------------------------------------------------
006020 04000000        DC.L    $04000000      MANOP INITIALIZATION
006024 00000020        DC.L    $00000020
006028 00000000        DC.L    0,0,0,0,0
00602C 00000000
006030 00000000
006034 00000000
006038 00000000
00603C 00000100        DC.L    CTRL_REG
                *
       00006048        ORG     PC_COMM2
006048 8000            DC      $8000          CONFIGURATION BYTE
                *
       00006050        ORG     PC_COMM2+$8
006050 00000000        DC.L    0              CONTROL BLOCK ADDRESS FOR INTERRUPTS
                *                               FROM PC
006054 00000000        DC.L    0              CONTROL BLOCK ADDRESS FOR REQUESTS
                *                               GOING TO PC
006058 00000000        DC.L    0              INTERRUPT MASK FOR PC
00605C 00000000        DC.L    0              REFERENCE CODE FOR ERRORS
                *
       00006060        ORG     PC_COMM2+$18
006060 05000000        DC.L    $05000000      TIMER PCIB
006064 03000014        DC.L    $03000014
006068 00000000        DC.L    0
00606C 00000000        DC.L    0              TIMER DATA
006070 00000000        DC.L    0
                *
006074 04000000        DC.L    $04000000      ASYNCHRONOUS MANOP PCIB
006078 00000020        DC.L    $00000020
00607C 00000000        DC.L    0
006080 00000000        DC.L    0
006084 00000000        DC.L    0
006088 00000000        DC.L    0
00608C 00000000        DC.L    0
```

```
006090 00000000              DC.L     0
                       *
006094 06000000              DC.L     $06000000          MASK
006098 0000000C              DC.L     $0000000C
00609C 00000000              DC.L     0
                       *
0060A0 05000000              DC.L     $05000000          ASYNCHRONOUS TIMER PCIB
0060A4 03000014              DC.L     $03000014
0060A8 00000000              DC.L     0
0060AC 00000000              DC.L     0
0060B0 00000000              DC.L     0
                       *
0060B4 8005E060              DC.L    TIMER_CB+MAIN_STR+$80000000    HIGH ORDER BIT IS
0060B8 8005E020              DC.L    MANOP_CB+MAIN_STR+$80000000      INTERRUPT FLAG FOR PC
0060BC 8005E094              DC.L    MASK_CB+MAIN_STR+$80000000
                       *
                       *
                       *
       000060C0              ORG      E_WORK
EN983024
                       *     LOAD/STORE GPR INSTRUCTIONS
                       *
0060C0 5000                  DC.W     $5000              STORE REGISTER
0060C2 01A0                  DC.W     GPR
                       *
0060C4 900F                  DC.W     $900F              STORE MULTIPLE
0060C6 0140                  DC.W     GPRSAVE
                       *
0060C8 5800                  DC.W     $5800              LOAD REGISTER FOR EXECUTE
0060CA 01A0                  DC.W     GPR
                       *
0060CC 980F                  DC.W     $980F              LOAD MULTIPLE
0060CE 0140                  DC.W     GPRSAVE
                       *
0060D0 0000                  DC.W     0                  INSTRUCTION AREA FOR EXECUTE
0060D2 00000000              DC.L     0
0060D6 0000                  DC.W     0                  ADDRESS COMPARE STOP SAVE AREA
0060D8 00000000              DC.L     0
                       *
       00006128              ORG      PER_WORK
                       *-----------------------------------------------------------------
                       *
006128 00000000              DC.L     0                  PER DATA AREAS
00612C 00000000              DC.L     0
006130 0000                  DC       0
006132 0000                  DC       0
006134 00000000              DC.L     0
006138 00000000              DC.L     0
00613C 0000                  DC.W     0
00613E 00000000              DC.L     0
006142 00000000              DC.L     0
                       *
006146 0000                  DC       0                  SAVE AREA FOR I-STEP COUNT
                       *
                       *     TERMINATION PCIB
                       *
006148 8005E14C        TRM_CBADR DC.L   TERM_CB+MAIN_STR+$80000000
00614C FF020000        TERM_CB   DC.L   $FF020000
006150 0000000C                  DC.L   $0000000C
006154 00000001                  DC.L   $00000001
                             END
```

Having thus described our invention, what we claim as new and desire to secure by Letters Patent, is as follows:

1. A dual purpose apparatus capable of operating in translation mode and segmentation mode for effecting virtual to real address translations using fixed page sizes in a microprocessor implemented data processing system having predetermined real storage and virtual storage while in said translation mode, and for effecting real storage segmentation while in said segmentation mode, comprising:

a microprocessor address bus;

table storage means connected to said address bus for storing a plurality of dual purpose pages, said storage means capable of storing the total number of pages possible in said predetermined virtual storage, each of said pages further comprising:

a translation information field; and a real out-of-bounds bit;

accessing means, connected to said storage means, for accessing only said translation information field when said apparatus is in said translation mode and for accessing only said real out of bounds bit when said apparatus is in said segmentation mode.

2. The dual purpose apparatus according to claim 1, further comprising:

mode selection means for selecting a mode of operation of said dual purpose apparatus, said selection means capable of selecting translation mode and segmentation mode.

3. The dual purpose apparatus according to claim 1, wherein said accessing means further comprises:

modification means for modifying said real out of bounds bit, thereby changing the segmentation of said real storage.

4. The dual purpose apparatus according to claim 1, wherein said translation information field further comprises:

a real address field and a page fault bit.

5. The dual purpose apparatus according to claim 1, further comprising:

a multiplexing means having a first input, a second input, and an output, said second input connected to said microprocessor address bus, said first input connected to said table storage means, said output connected to said real storage, said multiplexing means for multiplexing said first input to said output when said dual purpose apparatus is in said translation mode, and for multiplexing said second input to said output when said dual purpose apparatus is in said segmentation mode.

6. A dual purpose apparatus capable of operating in translation mode and segmentation mode for effecting virtual to real address translations using fixed page sizes in a microprocessor implemented data processing system having predetermined real storage and virtual storage while in said translation mode, and for effecting real storage segmentation while in said segmentation mode, comprising:

a microprocessor address bus;

a page address table having an input and output of predetermined bit width and connected to said microprocessor address bus at said input, said table having a depth at least equal to the total number of pages possible in said predetermined virtual storage and a width at least equal to the number of bits needed to represent the largest real page address that can be encountered in said predetermined real storage plus a plurality of flag bits wherein one of said flag bits is a real-out-of-bounds bit;

control means connected to said page address table for initializing said page address table, including means for updating a portion of the contents thereof, and means for reading a portion of the contents thereof;

mode selection means for selecting a mode of operation of said dual purpose apparatus, said selection means capable of selecting translation mode and segmentation mode;

a mode selection register means for holding an indication therein of the mode selected by said mode selection means; and a multiplexer circuit having an untranslated data input, a translated data input, a control line input, and an multiplexer output, said untranslated data input connected to said microprocessor address bus, said translated data input connected to said page address table, said multiplexer output connected to said real storage, and said control line input connected to said mode selection holding means to responsively select said untranslated data input to be switched to said multiplexer output when said mode selection means has selected said segmentation mode, and to responsively select said translated data input to be switched to said multiplexor output when said mode selection means has selected said translation mode, wherein each real-out-of-bounds bit associated with each page of said page address table is individually programmable by said control means so that said real storage can be programmably segmented, wherein said real out of bounds bit is ignored when said dual purpose apparatus is in said translation mode, and wherein all data occupying said width of said page address table except said real-out-of-bounds bit is ignored when said dual purpose apparatus is in said segmentation mode, thereby allowing said page address table to be used for both virtual to real address translation and for real storage segmentation.

7. A method of using a page address table comprising a plurality of dual purpose pages, said table capable of storing the total number of pages possible in a predetermined virtual storage, each of said pages comprising a real address field, a page fault bit and a real out of bounds bit, said page address table efficiently used for both virtual to real address translation and real storage segmentation, said translation comprising the steps of:

requesting a virtual page address, requesting a data location address within said virtual page address, selecting a page from said page table corresponding to said requested virtual page address, checking said page fault bit to verify that said data resides in real storage, ignoring said real out-of-bounds bit contained in said selected page, translating said virtual page address into a real page address contained in said real address field;

said real storage segmentation comprising the steps of:

requesting a real page address, requesting a data location address within said real page address, selecting a page from said page table corresponding to said requested real page address, ignoring said real address field and said page fault bit contained in said selected page, and checking said real out of bounds bit to make sure that said requested data is within the available segment of real storage.

8. The method of claim 7 wherein said translation further comprises the steps of:

joining said real page address obtained in said translating step with said requested data location address; and providing the requestor with the data contained in real memory at said joined address.

9. The method of claim 7 wherein said real storage segmentation further comprises the steps of:

joining said requested real address with said requested data location address; and providing the requestor with the data contained in available segmented real memory responsive to said checking step.

* * * * *